US012771178B2

(12) United States Patent
Johnston et al.

(10) Patent No.: US 12,771,178 B2
(45) Date of Patent: Oct. 20, 2026

(54) INTEGRATED WIRELESS-POWER-TRANSMISSION PLATFORM WITH SUPPORT FOR DYNAMIC TUNING, AND METHOD AND SYSTEMS OF USE THEREOF

(71) Applicant: Energous Corporation, San Jose, CA (US)

(72) Inventors: Cesar A. Johnston, Sunnyvale, CA (US); Erik Heinke, San Jose, CA (US); Deepak Jain, San Ramon, CA (US); Yunhong Liu, San Jose, CA (US); Weimin Peng, San Jose, CA (US); Noorul Ameen Thfile Ahamed, San Jose, CA (US); Alister Hoss, Long Beach, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 18/639,430

(22) Filed: Apr. 18, 2024

(65) Prior Publication Data

US 2024/0266884 A1 Aug. 8, 2024

Related U.S. Application Data

(63) Continuation-in-part of application No. 18/314,742, filed on May 9, 2023, now Pat. No. 12,142,939.

(Continued)

(51) Int. Cl.

*H02J 50/23* (2016.01)
*H02J 50/00* (2016.01)
*H02J 50/40* (2016.01)

(52) U.S. Cl.

CPC ............ *H02J 50/23* (2016.02); *H02J 50/005* (2020.01); *H02J 50/402* (2020.01)

(58) Field of Classification Search

CPC ........ H02J 50/23; H02J 50/005; H02J 50/402; H02J 50/20

See application file for complete search history.

(56) References Cited

U.S. PATENT DOCUMENTS

| | | | |
|---|---|---|---|
| 787,412 | A | 4/1905 | Tesla |
| 2,811,624 | A | 10/1957 | Haagensen |

(Continued)

FOREIGN PATENT DOCUMENTS

| | | | |
|---|---|---|---|
| CN | 201278367 | Y | 7/2009 |
| CN | 102227884 | A | 10/2011 |

(Continued)

OTHER PUBLICATIONS

Energous Corp., IPRP, PCT/US2014/040697, Dec. 8, 2015, 9 pgs.

(Continued)

*Primary Examiner* — Daniel Cavallari

(74) *Attorney, Agent, or Firm* — Ashurst Perkins Coie US LLP

(57) ABSTRACT

Methods and devices for wireless power transmission are described. An example wireless-power-transmitting device includes a programmable-splitter component configured to be switchable between a linear polarization setting and a circular polarization setting. The example device also includes a plurality of polarization-switching components coupled to a plurality of outputs of the programmable-splitter component, and a plurality of amplifiers coupled to respective outputs of the plurality of polarization-switching components. The example device further includes a plurality of antennas coupled to respective outputs of the plurality of amplifiers.

19 Claims, 76 Drawing Sheets

Related U.S. Application Data

(60) Provisional application No. 63/496,663, filed on Apr. 17, 2023, provisional application No. 63/490,441, filed on Mar. 15, 2023, provisional application No. 63/411,060, filed on Sep. 28, 2022, provisional application No. 63/342,000, filed on May 13, 2022.

(56) References Cited

U.S. PATENT DOCUMENTS 2,863,148 A 12/1958 Gammon et al.
3,167,775 A 1/1965 Guertler
3,434,678 A 3/1969 Brown et al.
3,696,384 A 10/1972 Lester
3,754,269 A 8/1973 Clavin
4,101,895 A 7/1978 Jones, Jr.
4,360,741 A 11/1982 Fitzsimmons et al.
4,944,036 A 7/1990 Hyatt
4,995,010 A 2/1991 Knight
5,142,292 A 8/1992 Chang
5,200,759 A 4/1993 McGinnis
5,211,471 A 5/1993 Rohrs
5,276,455 A 1/1994 Fitzsimmons et al.
5,548,292 A 8/1996 Hirshfield et al.
5,556,749 A 9/1996 Mitsuhashi et al.
5,568,088 A 10/1996 Dent et al.
5,631,572 A 5/1997 Sheen et al.
5,646,633 A 7/1997 Dahlberg
5,697,063 A 12/1997 Kishigami et al.
5,712,642 A 1/1998 Hulderman
5,936,527 A 8/1999 Isaacman et al.
5,982,139 A 11/1999 Parise
6,046,708 A 4/2000 MacDonald, Jr. et al.
6,061,025 A 5/2000 Jackson et al.
6,127,799 A 10/2000 Krishnan
6,127,942 A 10/2000 Welle
6,163,296 A 12/2000 Lier et al.
6,176,433 B1 1/2001 Uesaka et al.
6,271,799 B1 8/2001 Rief
6,289,237 B1 9/2001 Mickle et al.
6,329,908 B1 12/2001 Frecska
6,400,586 B2 6/2002 Raddi et al.
6,421,235 B2 7/2002 Ditzik
6,437,685 B2 8/2002 Hanaki
6,456,253 B1 9/2002 Rummeli et al.
6,476,795 B1 11/2002 Derocher et al.
6,501,414 B2 12/2002 Amdt et al.
6,583,723 B2 6/2003 Watanabe et al.
6,597,897 B2 7/2003 Tang
6,615,074 B2 9/2003 Mickle et al.
6,650,376 B1 11/2003 Obitsu
6,664,920 B1 12/2003 Mott et al.
6,680,700 B2 1/2004 Hilgers
6,798,716 B1 9/2004 Charych
6,803,744 B1 10/2004 Sabo
6,853,197 B1 2/2005 McFarland
6,856,291 B2 2/2005 Mickle et al.
6,911,945 B2 6/2005 Korva
6,960,968 B2 11/2005 Odendaal et al.
6,967,462 B1 11/2005 Landis
6,988,026 B2 1/2006 Breed et al.
7,003,350 B2 2/2006 Denker et al.
7,012,572 B1 3/2006 Schaffner et al.
7,027,311 B2 4/2006 Vanderelli et al.
7,068,234 B2 6/2006 Sievenpiper
7,068,991 B2 6/2006 Parise
7,079,079 B2 7/2006 Jo et al.
7,183,748 B1 2/2007 Unno et al.
7,191,013 B1 3/2007 Miranda et al.
7,193,644 B2 3/2007 Carter
7,196,663 B2 3/2007 Bolzer et al.
7,205,749 B2 4/2007 Hagen et al.
7,215,296 B2 5/2007 Abramov et al.
7,222,356 B1 5/2007 Yonezawa et al.
7,274,334 B2 9/2007 O'Riordan et al.
7,274,336 B2 9/2007 Carson
7,351,975 B2 4/2008 Brady et al.
7,359,730 B2 4/2008 Dennis et al.
7,372,408 B2 5/2008 Gaucher
7,392,068 B2 6/2008 Dayan
7,403,803 B2 7/2008 Mickle et al.
7,443,057 B2 10/2008 Nunally
7,451,839 B2 11/2008 Perlman
7,463,201 B2 12/2008 Chiang et al.
7,471,247 B2 12/2008 Saily
7,535,195 B1 5/2009 Horovitz et al.
7,614,556 B2 11/2009 Overhultz et al.
7,639,994 B2 12/2009 Greene et al.
7,643,312 B2 1/2010 Vanderelli et al.
7,652,577 B1 1/2010 Madhow et al.
7,679,576 B2 3/2010 Riedel et al.
7,702,771 B2 4/2010 Ewing et al.
7,786,419 B2 8/2010 Hyde et al.
7,812,771 B2 10/2010 Greene et al.
7,830,312 B2 11/2010 Choudhury et al.
7,844,306 B2 11/2010 Shearer et al.
7,868,482 B2 1/2011 Greene et al.
7,898,105 B2 3/2011 Greene et al.
7,904,117 B2 3/2011 Doan et al.
7,911,386 B1 3/2011 Ito et al.
7,925,308 B2 4/2011 Greene et al.
7,948,208 B2 5/2011 Partovi et al.
8,049,676 B2 11/2011 Yoon et al.
8,055,003 B2 11/2011 Mittleman et al.
8,070,595 B2 12/2011 Alderucci et al.
8,072,380 B2 12/2011 Crouch
8,092,301 B2 1/2012 Alderucci et al.
8,099,140 B2 1/2012 Arai
8,115,448 B2 2/2012 John
8,159,090 B2 4/2012 Greene et al.
8,159,364 B2 4/2012 Zeine
8,180,286 B2 5/2012 Yamasuge
8,184,454 B2 5/2012 Mao
8,228,194 B2 7/2012 Mickle
8,234,509 B2 7/2012 Gioscia et al.
8,264,101 B2 9/2012 Hyde et al.
8,264,291 B2 9/2012 Morita
8,276,325 B2 10/2012 Clifton et al.
8,278,784 B2 10/2012 Cook et al.
8,284,101 B2 10/2012 Fusco
8,310,201 B1 11/2012 Wright
8,338,991 B2 12/2012 Von Novak et al.
8,362,745 B2 1/2013 Tinaphong
8,380,255 B2 2/2013 Shearer et al.
8,384,600 B2 2/2013 Huang et al.
8,410,953 B2 4/2013 Zeine
8,411,963 B2 4/2013 Luff
8,432,062 B2 4/2013 Greene et al.
8,432,071 B2 4/2013 Huang et al.
8,446,248 B2 5/2013 Zeine
8,447,234 B2 5/2013 Cook et al.
8,451,189 B1 5/2013 Fluhler
8,452,235 B2 5/2013 Kirby et al.
8,457,656 B2 6/2013 Perkins et al.
8,461,817 B2 6/2013 Martin et al.
8,467,733 B2 6/2013 Leabman
8,497,601 B2 7/2013 Hall et al.
8,497,658 B2 7/2013 Von Novak et al.
8,552,597 B2 10/2013 Song et al.
8,558,661 B2 10/2013 Zeine
8,560,026 B2 10/2013 Chanterac
8,564,485 B2 10/2013 Milosavljevic et al.
8,604,746 B2 12/2013 Lee
8,614,643 B2 12/2013 Leabman
8,621,245 B2 12/2013 Shearer et al.
8,626,249 B2 1/2014 Kuusilinna et al.
8,629,576 B2 1/2014 Levine
8,653,966 B2 2/2014 Rao et al.
8,655,272 B2 2/2014 Saunamäki
8,674,551 B2 3/2014 Low et al.
8,686,685 B2 4/2014 Moshfeghi
8,686,905 B2 4/2014 Shtrom
8,712,355 B2 4/2014 Black et al.
8,712,485 B2 4/2014 Tam
8,718,773 B2 5/2014 Wills et al.

(56) References Cited

U.S. PATENT DOCUMENTS 8,729,737 B2 5/2014 Schatz et al.
8,736,228 B1 5/2014 Freed et al.
8,760,113 B2 6/2014 Keating
8,770,482 B2 7/2014 Ackermann et al.
8,772,960 B2 7/2014 Yoshida
8,823,319 B2 9/2014 Von Novak, III et al.
8,832,646 B1 9/2014 Wendling
8,854,176 B2 10/2014 Zeine
8,860,364 B2 10/2014 Low et al.
8,897,770 B1 11/2014 Frolov et al.
8,903,456 B2 12/2014 Chu et al.
8,917,057 B2 12/2014 Hui
8,923,189 B2 12/2014 Leabman
8,928,544 B2 1/2015 Massie et al.
8,937,408 B2 1/2015 Ganem et al.
8,946,940 B2 2/2015 Kim et al.
8,963,486 B2 2/2015 Kirby et al.
8,970,070 B2 3/2015 Sada et al.
8,989,053 B1 3/2015 Skaaksrud et al.
9,000,616 B2 4/2015 Greene et al.
9,001,622 B2 4/2015 Perry
9,006,934 B2 4/2015 Kozakai et al.
9,021,277 B2 4/2015 Shearer et al.
9,030,161 B2 5/2015 Lu et al.
9,059,598 B2 6/2015 Kang et al.
9,059,599 B2 6/2015 Won et al.
9,077,188 B2 7/2015 Moshfeghi
9,083,595 B2 7/2015 Rakib et al.
9,088,216 B2 7/2015 Garrity et al.
9,124,125 B2 9/2015 Leabman et al.
9,130,397 B2 9/2015 Leabman et al.
9,130,602 B2 9/2015 Cook
9,142,998 B2 9/2015 Yu et al.
9,143,000 B2 9/2015 Leabman et al.
9,143,010 B2 9/2015 Urano
9,153,074 B2 10/2015 Zhou et al.
9,178,389 B2 11/2015 Hwang
9,225,196 B2 12/2015 Huang et al.
9,240,469 B2 1/2016 Sun et al.
9,242,411 B2 1/2016 Kritchman et al.
9,244,500 B2 1/2016 Cain et al.
9,252,628 B2 2/2016 Leabman et al.
9,270,344 B2 2/2016 Rosenberg
9,276,329 B2 3/2016 Jones et al.
9,282,582 B1 3/2016 Dunsbergen et al.
9,294,840 B1 3/2016 Anderson et al.
9,297,896 B1 3/2016 Andrews
9,318,898 B2 4/2016 John
9,368,020 B1 6/2016 Bell et al.
9,401,977 B1 7/2016 Gaw
9,409,490 B2 8/2016 Kawashima
9,419,335 B2 8/2016 Pintos
9,419,443 B2 8/2016 Leabman
9,438,045 B1 9/2016 Leabman
9,438,046 B1 9/2016 Leabman
9,444,283 B2 9/2016 Son et al.
9,450,449 B1 9/2016 Leabman et al.
9,461,502 B2 10/2016 Lee et al.
9,520,725 B2 12/2016 Masaoka et al.
9,520,748 B2 12/2016 Hyde et al.
9,522,270 B2 12/2016 Perryman et al.
9,532,748 B2 1/2017 Denison et al.
9,537,354 B2 1/2017 Bell et al.
9,537,357 B2 1/2017 Leabman
9,537,358 B2 1/2017 Leabman
9,538,382 B2 1/2017 Bell et al.
9,544,640 B2 1/2017 Lau
9,559,553 B2 1/2017 Bae
9,564,773 B2 2/2017 Pogorelik et al.
9,571,974 B2 2/2017 Choi et al.
9,590,317 B2 3/2017 Zimmerman et al.
9,590,444 B2 3/2017 Walley
9,620,996 B2 4/2017 Zeine
9,647,328 B2 5/2017 Dobric
9,706,137 B2 7/2017 Scanlon et al.
9,711,999 B2 7/2017 Hietala et al.
9,723,635 B2 8/2017 Nambord et al.
9,793,758 B2 10/2017 Leabman
9,793,764 B2 10/2017 Perry
9,800,080 B2 10/2017 Leabman et al.
9,800,172 B1 10/2017 Leabman
9,806,564 B2 10/2017 Leabman
9,819,230 B2 11/2017 Petras et al.
9,824,815 B2 11/2017 Leabman et al.
9,825,674 B1 11/2017 Leabman
9,831,718 B2 11/2017 Leabman et al.
9,838,083 B2 12/2017 Bell et al.
9,843,201 B1 12/2017 Leabman et al.
9,843,213 B2 12/2017 Leabman et al.
9,843,229 B2 12/2017 Leabman
9,843,763 B2 12/2017 Leabman et al.
9,847,669 B2 12/2017 Leabman
9,847,677 B1 12/2017 Leabman
9,847,679 B2 12/2017 Bell et al.
9,853,361 B2 12/2017 Chen et al.
9,853,692 B1 12/2017 Bell et al.
9,859,756 B2 1/2018 Leabman et al.
9,859,758 B1 1/2018 Leabman
9,859,797 B1 1/2018 Leabman
9,866,279 B2 1/2018 Bell et al.
9,867,032 B2 1/2018 Verma et al.
9,867,062 B1 1/2018 Bell et al.
9,871,301 B2 1/2018 Contopanagos
9,876,379 B1 1/2018 Leabman et al.
9,876,380 B1 1/2018 Leabman et al.
9,876,394 B1 1/2018 Leabman
9,876,536 B1 1/2018 Bell et al.
9,876,648 B2 1/2018 Bell
9,882,394 B1 1/2018 Bell et al.
9,882,427 B2 1/2018 Leabman et al.
9,887,584 B1 2/2018 Bell et al.
9,887,739 B2 2/2018 Leabman et al.
9,891,669 B2 2/2018 Bell
9,893,554 B2 2/2018 Bell et al.
9,893,555 B1 2/2018 Leabman et al.
9,893,564 B2 2/2018 de Rochemont
9,899,744 B1 2/2018 Contopanagos et al.
9,899,844 B1 2/2018 Bell et al.
9,899,861 B1 2/2018 Leabman et al.
9,899,873 B2 2/2018 Bell et al.
9,906,065 B2 2/2018 Leabman et al.
9,906,275 B2 2/2018 Leabman
9,912,199 B2 3/2018 Leabman et al.
9,916,485 B1 3/2018 Lilly et al.
9,917,477 B1 3/2018 Bell et al.
9,923,386 B1 3/2018 Leabman et al.
9,939,864 B1 4/2018 Bell et al.
9,941,747 B2 4/2018 Bell et al.
9,941,754 B2 4/2018 Leabman et al.
9,948,135 B2 4/2018 Leabman et al.
9,954,374 B1 4/2018 Bell et al.
9,965,009 B1 5/2018 Bell et al.
9,966,765 B1 5/2018 Leabman
9,966,784 B2 5/2018 Leabman
9,967,743 B1 5/2018 Bell et al.
9,973,008 B1 5/2018 Leabman
10,003,211 B1 6/2018 Leabman et al.
10,008,777 B1 6/2018 Broyde et al.
10,008,875 B1 6/2018 Leabman
10,008,889 B2 6/2018 Bell et al.
10,014,728 B1 7/2018 Leabman
10,027,159 B2 7/2018 Hosseini
10,038,337 B1 7/2018 Leabman et al.
10,050,462 B1 8/2018 Leabman et al.
10,056,782 B1 8/2018 Leabman
10,063,064 B1 8/2018 Bell et al.
10,063,105 B2 8/2018 Leabman
10,063,106 B2 8/2018 Bell et al.
10,068,703 B1 9/2018 Contopanagos
10,075,008 B1 9/2018 Bell et al.
10,079,515 B2 9/2018 Hosseini et al.
10,090,699 B1 10/2018 Leabman
10,090,714 B2 10/2018 Bohn et al.
10,090,886 B1 10/2018 Bell et al.

(56) References Cited

U.S. PATENT DOCUMENTS 10,103,552 B1 10/2018 Leabman et al.
10,103,582 B2 10/2018 Leabman et al.
10,110,046 B1 10/2018 Esquibel et al.
10,116,170 B1 10/2018 Leabman
10,122,219 B1 11/2018 Hosseini et al.
10,122,415 B2 11/2018 Bell et al.
10,124,754 B1 11/2018 Leabman
10,128,686 B1 11/2018 Leabman et al.
10,128,693 B2 11/2018 Bell et al.
10,128,695 B2 11/2018 Leabman et al.
10,128,699 B2 11/2018 Leabman
10,134,260 B1 11/2018 Bell et al.
10,135,112 B1 11/2018 Hosseini
10,135,286 B2 11/2018 Hosseini et al.
10,135,294 B1 11/2018 Leabman
10,135,295 B2 11/2018 Leabman
10,141,768 B2 11/2018 Leabman et al.
10,141,771 B1 11/2018 Hosseini et al.
10,141,791 B2 11/2018 Bell et al.
10,148,097 B1 12/2018 Leabman et al.
10,153,645 B1 12/2018 Bell et al.
10,153,653 B1 12/2018 Bell et al.
10,153,660 B1 12/2018 Leabman et al.
10,158,257 B2 12/2018 Leabman
10,158,259 B1 12/2018 Leabman
10,164,478 B2 12/2018 Leabman
10,170,917 B1 1/2019 Bell et al.
10,177,594 B2 1/2019 Contopanagos
10,181,756 B2 1/2019 Bae et al.
10,186,892 B2 1/2019 Hosseini et al.
10,186,893 B2 1/2019 Bell et al.
10,186,911 B2 1/2019 Leabman
10,186,913 B2 1/2019 Leabman et al.
10,193,396 B1 1/2019 Bell et al.
10,199,835 B2 2/2019 Bell
10,199,849 B1 2/2019 Bell
10,199,850 B2 2/2019 Leabman
10,205,239 B1 2/2019 Contopanagos et al.
10,206,185 B2 2/2019 Leabman et al.
10,211,674 B1 2/2019 Leabman et al.
10,211,680 B2 2/2019 Leabman et al.
10,211,682 B2 2/2019 Bell et al.
10,211,685 B2 2/2019 Bell et al.
10,218,207 B2 2/2019 Hosseini et al.
10,218,227 B2 2/2019 Leabman et al.
10,223,717 B1 3/2019 Bell
10,224,758 B2 3/2019 Leabman et al.
10,224,982 B1 3/2019 Leabman
10,230,266 B1 3/2019 Leabman et al.
10,243,414 B1 3/2019 Leabman et al.
10,256,657 B2 4/2019 Hosseini et al.
10,256,677 B2 4/2019 Hosseini et al.
10,263,432 B1 4/2019 Leabman et al.
10,263,476 B2 4/2019 Leabman
10,270,261 B2 4/2019 Bell et al.
10,277,054 B2 4/2019 Hosseini
10,291,055 B1 5/2019 Bell et al.
10,291,056 B2 5/2019 Bell et al.
10,291,066 B1 5/2019 Leabman
10,291,294 B2 5/2019 Leabman
10,298,024 B2 5/2019 Leabman
10,298,133 B2 5/2019 Leabman
10,305,315 B2 5/2019 Leabman et al.
10,312,715 B2 6/2019 Leabman
10,320,446 B2 6/2019 Hosseini
10,333,332 B1 6/2019 Hosseini
10,355,534 B2 7/2019 Johnston et al.
10,381,880 B2 8/2019 Leabman et al.
10,389,161 B2 8/2019 Hosseini et al.
10,396,588 B2 8/2019 Leabman
10,396,604 B2 8/2019 Bell et al.
10,439,442 B2 10/2019 Hosseini et al.
10,439,448 B2 10/2019 Bell et al.
10,447,093 B2 10/2019 Hosseini
10,476,312 B2 11/2019 Johnston et al.
10,483,768 B2 11/2019 Bell et al.
10,490,346 B2 11/2019 Contopanagos
10,491,029 B2 11/2019 Hosseini
10,498,144 B2 12/2019 Leabman et al.
10,511,097 B2 12/2019 Kornaros et al.
10,511,196 B2 12/2019 Hosseini
10,516,289 B2 12/2019 Leabman et al.
10,516,301 B2 12/2019 Leabman
10,523,033 B2 12/2019 Leabman
10,523,058 B2 12/2019 Leabman
10,554,052 B2 2/2020 Bell et al.
10,594,165 B2 3/2020 Hosseini
10,615,647 B2 4/2020 Johnston et al.
10,651,670 B1 * 5/2020 Jiang .................... H02J 50/005
10,680,319 B2 6/2020 Hosseini et al.
10,714,984 B2 7/2020 Hosseini et al.
10,734,717 B2 8/2020 Hosseini
10,778,041 B2 9/2020 Leabman
10,790,674 B2 9/2020 Bell et al.
10,840,743 B2 11/2020 Johnston et al.
10,848,853 B2 11/2020 Leabman et al.
10,879,740 B2 12/2020 Hosseini
10,923,954 B2 2/2021 Leabman
10,958,095 B2 3/2021 Leabman et al.
10,965,164 B2 3/2021 Leabman et al.
10,985,617 B1 4/2021 Johnston et al.
10,992,185 B2 4/2021 Leabman
10,992,187 B2 4/2021 Leabman
11,011,942 B2 5/2021 Liu
11,018,779 B2 5/2021 Sarajedini
11,056,929 B2 7/2021 Bell et al.
11,114,885 B2 9/2021 Hosseini et al.
11,159,057 B2 10/2021 Kabiri et al.
11,218,795 B2 1/2022 Leabman et al.
11,233,425 B2 1/2022 Leabman
11,245,191 B2 2/2022 Kornaros et al.
11,245,289 B2 2/2022 Johnston et al.
11,342,798 B2 5/2022 Johnston et al.
11,355,966 B2 6/2022 Muryanto et al.
11,411,437 B2 8/2022 Johnston et al.
11,437,735 B2 9/2022 Papio-Toda et al.
11,451,096 B2 9/2022 Hoss
11,463,179 B2 10/2022 Sarajedini et al.
11,469,629 B2 10/2022 Jain et al.
11,502,551 B2 11/2022 Leabman
11,515,732 B2 11/2022 Contopanagos et al.
11,539,243 B2 12/2022 Katajamaki et al.
11,594,902 B2 2/2023 Johnston et al.
11,637,456 B2 4/2023 Kornaros et al.
11,652,369 B2 5/2023 Leabman et al.
11,670,970 B2 6/2023 Leabman
11,689,045 B2 6/2023 Leabman et al.
11,699,847 B2 7/2023 Contopanagos et al.
11,710,987 B2 7/2023 Johnston et al.
2002/0065052 A1 5/2002 Pande et al.
2002/0103447 A1 8/2002 Terry
2002/0171594 A1 11/2002 Fang
2003/0038750 A1 2/2003 Chen
2003/0058187 A1 3/2003 Billiet et al.
2004/0020100 A1 2/2004 O'Brian et al.
2004/0130425 A1 7/2004 Dayan et al.
2004/0130442 A1 7/2004 Breed
2004/0145342 A1 7/2004 Lyon
2004/0155832 A1 8/2004 Yuanzhu
2004/0207559 A1 10/2004 Milosavljevic
2004/0259604 A1 12/2004 Mickle et al.
2005/0007276 A1 1/2005 Barrick et al.
2005/0116683 A1 6/2005 Cheng
2005/0117660 A1 6/2005 Vialle et al.
2005/0134517 A1 6/2005 Gottl
2005/0227619 A1 10/2005 Lee et al.
2005/0237258 A1 10/2005 Abramov et al.
2006/0013335 A1 1/2006 Leabman
2006/0019712 A1 1/2006 Choi
2006/0030279 A1 2/2006 Leabman et al.
2006/0092079 A1 5/2006 de Rochemont
2006/0094425 A1 5/2006 Mickle et al.
2006/0113955 A1 6/2006 Nunally
2006/0119532 A1 6/2006 Yun et al.

(56) References Cited

U.S. PATENT DOCUMENTS

| | | | |
|---|---|---|---|
| 2006/0160517 | A1 | 7/2006 | Yoon |
| 2006/0184705 | A1 | 8/2006 | Nakajima |
| 2006/0199620 | A1 | 9/2006 | Greene et al. |
| 2006/0238365 | A1 | 10/2006 | Vecchione et al. |
| 2006/0252370 | A1 | 11/2006 | Goossens et al. |
| 2006/0266564 | A1 | 11/2006 | Perlman et al. |
| 2006/0266917 | A1 | 11/2006 | Baldis et al. |
| 2006/0284593 | A1 | 12/2006 | Nagy et al. |
| 2007/0007821 | A1 | 1/2007 | Rossetti |
| 2007/0019693 | A1 | 1/2007 | Graham |
| 2007/0021140 | A1 | 1/2007 | Keyes |
| 2007/0060185 | A1 | 3/2007 | Simon et al. |
| 2007/0090997 | A1 | 4/2007 | Brown et al. |
| 2007/0093269 | A1 | 4/2007 | Leabman et al. |
| 2007/0097653 | A1 | 5/2007 | Gilliland et al. |
| 2007/0103110 | A1 | 5/2007 | Sagoo |
| 2007/0106894 | A1 | 5/2007 | Zhang |
| 2007/0109121 | A1 | 5/2007 | Cohen |
| 2007/0139000 | A1 | 6/2007 | Kozuma |
| 2007/0149162 | A1 | 6/2007 | Greene et al. |
| 2007/0164868 | A1 | 7/2007 | Deavours et al. |
| 2007/0173214 | A1 | 7/2007 | Mickle et al. |
| 2007/0178857 | A1 | 8/2007 | Greene et al. |
| 2007/0178945 | A1 | 8/2007 | Cook et al. |
| 2007/0182367 | A1 | 8/2007 | Partovi |
| 2007/0191074 | A1 | 8/2007 | Harrist et al. |
| 2007/0191075 | A1 | 8/2007 | Greene et al. |
| 2007/0210960 | A1 | 9/2007 | Rofougaran et al. |
| 2007/0222681 | A1 | 9/2007 | Greene et al. |
| 2007/0228833 | A1 | 10/2007 | Stevens et al. |
| 2007/0229261 | A1 | 10/2007 | Zimmerman et al. |
| 2007/0240297 | A1 | 10/2007 | Yang et al. |
| 2007/0273486 | A1 | 11/2007 | Shiotsu |
| 2007/0296639 | A1 | 12/2007 | Hook et al. |
| 2007/0298846 | A1 | 12/2007 | Greene et al. |
| 2008/0014897 | A1 | 1/2008 | Cook et al. |
| 2008/0024376 | A1 | 1/2008 | Norris et al. |
| 2008/0048917 | A1 | 2/2008 | Achour et al. |
| 2008/0067874 | A1 | 3/2008 | Tseng |
| 2008/0074324 | A1 | 3/2008 | Puzella et al. |
| 2008/0089277 | A1 | 4/2008 | Alexander et al. |
| 2008/0110263 | A1 | 5/2008 | Klessel et al. |
| 2008/0122297 | A1 | 5/2008 | Arai |
| 2008/0123383 | A1 | 5/2008 | Shionoiri |
| 2008/0169910 | A1 | 7/2008 | Greene et al. |
| 2008/0197802 | A1 | 8/2008 | Onishi |
| 2008/0204350 | A1 | 8/2008 | Tam et al. |
| 2008/0210762 | A1 | 9/2008 | Osada et al. |
| 2008/0211458 | A1 | 9/2008 | Lawther et al. |
| 2008/0233890 | A1 | 9/2008 | Baker |
| 2008/0258993 | A1 | 10/2008 | Gummalla et al. |
| 2008/0266191 | A1 | 10/2008 | Hilgers |
| 2008/0278378 | A1 | 11/2008 | Chang et al. |
| 2008/0309452 | A1 | 12/2008 | Zeine |
| 2009/0002493 | A1 | 1/2009 | Kates |
| 2009/0010316 | A1 | 1/2009 | Rofougaran et al. |
| 2009/0019183 | A1 | 1/2009 | Wu et al. |
| 2009/0036065 | A1 | 2/2009 | Siu |
| 2009/0039828 | A1 | 2/2009 | Jakubowski |
| 2009/0047998 | A1 | 2/2009 | Alberth, Jr. |
| 2009/0058361 | A1 | 3/2009 | John |
| 2009/0058731 | A1 | 3/2009 | Geary et al. |
| 2009/0060012 | A1 | 3/2009 | Gresset et al. |
| 2009/0067198 | A1 | 3/2009 | Graham et al. |
| 2009/0067208 | A1 | 3/2009 | Martin et al. |
| 2009/0073066 | A1 | 3/2009 | Jordon et al. |
| 2009/0096412 | A1 | 4/2009 | Huang |
| 2009/0096413 | A1 | 4/2009 | Partovi |
| 2009/0102292 | A1 | 4/2009 | Cook et al. |
| 2009/0102296 | A1 | 4/2009 | Greene et al. |
| 2009/0108679 | A1 | 4/2009 | Porwal |
| 2009/0122847 | A1 | 5/2009 | Nysen et al. |
| 2009/0128262 | A1 | 5/2009 | Lee et al. |
| 2009/0174604 | A1 | 7/2009 | Keskitalo |
| 2009/0200985 | A1 | 8/2009 | Zane et al. |
| 2009/0206791 | A1 | 8/2009 | Jung |
| 2009/0207092 | A1 | 8/2009 | Nysen et al. |
| 2009/0218884 | A1 | 9/2009 | Soar |
| 2009/0218891 | A1 | 9/2009 | McCollough |
| 2009/0243397 | A1 | 10/2009 | Cook et al. |
| 2009/0256752 | A1 | 10/2009 | Akkermans et al. |
| 2009/0264069 | A1 | 10/2009 | Yamasuge |
| 2009/0271048 | A1 | 10/2009 | Wakamatsu |
| 2009/0281678 | A1 | 11/2009 | Wakamatsu |
| 2009/0284082 | A1 | 11/2009 | Mohammadian |
| 2009/0284220 | A1 | 11/2009 | Toncich et al. |
| 2009/0284227 | A1 | 11/2009 | Mohammadian et al. |
| 2009/0286475 | A1 | 11/2009 | Toncich et al. |
| 2009/0286476 | A1 | 11/2009 | Toncich et al. |
| 2009/0291634 | A1 | 11/2009 | Saarisalo |
| 2009/0312046 | A1 | 12/2009 | Clevenger et al. |
| 2009/0322281 | A1 | 12/2009 | Kamijo et al. |
| 2010/0001683 | A1 | 1/2010 | Huang et al. |
| 2010/0007307 | A1 | 1/2010 | Baarman et al. |
| 2010/0007569 | A1 | 1/2010 | Sim et al. |
| 2010/0019908 | A1 | 1/2010 | Cho et al. |
| 2010/0033021 | A1 | 2/2010 | Bennett |
| 2010/0034238 | A1 | 2/2010 | Bennett |
| 2010/0044123 | A1 | 2/2010 | Perlman et al. |
| 2010/0060534 | A1 | 3/2010 | Oodachi |
| 2010/0066631 | A1 | 3/2010 | Puzella et al. |
| 2010/0075607 | A1 | 3/2010 | Hosoya |
| 2010/0079005 | A1 | 4/2010 | Hyde et al. |
| 2010/0079011 | A1 | 4/2010 | Hyde et al. |
| 2010/0087227 | A1 | 4/2010 | Francos et al. |
| 2010/0090656 | A1 | 4/2010 | Shearer et al. |
| 2010/0109443 | A1 | 5/2010 | Cook et al. |
| 2010/0117926 | A1 | 5/2010 | DeJean, II |
| 2010/0123618 | A1 | 5/2010 | Martin et al. |
| 2010/0123624 | A1 | 5/2010 | Minear et al. |
| 2010/0127660 | A1 | 5/2010 | Cook et al. |
| 2010/0142418 | A1 | 6/2010 | Nishioka et al. |
| 2010/0142509 | A1 | 6/2010 | Zhu et al. |
| 2010/0148723 | A1 | 6/2010 | Cook et al. |
| 2010/0151808 | A1 | 6/2010 | Toncich et al. |
| 2010/0156741 | A1 | 6/2010 | Vazquez et al. |
| 2010/0164296 | A1 | 7/2010 | Kurs et al. |
| 2010/0164433 | A1 | 7/2010 | Janefalker et al. |
| 2010/0167664 | A1 | 7/2010 | Szini |
| 2010/0171461 | A1 | 7/2010 | Baarman et al. |
| 2010/0171676 | A1 | 7/2010 | Tani et al. |
| 2010/0174629 | A1 | 7/2010 | Taylor et al. |
| 2010/0176934 | A1 | 7/2010 | Chou et al. |
| 2010/0181961 | A1 | 7/2010 | Novak et al. |
| 2010/0181964 | A1 | 7/2010 | Huggins et al. |
| 2010/0194206 | A1 | 8/2010 | Burdo et al. |
| 2010/0201189 | A1 | 8/2010 | Kirby et al. |
| 2010/0201201 | A1 | 8/2010 | Mobarhan et al. |
| 2010/0201314 | A1 | 8/2010 | Toncich et al. |
| 2010/0207572 | A1 | 8/2010 | Kirby et al. |
| 2010/0210233 | A1 | 8/2010 | Cook et al. |
| 2010/0213895 | A1 | 8/2010 | Keating et al. |
| 2010/0214177 | A1 | 8/2010 | Parsche |
| 2010/0222010 | A1 | 9/2010 | Ozaki et al. |
| 2010/0225270 | A1 | 9/2010 | Jacobs et al. |
| 2010/0227570 | A1 | 9/2010 | Hendin |
| 2010/0244576 | A1 | 9/2010 | Hillan et al. |
| 2010/0253281 | A1 | 10/2010 | Li |
| 2010/0256831 | A1 | 10/2010 | Abramo et al. |
| 2010/0259447 | A1 | 10/2010 | Crouch |
| 2010/0264747 | A1 | 10/2010 | Hall et al. |
| 2010/0277003 | A1 | 11/2010 | Von Novak et al. |
| 2010/0279606 | A1 | 11/2010 | Hillan et al. |
| 2010/0289341 | A1 | 11/2010 | Ozaki et al. |
| 2010/0295372 | A1 | 11/2010 | Hyde et al. |
| 2010/0309088 | A1 | 12/2010 | Hyvonen et al. |
| 2010/0315045 | A1 | 12/2010 | Zeine |
| 2010/0328044 | A1 | 12/2010 | Waffenschmidt et al. |
| 2011/0009057 | A1 | 1/2011 | Saunamäki |
| 2011/0013198 | A1 | 1/2011 | Shirley |
| 2011/0018360 | A1 | 1/2011 | Baarman et al. |
| 2011/0028114 | A1 | 2/2011 | Kerselaers |
| 2011/0032149 | A1 | 2/2011 | Leabman |
| 2011/0032866 | A1 | 2/2011 | Leabman |

(56) References Cited

U.S. PATENT DOCUMENTS

2011/0034190 A1 2/2011 Leabman
2011/0034191 A1 2/2011 Leabman
2011/0043047 A1 2/2011 Karalis et al.
2011/0043163 A1 2/2011 Baarman et al.
2011/0043327 A1 2/2011 Baarman et al.
2011/0050166 A1 3/2011 Cook et al.
2011/0057607 A1 3/2011 Carobolante
2011/0057853 A1 3/2011 Kim et al.
2011/0062788 A1 3/2011 Chen et al.
2011/0074342 A1 3/2011 MacLaughlin
2011/0074349 A1 3/2011 Ghovanloo
2011/0092161 A1 4/2011 Dotan
2011/0109167 A1 5/2011 Park et al.
2011/0115303 A1 5/2011 Baarman et al.
2011/0115432 A1 5/2011 El-Maleh
2011/0115605 A1 5/2011 Dimig et al.
2011/0121660 A1 5/2011 Azancot et al.
2011/0122018 A1 5/2011 Tarng et al.
2011/0122026 A1 5/2011 DeLaquil et al.
2011/0127845 A1 6/2011 Walley et al.
2011/0127952 A1 6/2011 Walley et al.
2011/0133691 A1 6/2011 Hautanen
2011/0151789 A1 6/2011 Viglione et al.
2011/0154429 A1 6/2011 Stantchev
2011/0156493 A1 6/2011 Bennett
2011/0156494 A1 6/2011 Mashinsky
2011/0156640 A1 6/2011 Moshfeghi
2011/0175455 A1 7/2011 Hashiguchi
2011/0175461 A1 7/2011 Tinaphong
2011/0181120 A1 7/2011 Liu et al.
2011/0182245 A1 7/2011 Malkamaki et al.
2011/0184842 A1 7/2011 Melen
2011/0194543 A1 8/2011 Zhao et al.
2011/0195722 A1 8/2011 Walter et al.
2011/0199046 A1 8/2011 Tsai et al.
2011/0202289 A1 8/2011 Kalantari Khandani
2011/0215086 A1 9/2011 Yeh
2011/0217923 A1 9/2011 Ma
2011/0220634 A1 9/2011 Yeh
2011/0221389 A1 9/2011 Won et al.
2011/0221391 A1 9/2011 Won et al.
2011/0222154 A1 9/2011 Choi et al.
2011/0222272 A1 9/2011 Yeh
2011/0227725 A1 9/2011 Muirhead
2011/0243040 A1 10/2011 Khan et al.
2011/0243050 A1 10/2011 Yanover
2011/0244913 A1 10/2011 Kim et al.
2011/0248573 A1 10/2011 Kanno et al.
2011/0248575 A1 10/2011 Kim et al.
2011/0249678 A1 10/2011 Bonicatto
2011/0254377 A1 10/2011 Widmer et al.
2011/0254503 A1 10/2011 Widmer et al.
2011/0259953 A1 10/2011 Baarman et al.
2011/0273977 A1 11/2011 Shapira et al.
2011/0278941 A1 11/2011 Krishna et al.
2011/0279226 A1 11/2011 Chen et al.
2011/0281535 A1 11/2011 Low et al.
2011/0282415 A1 11/2011 Eckhoff et al.
2011/0285213 A1 11/2011 Kowalewski
2011/0286374 A1 11/2011 Shin et al.
2011/0291489 A1 12/2011 Tsai et al.
2011/0302078 A1 12/2011 Failing
2011/0304216 A1 12/2011 Baarman
2011/0304437 A1 12/2011 Beeler
2011/0304521 A1 12/2011 Ando et al.
2012/0007441 A1 1/2012 John
2012/0013196 A1 1/2012 Kim et al.
2012/0013198 A1 1/2012 Uramoto et al.
2012/0013296 A1 1/2012 Heydari et al.
2012/0019419 A1 1/2012 Prat et al.
2012/0025622 A1 2/2012 Kim et al.
2012/0043887 A1 2/2012 Mesibov
2012/0051109 A1 3/2012 Kim et al.
2012/0051294 A1 3/2012 Guillouard
2012/0056486 A1 3/2012 Endo et al.
2012/0056741 A1 3/2012 Zhu et al.
2012/0068906 A1 3/2012 Asher et al.
2012/0074891 A1 3/2012 Anderson et al.
2012/0075072 A1 3/2012 Pappu
2012/0080944 A1 4/2012 Recker et al.
2012/0080957 A1 4/2012 Cooper et al.
2012/0086284 A1 4/2012 Capanella et al.
2012/0086615 A1 4/2012 Norair
2012/0095617 A1 4/2012 Martin et al.
2012/0098350 A1 4/2012 Campanella et al.
2012/0098485 A1 4/2012 Kang et al.
2012/0099675 A1 4/2012 Kitamura et al.
2012/0103562 A1 5/2012 Clayton
2012/0104849 A1 5/2012 Jackson
2012/0105252 A1 5/2012 Wang
2012/0112532 A1 5/2012 Kesler et al.
2012/0119914 A1 5/2012 Uchida
2012/0126743 A1 5/2012 Rivers, Jr.
2012/0132647 A1 5/2012 Beverly et al.
2012/0133214 A1 5/2012 Yun et al.
2012/0142291 A1 6/2012 Rath et al.
2012/0146426 A1 6/2012 Sabo
2012/0146576 A1 6/2012 Partovi
2012/0146577 A1 6/2012 Tanabe
2012/0147802 A1 6/2012 Ukita et al.
2012/0149307 A1 6/2012 Terada et al.
2012/0150670 A1 6/2012 Taylor et al.
2012/0153894 A1 6/2012 Widmer et al.
2012/0157019 A1 6/2012 Li
2012/0161531 A1 6/2012 Kim et al.
2012/0161544 A1 6/2012 Kashiwagi et al.
2012/0169276 A1 7/2012 Wang
2012/0169278 A1 7/2012 Choi
2012/0173418 A1 7/2012 Beardsmore et al.
2012/0179004 A1 7/2012 Roesicke et al.
2012/0181973 A1 7/2012 Lyden
2012/0182427 A1 7/2012 Marshall
2012/0187851 A1 7/2012 Huggins et al.
2012/0188142 A1 7/2012 Shashi et al.
2012/0193999 A1 8/2012 Zeine
2012/0200399 A1 8/2012 Chae
2012/0201153 A1 8/2012 Bharadia et al.
2012/0201173 A1 8/2012 Jian et al.
2012/0206299 A1 8/2012 Valdes-Garcia
2012/0211214 A1 8/2012 Phan
2012/0212071 A1 8/2012 Miyabayashi et al.
2012/0212072 A1 8/2012 Miyabayashi et al.
2012/0214462 A1 8/2012 Chu et al.
2012/0214536 A1 8/2012 Kim et al.
2012/0228392 A1 9/2012 Cameron et al.
2012/0228956 A1 9/2012 Kamata
2012/0231856 A1 9/2012 Lee et al.
2012/0235636 A1 9/2012 Partovi
2012/0242283 A1 9/2012 Kim et al.
2012/0248886 A1 10/2012 Kesler et al.
2012/0248888 A1 10/2012 Kesler et al.
2012/0248891 A1 10/2012 Drennen
2012/0249051 A1 10/2012 Son et al.
2012/0262002 A1 10/2012 Widmer et al.
2012/0265272 A1 10/2012 Judkins
2012/0267900 A1 10/2012 Huffman et al.
2012/0268238 A1 10/2012 Park et al.
2012/0270592 A1 10/2012 Ngai
2012/0274154 A1 11/2012 DeLuca
2012/0280650 A1 11/2012 Kim et al.
2012/0286582 A1 11/2012 Kim et al.
2012/0292993 A1 11/2012 Mettler et al.
2012/0293021 A1 11/2012 Teggatz et al.
2012/0293119 A1 11/2012 Park et al.
2012/0299389 A1 11/2012 Lee et al.
2012/0299540 A1 11/2012 Perry
2012/0299541 A1 11/2012 Perry
2012/0299542 A1 11/2012 Perry
2012/0300588 A1 11/2012 Perry
2012/0300592 A1 11/2012 Perry
2012/0300593 A1 11/2012 Perry
2012/0306284 A1 12/2012 Lee et al.
2012/0306433 A1 12/2012 Kim et al.
2012/0306572 A1 12/2012 Hietala et al.

(56) References Cited

U.S. PATENT DOCUMENTS

2012/0306705 A1 12/2012 Sakurai et al.
2012/0306707 A1 12/2012 Yang et al.
2012/0306720 A1 12/2012 Tanmi et al.
2012/0307873 A1 12/2012 Kim et al.
2012/0309295 A1 12/2012 Maguire
2012/0309308 A1 12/2012 Kim et al.
2012/0309332 A1 12/2012 Liao
2012/0313446 A1 12/2012 Park et al.
2012/0313449 A1 12/2012 Kurs
2012/0313835 A1 12/2012 Gebretnsae
2012/0326660 A1 12/2012 Lu et al.
2013/0002550 A1 1/2013 Zalewski
2013/0005252 A1 1/2013 Lee et al.
2013/0018439 A1 1/2013 Chow et al.
2013/0024059 A1 1/2013 Miller et al.
2013/0026981 A1 1/2013 Van Der Lee
2013/0026982 A1 1/2013 Rothenbaum
2013/0032589 A1 2/2013 Chung
2013/0033571 A1 2/2013 Steen
2013/0038124 A1 2/2013 Newdoll et al.
2013/0038402 A1 2/2013 Karalis et al.
2013/0043738 A1 2/2013 Park et al.
2013/0044035 A1 2/2013 Zhuang
2013/0049471 A1 2/2013 Oleynik
2013/0049475 A1 2/2013 Kim et al.
2013/0049484 A1 2/2013 Weissentern et al.
2013/0057078 A1 3/2013 Lee
2013/0057205 A1 3/2013 Lee et al.
2013/0057210 A1 3/2013 Negaard et al.
2013/0057364 A1 3/2013 Kesler et al.
2013/0058379 A1 3/2013 Kim et al.
2013/0062959 A1 3/2013 Lee et al.
2013/0063082 A1 3/2013 Lee et al.
2013/0063143 A1 3/2013 Adalsteinsson et al.
2013/0063266 A1 3/2013 Yunker et al.
2013/0069444 A1 3/2013 Waffenschmidt et al.
2013/0076308 A1 3/2013 Niskala et al.
2013/0077650 A1 3/2013 Traxler et al.
2013/0078918 A1 3/2013 Crowley et al.
2013/0082651 A1 4/2013 Park et al.
2013/0082653 A1 4/2013 Lee et al.
2013/0083774 A1 4/2013 Son et al.
2013/0088082 A1 4/2013 Kang et al.
2013/0088090 A1 4/2013 Wu
2013/0088192 A1 4/2013 Eaton
2013/0088331 A1 4/2013 Cho
2013/0093388 A1 4/2013 Partovi
2013/0099389 A1 4/2013 Hong et al.
2013/0099586 A1 4/2013 Kato
2013/0106197 A1 5/2013 Bae et al.
2013/0107023 A1 5/2013 Tanaka et al.
2013/0119777 A1 5/2013 Rees
2013/0119778 A1 5/2013 Jung
2013/0119929 A1 5/2013 Partovi
2013/0120052 A1 5/2013 Siska
2013/0120205 A1 5/2013 Thomson et al.
2013/0120206 A1 5/2013 Biancotto et al.
2013/0120217 A1 5/2013 Ueda et al.
2013/0130621 A1 5/2013 Kim et al.
2013/0132010 A1 5/2013 Winger et al.
2013/0134923 A1 5/2013 Smith
2013/0137455 A1 5/2013 Xia
2013/0141037 A1 6/2013 Jenwatanavet et al.
2013/0148341 A1 6/2013 Williams
2013/0149975 A1 6/2013 Yu et al.
2013/0154387 A1 6/2013 Lee et al.
2013/0155748 A1 6/2013 Sundstrom
2013/0157729 A1 6/2013 Tabe
2013/0162335 A1 6/2013 Kim et al.
2013/0169061 A1 7/2013 Microshnichenko et al.
2013/0169219 A1 7/2013 Gray
2013/0169348 A1 7/2013 Shi
2013/0171939 A1 7/2013 Tian et al.
2013/0175877 A1 7/2013 Abe et al.
2013/0178253 A1 7/2013 Karaoguz
2013/0181881 A1 7/2013 Christie et al.
2013/0187475 A1 7/2013 Vendik
2013/0190031 A1 7/2013 Persson et al.
2013/0193769 A1 8/2013 Mehta et al.
2013/0197320 A1 8/2013 Albert et al.
2013/0200064 A1 8/2013 Alexander
2013/0207477 A1 8/2013 Nam et al.
2013/0207604 A1 8/2013 Zeine
2013/0207879 A1 8/2013 Rada et al.
2013/0207893 A1 8/2013 Liu et al.
2013/0210357 A1 8/2013 Qin et al.
2013/0221757 A1 8/2013 Cho et al.
2013/0222201 A1 8/2013 Ma et al.
2013/0234530 A1 9/2013 Miyauchi
2013/0234536 A1 9/2013 Chemishkian et al.
2013/0234658 A1 9/2013 Endo et al.
2013/0241306 A1 9/2013 Aber et al.
2013/0241468 A1 9/2013 Moshfeghi
2013/0241474 A1 9/2013 Moshfeghi
2013/0249478 A1 9/2013 Hirano
2013/0249479 A1 9/2013 Partovi
2013/0249682 A1 9/2013 Van Wiemeersch et al.
2013/0250102 A1 9/2013 Scanlon et al.
2013/0254578 A1 9/2013 Huang et al.
2013/0264997 A1 10/2013 Lee et al.
2013/0268782 A1 10/2013 Tam et al.
2013/0270923 A1 10/2013 Cook et al.
2013/0278076 A1 10/2013 Proud
2013/0278209 A1 10/2013 Von Novak
2013/0285464 A1 10/2013 Miwa
2013/0285477 A1 10/2013 Lo et al.
2013/0285606 A1 10/2013 Ben-Shalom et al.
2013/0288600 A1 10/2013 Kuusilinna et al.
2013/0288617 A1 10/2013 Kim et al.
2013/0293423 A1 11/2013 Moshfeghi
2013/0300356 A1 11/2013 Yang
2013/0307751 A1 11/2013 Yu-Juin et al.
2013/0310020 A1 11/2013 Kazuhiro
2013/0311798 A1 11/2013 Sultenfuss
2013/0328417 A1 12/2013 Takeuchi
2013/0334883 A1 12/2013 Kim et al.
2013/0339108 A1 12/2013 Ryder et al.
2013/0343208 A1 12/2013 Sexton et al.
2013/0343251 A1 12/2013 Zhang
2013/0343585 A1 12/2013 Bennett et al.
2014/0001846 A1 1/2014 Mosebrook
2014/0001875 A1 1/2014 Nahidipour
2014/0001876 A1 1/2014 Fujiwara et al.
2014/0006017 A1 1/2014 Sen
2014/0008993 A1 1/2014 Leabman
2014/0009110 A1 1/2014 Lee
2014/0011531 A1 1/2014 Burstrom et al.
2014/0015336 A1 1/2014 Weber et al.
2014/0015344 A1 1/2014 Mohamadi
2014/0021907 A1 1/2014 Yu et al.
2014/0021908 A1 1/2014 McCool
2014/0035524 A1 2/2014 Zeine
2014/0035526 A1 2/2014 Tripathi et al.
2014/0035786 A1 2/2014 Ley
2014/0043248 A1 2/2014 Yeh
2014/0049422 A1 2/2014 Von Novak et al.
2014/0054971 A1 2/2014 Kissin
2014/0055098 A1 2/2014 Lee et al.
2014/0057618 A1 2/2014 Zirwas et al.
2014/0062395 A1 3/2014 Kwon et al.
2014/0082435 A1 3/2014 Kitgawa
2014/0086125 A1 3/2014 Polo et al.
2014/0086592 A1 3/2014 Nakahara et al.
2014/0091756 A1 4/2014 Ofstein et al.
2014/0091968 A1 4/2014 Harel et al.
2014/0091974 A1 4/2014 Desclos et al.
2014/0103869 A1 4/2014 Radovic
2014/0104157 A1 4/2014 Burns
2014/0111147 A1 4/2014 Soar
2014/0111153 A1 4/2014 Kwon et al.
2014/0113689 A1 4/2014 Lee
2014/0117946 A1 5/2014 Muller et al.
2014/0118140 A1 5/2014 Amis
2014/0128107 A1 5/2014 An

(56) References Cited

U.S. PATENT DOCUMENTS

2014/0132210 A1 5/2014 Partovi
2014/0133279 A1 5/2014 Khuri-Yakub
2014/0139034 A1 5/2014 Sankar et al.
2014/0139039 A1 5/2014 Cook et al.
2014/0139180 A1 5/2014 Kim et al.
2014/0141838 A1 5/2014 Cai et al.
2014/0142876 A1 5/2014 John et al.
2014/0143933 A1 5/2014 Low et al.
2014/0145879 A1 5/2014 Pan
2014/0145884 A1 5/2014 Dang et al.
2014/0152117 A1 6/2014 Sanker
2014/0159651 A1 6/2014 Von Novak et al.
2014/0159652 A1 6/2014 Hall et al.
2014/0159662 A1 6/2014 Furui
2014/0159667 A1 6/2014 Kim et al.
2014/0169385 A1 6/2014 Hadani et al.
2014/0175893 A1 6/2014 Sengupta et al.
2014/0176054 A1 6/2014 Porat et al.
2014/0176061 A1 6/2014 Cheatham, III et al.
2014/0176082 A1 6/2014 Visser
2014/0177399 A1 6/2014 Teng et al.
2014/0183964 A1 7/2014 Walley
2014/0184148 A1 7/2014 Van Der Lee et al.
2014/0184155 A1 7/2014 Cha
2014/0184163 A1 7/2014 Das et al.
2014/0184170 A1 7/2014 Jeong
2014/0191568 A1 7/2014 Partovi
2014/0191818 A1 7/2014 Waffenschmidt et al.
2014/0194092 A1 7/2014 Wanstedt et al.
2014/0194095 A1 7/2014 Wanstedt et al.
2014/0197691 A1 7/2014 Wang
2014/0203629 A1 7/2014 Hoffman et al.
2014/0206384 A1 7/2014 Kim et al.
2014/0210281 A1 7/2014 Ito et al.
2014/0217955 A1 8/2014 Lin
2014/0217967 A1 8/2014 Zeine et al.
2014/0225805 A1 8/2014 Pan et al.
2014/0232320 A1 8/2014 Ento July et al.
2014/0232610 A1 8/2014 Shigemoto et al.
2014/0239733 A1 8/2014 Mach et al.
2014/0241231 A1 8/2014 Zeine
2014/0245036 A1 8/2014 Oishi
2014/0246416 A1 9/2014 White
2014/0247152 A1 9/2014 Proud
2014/0252813 A1 9/2014 Lee et al.
2014/0252866 A1 9/2014 Walsh et al.
2014/0265725 A1 9/2014 Angle et al.
2014/0265727 A1 9/2014 Berte
2014/0265943 A1 9/2014 Angle et al.
2014/0266025 A1 9/2014 Jakubowski
2014/0266946 A1 9/2014 Bily et al.
2014/0273819 A1 9/2014 Nadakuduti et al.
2014/0273892 A1 9/2014 Nourbakhsh
2014/0281655 A1 9/2014 Angle et al.
2014/0292090 A1 10/2014 Cordeiro et al.
2014/0292451 A1 10/2014 Zimmerman
2014/0300452 A1 10/2014 Rofe et al.
2014/0312706 A1 10/2014 Fiorello et al.
2014/0325218 A1 10/2014 Shimizu et al.
2014/0327320 A1 11/2014 Muhs et al.
2014/0327390 A1 11/2014 Park et al.
2014/0333142 A1 11/2014 Desrosiers
2014/0346860 A1 11/2014 Aubry et al.
2014/0354063 A1 12/2014 Leabman et al.
2014/0354221 A1 12/2014 Leabman et al.
2014/0355718 A1 12/2014 Guan et al.
2014/0368048 A1 12/2014 Leabman et al.
2014/0368161 A1 12/2014 Leabman et al.
2014/0368405 A1 12/2014 Ek et al.
2014/0375139 A1 12/2014 Tsukamoto
2014/0375253 A1 12/2014 Leabman et al.
2014/0375258 A1 12/2014 Arkhipenkov
2014/0375261 A1 12/2014 Manova-Elssibony et al.
2015/0001949 A1 1/2015 Leabman et al.
2015/0002080 A1 1/2015 Lang
2015/0002086 A1 1/2015 Matos et al.
2015/0003207 A1 1/2015 Lee et al.
2015/0008980 A1 1/2015 Kim et al.
2015/0011160 A1 1/2015 Uurgovan et al.
2015/0015180 A1 1/2015 Miller et al.
2015/0015182 A1 1/2015 Brandtman et al.
2015/0015192 A1 1/2015 Leabman et al.
2015/0021990 A1 1/2015 Myer et al.
2015/0022008 A1 1/2015 Leabman et al.
2015/0022010 A1 1/2015 Leabman et al.
2015/0022194 A1 1/2015 Almalki et al.
2015/0023204 A1 1/2015 Wil et al.
2015/0028688 A1 1/2015 Masaoka
2015/0028694 A1 1/2015 Leabman et al.
2015/0028697 A1 1/2015 Leabman et al.
2015/0028875 A1 1/2015 Irie et al.
2015/0035378 A1 2/2015 Calhoun et al.
2015/0035709 A1 2/2015 Lim
2015/0035715 A1 2/2015 Kim et al.
2015/0039482 A1 2/2015 Fuinaga
2015/0041459 A1 2/2015 Leabman et al.
2015/0042265 A1 2/2015 Leabman et al.
2015/0044977 A1 2/2015 Ramasamy et al.
2015/0046526 A1 2/2015 Bush et al.
2015/0061404 A1 3/2015 Lamenza et al.
2015/0076917 A1 3/2015 Leabman et al.
2015/0076927 A1 3/2015 Leabman et al.
2015/0077036 A1 3/2015 Leabman et al.
2015/0077037 A1 3/2015 Leabman et al.
2015/0091520 A1 4/2015 Blum et al.
2015/0091706 A1 4/2015 Chemishkian et al.
2015/0097442 A1 4/2015 Muurinen
2015/0097663 A1 4/2015 Sloo et al.
2015/0102764 A1 4/2015 Leabman et al.
2015/0102769 A1 4/2015 Leabman et al.
2015/0102942 A1 4/2015 Houser et al.
2015/0102973 A1 4/2015 Hand et al.
2015/0108848 A1 4/2015 Joehren
2015/0109181 A1 4/2015 Hyde et al.
2015/0115877 A1 4/2015 Aria et al.
2015/0115878 A1 4/2015 Park
2015/0116153 A1 4/2015 Chen et al.
2015/0128733 A1 5/2015 Taylor et al.
2015/0130285 A1 5/2015 Leabman et al.
2015/0130293 A1 5/2015 Hajimiri et al.
2015/0137612 A1 5/2015 Yamakawa et al.
2015/0148664 A1 5/2015 Stolka et al.
2015/0155737 A1 6/2015 Mayo
2015/0155738 A1 6/2015 Leabman et al.
2015/0162129 A1 6/2015 Fujieda
2015/0162662 A1 6/2015 Chen et al.
2015/0162751 A1 6/2015 Leabman et al.
2015/0162779 A1 6/2015 Lee et al.
2015/0171512 A1 6/2015 Chen et al.
2015/0171513 A1 6/2015 Chen et al.
2015/0171656 A1 6/2015 Leabman et al.
2015/0171658 A1* 6/2015 Manova-Elssibony ...................... H02J 50/23 320/108
2015/0171931 A1 6/2015 Won et al.
2015/0177326 A1 6/2015 Chakraborty et al.
2015/0180133 A1 6/2015 Hunt
2015/0180249 A1 6/2015 Jeon et al.
2015/0180284 A1 6/2015 Kang et al.
2015/0181117 A1 6/2015 Park et al.
2015/0187491 A1 7/2015 Yanagawa
2015/0188352 A1 7/2015 Peek et al.
2015/0199665 A1 7/2015 Chu
2015/0201385 A1 7/2015 Mercer et al.
2015/0207333 A1 7/2015 Baarman et al.
2015/0207542 A1 7/2015 Zeine
2015/0222126 A1 8/2015 Leabman et al.
2015/0233987 A1 8/2015 Von Novak, III et al.
2015/0234144 A1 8/2015 Cameron et al.
2015/0236515 A1 8/2015 Yoshida et al.
2015/0236520 A1 8/2015 Baarman
2015/0236877 A1 8/2015 Peng et al.
2015/0244070 A1 8/2015 Cheng et al.
2015/0244080 A1 8/2015 Gregoire

(56) References Cited

U.S. PATENT DOCUMENTS

2015/0244187 A1 8/2015 Horie
2015/0244201 A1 8/2015 Chu
2015/0244341 A1 8/2015 Ritter et al.
2015/0249484 A1 9/2015 Mach et al.
2015/0255989 A1 9/2015 Walley et al.
2015/0256097 A1 9/2015 Gudan et al.
2015/0260835 A1 9/2015 Widmer et al.
2015/0262465 A1 9/2015 Pritchett
2015/0263534 A1 9/2015 Lee et al.
2015/0263548 A1 9/2015 Cooper
2015/0270618 A1 9/2015 Zhu et al.
2015/0270622 A1 9/2015 Takasaki et al.
2015/0270741 A1 9/2015 Leabman et al.
2015/0278558 A1 10/2015 Priev et al.
2015/0280429 A1 10/2015 Makita et al.
2015/0280484 A1 10/2015 Radziemski et al.
2015/0288067 A1 10/2015 Kwon et al.
2015/0288074 A1 10/2015 Harper et al.
2015/0288438 A1 10/2015 Maltsev et al.
2015/0311585 A1 10/2015 Church et al.
2015/0312721 A1 10/2015 Singh
2015/0318729 A1 11/2015 Leabman
2015/0326024 A1 11/2015 Bell et al.
2015/0326070 A1 11/2015 Petras et al.
2015/0326072 A1 11/2015 Petras et al.
2015/0326143 A1 11/2015 Petras et al.
2015/0327085 A1 11/2015 Hadani
2015/0333528 A1 11/2015 Leabman
2015/0333573 A1 11/2015 Leabman
2015/0333800 A1 11/2015 Perry et al.
2015/0339497 A1 11/2015 Kurian
2015/0340759 A1 11/2015 Bridgelall et al.
2015/0340903 A1 11/2015 Bell et al.
2015/0341087 A1 11/2015 Moore et al.
2015/0358222 A1 12/2015 Berger et al.
2015/0365137 A1 12/2015 Miller et al.
2015/0365138 A1 12/2015 Miller et al.
2016/0005068 A1 1/2016 Im et al.
2016/0012695 A1 1/2016 Bell et al.
2016/0013560 A1 1/2016 Daniels
2016/0013661 A1 1/2016 Kurs et al.
2016/0013677 A1 1/2016 Bell et al.
2016/0013855 A1 1/2016 Campos
2016/0020636 A1 1/2016 Khlat
2016/0028403 A1 1/2016 McCaughan et al.
2016/0033254 A1 2/2016 Zeine et al.
2016/0042206 A1 2/2016 Pesavento et al.
2016/0043571 A1 2/2016 Kesler et al.
2016/0043572 A1 2/2016 Cooper et al.
2016/0054440 A1 2/2016 Younis
2016/0056635 A1 2/2016 Bell
2016/0056640 A1 2/2016 Mao
2016/0065005 A1 3/2016 Won et al.
2016/0079799 A1 3/2016 Khlat
2016/0087483 A1 3/2016 Hietala et al.
2016/0087486 A1 3/2016 Pogorelik et al.
2016/0094091 A1 3/2016 Shin et al.
2016/0094092 A1 3/2016 Davlantes et al.
2016/0099601 A1 4/2016 Leabman et al.
2016/0099614 A1 4/2016 Leabman et al.
2016/0099755 A1 4/2016 Leabman et al.
2016/0099757 A1 4/2016 Leabman et al.
2016/0112787 A1 4/2016 Rich
2016/0126749 A1 5/2016 Shichino et al.
2016/0126752 A1 5/2016 Vuori et al.
2016/0126775 A1 5/2016 Park et al.
2016/0126776 A1 5/2016 Kim et al.
2016/0141908 A1 5/2016 Jakl et al.
2016/0164563 A1 6/2016 Khawand et al.
2016/0172890 A1 6/2016 Jeong
2016/0174162 A1 6/2016 Nadakuduti et al.
2016/0181849 A1 6/2016 Govindaraj
2016/0181867 A1 6/2016 Daniel et al.
2016/0181873 A1 6/2016 Mitcheson et al.
2016/0197522 A1 7/2016 Zeine et al.
2016/0202343 A1 7/2016 Okutsu
2016/0204642 A1 7/2016 Oh
2016/0204643 A1 7/2016 Manova-Elssibony
2016/0218545 A1 7/2016 Schroeder et al.
2016/0233582 A1 8/2016 Piskun Vadim
2016/0238365 A1 8/2016 Wixey et al.
2016/0240908 A1 8/2016 Strong
2016/0248276 A1 8/2016 Hong et al.
2016/0294225 A1 10/2016 Blum et al.
2016/0299210 A1 10/2016 Zeine
2016/0301240 A1 10/2016 Zeine Hatem
2016/0322868 A1 11/2016 Akuzawa et al.
2016/0323000 A1 11/2016 Liu et al.
2016/0336804 A1 11/2016 Son et al.
2016/0339258 A1 11/2016 Perryman et al.
2016/0344098 A1 11/2016 Ming
2016/0359367 A1 12/2016 Rothschild
2016/0380464 A1 12/2016 Chin et al.
2016/0380466 A1 12/2016 Yang et al.
2017/0005481 A1 1/2017 Von Novak, III
2017/0005516 A9 1/2017 Leabman et al.
2017/0005524 A1 1/2017 Akuzawa et al.
2017/0005530 A1 1/2017 Zeine et al.
2017/0012448 A1 1/2017 Miller et al.
2017/0025887 A1 1/2017 Hyun et al.
2017/0025903 A1 1/2017 Song et al.
2017/0026087 A1 1/2017 Tanabe
2017/0040700 A1 2/2017 Leung
2017/0043675 A1 2/2017 Jones et al.
2017/0047784 A1 2/2017 Jung et al.
2017/0063168 A1 3/2017 Uchida
2017/0077733 A1 3/2017 Jeong et al.
2017/0077734 A1 3/2017 Nokkonen et al.
2017/0077765 A1 3/2017 Bell et al.
2017/0077979 A1 3/2017 Papa et al.
2017/0085437 A1 3/2017 Condeixa et al.
2017/0092115 A1 3/2017 Sloo et al.
2017/0110886 A1 4/2017 Reynolds et al.
2017/0110910 A1 4/2017 Zeine et al.
2017/0127196 A1 5/2017 Blum et al.
2017/0134686 A9 5/2017 Leabman
2017/0141582 A1 5/2017 Adolf et al.
2017/0141583 A1 5/2017 Adolf et al.
2017/0163076 A1 6/2017 Park et al.
2017/0168595 A1 6/2017 Sakaguchi et al.
2017/0179763 A9 6/2017 Leabman
2017/0214422 A1 7/2017 Na et al.
2017/0274787 A1 9/2017 Salter et al.
2017/0338695 A1 11/2017 Port
2018/0006611 A1 1/2018 de Jong et al.
2018/0040929 A1 2/2018 Chappelle
2018/0048178 A1 2/2018 Leabman
2018/0090992 A1 3/2018 Shrivastava et al.
2018/0109146 A1 4/2018 Meng et al.
2018/0262050 A1 9/2018 Yankowitz
2018/0269715 A1 9/2018 Hannigan et al.
2018/0301934 A1 10/2018 Prabhala et al.
2018/0309314 A1 10/2018 White et al.
2018/0316391 A1 11/2018 Hijikata
2018/0343040 A1 11/2018 Luzinski et al.
2018/0375368 A1 12/2018 Leabman et al.
2019/0052979 A1 2/2019 Chen et al.
2019/0074862 A1 3/2019 Wang et al.
2019/0296586 A1 9/2019 Moshfeghi
2019/0326782 A1 10/2019 Graham et al.
2019/0386522 A1 12/2019 Park et al.
2019/0393928 A1 12/2019 Leabman
2020/0091608 A1 3/2020 Alpman et al.
2020/0112204 A1 4/2020 Hosseini et al.
2020/0153286 A1 5/2020 Mao
2020/0235614 A1 7/2020 Swan et al.
2020/0244111 A1 7/2020 Johnston et al.
2020/0274397 A1 8/2020 Hwang et al.
2020/0295599 A1 9/2020 Heinrich et al.
2021/0143681 A1 * 5/2021 Farkas .................... H02J 50/30
2021/0273684 A1 9/2021 Yeh et al.
2023/0198164 A1 * 6/2023 Park ........................ H02J 50/23
343/848

(56) References Cited

U.S. PATENT DOCUMENTS

2023/0275467 A1* 8/2023 Farkas .................... H01P 3/12
320/108
2023/0369899 A1 11/2023 Johnston et al.
2025/0266720 A1* 8/2025 Ko .................... H02J 50/80
2026/0031657 A1* 1/2026 Roelvink .............. H01P 5/107

FOREIGN PATENT DOCUMENTS

CN 102292896 A 12/2011
CN 102860037 A 1/2013
CN 103151848 A 6/2013
CN 103348563 A 10/2013
CN 203826555 U 9/2014
CN 104090265 A 10/2014
CN 104167773 A 11/2014
CN 104347915 A 2/2015
CN 105765821 A 7/2016
CN 106329116 A 1/2017
CN 103380561 B 9/2017
DE 20016655 U1 2/2002
DE 102013216953 A1 2/2015
DE 102022209306 A1 * 3/2023 .............. H01Q 9/04
EP 1028482 A2 8/2000
EP 1081506 A1 3/2001
EP 2346136 A1 7/2011
EP 2397973 A1 2/2012
EP 2545635 A2 1/2013
EP 2747195 A1 6/2014
EP 3067983 A1 9/2016
EP 3118970 A1 1/2017
EP 3145052 A1 3/2017
GB 2404497 A 2/2005
GB 2556620 A 6/2018
JP 2000323916 A 11/2000
JP 2002319816 A 10/2002
JP 2006157586 A 6/2006
JP 2007043432 A 2/2007
JP 2008167017 A 7/2008
JP 2009525715 A 7/2009
JP 2009201328 A 9/2009
JP 2012016171 A 1/2012
JP 2012095226 A 5/2012
JP 2012157167 A 8/2012
JP 2013099249 A 5/2013
JP 2013162624 A 8/2013
JP 2014075927 A 4/2014
JP 2014112063 A 6/2014
JP 2014176131 A 9/2014
JP 2014217044 A 11/2014
JP 2015027345 A 2/2015
JP 2015128349 A 7/2015
JP 2015128370 A 7/2015
JP WO2015177859 A1 4/2017
KR 20060061776 A 6/2006
KR 20070044302 A 4/2007
KR 100755144 B1 9/2007
KR 100819604 B1 4/2008
KR 20110132059 A 12/2011
KR 20110135540 A1 12/2011
KR 20120009843 A 2/2012
KR 20120108759 A 10/2012
KR 20130026977 A 3/2013
KR 20140023409 A 2/2014
KR 20140023410 A 3/2014
KR 20140085200 A 7/2014
KR 20140148270 A 12/2014
KR 20150077678 A 7/2015
KR 20160087671 A 7/2016
KR 20180108317 A 10/2018
KR 20180114721 A 10/2018
RU 2658332 C1 6/2018
WO WO 199508125 A1 3/1995
WO WO 199831070 A1 7/1998
WO WO 199952173 A1 10/1999
WO WO 2000111716 A1 2/2001
WO WO 2003091943 A1 11/2003
WO WO 2004077550 A1 9/2004
WO WO 2006122783 A2 11/2006
WO WO 2007070571 A2 6/2007
WO WO 2008024993 A2 2/2008
WO WO 2008156571 A2 12/2008
WO WO 2010022181 A1 2/2010
WO WO 2010039246 A1 4/2010
WO WO 2010138994 A1 12/2010
WO WO 2011112022 A2 9/2011
WO WO 2012177283 A1 12/2012
WO WO 2013031988 A1 3/2013
WO WO 2013035190 A1 3/2013
WO WO 2013038074 A2 3/2013
WO WO 2013042399 A1 3/2013
WO WO 2013052950 A1 4/2013
WO WO 2013105920 A2 7/2013
WO WO 2013175596 A1 11/2013
WO WO 2014068992 A1 5/2014
WO WO 2014075103 A1 5/2014
WO WO 2014113093 A1 7/2014
WO WO 2014132258 A1 9/2014
WO WO 2014134996 A1 9/2014
WO WO 2014182788 A2 11/2014
WO WO 2014182788 A3 11/2014
WO WO 2014197472 A1 12/2014
WO WO 2014209587 A1 12/2014
WO WO 2015038773 A1 3/2015
WO WO 2015097809 A1 7/2015
WO WO 2015130902 A1 9/2015
WO WO 2015161323 A1 10/2015
WO WO 2016013944 A1 1/2016
WO WO 2016024869 A1 2/2016
WO WO 2016048512 A1 3/2016
WO WO 2016057115 A1 4/2016
WO WO 2016088261 A1 6/2016
WO WO 2016187357 A1 11/2016
WO WO 2019078660 A1 4/2019

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr, 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.

(56) References Cited

OTHER PUBLICATIONS

Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., IPRP, PCT/US2020/027409, Sep. 28, 2021, 7 pgs.
Energous Corp., IPRP, PCT/US2020/064592, May 17, 2022, 7pgs.
Energous Corp., IPRP, PCT/US2020/067566, Jul. 5, 2022, 8 pgs.
Energous Corp., IPRP, PCT/US2021/027140, Oct. 13, 2022, 5 pgs.
Energous Corp., IPRP, PCT/US2021/045269, Feb. 7, 2023, 7 pgs.
Energous Corp., IPRP, PCT/US2021/061430, May 30, 2023, 7 pgs.
Energous Corp., IPRP, PCT/US2021/062452, Jun. 13, 2023, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.

(56) References Cited

OTHER PUBLICATIONS

Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/027409, Jul. 24, 2020, 11 pgs.
Energous Corp., ISRWO, PCT/US2020/064592, Mar. 24, 2021, 10 pgs.
Energous Corp., ISRWO, PCT/US2020/067566, Apr. 27, 2021, 12 pgs.
Energous Corp., ISRWO, PCT/US2021/027140, Jul. 21, 2021, 9 pgs.
Energous Corp., ISRWO, PCT/US2021/045269, Dec. 7, 2021, 7 pgs.
Energous Corp., ISRWO, PCT/US2021/061430, Apr. 6, 2022, 10 pgs.
Energous Corp., ISRWO, PCT/US2021/062452, Mar. 29, 2022, 11 pgs.
Energous Corp., ISRWO, PCT/US2022/054108, May 4, 2023, 11 pgs.
Energous Corp., ISRWO, PCT/US2023/022138, Sep. 29, 2023, 20 pgs.
Notice of Intent to Issue Reexam Certificate: 90/013,793 Feb. 2, 2017, 8 pgs.
Order Granting Reexamination Request, U.S. Appl. No. 90/013,793 Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Adamiuk et al., “Compact, Dual-Polarized UWB-Antanna, Embedded in a Dielectric,” IEEE Transactions on Antenna and Propagation, IEEE Service Center, Piscataway, NJ, US vol. 56, No. 2, Feb. 1, 2010, 8 pgs.
Gill et al., “A System for Change Detection and Human Recognition in Voxel Space using the Microsoft Kinect Sensor,” 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., “Development of a Retrodirective Wireless Microwave Power Transmission System”, IEEE, 2003, pp. 393-396.
Leabman, “Adaptive Band-partitioning for Interference Cancellation in Communication System,” Thesis Massachusetts Institute of Technology, Feb. 1997, pp. 1-70.
Li et al., “High-Efficiency Switching-Mode Charger System Design Considerations with Dynamic Power Path Management,” Mar./Apr. 2012 Issue, 8 pgs.
Mao et al., “BeamStar: An Edge-Based Approach to Routing in Wireless Sensors Networks”, IEEE Transactions on Mobile Computing, IEEE Service Center, Los Alamitos, CA, vol. 6, No. 11, Nov. 1, 2007, 13 pgs.
Mascarenas et al., “Experimental Studies of Using Wireless Energy Transmission for Powering Embedded Sensor Nodes,” Nov. 28, 2009, Journal of Sound and Vibration, 13 pgs.
Mishra et al., “SIW-based Slot Array Antenna and Power Management Circuit for Wireless Energy Harvesting Applications”, IEEE APSURSI, Jul. 2012, 2 pgs.
Nenzi et al., “U-Helix: On-Chip Short Conical Antenna”, 7th European Conference on Antennas and Propagation (EUCAP), ISBN: 978-1-4673-2187-7, IEEE, Apr. 8, 2013, 5 pgs.
Qing et al., “UHF Near-Field Segmented Loop Antennas with Enlarged Interrogation Zone,” 2012 IEEE International Workshop on Antenna Technology (iWAT), Mar. 1, 2012, pp. 132-135, XP055572059, ISBN: 978-1-4673-0035-3.
Singh, “Wireless Power Transfer Using Metamaterial Bonded Microstrip Antenna for Smart Grid WSN”, 4th International Conference on Advances in Computing and Communications (ICACC), Aug. 27-29, 2014, 1 pg.
Smolders, “Broadband Microstrip Array Antennas”, Institute of Electrical and Electronics Engineers, Digest of the Antennas and Propagation Society International Symposium, Seattle, WA, Jun. 19-24, 1994, 3 pgs.
Van Veen et al., “Beamforming: A Versatile Approach to Spatial Filtering”, IEEE, ASSP Magazine, Apr. 1988, pp. 4-24.
Wei et al., “Design of a Wideband Horizontally Polarized Omnidirectional Printed Loop Antenna,” IEEE Antennas and Wireless Propagation Letters, vol. 11, Jan. 3, 2012, 4 pgs.
Zeng et al., “A Compact Fractal Loop Rectenna for RF Energy Harvesting,” IEEE Antennas and Wireless Propagation Letters, vol. 16, Jun. 26, 2017, 4 pgs.
Zhai et al., “A Practical Wireless Charging System Based on Ultra-Wideband Retro-Reflective Beamforming”, 2010 IEEE Antennas and Propagation Society International Symposium, Toronto, ON, 2010, 4 pgs.

* cited by examiner

| Port | 5 | 6 | 7 | 8 |
|---|---|---|---|---|
| Phase (Deg) | 0 | 180 | 90 | 270 |

INTEGRATED WIRELESS-POWER-TRANSMISSION PLATFORM WITH SUPPORT FOR DYNAMIC TUNING, AND METHOD AND SYSTEMS OF USE THEREOF

PRIORITY AND RELATED APPLICATIONS

This application is a continuation-in-part of U.S. patent application Ser. No. 18/314,742, filed on May 9, 2023, and entitled "Integrated Wireless-Power-Transmission Platform Designed to Operate in Multiple Bands, and Multi-Band Antennas for Use Therewith," which claims priority to:

- U.S. Prov. App. No. 63/342,000, filed on May 13, 2022, and entitled "Integrated Wireless-Power-Transmission Platform Designed to Operate in Multiple Bands, and Multi-Band Antennas for Use Therewith;"
- U.S. Prov. App. No. 63/411,060, filed on Sep. 28, 2022, and entitled "Integrated Wireless-Power-Transmission Platform Designed to Operate in Multiple Bands, and Multi-Band Antennas for Use Therewith;"
- U.S. Prov. App. No. 63/490,441, filed on Mar. 15, 2023, and entitled "Integrated Wireless-Power-Transmission Platform Designed to Operate in Multiple Bands, and Multi-Band Antennas for Use Therewith;"
- U.S. Prov. App. No. 63/496,663, filed on Apr. 17, 2023, and entitled "Integrated Wireless-Power-Transmission Platform Designed to Operate in Multiple Bands, and Multi-Band Antennas for Use Therewith," each of which is hereby incorporated by reference in its entirety.

TECHNICAL FIELD

The present disclosure relates generally to wireless-power transmission, and to wireless-power-transmitting devices with polarization-switching components.

BACKGROUND

Wireless charging systems for consumer devices typically require users to place devices at a specific position or orientation around the wireless power transmitter to be charged. These types of systems are poorly suited for environments in which multiple receiving devices need to be charged simultaneously (e.g., in a large room, manufacturing center, warehouse, etc.). Environments in which multiple receiving devices need to be powered simultaneously often include batteryless devices or devices that might be unable to communicate with a wireless-power transmitter (e.g., because the receiving device does not include a communication radio or is unable to provide sufficient power to a communication radio due to various reasons). Thus, these types of environments, which can include multiple receiving devices needing to be powered simultaneously, need infrastructure to allow wireless power transmitters to identify receiving devices that are initially active and/or inactive to allow for a comprehensive and efficiently-designed solution.

Additionally, many of these types of environments can include receiving devices (the inactive and/or active receiving devices) that operate at different frequency bands for receipt of wireless power. Thus, appropriately designed infrastructure also needs to be developed to support multiple frequency bands. Moreover, the infrastructure needs to comply with regulatory requirements in various jurisdictions, which can limit the flexibility and adoption of such systems as they need to be defined for each specific application in different jurisdictions without being able to be dynamically changed after production and/or manufacture of the sets.

Moreover, wireless charging systems may need to operate in areas with other types of active wireless communication, such as WiFi, Bluetooth, or radio-frequency identification (RFID). In these situations, the wireless charging systems may cause interference with other types of wireless communication, leading to errors and/or failures. Thus, these types of environments need wireless charging systems that are able to coexist with the other wireless communication systems to allow for a comprehensive and efficiently designed solution.

As such, it would be desirable to provide systems and methods for wirelessly transmitting and receiving power that address the above-mentioned drawbacks or needs.

SUMMARY

As mentioned above, wireless charging system may be deployed in circumstances in which receivers are arranged at various locations and require differing frequencies, and in which other network devices and signals are present. Some of the embodiments described herein include wireless-power-transmission devices with multiple power amplifiers and antenna configurations depending on application requirements. In some embodiments the wireless-power-transmission devices include multiple DC power and networking options. The wireless-power-transmission devices described herein may include multiple power amplifiers and antenna elements in any band with individual or group operation, support for dynamic antenna pattern switching with low-cost switches, optional integrated matching, and/or optional dynamic tuning.

Some embodiments described herein include a wireless-power transmitting device that includes: (i) a programmable-splitter component configured to be switchable between a linear polarization setting and a circular polarization setting; (ii) a plurality of polarization-switching components coupled to a plurality of outputs of the programmable-splitter component; (iii) a plurality of amplifiers coupled to respective outputs of the plurality of polarization-switching components; and (iv) a plurality of antennas coupled to respective outputs of the plurality of amplifiers.

Some embodiments described herein include a wireless-power transmitting device that includes: (i) a housing; (ii) a plurality of antenna elements arranged within the housing, each antenna element of the plurality of antenna elements having a different coverage zone of a plurality of coverage zones, wherein the plurality of coverage zones are configured to reduce overlap; (iii) a transmitter coupled to the plurality of antenna elements, the transmitter configured to govern operation of the plurality of antenna elements; and (iv) a plurality of radiofrequency (RF) wave reflectors arranged on the housing, where the plurality of RF wave reflectors and the plurality of antenna elements are arranged such that each antenna element of the plurality of antenna elements produces a respective wireless-power radiation field pattern into a respective coverage zone of the plurality of coverage zones.

Some embodiments described herein include a wireless-power-transmitting device that includes: (i) a substrate; (ii) a plurality of patch antennas arranged on the substrate; and (iii) a transmitter coupled to the plurality of patch antennas, wherein: (a) each patch antenna of the plurality of patch antennas includes at least one feed port; (b) the transmitter is configured to govern operation of each feed port of the at least one feed port of each patch antenna; and (c) the transmitter is configured to selectively produce a plurality of directive wireless-power radiation field patterns by adjusting feed port configurations.

The wireless power transmission systems and methods described herein enable a wireless power transmitter to discover and provide power for active and inactive power receivers within a wireless-power coverage area. Internet-of-things (IOT) systems can benefit from dedicated wireless power transmitters and bridges that augment existing networks and increase the capability of batteryless and battery-light applications. Batteryless IOT devices tend to have low power and functionality with limited networking capabilities. Moreover, wireless power receivers may operate at different frequencies and protocols. Gateway and bridging functionality can aid in localization and filtering of batteryless devices. This functionality can include network traffic management functionality and site survey and device location capabilities.

Conversely, ambient harvesting systems may have: (i) lower maximum energy available, (ii) limited range with WiFi-only harvesting (e.g., 2.4 and 5.8 GHz), and (iii) a non-deterministic WPT duty cycle due to networking traffic that can result in an unreliable power source. Many applications require networking (e.g., Bluetooth Low Energy (BLE)) and sensor data that is periodic and/or event-based. Ambient harvesting systems may not be able to provide enough energy, and therefore the networking devices need a reliable power source.

Some embodiments described herein include a method of surveying for active and inactive power receivers within a wireless-power coverage area. The method includes (i) causing performance of a survey looking for active power receivers of a plurality of power receivers within a wireless-power coverage area using one or more communication radios; (ii) receiving information from an active power receiver of the plurality of power receivers; (iii) causing transmission of RF signals to energize inactive power receivers of the plurality of power receivers using a power-transmission antenna, where (a) a first RF signal of the RF signals is transmitted using a first value for a transmission characteristic, and (b) a second RF signal of the RF signals is transmitted using a second value for the transmission characteristic, the first and second values being distinct; (iv) receiving additional information from a first energized power receiver and further information from a second energized power receiver, where: (a) the first energized power receiver was one of the inactive power receivers until it received energy from the first RF signal, and (b) the second energized power receiver was one of the inactive power receivers until it received energy from the second RF signal; and (v) identifying two or more frequency bands for RF wireless power transmissions by a wireless-power transmitting device within the wireless-power coverage area based on the information, the additional information, and the further information.

Some embodiments described herein include a wireless-power transmitting device that includes (i) a polarization-switching component configured to switch between a left-hand circular polarization setting, a right-hand circular polarization setting, a horizontal polarization setting, and a vertical polarization setting; (ii) a plurality of antennas coupled to a plurality of outputs of the polarization-switching component; and (iii) a programmable-splitter component coupled to the polarization-switching component and configured to be switchable between a linear polarization setting and a circular polarization setting.

Some embodiments described herein include a wireless-power transmitting device that includes (i) a programmable-splitter component configured to be switchable between a linear polarization setting and a circular polarization setting; (ii) a plurality of polarization-switching components coupled to a plurality of outputs of the programmable-splitter component; (iii) a plurality of amplifiers coupled to respective outputs of the plurality of polarization-switching components; and (iv) a plurality of antennas coupled to respective outputs of the plurality of amplifiers.

Some embodiments described herein include a wireless-power transmitting device that includes (i) a housing; (ii) a plurality of antenna elements arranged within the housing, each antenna element of the plurality of antenna elements having a different coverage zone of a plurality of coverage zones, wherein the plurality of coverage zones are configured to reduce overlap; (iii) a transmitter coupled to the plurality of antenna elements, the transmitter configured to govern operation of the plurality of antenna elements; and (iv) a plurality of radiofrequency (RF) wave reflectors arranged on the housing. The plurality of RF wave reflectors and the plurality of antenna elements are arranged such that each antenna element of the plurality of antenna elements produces a respective wireless-power radiation field pattern into a respective coverage zone of the plurality of coverage zones.

Some embodiments described herein include a wireless-power transmitting device that includes (i) a substrate; (ii) a plurality of patch antennas arranged on the substrate; and (iii) a transmitter coupled to the plurality of patch antennas. Each patch antenna of the plurality of patch antennas includes at least one feed port. The transmitter is configured to govern operation of each feed port of the at least one feed port of each patch antenna. The transmitter is configured to selectively produce a plurality of directive wireless-power radiation field patterns by adjusting feed port configurations.

Thus, methods, systems, and devices are disclosed for surveying for active and inactive power receivers within a wireless-power coverage area and providing wireless power transmission. Such methods may complement or replace conventional methods for surveying and power transfer.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have necessarily been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
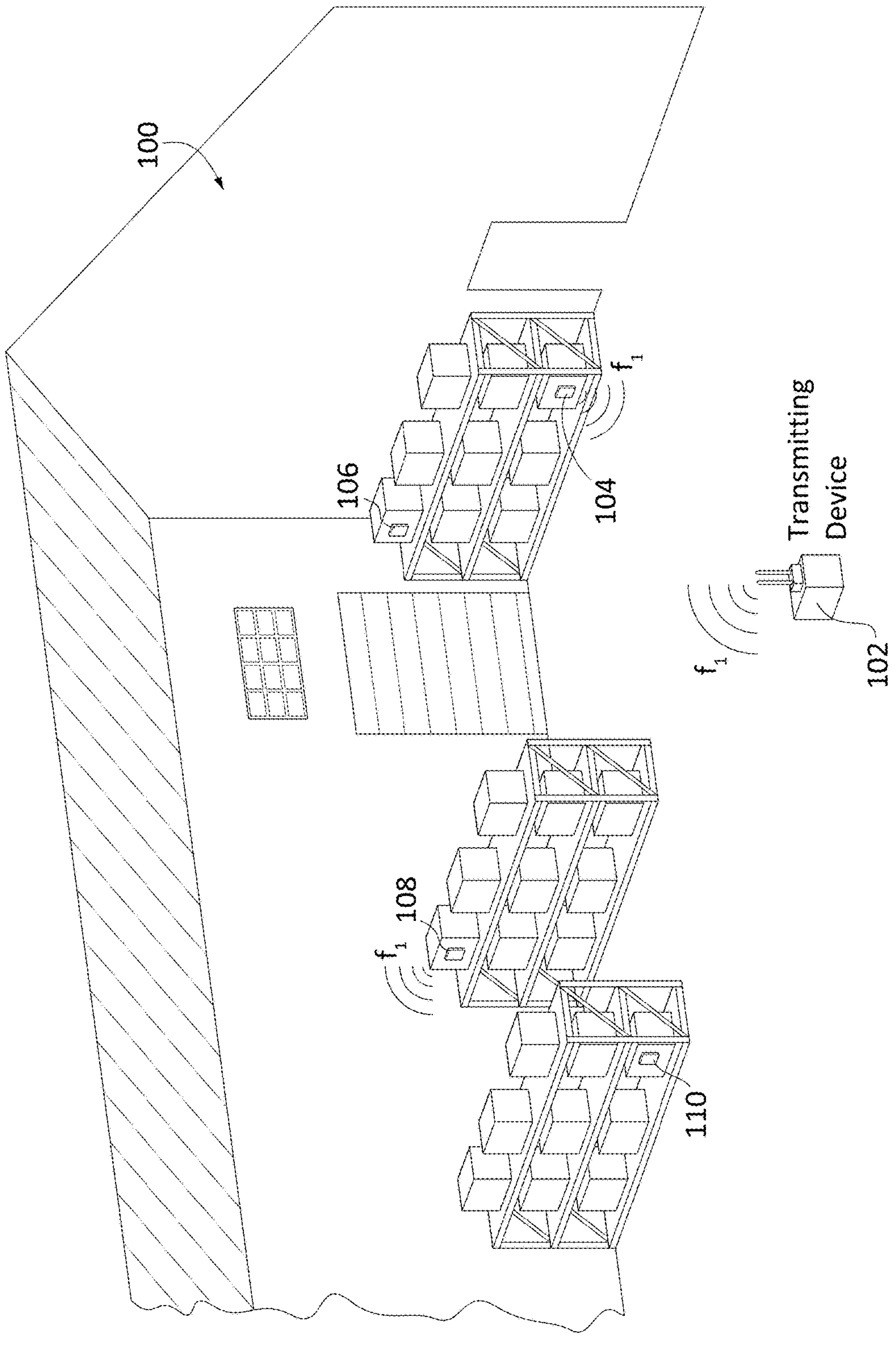
FIGS. 1A-1D illustrate example operations of a wireless-power transmission system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

A transmitting device can be an electronic device that includes, or is otherwise associated with, various components and circuits responsible for generating and transmitting electromagnetic energy, forming transmission energy within a radiation profile at locations in a transmission field, monitoring the conditions of the transmission field (e.g., by monitoring receiver communications), and/or adjusting the radiation profile as needed. A radiation profile, as described herein, refers to a distribution of energy field within the transmission range of a transmitting device or an individual antenna (also referred to as a "transmitter"). A receiver (which may also be referred to as a wireless-power receiver or tag) can be an electronic device that comprises at least one antenna, at least one rectifying circuit, and at least one power converter, which may utilize energy transmitted in the transmission field from a transmitter for powering or charging the electronic device (e.g., for purposes of communication and/or advertising).

FIGS. 1A-1D illustrate example operation of a wireless-power transmission system in accordance with some embodiments. FIG. 1A shows a site (e.g., a warehouse) with a transmitting device 102 (e.g., the wireless-power transmitter 1000 of FIG. 10A) transmitting a signal at a first frequency, $f_1$, (e.g., 2.4 GHz) and receiving a response from a receiver 104 and a receiver 108. In some embodiments, the receivers shown in FIGS. 1A-1D (e.g., the receivers 104, 106, 108, and 110) are instances of the wireless-power receiver 1100 of FIG. 11. In FIG. 1A, the receivers 106 and 110 do not respond to the first frequency.

Figure 1B:
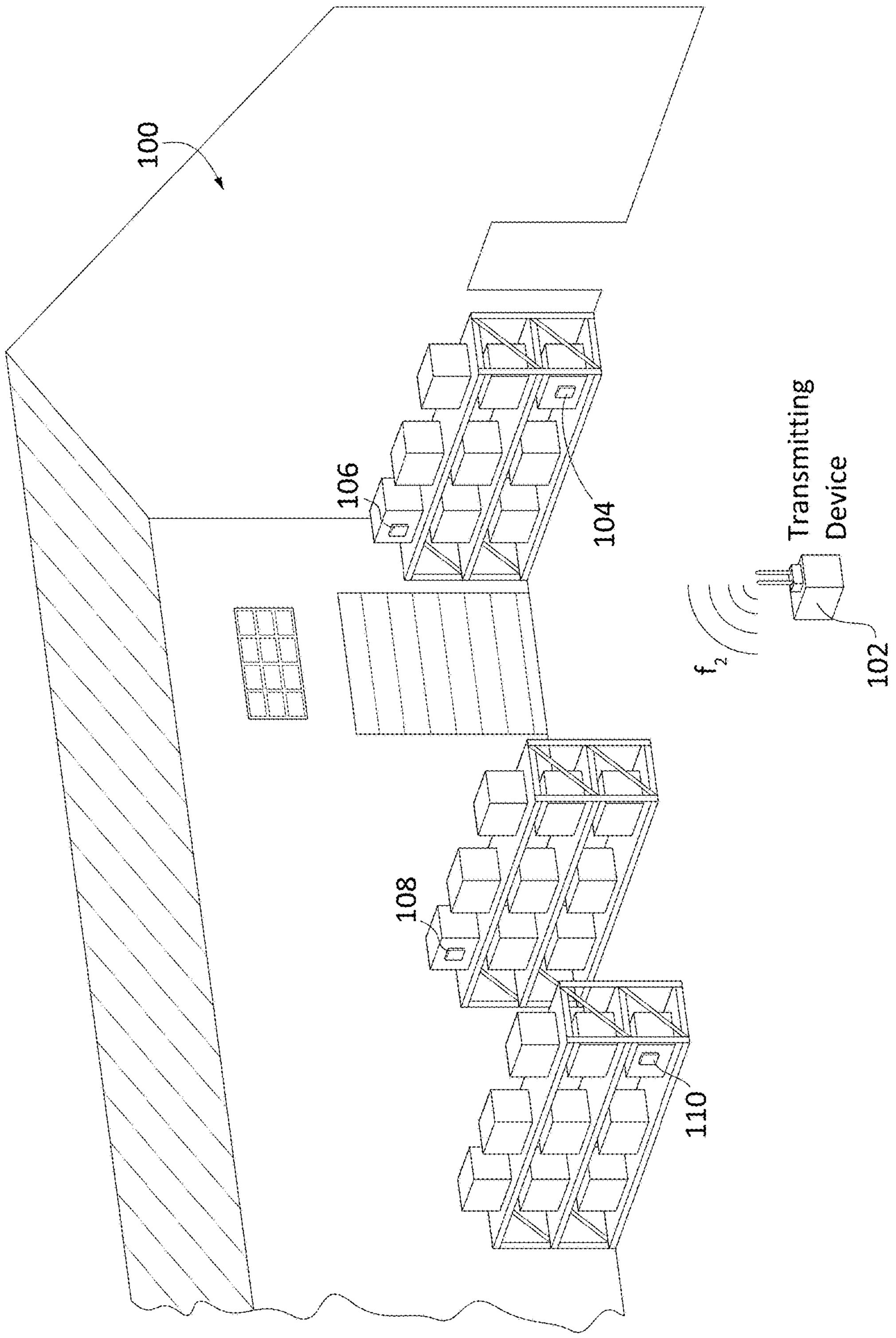

FIG. 1B shows the transmitting device 102 transmitting a signal at a second frequency, f2, (e.g., 865 MHz) and receiving no response from the receivers 104, 106, 108, and 110. For example, the receivers 104, 106, 108, and 110 are not responsive to the signals transmitted at the second frequency, e.g., due to an operating bandwidth of the receivers and/or a determination that the receivers are not authorized to communicate with the transmitting device via the signals transmitted at the second frequency.

Figure 1C:
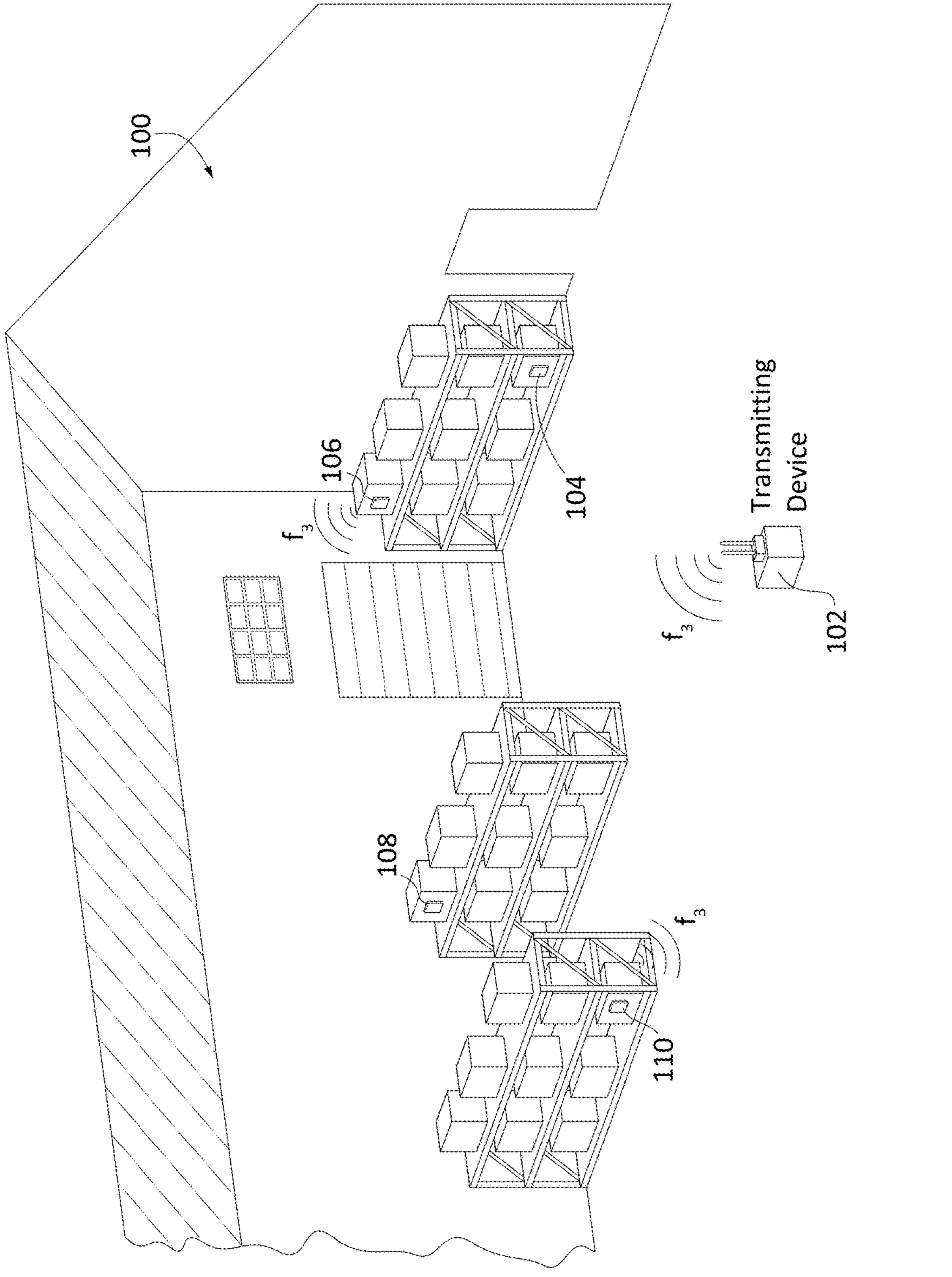

FIG. 1C shows the transmitting device 102 transmitting a signal at a third frequency, f3, (e.g., 915 MHz) and receiving a response from the receiver 106 and the receiver 110 (not from the receivers 104 and 108).

Figure 1D:
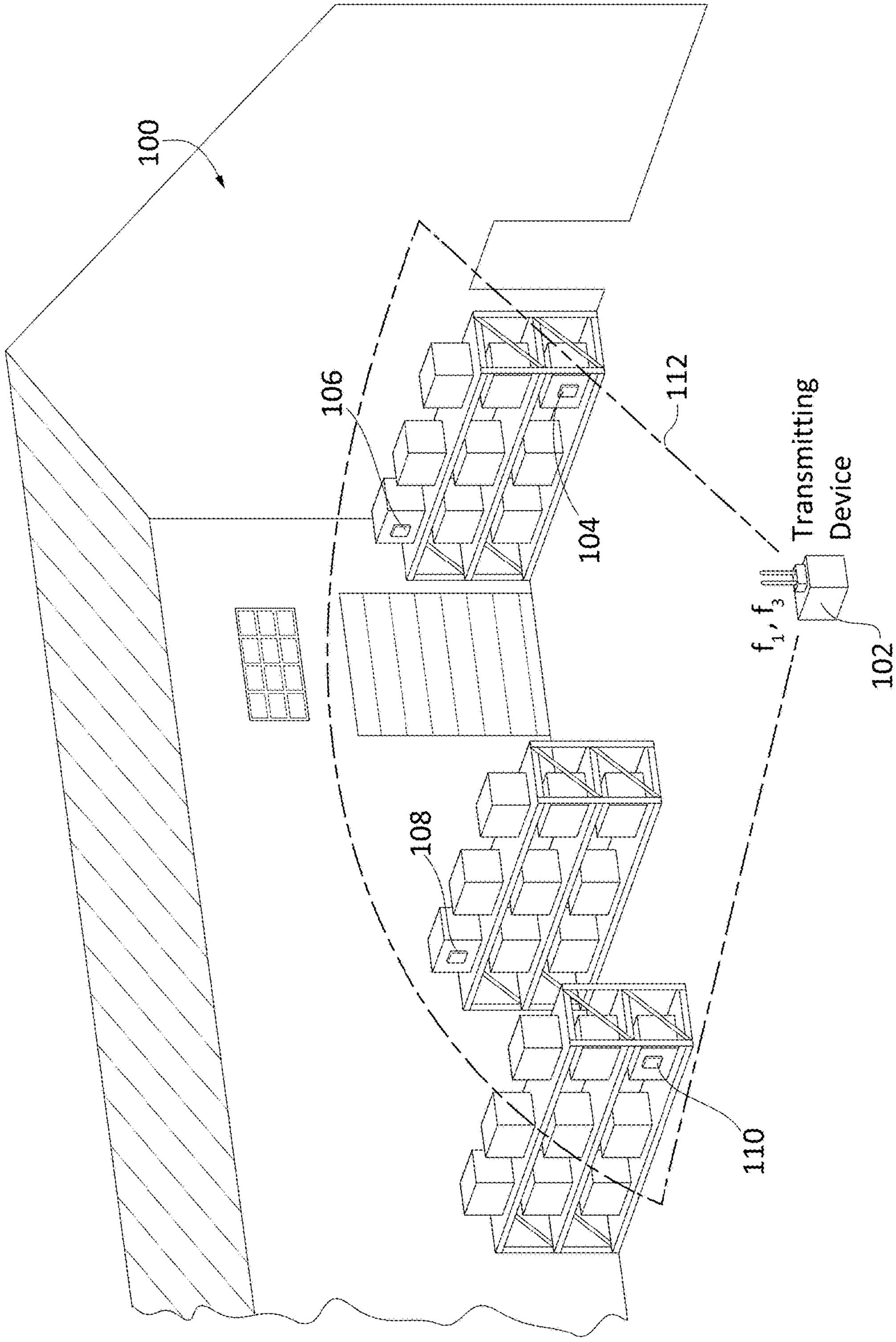

FIG. 1D shows the transmitting device 102 generating an energizing pattern 112 (including the first and third frequencies) based on the responses received (and not received) in FIGS. 1A-1C. The energizing pattern is sometimes referred to as a wireless power zone, wireless power cell, or wireless operating area. The energizing pattern 112 is adapted to reach each of the receivers. In some embodiments, the transmitting device 102 generates a first energizing pattern for the first frequency (adapted to reach the receivers 104 and 108) and a second energizing pattern for the second frequency (adapted to reach the receivers 106 and 110).

In the example illustrated in FIGS. 1A-1D, the receivers communicate with the transmitting device 102 via the frequencies used for wireless-power transfer (e.g., frequencies $f_1$ and $f_3$). In some embodiments, the receivers communicate with the transmitting device 102 via one or more communication channels that are distinct from the frequencies used for wireless-power transfer. For example, a first receiver communicates with the transmitting device 102 via Bluetooth low energy (BLE) protocol to inform the transmitting device 102 that the first receiver is configured to receive WPT at a first frequency (e.g., 915 MHz) and a second receiver communicates with the transmitting device 102 via BLE protocol to inform the transmitting device 102 that the second receiver is configured to receive WPT at a second frequency (e.g., 865 MHz). In some embodiments, a third receiver communicates with the transmitting device 102 at one of the first frequency and the second frequency. In some embodiments, the third receiver communicates with the transmitting device 102 at a third frequency.

Figure 2A:
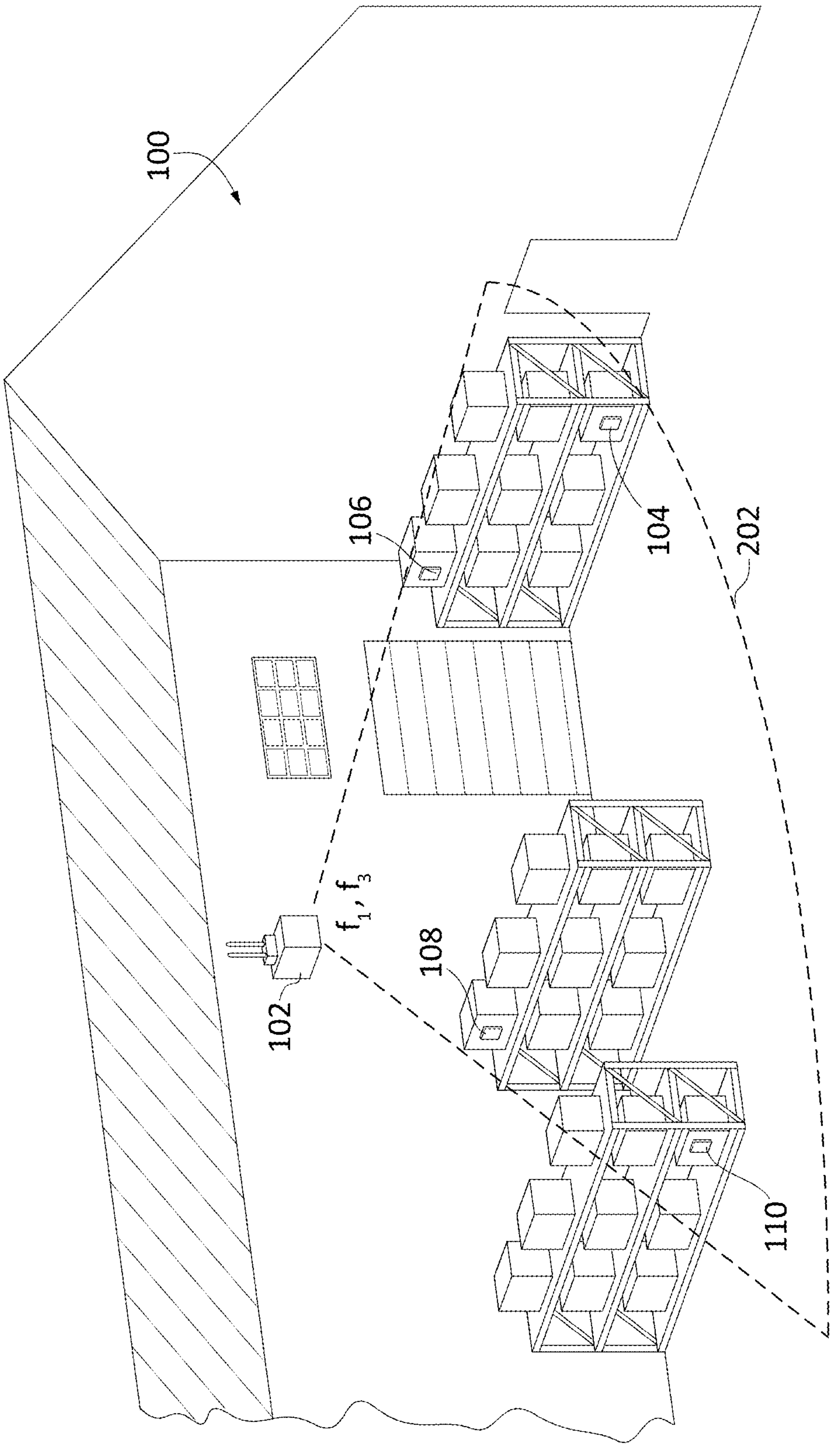
FIGS. 2A-2C illustrate other example operations of the wireless-power transmission system in accordance with some embodiments.
Figure 2B:
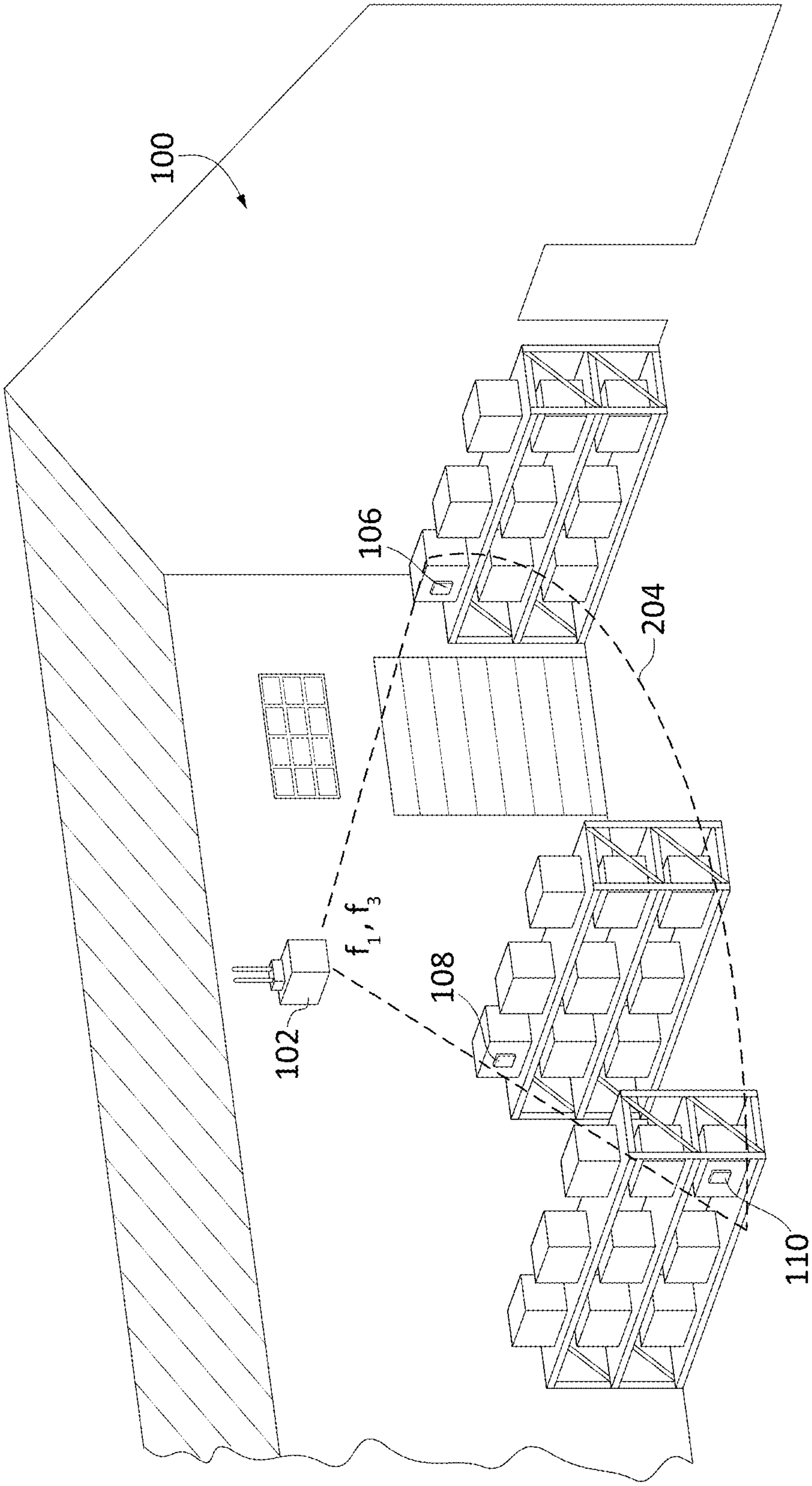
Figure 2C:
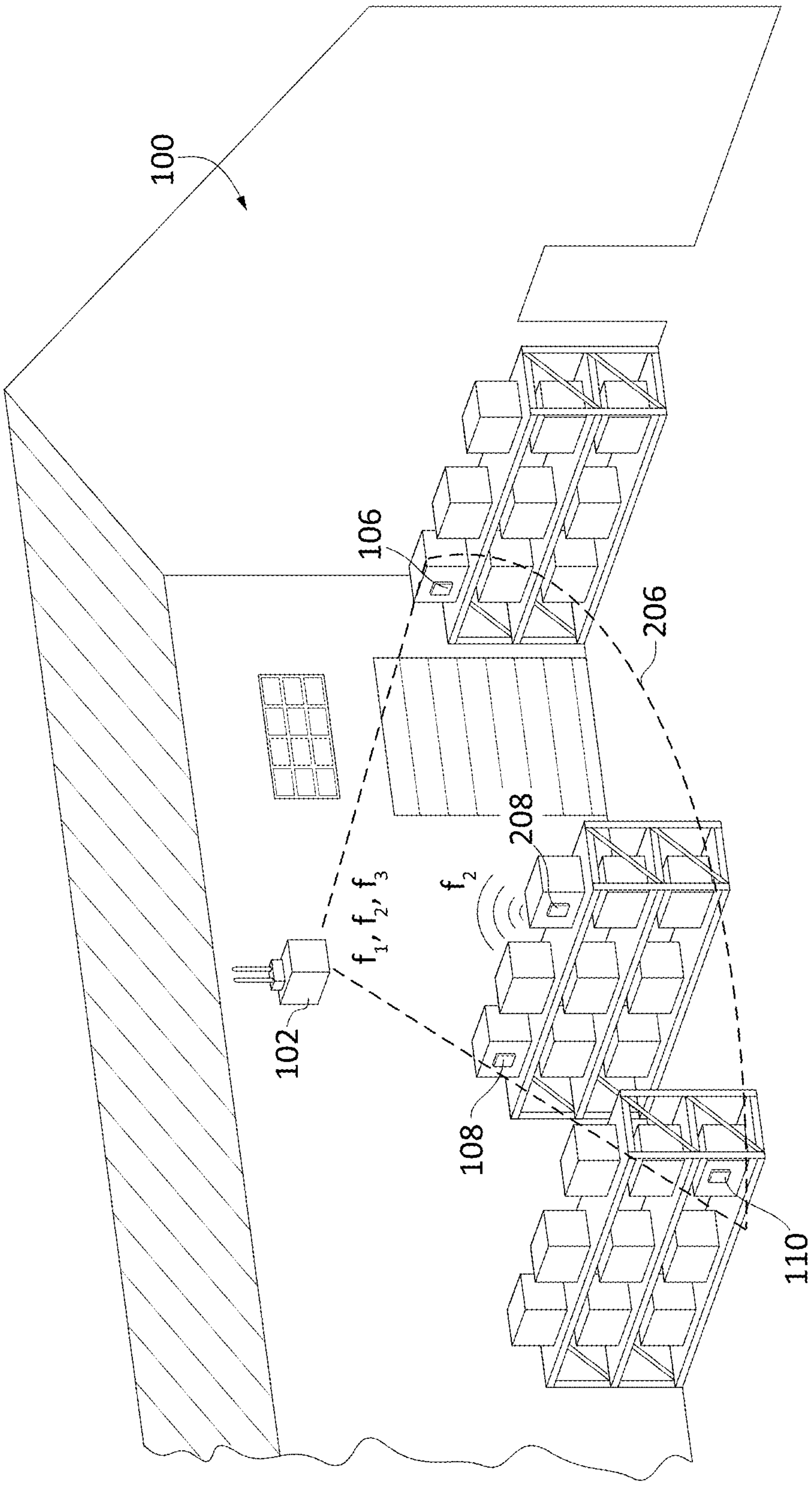

FIGS. 2A-2C illustrate another example operation of the wireless-power transmission system in accordance with some embodiments. FIG. 2A shows the transmitting device 102 mounted on a wall of a building (e.g., a warehouse). In some embodiments, the transmitting device 102 is mountable on a wall, ceiling, crossbar, fixture, or the like. The transmitting device 102 in FIG. 2A is generating an energizing pattern 202. The energizing pattern 202 includes the first and third frequencies and is adapted to cover the receivers 104, 106, 108, and 110. In some embodiments, the energizing pattern 202 is determined and/or selected based on prior communication(s) between the transmitting device 102 and the receivers 104, 106, 108, and 110.

FIG. 2B shows the receiver 104 having left the wireless-power coverage area of the transmitting device 102. In the example shown in FIG. 2B, the transmitting device 102 has determined that the receiver 104 is not in the wireless-power coverage area and accordingly has generated an energizing pattern 204 having a different shape (coverage area) than the energizing pattern 202. For example, the energizing pattern 204 is configured to cover an area that includes the receivers 106, 108, and 110, but not the prior location of the receiver 104. In some embodiments, the transmitting device 102 detects movement of the receiver 104 leaving the wireless-power coverage area and generates the energizing pattern 202 based on the locations of the remaining receivers (e.g., the receivers 106, 108, and 110). In some embodiments, the transmitting device 102 sends a transmission intended for the receiver 104 and determines that the receiver 104 has left the wireless-power coverage area in accordance with not receiving a response from the receiver 104 to the transmission within a preset amount of time. In some embodiments, the transmitting device 102 performs a frequency scan and determines that the receiver 104 has left the wireless-power coverage area based on the frequency scan (e.g., the transmitting device 102 performs the scan in response to not receiving a response from the receiver within the preset amount of time). In some embodiments, in accordance with a determination that the receiver 104 has not left the wireless-power coverage area based on the frequency scan, the transmitting device re-scans the wireless-power coverage area (e.g., by transmitting signals at a different frequency, and/or waiting for more than the preset amount of time (e.g., a second preset amount of time)).

FIG. 2C shows a receiver 208 within the wireless-power coverage area of the transmitting device 102 while the transmitting device 102 is generating an energizing pattern 206. In accordance with some embodiments, the energizing pattern 206 includes different frequencies than the energizing pattern 202 (e.g., the second frequency, $f_2$). In the example of FIG. 2C, the receiver 208 communicates with the transmitting device 102 via the second frequency (e.g., to inform the transmitting device of its presence in the wireless-power coverage area (and its frequency for wireless power transmission)). In some embodiments, the transmitting device 102 periodically surveys for receivers (e.g., performs one or more operations of the method 900) while generating an energizing pattern.

Figure 3A:
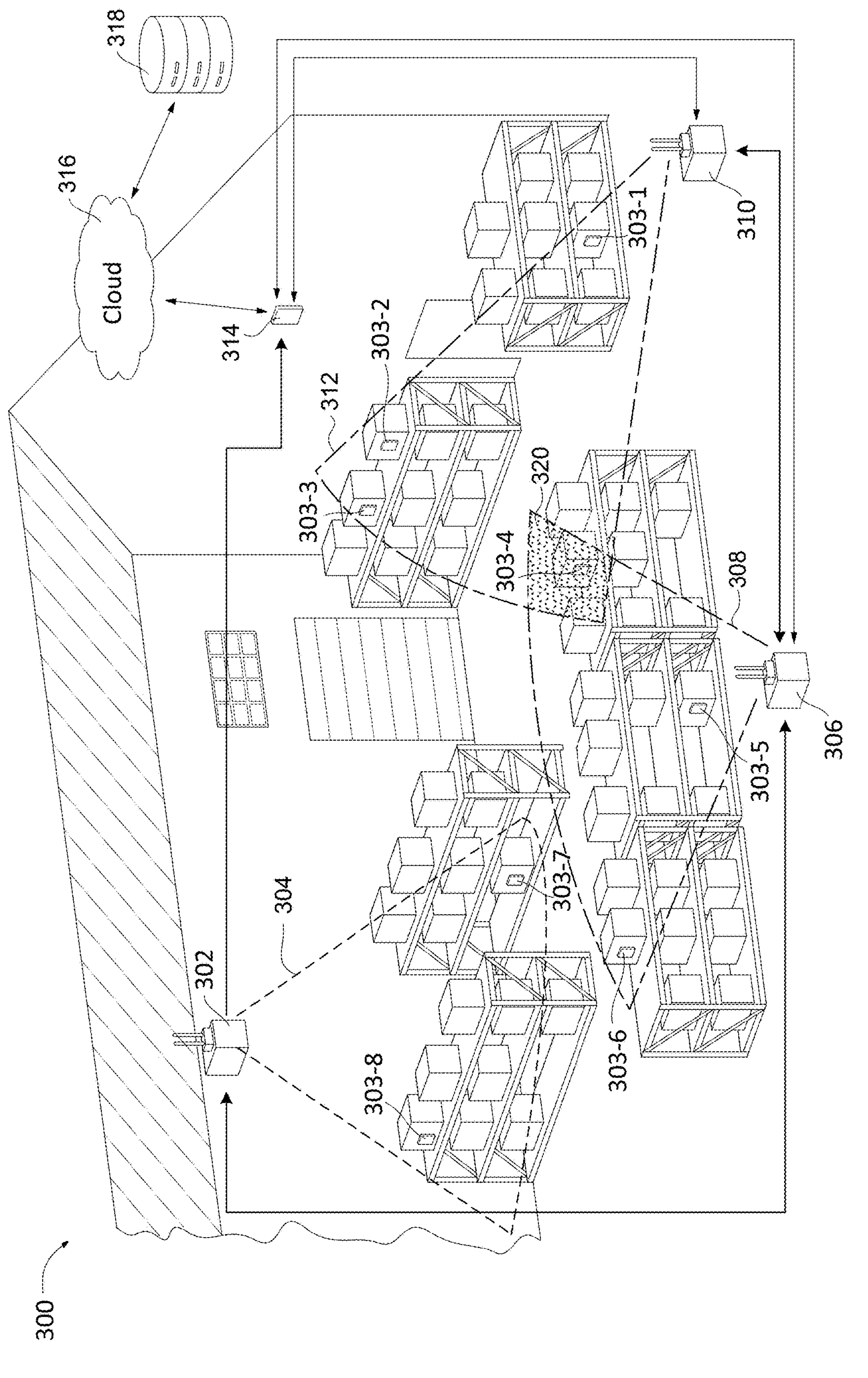
FIGS. 3A-3C illustrate example operations of a wireless-power network in accordance with some embodiments.
Figure 3B:
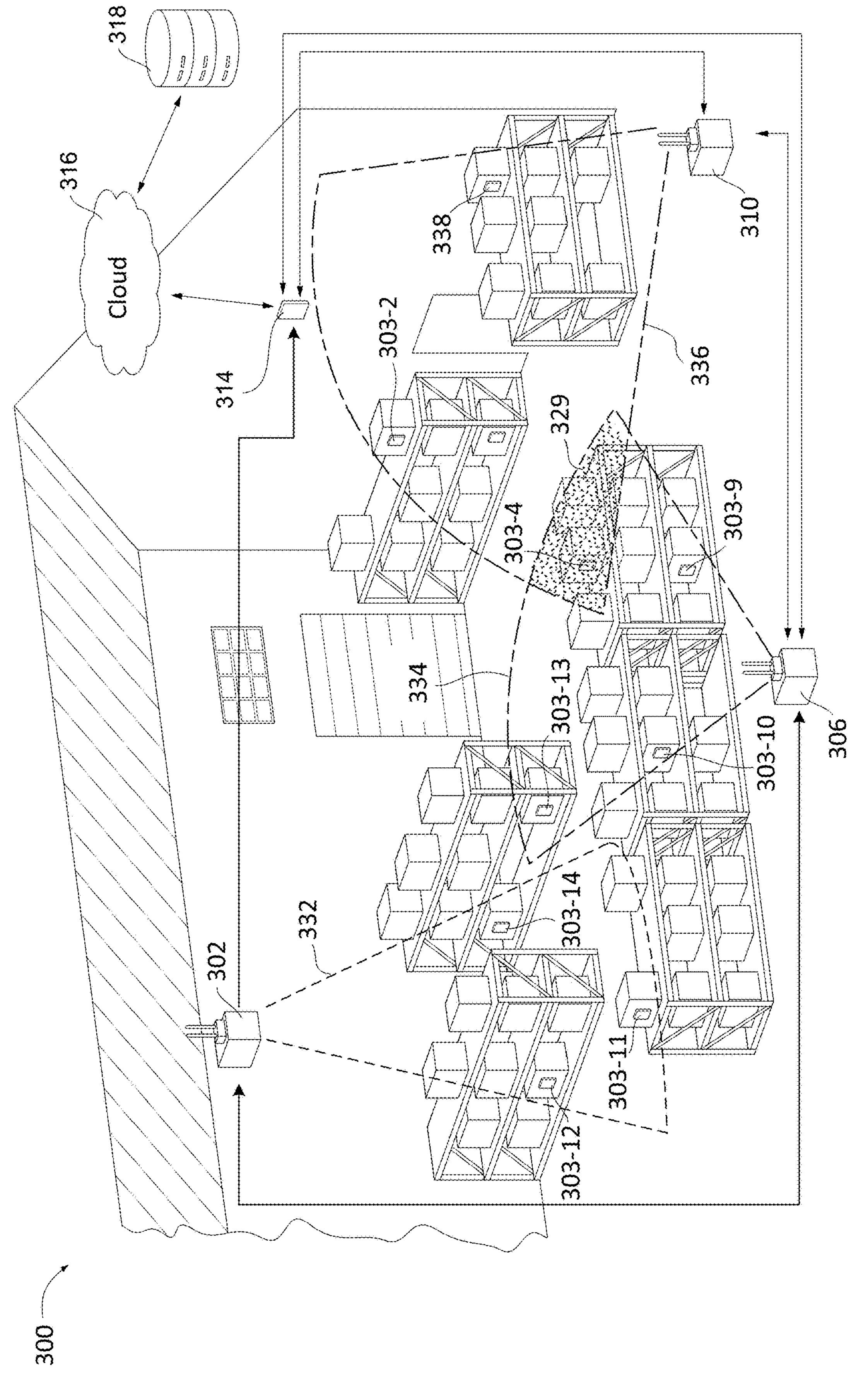
Figure 3C:
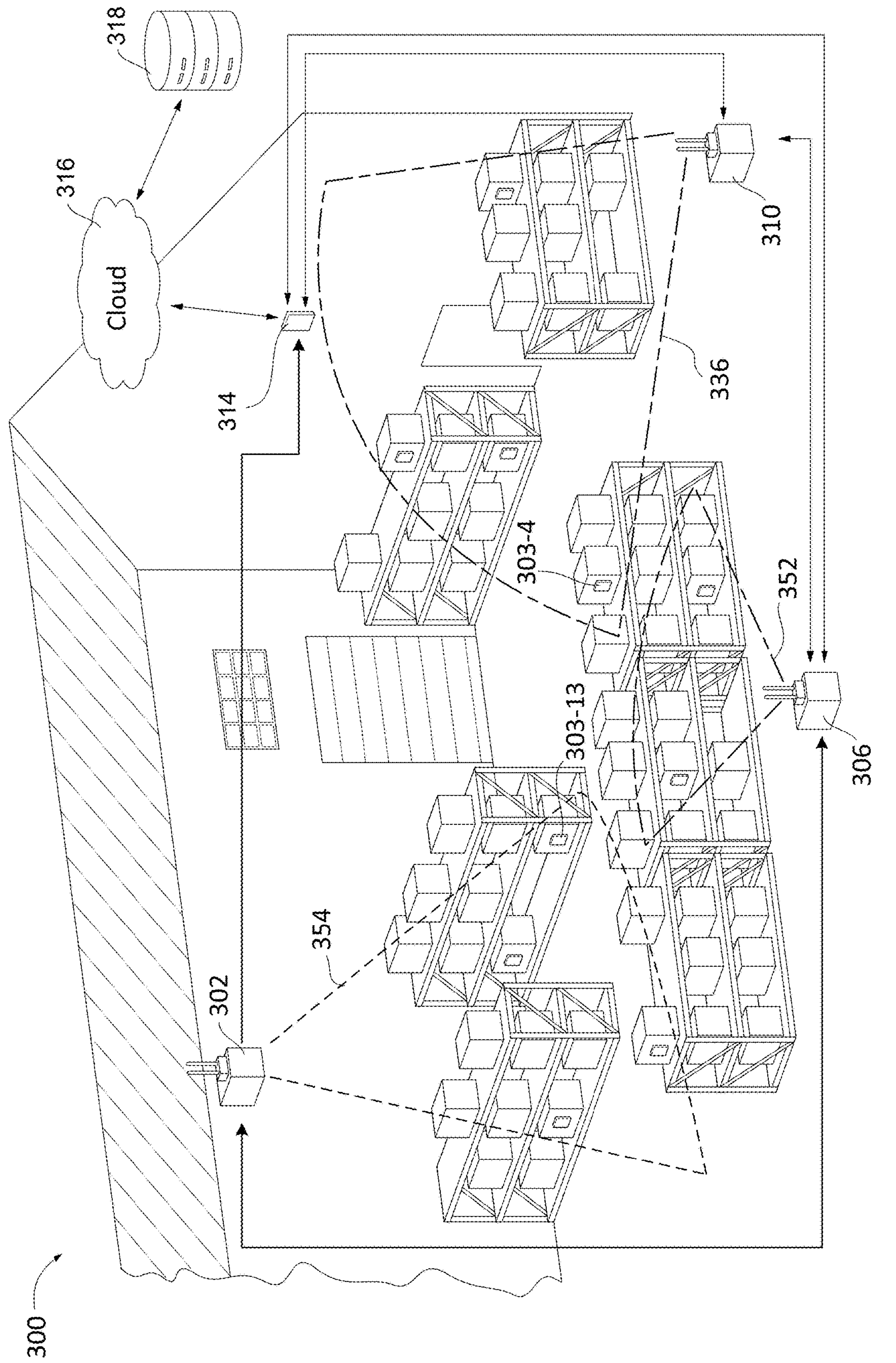

FIGS. 3A-3C illustrate a wireless-power network 300 in accordance with some embodiments. FIG. 3A shows the wireless-power network 300 at a first time providing WPT to a plurality of receivers 303 with respective wireless power zones based on the locations of the receivers 303. The wireless-power network 300 in FIG. 3A includes wireless power transmitting devices 302, 306, and 310 (also sometimes referred to as "wireless power bridge" or "wireless power transmitter") located at different locations within the area associated with the wireless-power network 300 (e.g., at a plurality of locations are selected to maximize a cumulative operating area of the wireless-power network 300). In some embodiments, each of the wireless power transmitting device 302, 306, and 310 is an instance of the wireless-power transmitter 1000 of FIG. 10A.

Each transmitter within the wireless-power network provides WPT to a respective wireless power zone (e.g., the wireless power zones 304, 308, and 312) providing power to a plurality of receivers, e.g., the receivers 303-1 through 303-8. In some embodiments, the receivers include battery-less and small-battery devices. In some embodiments, the wireless power transmitters communicate a network status and/or device status to the cloud 316, the gateway 314, and each other. In some embodiments, an operating area defined by the wireless-power network is adjustable via transmit power control based on feedback from the receivers and/or the other transmitting devices. In some embodiments, the gateway 314 (e.g., an access point) governs the operating state and/or operating area of each transmitting device (e.g., to reduce or minimize operating area overlap between two or more of the wireless power transmitting device). In some embodiments, the operating state and/or operating area of each transmitting device is stored at a database 318 (e.g., a network storage location). In some embodiments, the wireless power zones overlap (e.g., the overlap region 320), and the network 300 assigns a receiver to a particular transmitting device or power zone. For example, the receiver 303-4 in FIG. 3A could be assigned to the transmitting device 310 or the transmitting device 306. In some embodiments, the assigned transmitting device accounts for the receiver position and requirements when generating energizing patterns and the unassigned transmitting device does not. In some embodiments, the transmitting devices provide multi-radio bridging, as well as an artificial-reality (AI) offload (e.g., to the AI engine 478), which can provide technical improvements (e.g., reducing network traffic). In various embodiments, the device communication is connection-mode or connectionless and bidirectional or unidirectional.

In some embodiments, a wireless power transmitting device identifies, locates, and energizes receiver devices. In some embodiments, a transmitting device filters and/or aggregates data from a collection of receiver devices in the wireless power operating area. In some embodiments, a transmitting device has a dynamically programmable energizing power zone area (e.g., based on feedback from energized receiver devices and/or a site map). In some embodiments, a transmitting device has programmable bridging and gateway functionality. In some embodiments, a transmitting device has programmable BLE scanning timing (e.g., for optimizing receiver (e.g., the receiver 303) reception). In some embodiments, a transmitting device aggregates, filters, and retransmits receiver information (e.g., on BLE via advertisement and/or mesh connections). In some embodiments, a transmitting device aggregates, filters, and retransmits receiver information on a backhaul network (e.g., WiFi or ethernet networks). In some embodiments, a transmitting device has cloud-control API for dynamic re-programmability via the cloud 316. In some embodiments, a transmitting device has a (self-organizing) array of transmitters.

In some embodiments, the network 300 has knowledge (e.g., in the network storage 318) of all the transmitting devices, gateways, and receiver metrics (e.g., per unit time). In some embodiments, adaptive time-series data is aggregated up to the network 300. In some embodiments, the aggregated data (e.g., a full dataset) is stored in a database (e.g., in memory of a transmitting device, the gateway 314, or network storage 318).

FIG. 3B shows the wireless-power network 300 at a second time. In FIG. 3B some of the receivers 303 from FIG. 3A (e.g., the receivers 303-1, 303-3, 303-5, 303-6, 303-7, and 303-8) have left the area and some receivers (e.g., the receivers 303-10 through 303-14) have entered the area. In the example of FIG. 3B, the transmitting devices 302, 306 and 310 have adjusted their respective wireless power zones in accordance with the updated positions of the receivers in the coverage area. In FIG. 3B, the transmitting device 302 is producing the wireless power zone 332, the transmitting device 306 is producing the wireless power zone 334, and the transmitting device 310 is producing the wireless power zone 336. Based on wireless power zones produced by the wireless power transmitters 306 and 310, there is an overlap region 329 that includes both of the wireless power zones 334 and 336.

FIG. 3C shows the wireless-power network 300 with the wireless power zones adjusted (as compared to FIG. 3B) to reduce (eliminate) overlap between the wireless power zones (e.g., eliminate the overlap region 329). In particular, the transmitting device 306 is producing the wireless power zone 352, which does not cover the receiver 303-4 or the receiver 303-13, and the transmitting device 302 is producing the wireless power zone 354, which is enlarged (as compared to the wireless power zone 332 in FIG. 3B) to cover the receiver 303-13. In some embodiments, an optimization of the wireless power zones is performed at the gateway 314 or the cloud 316 based on information from the transmitting devices 302, 306, and 310. In some embodiments, the optimization includes reducing an area of overlap regions between the power zones. In some embodiments, the transmitting devices 302, 306, and 310 relay receiver locations and coverage areas to one another to coordinate optimization of the wireless power zones.

In some embodiments, the network 300 performs concentration and segregation by adjusting the wireless power zone for each transmitting device. In some embodiments, the network 300 performs smart gateway filtering (e.g., via stream analysis). In some embodiments, the network 300 reduces/minimizes the amount of additional traffic in the case of very large numbers of receivers that may be visible from multiple transmitters (e.g., via optimization techniques described above, such as smart gateway filtering). In some embodiments, the network 300 minimizes the zone overlap by programming the receiver BLE transmit power. In some embodiments, the network 300 prioritizes based on role, performance, schedule, and/or event type. Examples of event types can include glass break detection, a mass receiver drop event, and the like. Performance metrics examples include a receiver advertising frequency, a frequency of sensor information updates or timed parameter change, received signal strength indicator (RSSI) and angle of arrival (AoA), filtered MAC address, physical location information, and the like. In some embodiments, the system has an onboard AI system (e.g., the AI engine 478) configured to evaluate performance metrics and govern the operation of the transmitting devices accordingly.

In some embodiments, the network 300 includes multiple gateways in communication with subsets of the transmitting devices (and one another). In some embodiments, the gateways communicate with each other and/or the cloud to upload and/or bridge preferred receivers. In some embodiments, the gateway communications include proprietary and standards-based communications (e.g., BLE mesh option). In some embodiments, the gateway communication is used to reinforce the location of the receivers based on gateway location.

Figure 4A:
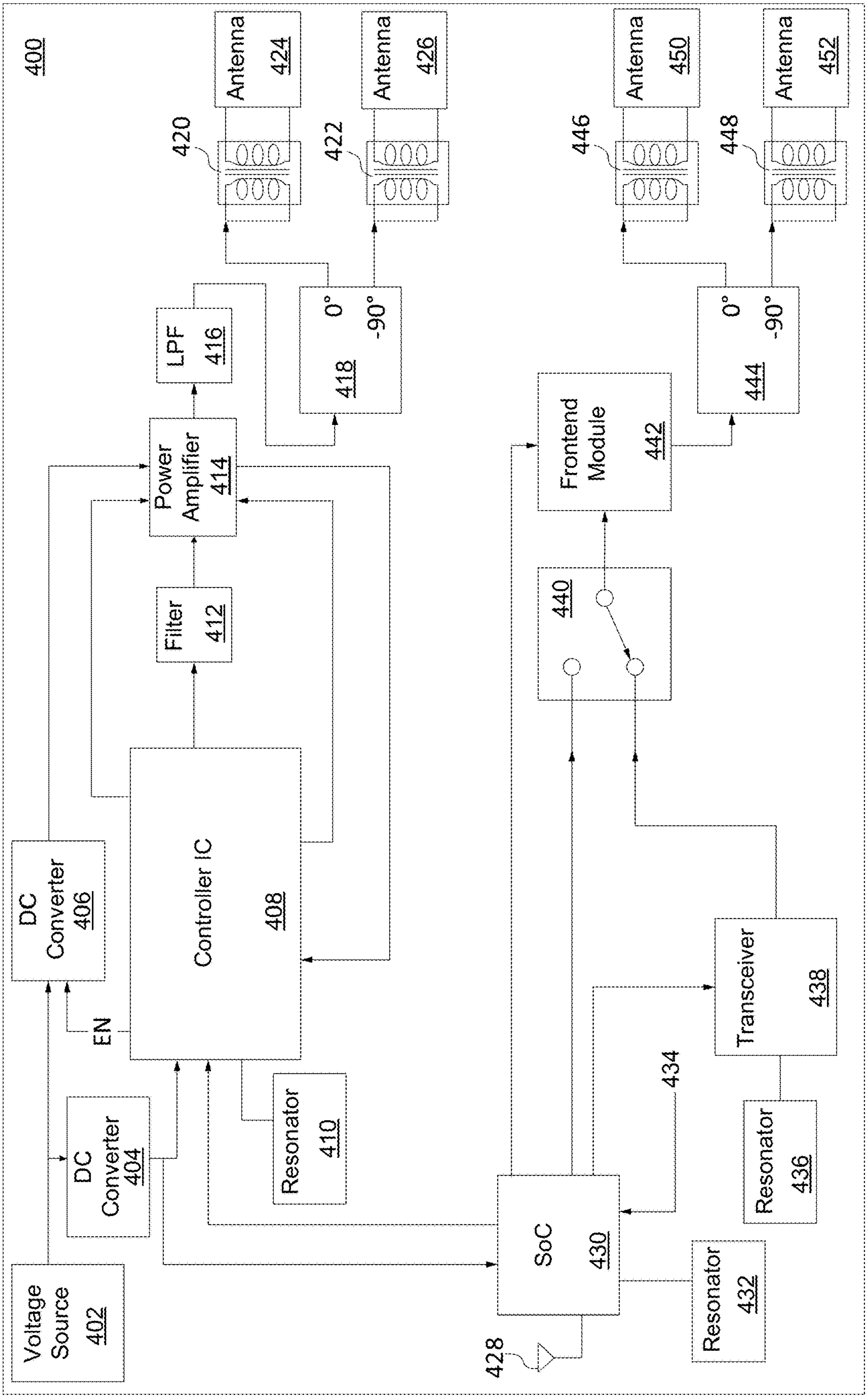
FIGS. 4A-4B illustrate example circuits for wireless-power transmission in accordance with some embodiments.
Figure 4B:
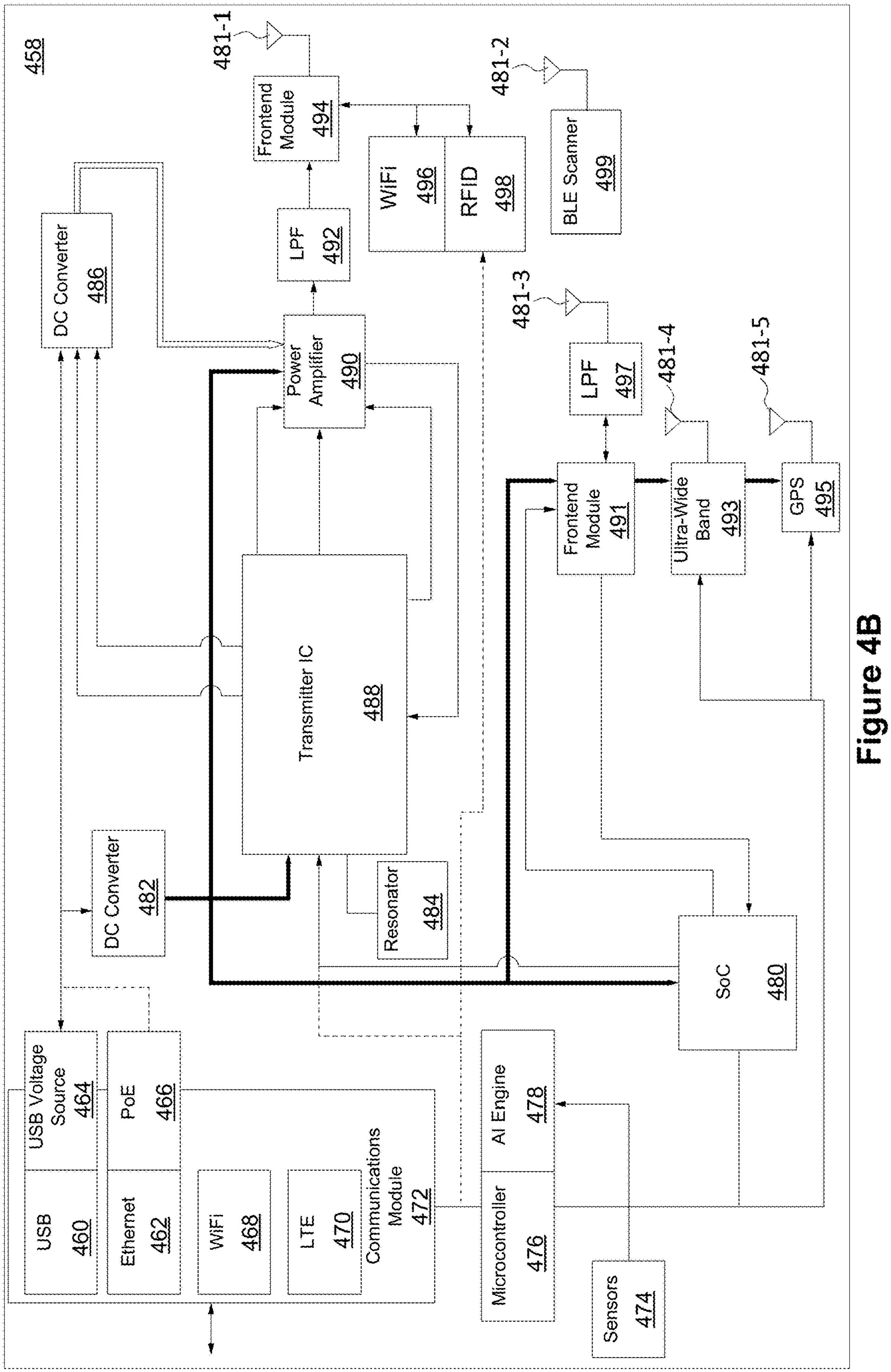

FIGS. 4A-4B illustrate example circuits for wireless-power transmission in accordance with some embodiments. FIG. 4A illustrates an integrated transmitter platform 400 with dual band energizing and BLE bridge in accordance with some embodiments. In some embodiments, the integrated transmitter platform 400 is a component of the transmitting device 102. The integrated transmitter platform 400 includes a voltage source 402 (e.g., a 5-volt USB voltage source), a DC converter 404 (e.g., a 5-volt to 3.3-volt converter), a DC converter 406 (e.g., a 5-volt to 1.5-volt converter), a resonator 410 (e.g., a 50M resonator), and a controller integrated circuit (IC) 408 (e.g., a sub-GHz WPT controller with programmable frequencies 864-867 MHz and 902-928 MHz). t The integrated transmitter platform 400 further includes a filter 412 (e.g., a band-pass filter for 915 MHz), a low-pass filter (LPF) 416, a power amplifier 414, a phase splitter 418, balancing units (baluns) 420 and 422, and antennas 424 and 426 (e.g., sub-GHz antennas). In some embodiments, the power amplifier 414 is a power amplifier integrated circuit (IC) (e.g., 30 dBm) with programmable power scaling via internal settings or external supply. In various embodiments, the power amplifier 414 has one or more of: continuous wave programmable frequency-hopping spread spectrum (FHSS), pulse-width modulation (PWM), amplitude modification (AM), and on-off keying (OOK). In some embodiments, the phase splitter 418, balancing units 420 and 422, and antennas 424 and 426 comprise an integrated balanced dual-dipole antenna feed. The integrated transmitter platform 400 further includes an antenna 428, one or more resonators (e.g., including a resonator 432, which can be c, a system-on-chip (SoC) 430, a transceiver 438, a switching component 440, and a frontend module 442. In some embodiments, the SoC 430 is, or includes a 2.4 GHz WPT and BLE circuit with time division multiplexing (TDM) BLE and WPT functionality. In some embodiments, the frontend module 442 includes a programmable 2.4 GHz 20 dBm power amplifier. In some embodiments, the transceiver 438 is and WPT transmitter IC with individually-programmable output power, modulation, bandwidth, and/or transmission length. The integrated transmitter platform 400 further includes a phase splitter 444 (e.g., a 90-degree hybrid phase splitter), balancing units 446 and 448, and antennas 450 and 452 (e.g., 2.4 GHz antennas). In some embodiments, the phase splitter 444, balancing units 446 and 448, and antennas 450 and 452 comprise an integrated balanced dual-dipole antenna feed.

FIG. 4B illustrates an integrated transmitter platform 458, in accordance with some embodiments. The integrated transmitter platform 458 includes a microcontroller (MCU) 476 (e.g., configured for data aggregation and filtering), an AI engine 478 coupled to one or more sensors 474 (e.g., a local sensor array to augment system AI capability), and an uplink communications module 472 with data backhaul options including USB 460, Ethernet 462, WiFi 468, and LTE 470. Some example AI capabilities for the AI engine 478 include: (i) a temperature comparison between device and gateway, (ii) acoustic event detection comparison between device and gateway, (iii) correlation of vibration event from devices versus temperature at the gateway, (iv) temperature, humidity, IMU, microphone, and IR sensing and monitoring, and (v) AI offloading of optimization operations performed by one or more wireless power transmitters and/or one or more wireless power receivers. In some embodiments, the embedded AI engine 478 is used to enhance receiver location and/or provide data filtering. In accordance with some embodiments, the uplink communications module 472 further includes power supply options including power-over-ethernet (PoE) 466 and USB voltage source 464. The integrated transmitter platform 458 further includes DC converters 482 and 486 (e.g., 5 volt to 3.3 volt or 1.5 volt converters), a transmitter IC (e.g., configured for WPT), a resonator 484 (e.g., a 50M resonator), a power amplifier 490 (e.g., an instance of the power amplifier 414), a low-pass filter 492, a front end module 494 (e.g., configured to manage the antenna 481-1 and 915 MHz, RFID, and/or WiFi transmissions), and antennas 481. The integrated transmitter platform 458 further includes an SoC 480 (e.g., configured to manage BLE, WPT, WiFi, ultra-wide band (UWB), and global positioning satellite (GPS) transmissions), a frontend module 491 (e.g., configured to manage antennas 481-3, 481-4, and 481-5), a low pass filter 497, a BLE scanner 499, and multiple radios for different device communication protocols, including WiFi (e.g., 802.11ah) 496, RFID 498, GPS 495, and UWB 493.

Figure 5A:
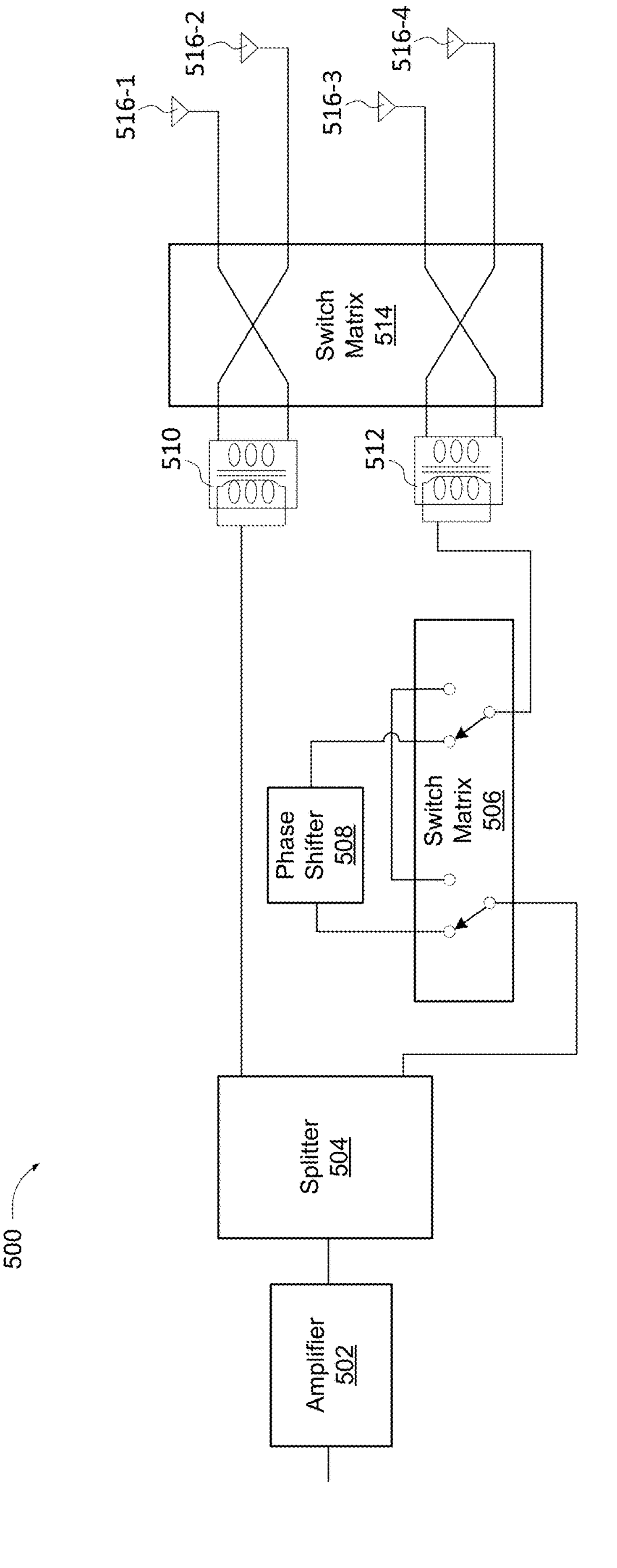
FIGS. 5A-5D illustrate example circuits for wireless-power transmission in accordance with some embodiments.

FIGS. 5A-5D illustrate example circuits for wireless-power transmission, in accordance with some embodiments. In some embodiments, the circuits in FIGS. 5A-5D are components of a transmitting device 1000 or a transmitting device 1050. FIG. 5A illustrates an antenna tuning circuit 500 in accordance with some embodiments. The antenna tuning circuit 500 has dynamically switchable polarization between linear or circular (e.g., right-hand circular polarization (RHCP) or left-hand circular polarization (LHCP)). The tuning circuit 500 includes an amplifier 502 (e.g., a variable gain amplifier), a splitter 504 (e.g., a programmable splitter), a phase shifter 508 (e.g., a 90-degree phase shifter), a switch matrix 506, balancing units 510 and 512, a switch matrix 514 (e.g., a 4×4 or dual double-port double-throw switch matrix), and antennas 516. In some embodiments, the programmable splitter 504 is programmable between a splitter-only mode for linear polarization and a splitter and 90-degree phase shift mode for circular polarization. In some embodiments, the switch matrix 514 has the following settings: A through and B through for LHCP, A cross and B cross for RCHP, A through and B open for horizontal polarization, and A open and B through for vertical polarization. In some embodiments, a transmitting device (e.g., transmitting device 1000 or a transmitting device 1050) includes a tuning circuit for tuning the frequency band, e.g., specifically for tuning for frequencies within a range between 860 MHz to 960 MHz (e.g., which can be 915 MHz in one example).

Figure 5B:
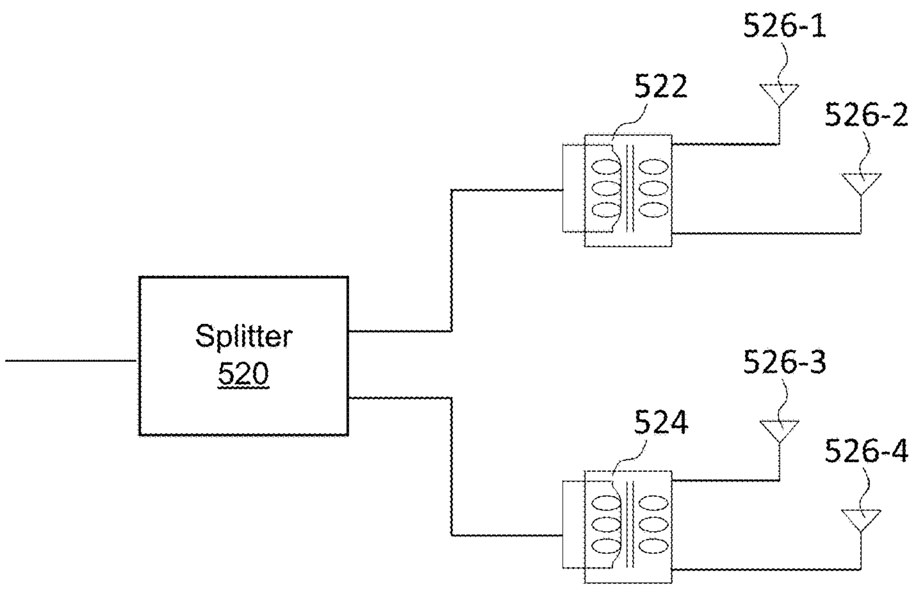
Figure 5C:
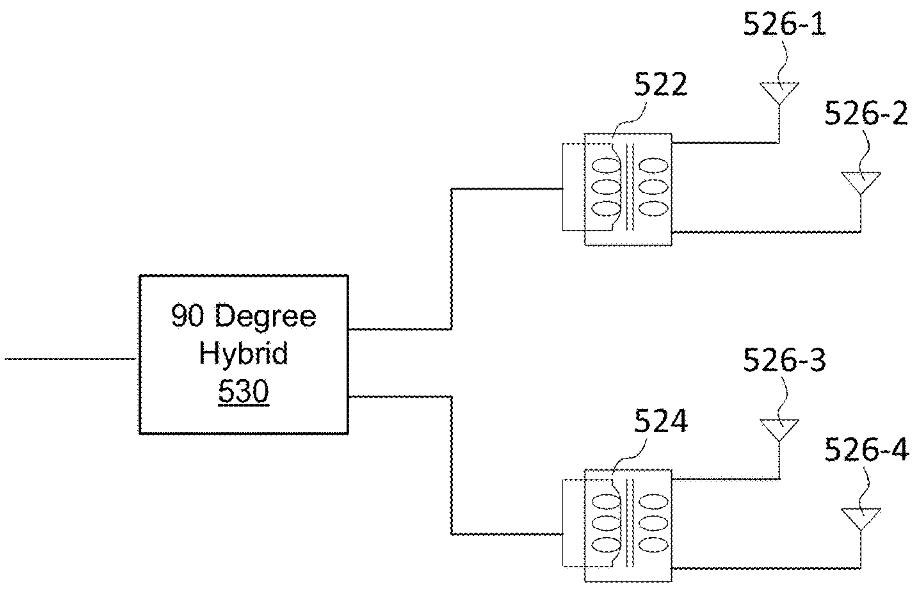

FIG. 5B illustrates a linear polarization scheme for an antenna arrangement in accordance with some embodiments. As shown in FIG. 5B, the linear polarization scheme includes an output of a splitter 520 coupled to balancing units 522 and 524. The balancing unit 522 is coupled to antennas 526-1 and 526-2. The balancing unit 524 is coupled to the antennas 526-3 and 526-4. FIG. 5C illustrates a circular polarization scheme for the antenna arrangement in accordance with some embodiments. As shown in FIG. 5C, the circular polarization scheme includes an output of a 90-degree hybrid splitter 530 coupled to the balancing units 522 and 524. In some embodiments, the antenna 526-1 in FIGS. 5B and 5C is used as a phase reference (e.g., 0 degrees). In some embodiments, the phase is controlled by inductive and/or capacitive (L/C) values and positions for each balancing unit 522 and 524.

Figure 5D:
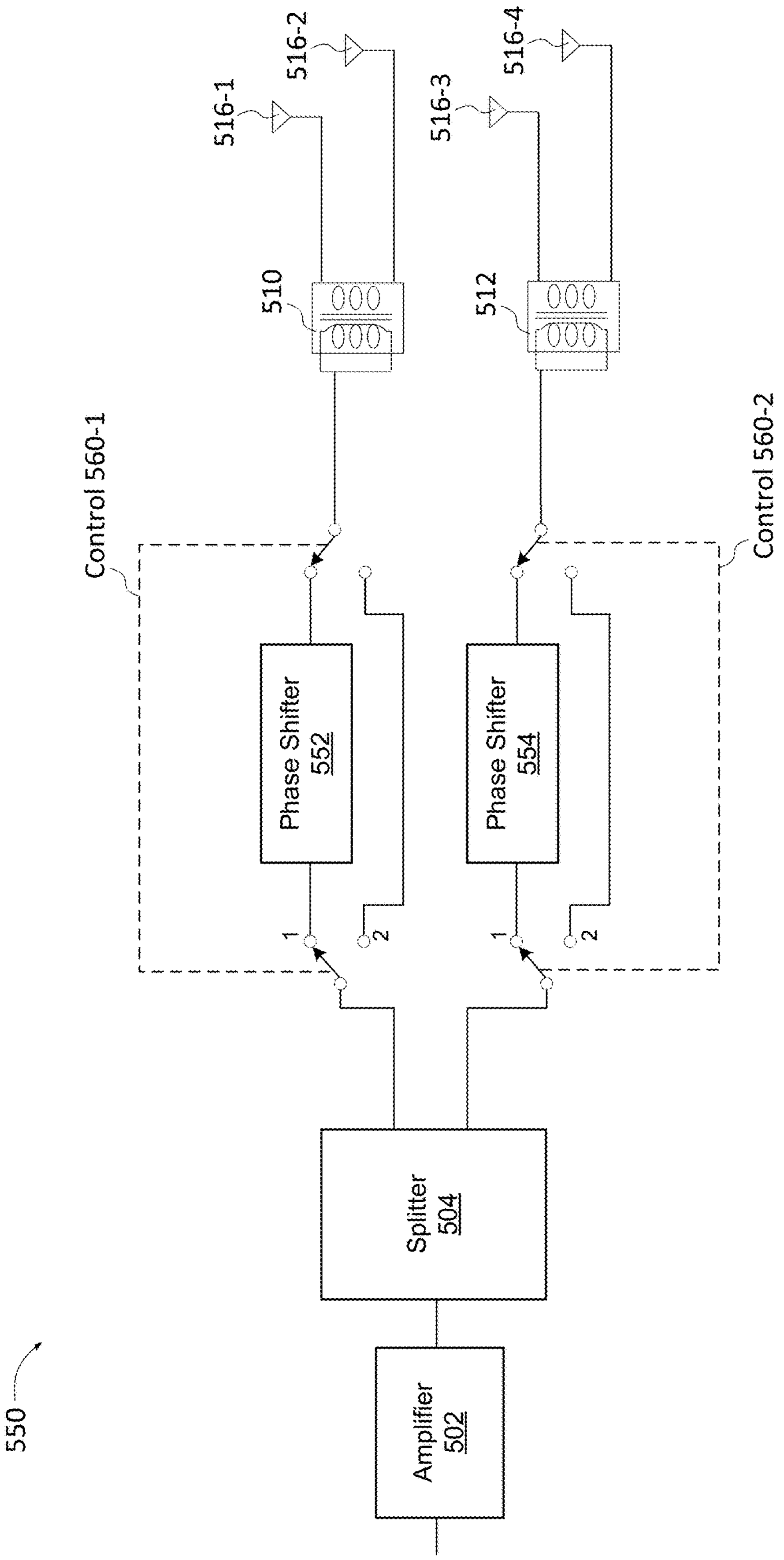

FIG. 5D illustrates an antenna tuning circuit 550 in accordance with some embodiments. The tuning circuit 550 has dynamically switchable polarization between linear or circular (e.g., RHCP or LHCP). The tuning circuit 550 includes the amplifier 502 (e.g., a variable gain amplifier), the splitter 504 (e.g., a programmable splitter), a phase shifter 552 (e.g., a 90-degree phase shifter), a phase shifter 554 (e.g., a 180-degree phase shifter), the balancing units 510 and 512, and the antennas 516. The tuning circuit 550 also includes switching controls 560 (e.g., switching control 560-1 for the phase shifter 552 and switching control 560-2 for the phase shifter 554). In some embodiments, the switching controls 560 are operable to switch polarization for antennas 516. For example, switching control 560-1 in position 1 and switching control 560-2 in position 1 corresponds to an RHCP setting; switching control 560-1 in position 1 and switching control 560-2 in position 2 (e.g., bypassing the phase shifter 554) corresponds to an LHCP setting; switching control 560-1 in position 2 (e.g., bypassing the phase shifter 552) and switching control 560-2 in position 1 corresponds to a horizontal linear polarization setting; and switching control 560-1 in position 2 and switching control 560-2 in position 2 corresponds to a vertical linear polarization setting.

Figure 6A:
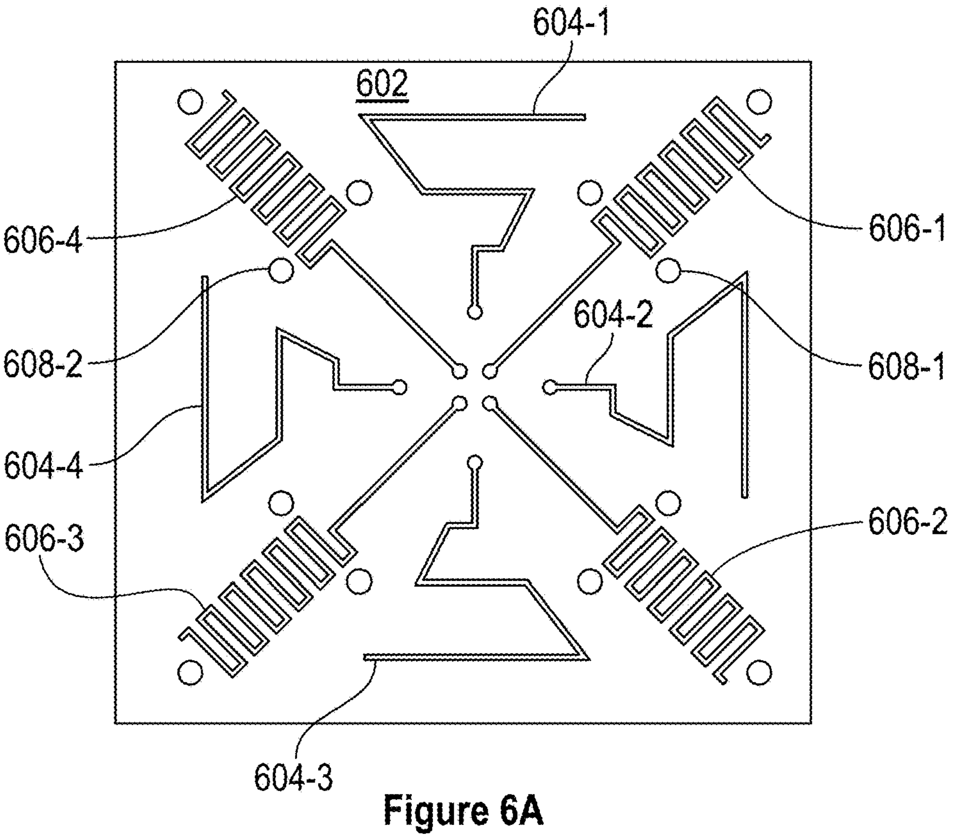
FIG. 6A illustrates an example antenna arrangement for wireless-power transmission in accordance with some embodiments.

FIG. 6A illustrates an example antenna arrangement for wireless-power transmission in accordance with some embodiments. Specifically, FIG. 6A shows a multiband dual-polarized antenna circuit 602 in accordance with some embodiments. The antenna circuit 602 includes antennas 604 (e.g., 604-1 through 604-4) for transmissions (e.g., wireless-power transmissions) in a first frequency range (e.g., a sub-GHz range), antennas 606 (e.g., 606-1 through 606-4) for transmissions (e.g., wireless-power transmissions) in a second frequency range (e.g., a 2.4 GHz range), and a plurality of mechanical coupling points 608 (e.g., 608-1 and 608-2). In some situations, the antenna circuit 602 is a low-cost, low-mass, and lightweight printed circuit board (PCB) antenna circuit. In some embodiments, the antenna circuit 602 includes additional antennas for transmitting signals at other frequencies distinct from the first and second frequencies (e.g., a third frequency, a fourth frequency, etc.).

Figure 6B:
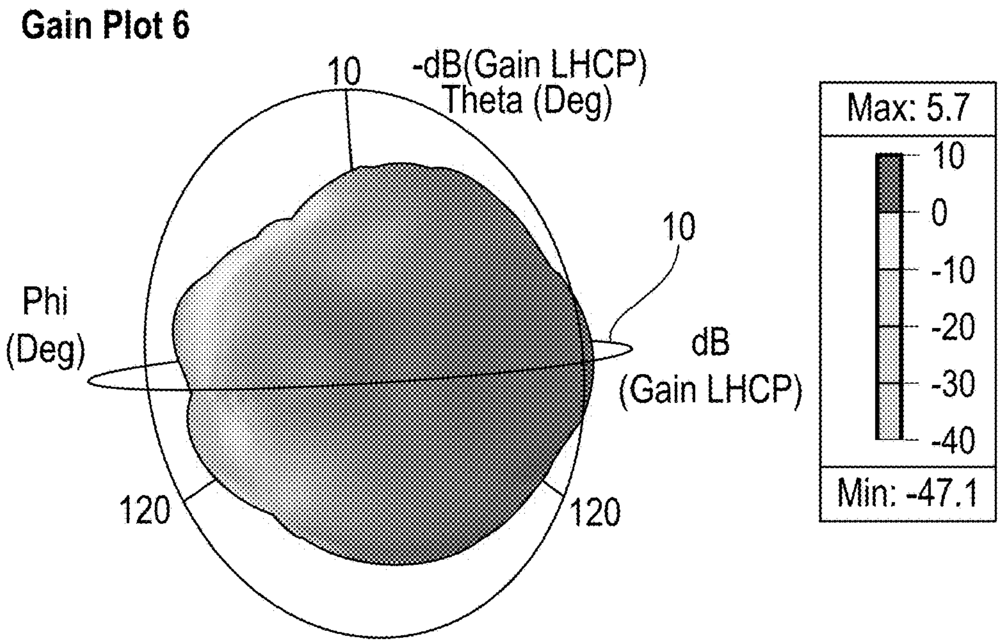
FIG. 6B illustrates an example operating state for the antenna arrangement of FIG. 6A in accordance with some embodiments.

The antenna circuit 602 is configured for coplanar, collocated dual-band operation (e.g., a same phase-center for both bands). In some embodiments, the antenna circuit 602 is circular-polarized for two or more bands. In some embodiments, the antenna circuit 602 is bill of materials (BOM)- programmable between RHCP and LHCP. In some embodiments, the antenna circuit 602 has high isolation (e.g., at least 15 dB or between 5 to 25 dB) between ports and frequency bands. In some embodiments, the antenna circuit 602 low band is BOM-programmable in a frequency range of 860-960 MHz (e.g., including 865 MHz to 918 MHz). In some embodiments, the antenna circuit 602 has a reflector integrated into the housing. FIG. 6B illustrates an example operating state (e.g., a radiation field pattern on top and a port configuration on bottom) for the antenna arrangement of FIG. 6A in accordance with some embodiments. In the example of FIG. 6B, an example gain plot is shown corresponding to the antennas 604 being active with antenna 604-4 having a 0-degree phase shift, antenna 604-2 having a 180-degree phase shift, antenna 604-3 having a 90-degree phase shift, and antenna 604-1 having a 270-degree phase shift.

Figure 6C:
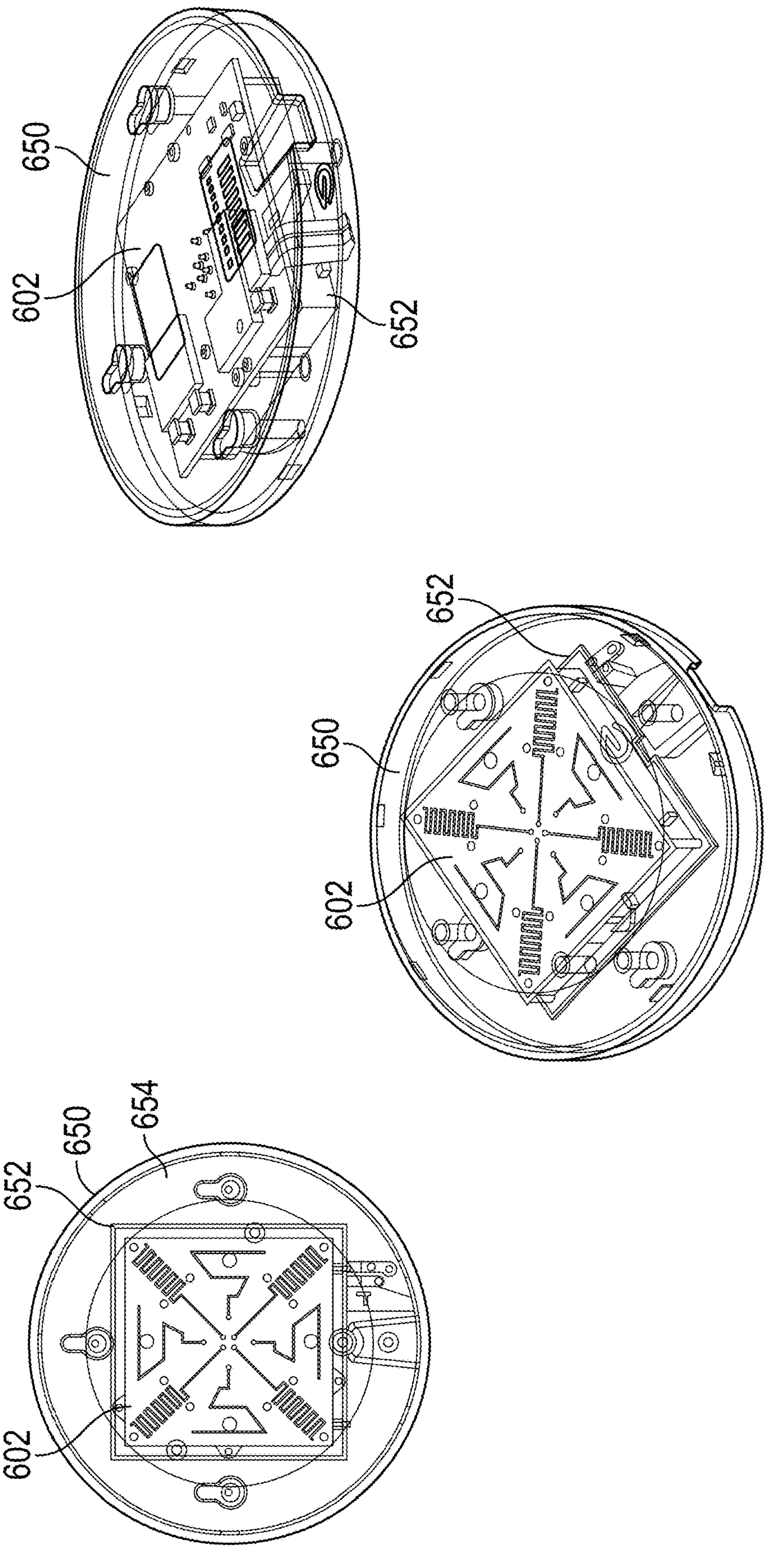
FIG. 6C illustrates an example transmitter for wireless-power transmission in accordance with some embodiments.

FIG. 6C shows views of a transmitter 650 for wireless-power transmission at different angles in accordance with some embodiments. As shown in FIG. 6C, the transmitter 650 includes the antenna circuit 602 mounted to a support structure 652 and enclosed in a housing 654. In some embodiments, the transmitter 650 is a programmable wireless power transmitter.

In some embodiments, the programmable wireless power transmitter (e.g., the transmitting device 102) includes a multiband WPT energizing source with configurable transmission patterns in multiple frequency bands. In some embodiments, a programmable wireless power transmitter includes one or more flexible radios for system calibration, device energizing, and communication functions. In some embodiments, a programmable wireless power transmitter includes a programmable physical layer (e.g., for frequency-hopping, PWM/OOK signaling, and modulation). In some embodiments, a programmable wireless power transmitter includes programmable and/or dynamic TDM between WPT and communications. In some embodiments, a programmable wireless power transmitter has a compact housing with an integrated antenna and reflector. In some embodiments, the integrated antenna (e.g., the antenna circuit 602) has a coplanar, collocated (e.g., same phase center) multi-band dual linear-polarized or circular-polarized antenna structure. In some embodiments, the integrated antenna can be operated as circular-polarized antenna or cross-polarized. In some embodiments, the wireless power transmitter includes at least one antenna with dynamic polarization-switching. In some embodiments, the wireless power transmitter includes at least one antenna integrated with a feeding structure on the PCB. In some embodiments, the wireless power transmitter 650 has at least one antenna that is BOM-programmable or has dynamic switched frequency tuning (for embodiments in which dynamic switched frequency tuning is utilized, the skilled artisan will understand upon reading this disclosure that updates would be made to the switching networks for use with this type of tuning).

Figure 7B:
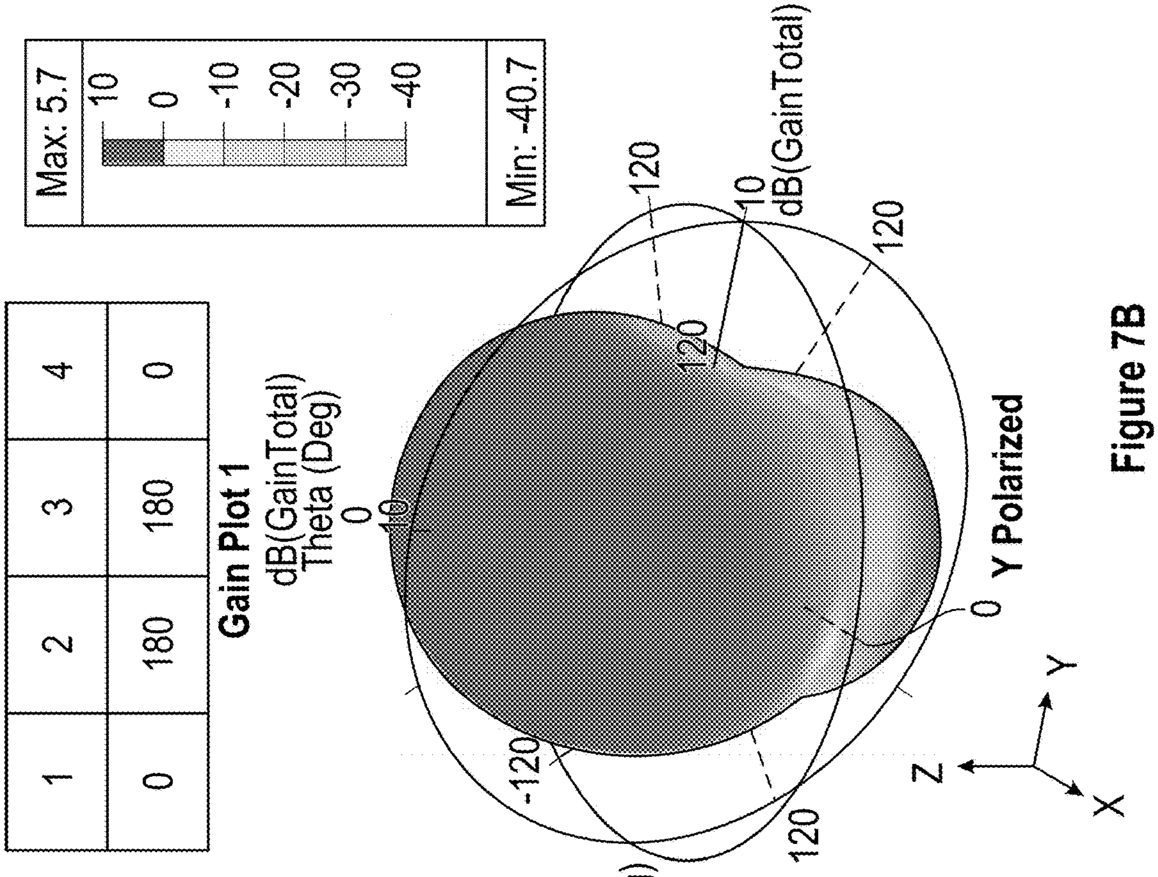
FIGS. 7A-7D illustrate additional example operating states for the antenna arrangement of FIG. 6A in accordance with some embodiments.
Figure 7A:
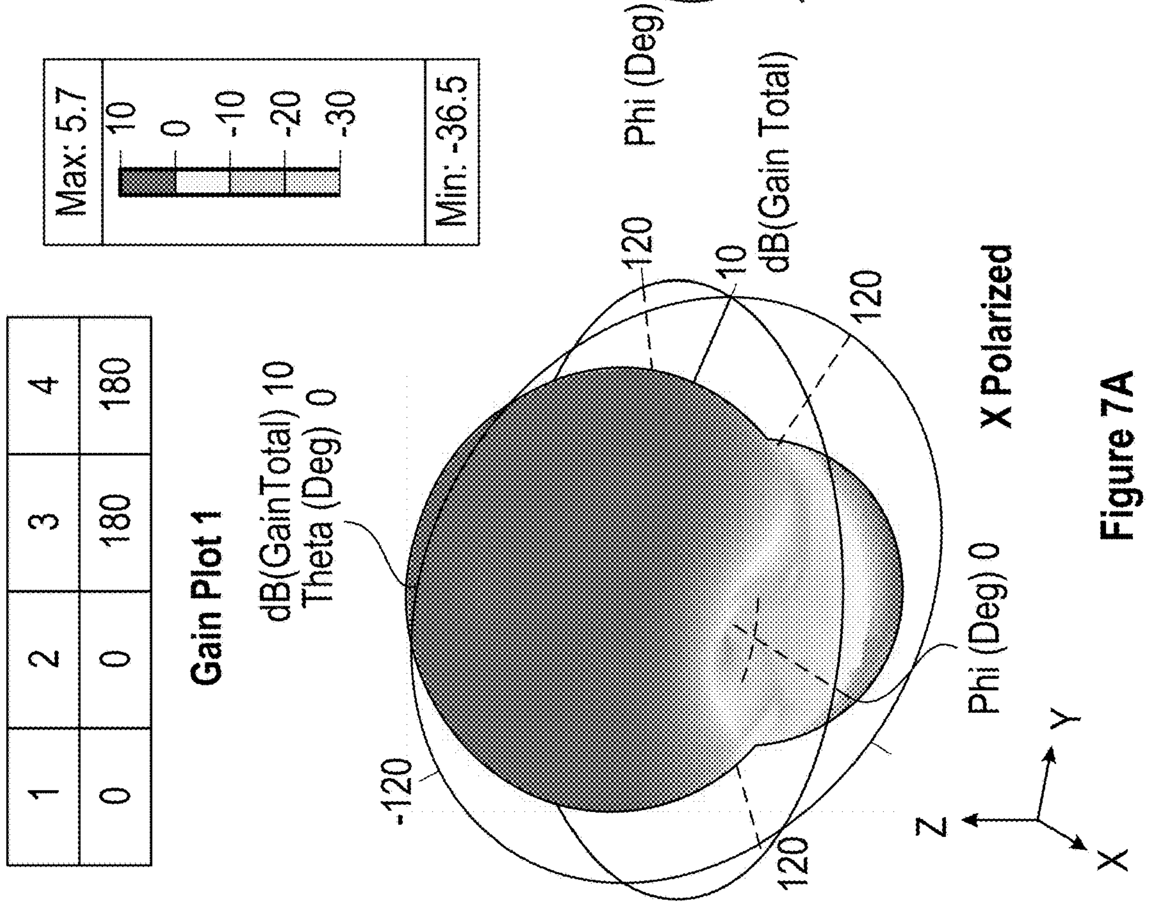

FIGS. 7A-7D illustrate additional example operating states for the antenna arrangement of FIG. 6A in accordance with some embodiments. FIG. 7A illustrates a horizontal linear polarization (e.g., an X-polarization) setting and radiation field pattern (e.g., gain plot) in accordance with some embodiments. In the example of FIG. 7A, an example radiation field pattern is shown corresponding to the antennas 606 being active with antenna 606-4 having a 0-degree phase shift, antenna 606-2 having a 0-degree phase shift, antenna 606-3 having a 180-degree phase shift, and antenna 606-1 having a 180-degree phase shift.

Figure 7D:
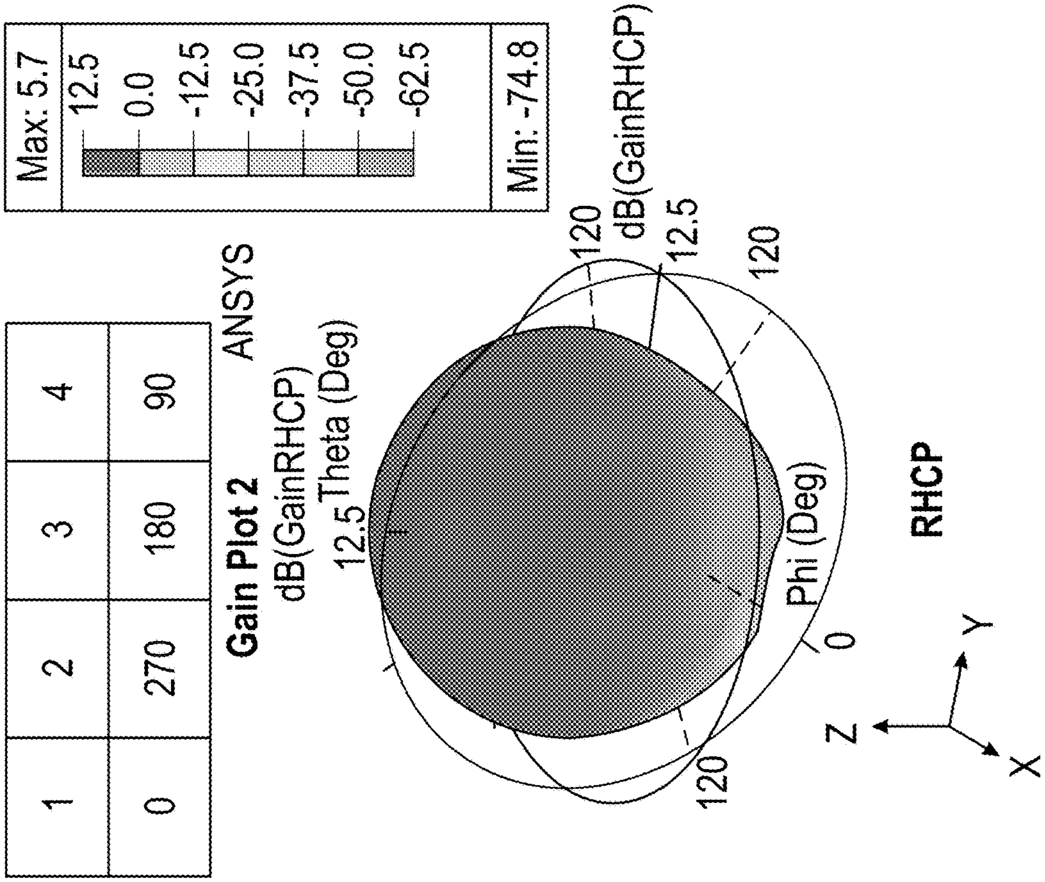
Figure 7C:
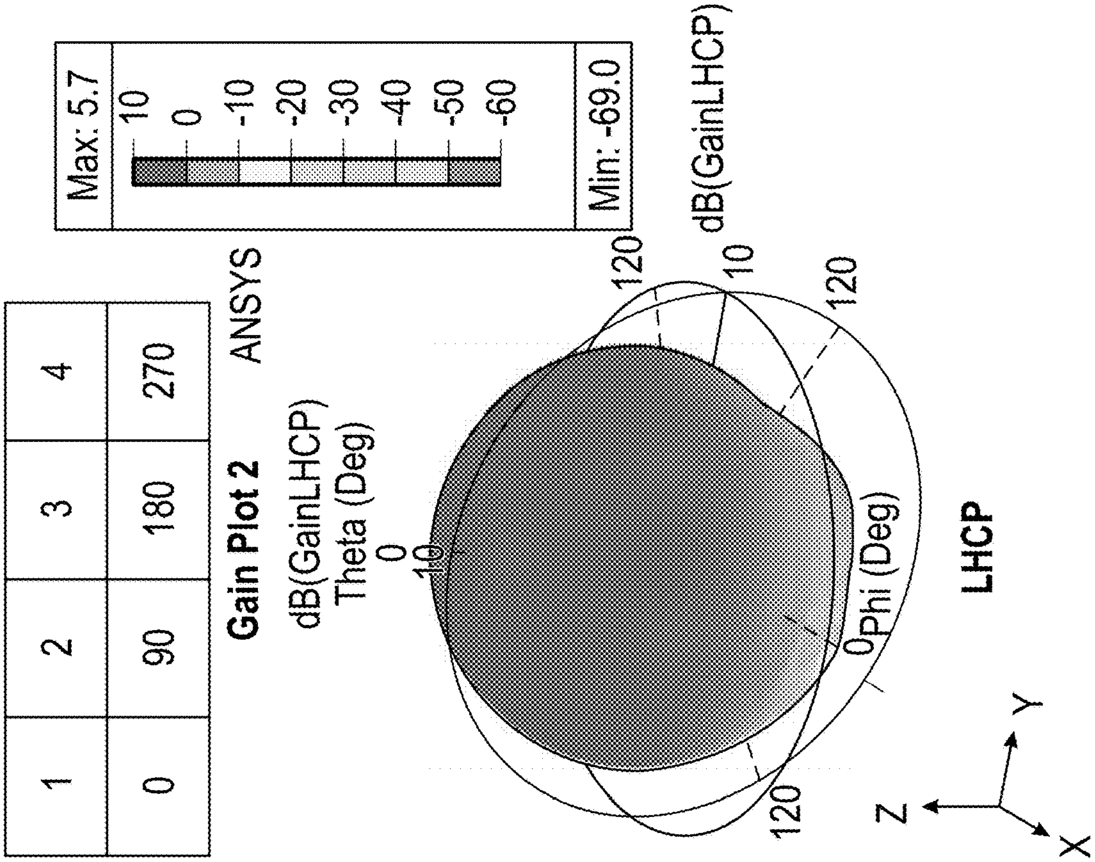

FIG. 7B illustrates a vertical linear polarization (e.g., a Y-polarization) setting and radiation field pattern in accordance with some embodiments. In the example of FIG. 7B, an example radiation field pattern is shown corresponding to the antennas 606 being active with antenna 606-4 having a 0-degree phase shift, antenna 606-2 having a 180-degree phase shift, antenna 606-3 having a 180-degree phase shift, and antenna 606-1 having a 0-degree phase shift. FIG. 7C illustrates an LHCP setting and radiation field pattern in accordance with some embodiments. In the example of FIG. 7C, an example radiation field pattern is shown corresponding to the antennas 606 being active with antenna 606-4 having a 0-degree phase shift, antenna 606-2 having a 90-degree phase shift, antenna 606-3 having a 180-degree phase shift, and antenna 606-1 having a 270-degree phase shift. FIG. 7D illustrates an RHCP setting and radiation field pattern in accordance with some embodiments. In the example of FIG. 7D, an example radiation field pattern is shown corresponding to the antennas 606 being active with antenna 606-4 having a 0-degree phase shift, antenna 606-2 having a 270-degree phase shift, antenna 606-3 having a 180-degree phase shift, and antenna 606-1 having a 90-degree phase shift.

Figure 8A:
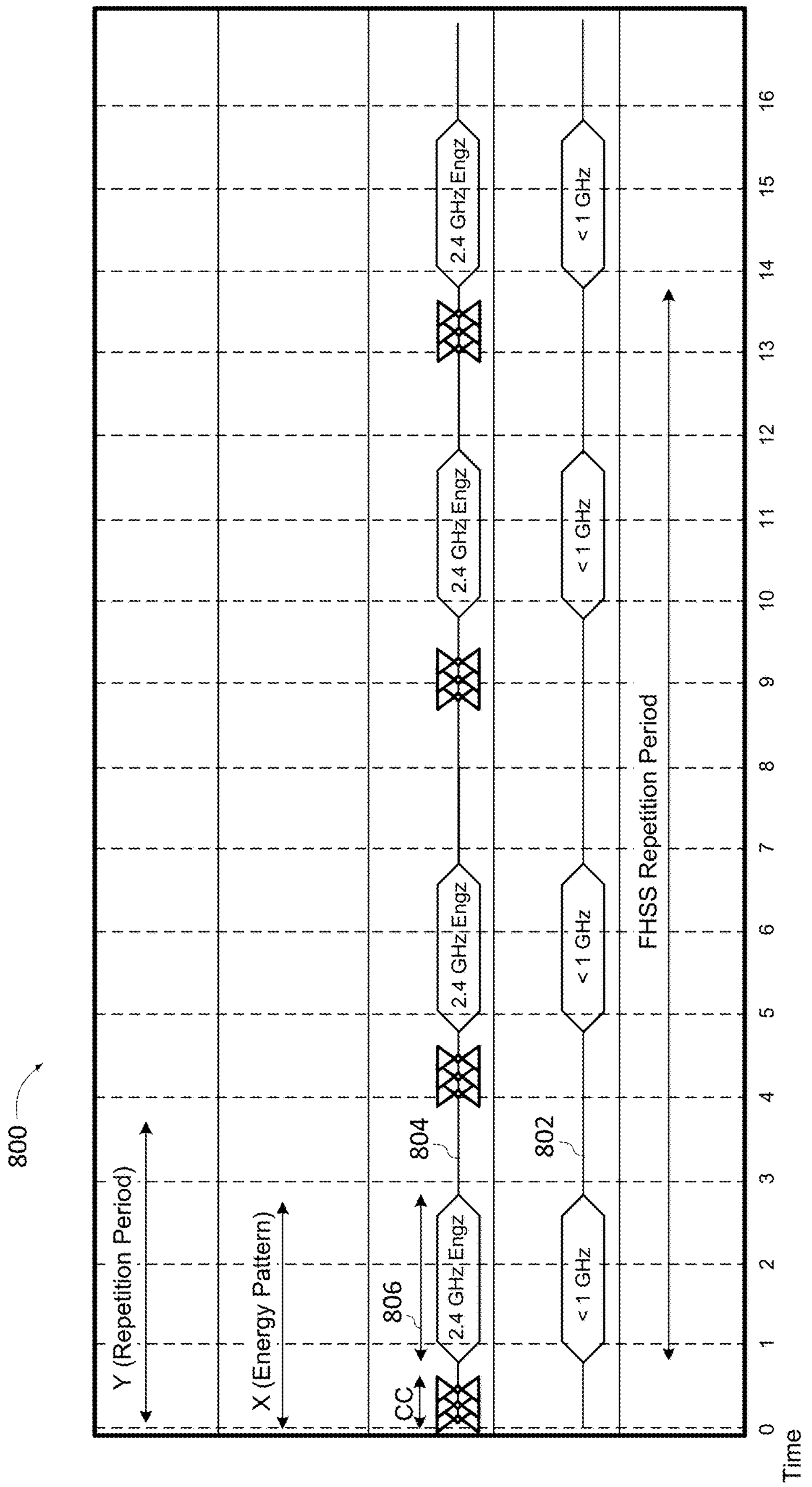
FIGS. 8A and 8B illustrate example timing waveforms for a wireless-power transmission system in accordance with some embodiments.
Figure 8B:
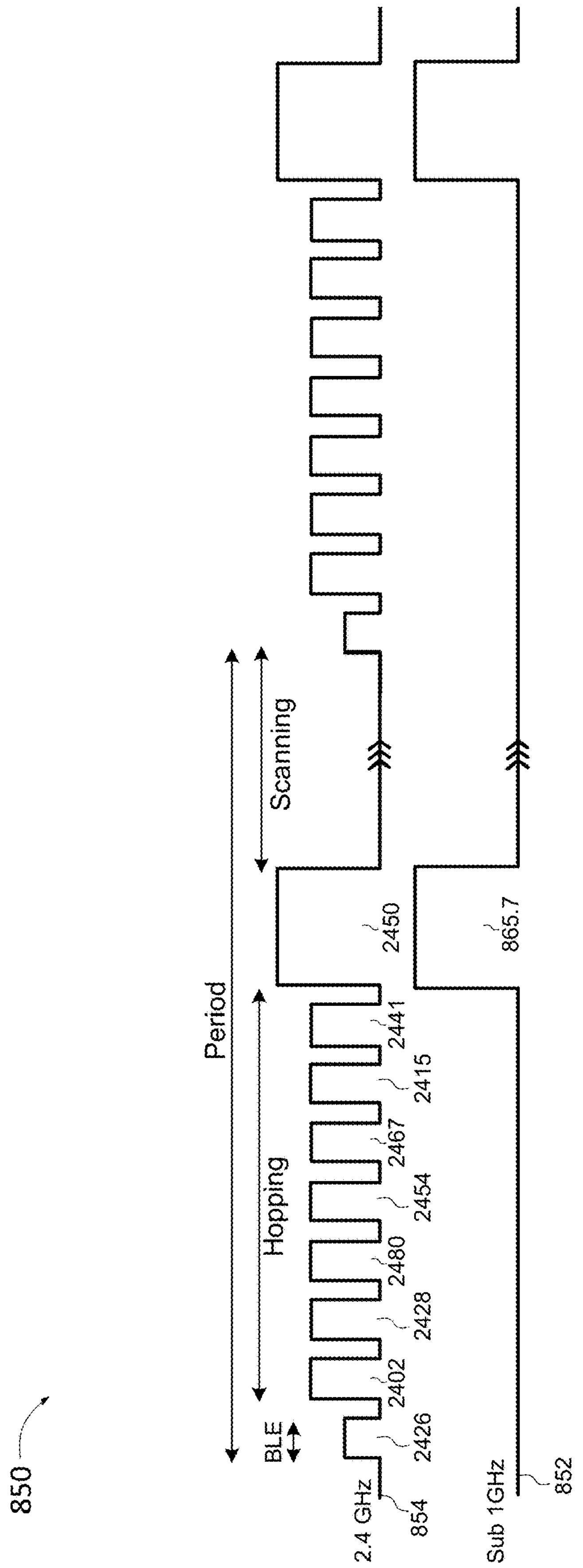
Figure 9A:
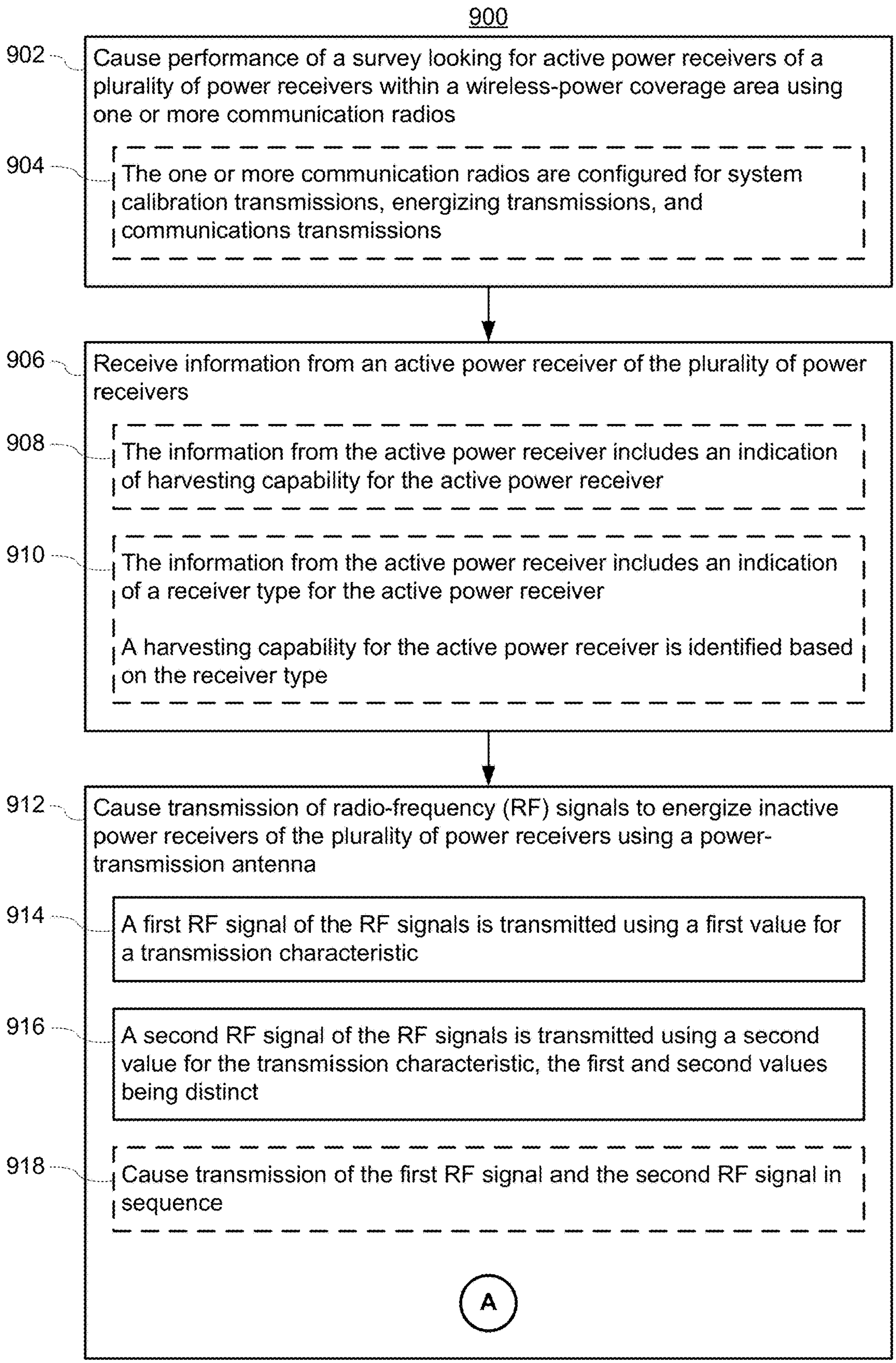
FIGS. 9A-9E are flow diagrams showing a method of surveying for active and inactive power receivers within a wireless-power coverage area in accordance with some embodiments.
Figure 9B:
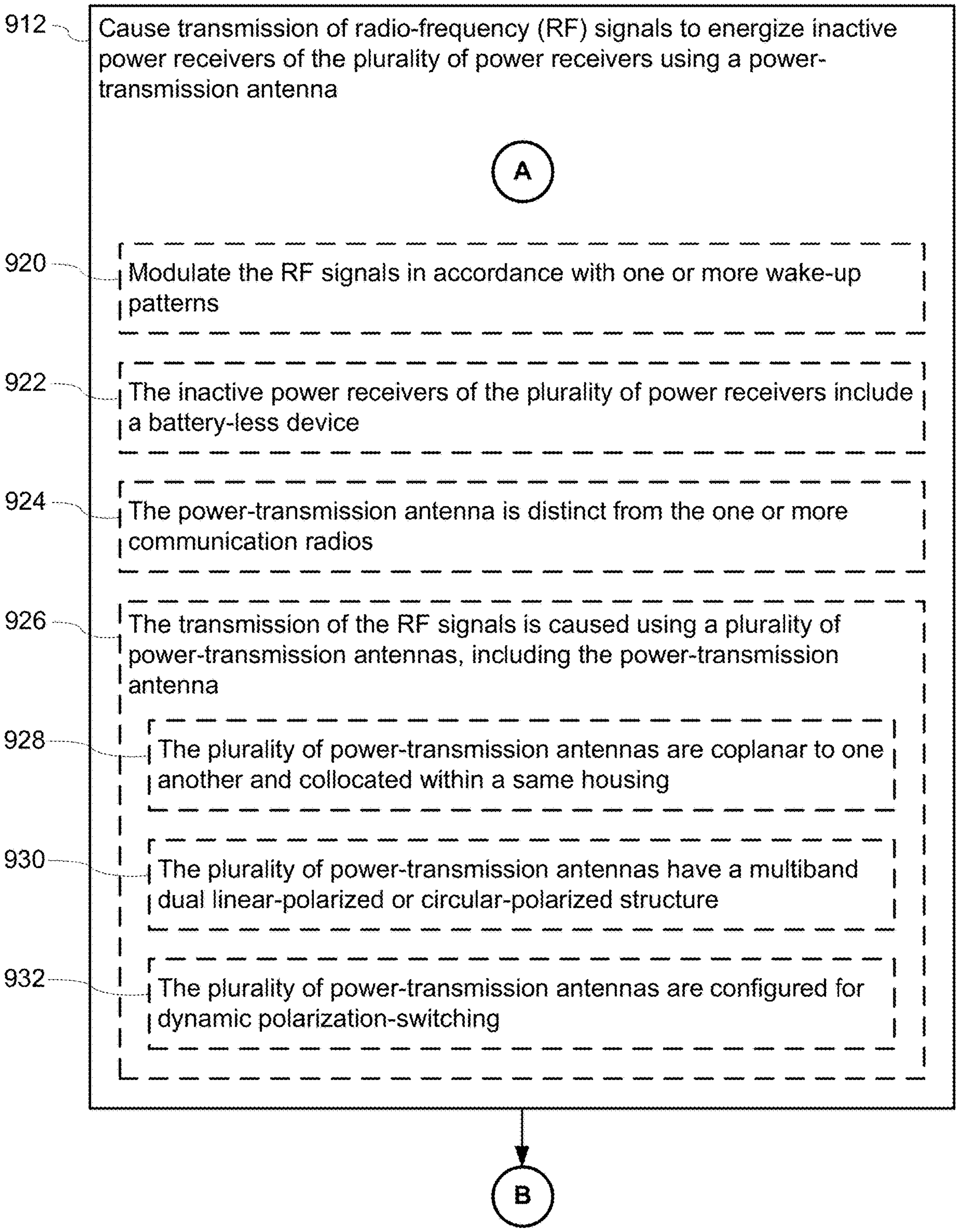
Figure 9C:
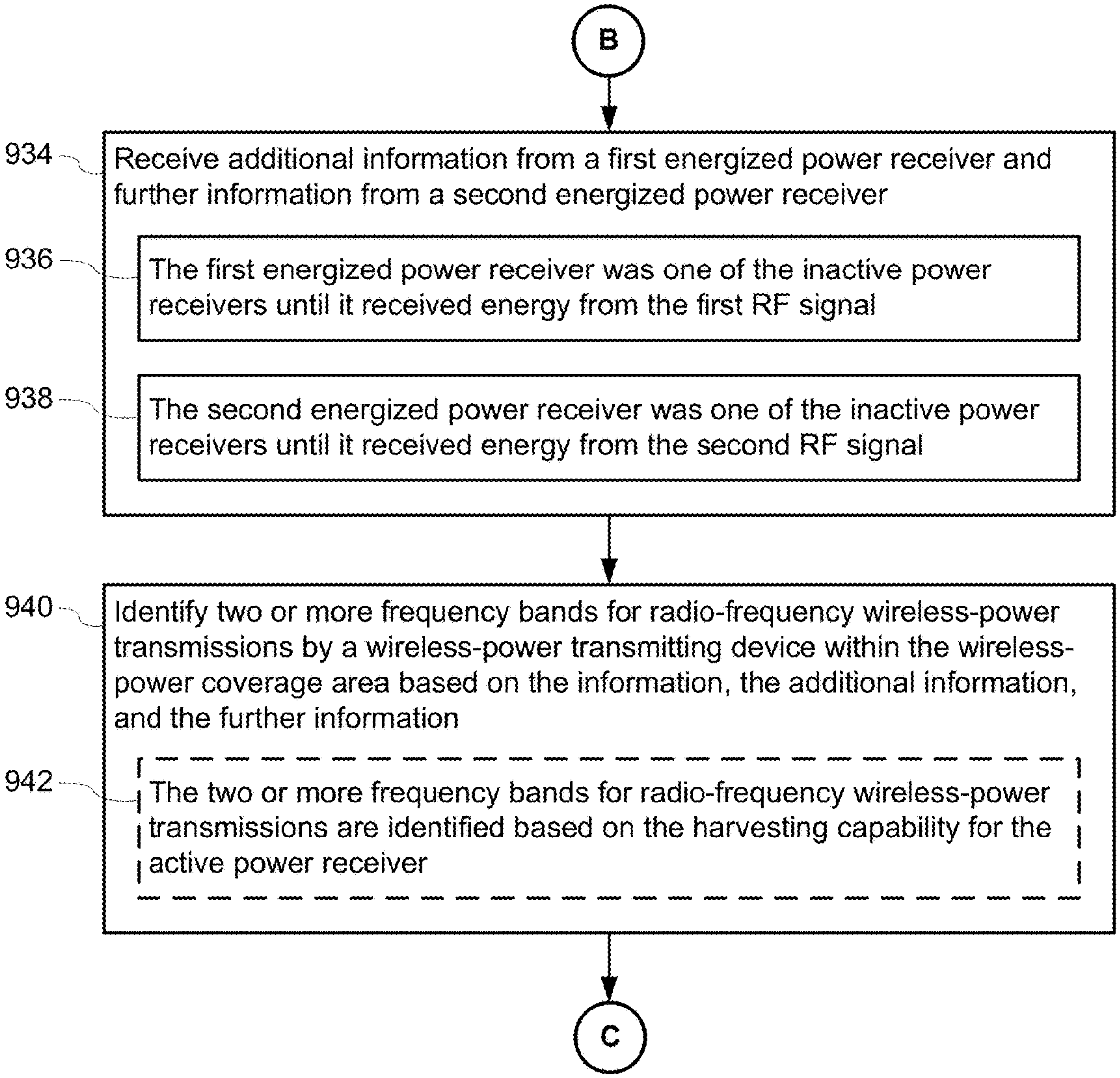
Figure 9D:
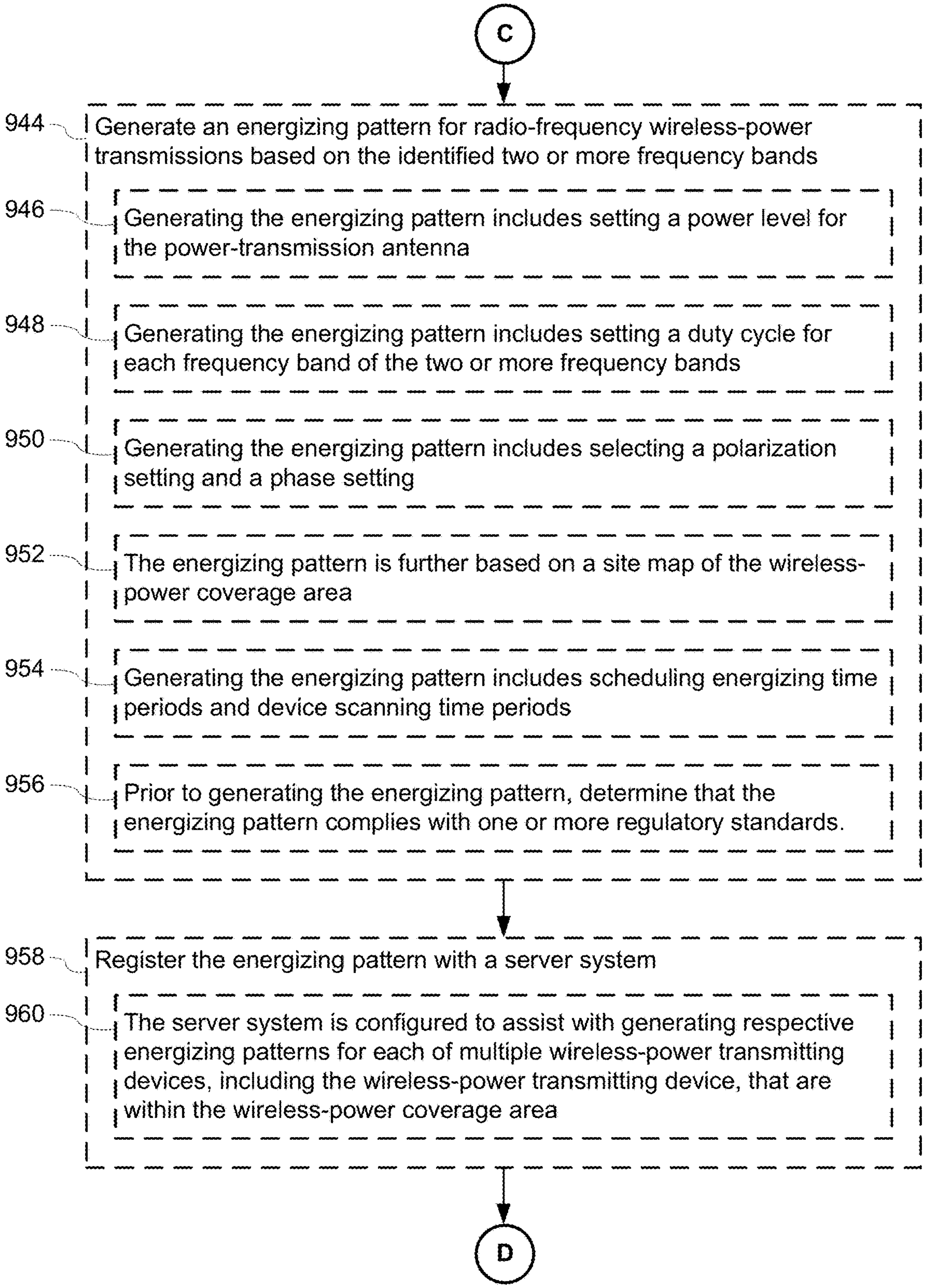
Figure 9E:
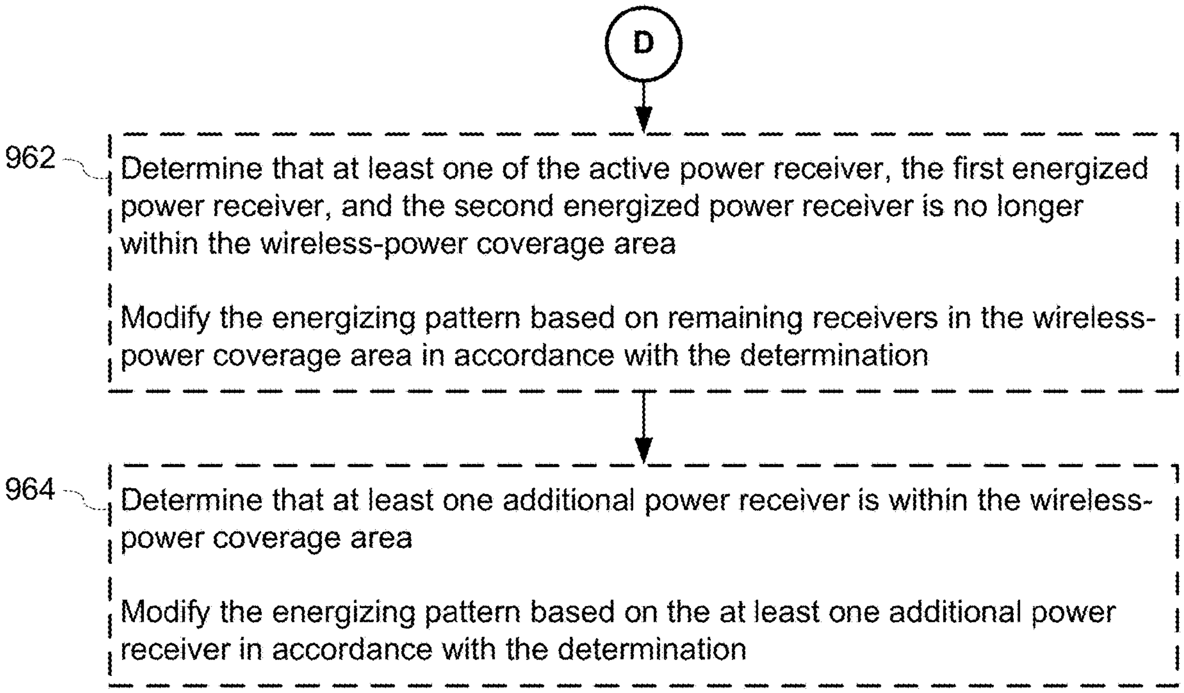

FIGS. 8A and 8B illustrate example timing waveforms for a wireless-power transmission system in accordance with some embodiments. FIG. 8A shows a timing waveform 800 that includes a sub-GHz signal 802 and a 2.4 GHz signal 804. In the example of FIG. 8A, each signal has an active time 806 (e.g., between 30 ms and 50 ms). FIG. 8B shows a frequency hopping spread spectrum (FHSS) timing waveform 850 illustrating dual-band synchronized energizing, BLE advertisement, and BLE scanning period. The timing waveform 850 includes a sub-GHz signal 852 and a 2.4 GHz signal 854. In the example of FIG. 8B, the 2.4 GHz signal 854 hops from 2426 MHz (e.g., a BLE transmission) to 2402 MHz to 2428 MHz to 2480 MHz to 2454 MHz to 2467 MHz to 2415 MHz to 2441 MHz to 2450 MHz. In some embodiments, the period is 45 milliseconds (ms), and the hopping occurs at 4.5 ms intervals.

In accordance with some embodiments, the wireless-power transmitting device (e.g., the transmitting device 102) is configured for a plurality of energizing and communication transmissions. In some embodiments, the plurality of transmissions includes a 918 MHz programmable WPT waveform with a PWM frequency and duty cycle, AM/OOK, Baud rate, frequency, CW, fixed frequency and FHSS, and/or programmable output power up to 30 dBm (or even up to 45 dBm). In some embodiments, the plurality of transmissions includes a 2.4 GHz WPT waveform with programmable frequency, modulation, bandwidth, data rate, programmable duty-cycle and timing to other radios, and/or programmable output power up to 20 dBm. In some embodiments, the plurality of transmissions includes a BLE transmission with programmable advertising period and scan windows, timing to energizing waveforms, programmable output power up to 20 dBm, and/or programmable repeater/bridge functionality.

In some embodiments, the plurality of transmissions includes a gateway operation transmission with receiver hub for various protocol (e.g., BLE, UWB, RFID, WiFi, etc.) receivers where data is filtered and retransmitted via BLE or dedicated backhaul (e.g., PoE, WiFi, or LTE). In some embodiments, the gateway operation transmission has programmable and/or adaptive filtering for high volumes of receivers, e.g., dynamically tracking receiver information and load-balance to the uplink. In some embodiments, the gateway operation transmission localizes each receiver to a gateway for location and uplink bandwidth conservation. In some embodiments, the gateway operation transmission has a control API channel, e.g., a remote-control API for scheduled or dynamic transmitting.

In accordance with some embodiments, the wireless-power transmitting device (e.g., the transmitting device 102) is programmable for regulatory compliance. In this way, the transmitter programmability can be used to achieve regulatory compliance for dedicated WPT devices. For example, for Federal Communications Commissions (FCC) Part 15 compliance, the transmitting device 102 can be configured as follows:

WPT1 (FHSS+AM+PWM): 917.210-918.778 MHz, 50 channels, on time 40 ms, Period 45 ms, up to 90% duty cycle, 30 dBm OP.

WPT2 (DTS+PWM): 2402-2475 MHz 19.8 dBm OP, 2476-2480 MHz 7.55 dBm OP, up to 100% duty cycle. Max power up to 2475 MHz, limited power >2475 due to restricted band emissions. This power level can be programmable by channel.

BLE: 2402-2440 MHz 18.8 dBm OP, 2441-2480 MHz 15.84 dBm OP

In this example, the WPT2 and BLE are time-sequenced (e.g., not concurrent).

As another example, for EN302-208 compliance, the transmitting device 102 can be configured as follows:

WPT1 (CW+PWM): 865.7 MHz, 1 channel, up to 90% duty cycle, 30 dBm OP.

WPT2a (DTS+PWM): 2450 MHz, 20 dBm OP, up to 100% duty cycle (EN300-440-4)

WPT2b (FHSS): 7 channel pseudo-random hopping in 2402-2480 MHz with even spacing and programmable timing such that TX duty-cycle <10%

BLE: 2402-2480 MHz, OP 7.5 dBm no duty-cycle restriction.

In this example, the WPT2a, WPT2b, and BLE are time sequenced (e.g., not concurrent).

FIGS. 9A-9E are a flow diagram showing a method 900 of surveying for active and inactive power receivers within a wireless-power coverage area (e.g., as illustrated in FIGS. 1A-1D) in accordance with some embodiments. The method 900 may be performed by a transmitting device 102, or a transmitting device 1000 or 1050, or one or more integrated circuits of a transmitting device such as the integrated transmitter platform 400 (FIG. 4A), the integrated transmitter platform 458 (FIG. 4B), the RF power transmitter integrated circuit (RFIC) 1060 (FIG. 10A), and/or the power amplifier integrated circuit (PAIC) 1061A (FIG. 10B). At least some of the operations shown in FIGS. 9A-9E correspond to instructions stored in a computer memory or a computer-readable storage medium (e.g., memory 1072 and 1074 of the wireless-power transmitter 1050, FIG. 10B). For simplicity and clarity, the operations below are described as being performed by a transmitting device.

In some embodiments, some, but not all, of the operations illustrated in FIGS. 9A-9E are performed. Similarly, one or more operations illustrated in FIGS. 9A-9E may be optional or performed in a different sequence. Furthermore, two or more operations of FIG. 9A-9E consistent with the present disclosure may be overlapping in time, concurrent, or simultaneous.

The transmitting device causes (902) performance of a survey looking for active power receivers of a plurality of power receivers (e.g., wireless-power receivers 303) within a wireless-power coverage area using one or more communication radios. For example, the transmitting device sends transmission(s) at different frequency bands as illustrated in FIGS. 1A-1C.

In some embodiments, the one or more communication radios are configured for (904) system calibration transmissions, energizing transmissions, and communications transmissions (e.g., the radios described above with reference to FIGS. 4A-4B). In some embodiments, the transmitting device performs a power zone calibration. In some embodiments, the transmitting device tests each band for optimum duty cycle and power. In some embodiments, the optimum settings are based on calibration results of other gateways or programmed from the cloud.

The transmitting device receives (906) information from an active power receiver of the plurality of power receivers (e.g., as illustrated in FIG. 1A). For example, the active power receiver transmits to the transmitting device at the same frequency at which the transmitting device transmitted (e.g., shown in FIG. 1A). In some embodiments, the active power receiver transmits on a communication frequency or band that is different from the frequency/band used by the transmitting device for the survey.

In some embodiments, the information from the active power receiver includes (908) an indication of harvesting capability for the active power receiver. In some embodiments, the transmitting device performs a site survey of devices in range, where the site survey does not include any WPT (e.g., communication radios only). In some situations, some devices are active already (e.g., battery-powered devices). Receivers (e.g., the receivers 104, 106, 108, and 110) can advertise their harvesting capability or the system may have a look-up table (LUT) based on device type.

In some embodiments, the information from the active power receiver includes (910) an indication of a receiver type for the active power receiver, and a harvesting capability for the active power receiver is identified based on the receiver type (e.g., using a LUT). LUT may be local or in the cloud and may be dynamically updated. In some embodiments, the transmitting device identifies which bands are needed based on the data from the receivers. In some embodiments, the LUT is a three-dimensional lookup table (e.g., a 3DLUT) configured to map to a three-dimensional area (e.g., the warehouse shown in FIGS. 1A-1D).

The transmitting device causes (912) transmission of radio-frequency (RF) signals to energize inactive power receivers of the plurality of power receivers using a power-transmission antenna. A first RF signal of the RF signals is transmitted (914) using a first value for a transmission characteristic (e.g., a first frequency value). A second RF signal of the RF signals is transmitted (916) using a second value for the transmission characteristic (e.g., a second frequency value), the first and second values being distinct. In some embodiments, the transmitting device performs a site survey of devices in range, where the site survey includes WPT. For example, the transmitting device 102 transmits a signal at a first frequency in FIG. 1A, and transmits a signal at a second frequency in FIG. 1B.

In some embodiments, the transmitting device causes (918) transmission of the first RF signal and the second RF signal in sequence. In some embodiments, the transmitting device energizes multiple bands in sequence or concurrently to identify sleeping or batteryless receivers. Energizing the multiple bands may include a 918 MHz max duty cycle and a 2.4 GHz energizing duty cycle with fixed preset balance between WPT and scan/communication. FIG. 8A illustrates an example of energizing multiple bands (e.g., 2.4 GHz and sub-1 GHz) concurrently.

In some embodiments, the transmitting device modulates (920) the RF signals in accordance with one or more wake-up patterns. In some embodiments, the site survey of devices in range includes known wake-up patterns required to turn on sleeping receivers (e.g., clock calibrations and OOK patterns). For example, the power transmitter 414 in FIGS. 4A and 4B is configured to transmit OOK signals. In some embodiments, the inactive power receivers of the plurality of power receivers include (922) a batteryless device. For example, a tag on retail merchandise may include a receiver circuit, but not a battery. In some embodiments, the power-transmission antenna is (924) distinct from the one or more communication radios. For example, the antenna 481-1 in FIG. 4B may be used for WPT while the antenna 481-2 in FIG. 4B is used for communication. In some embodiments, the transmission of the RF signals is caused (926) using a plurality of power-transmission antennas, including the power-transmission antenna (e.g., the antenna 481-1). For example, the antennas 424 and 426 in FIG. 4A may be used for power transmission, such as power transmission shown in FIGS. 1A-4B). In some embodiments, the plurality of power-transmission antennas are (928) coplanar to one another and collocated within a same housing. For example, the antennas 604 and 606 in FIG. 6A are coplanar and collocated. In some embodiments, the power-transmission antennas are arranged on a same circuit board. In some embodiments, the plurality of power-transmission antennas have (930) a multiband dual linear-polarized or circular-polarized structure. For example, the antennas in FIG. 6A may be controlled by the antenna tuning circuit 500 shown in FIG. 5A to generate the gain plots shown in FIGS. 7A-7D. In some embodiments, the plurality of power-transmission antennas are (932) configured for dynamic polarization-switching (e.g., via the antenna tuning circuit 500 shown in FIG. 5A).

The transmitting device receives (934) additional information from a first energized power receiver and further information from a second energized power receiver. The first energized power receiver is (936) one of the inactive power receivers before receiving energy from the first RF signal. The second energized power receiver is (938) one of the inactive power receivers before receiving energy from the second RF signal.

The transmitting device identifies (940) two or more frequency bands for RF wireless-power transmissions by a wireless-power transmitting device within the wireless-power coverage area based on the information, the additional information, and the further information. For example, the transmitting device 102 in FIG. 1D identifies the first and third frequencies for WPT based on the receiver responses shown in FIGS. 1A-1C. In some embodiments, the transmitting device identifies which bands are needed and how many receivers are present in each band. Different transmitters may have different energizing patterns and may use different combinations of frequencies. In some embodiments, the transmitting device registers receiver information to the system (local/cloud).

In some embodiments, the two or more frequency bands for RF radio-frequency wireless-power transmissions are identified (942) based on the harvesting capability for the active power receiver.

In some embodiments, the transmitting device generates (944) an energizing pattern for RF wireless-power transmissions based on the identified two or more frequency bands. In some embodiments, generating the energizing pattern includes (946) setting a power level for the power-transmission antenna. In some embodiments, generating the energizing pattern includes (948) setting a duty cycle for each frequency band of the two or more frequency bands. In some embodiments, generating the energizing pattern includes (950) selecting a polarization setting and a phase setting. For example, FIG. 5D shows an antenna tuning circuit with switching controls 560-1 and 560-2 for switching the antennas 516 to different polarization settings.

In some embodiments, the energizing pattern is (952) further based on a site map of the wireless-power coverage area. In some embodiments, generating the energizing pattern includes (954) scheduling energizing time periods and device scanning time periods. In some embodiments, the transmitting device performs a site survey then a WPT optimization, then a site activation and network organization/optimization. In some embodiments, the transmitting device adds battery-less or sleeping receivers without electronic system level capability onboarding. In some embodiments, prior to generating the energizing pattern, the transmitting device determines (956) that the energizing pattern complies with one or more regulatory standards (e.g., the FCC Part 15 and/or EN302-208 standards described previously).

In some embodiments, the transmitting device registers (958) the energizing pattern with a server system. For example, the transmitting device 302 in FIG. 3A may register the wireless power zone 304 (e.g., an energizing pattern) with the gateway 314, or with a remote server system in the cloud 316. In some embodiments, the transmitting device registers the energizing pattern and receiver information to the system (e.g., a local, mesh, or cloud system) and updates the information over time (e.g., periodically).

In some embodiments, the server system is configured (960) to assist with generating respective energizing patterns for each of multiple wireless-power transmitting devices, including the wireless-power transmitting device, that are within the wireless-power coverage area. In some embodiments, for each transmitting device (e.g., the transmitting devices 302, 306, and 310 and/or the gateway 314 shown in FIG. 3A), a periodic site survey is used to identify (or reidentify) receivers in the corresponding wireless power zone (wireless-power coverage area).

In some embodiments, the transmitting device determines (962) that at least one of the active power receiver, the first energized power receiver, and the second energized power receiver is no longer within the wireless-power coverage area; and modifies the energizing pattern based on remaining receivers in the wireless-power coverage area in accordance with the determination. For example, in FIG. 2B the receiver 104 is no longer in the wireless-power coverage area, and the transmitting device 102 adjusts the wireless power zone accordingly, in accordance with determining that the receiver 104 is no longer in the coverage area (e.g., adjusting from the energizing pattern 202 to the energizing pattern 204).

In some embodiments, the transmitting device determines (964) that at least one additional power receiver is within the wireless-power coverage area; and modifies the energizing pattern based on the at least one additional power receiver in accordance with the determination. For example, in FIG. 2C the receiver 208 is in the wireless-power coverage area, and the transmitting device 102 adjusts the wireless power zone accordingly (e.g., adjusting from the energizing pattern 204 to the energizing pattern 206).

Figure 10A:
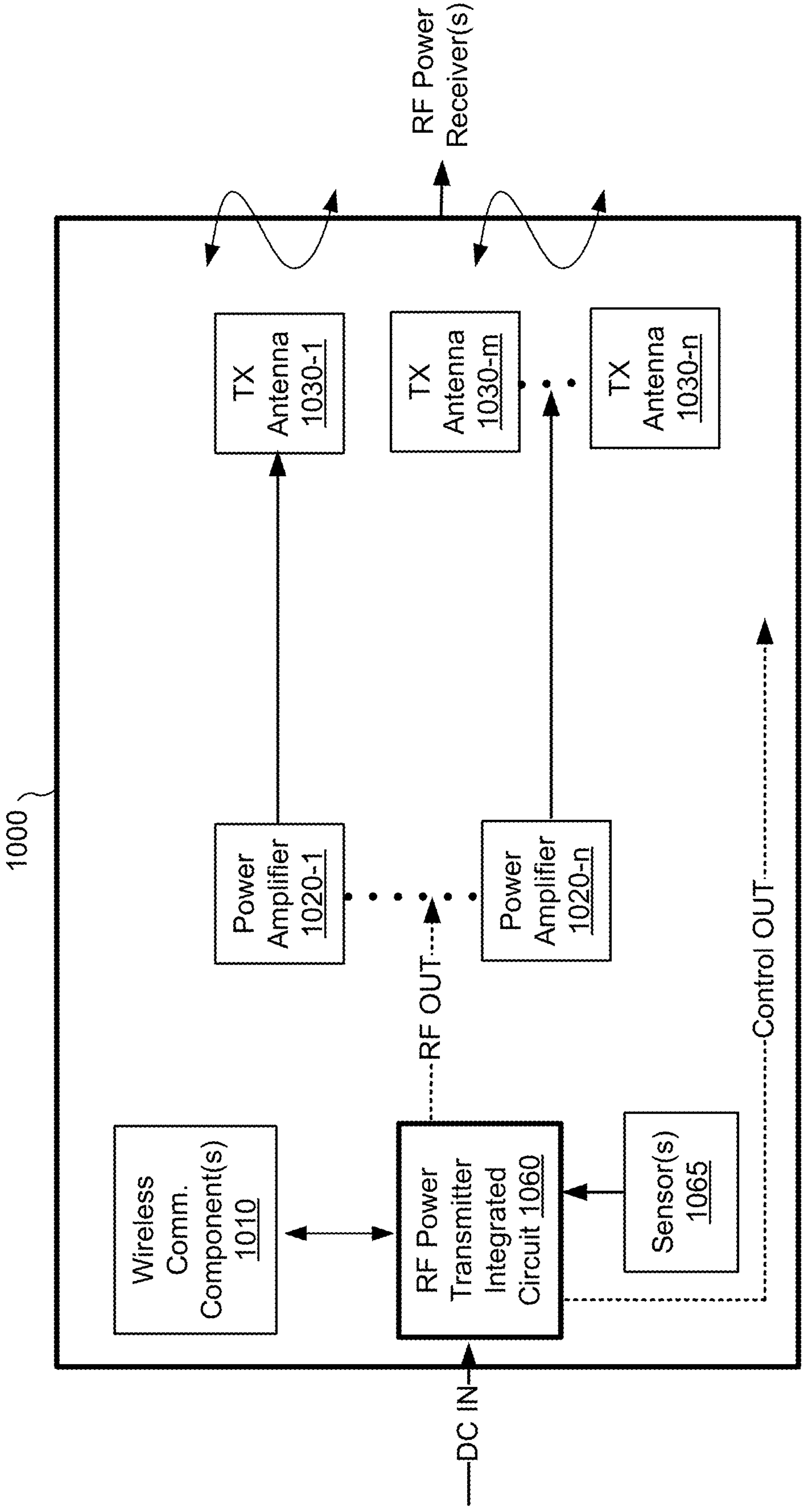
FIGS. 10A and 10B are block diagrams of a wireless-power transmitter in accordance with some embodiments.
Figure 10B:
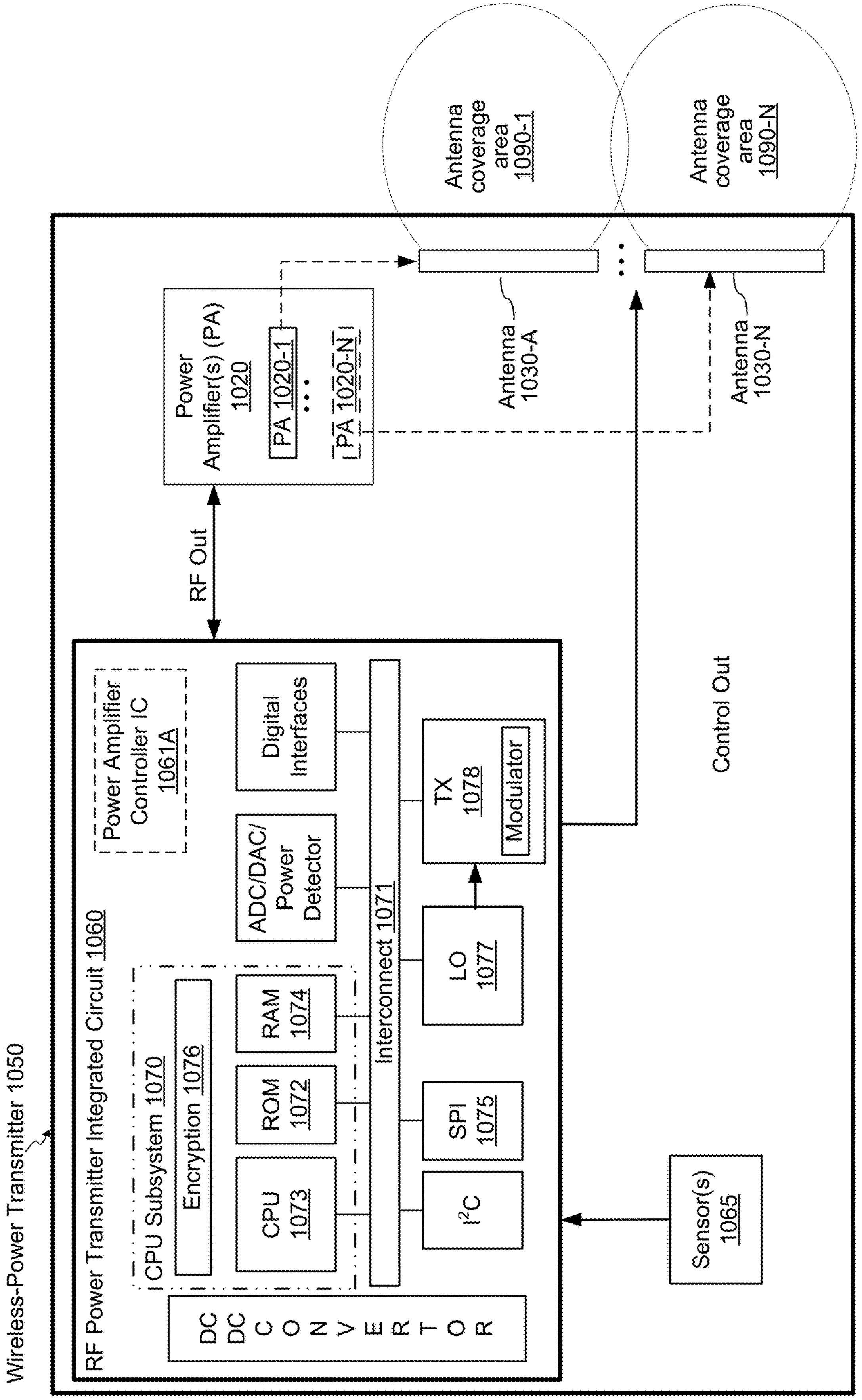

FIG. 10A is a block diagram of a wireless-power transmitter in accordance with some embodiments. The block diagram of a wireless-power transmitter 1000 corresponds to an example of the components that can be included within the transmitting device 102 described above in reference to FIGS. 1-9. The wireless-power transmitter 1000 can be referred to herein as a near-field power transmitter device, transmitter, power transmitter, or wireless-power transmitter device. The wireless-power transmitter 1000 includes one or more of: one or more communications components 1010, one or more power amplifier units 1020-1, . . . 1020-*n*, one or more power-transfer elements (e.g., such as antennas 1030-1 to 1030-*n* (which can be instances of the antenna elements shown in FIGS. 4-6)), an RFIC 1060 (e.g., analogous to controllers in FIGS. 4A-4B), and one or more sensors 1065 (e.g., the sensors 474).

In some embodiments, the communication component(s) 1010 (e.g., wireless communication components, such as WiFi and/or Bluetooth radios) enable communication between the wireless-power transmitter 1000 and one or more communication networks. In some embodiments, the communication component(s) 1010 are capable of data communications using any of a variety of custom or standard wireless protocols (e.g., IEEE 802.15.4, Wi-Fi, Zigbee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

In some embodiments, the communication component(s) 1010 receives charging information from a wireless-power receiver (or from an electronic device configured to be charged by the wireless-power receiver; e.g., the receiver 104, FIG. 1A). In some embodiments, the charging information is received in a packet of information that is received in conjunction with an indication that the wireless-power receiver is located within one meter of the wireless-power transmitter 1000. In some embodiments, the charging information includes the location of the wireless-power receiver within the transmission field of the wireless-power transmitter 1000 (or the surrounding area within the communications component(s) range). For example, communication components 1010, such as BLE communications paths operating at 2.4 GHz, to enable the wireless-power transmitter 1000 to monitor and track the location of the wireless-power receiver. The location of the wireless-power receiver can be monitored and tracked based on the charging information received from the wireless-power receiver via the communications component(s) 1010.

In some embodiments, the charging information indicates that a wireless-power receiver is configured or equipped to receive wirelessly-delivered power from the wireless-power transmitter 1000. More specifically, the wireless-power receiver can use a wireless communication protocol (such as BLE) to transmit the charging information as well as authentication information to the one or more integrated circuits (e.g., RFIC 1060) of the wireless-power transmitter 1000. In some embodiments, the charging information also includes general information such as charge requests from the receiver, the current battery level, charging rate (e.g., effectively transmitted power or electromagnetic energy successfully converted to usable energy), device specific information (e.g., temperature, sensor data, receiver requirements or specifications, and/or other receiver specific information), etc.

In some instances, the communication component(s) 1010 are not able to communicate with wireless-power receivers for various reasons, e.g., because there is no power available for the communication component(s) 1010 to use for the transmission of data signals or because the wireless-power receiver itself does not actually include any communication component of its own. As such, in some embodiments, the wireless-power transmitters 1000 described herein are still able to uniquely identify different types of devices and, when a wireless-power receiver is detected, figure out if that the wireless-power receiver is authorized to receive wireless-power (e.g., by measuring impedances, reflected power, and/or other techniques).

The one or more power amplifiers 1020 (e.g., analogous to the power amplifiers shown in FIGS. 4A-4B) are configured to amplify an electromagnetic signal that is provided to the one or more antennas 1030. In some embodiments, the power amplifier 1020 used in the power transmission system controls both the efficiency and gains of the output of the power amplifier. In some embodiments, the power amplifier used in the power transmission system is a class E power amplifier 1020. In some embodiments, the power amplifier 1020 used in the power transmission system is a Gallium Nitride (GaN) power amplifier. In some embodiments, the wireless-power transmitters 1000 is configured to control operation of the one or more power amplifiers 1020 when they drive one or more antennas 1030. In some embodiments, one or more of the power amplifiers 1020 are a variable power amplifier including at least two power levels. In some embodiments, a variable power amplifier includes one or more of a low-power level, median-power level, and high-power level. As discussed below in further detail, in some embodiments, the wireless-power transmitters 1000 is configured to select power levels of the one or more power amplifiers. In some embodiments, the power (e.g., electromagnetic power) is controlled and modulated at the wireless-power transmitters 1000 via switch circuitry as to enable the wireless-power transmitters to send electromagnetic energy to one or more wireless receiving devices (e.g., wireless-power receivers) via the one or more antennas 1030.

In some embodiments, the output power of the single power amplifier 1020 is equal or greater than 2 W. In some embodiments, the output power of the single power amplifier 1020 is equal or less than 15 W. In some embodiments, the output power of the single power amplifier 1020 is greater than 2 W and less than 15 W. In some embodiments, the output power of the single power amplifier 1020 is equal or greater than 4 W or is equal or less than 8 W. In some embodiments, the output power of the single power amplifier 1020 is greater than 4 W and less than 8 W. In some embodiments, the output power of the single power amplifier 1020 is greater than 8 W and up to 50 W.

In some embodiments, by using the single power amplifier 1020 with an output power range from 2 W to 15 W, the electric field within the power transmission range of the antenna 1030 controlled by the single power amplifier 1020 is at or below a specific absorption rate (SAR) value of 1.6 W/kg, which is in compliance with the FCC SAR requirement in the United States. In some embodiments, by using a single power amplifier 1020 with a power range from 2 W to 15 W, the electric field within the power transmission range of the antenna 1030 controlled by the single power amplifier 1020 is at or below a SAR value of 2 W/kg, which is in compliance with the International Electrotechnical Commission SAR requirement in the European Union. In some embodiments, by using a single power amplifier 1020 with a power range from 2 W to 15 W, the electric field within the power transmission range of the antenna 1030 controlled by the single power amplifier 1020 is at or below a SAR value of 0.8 W/kg. In some embodiments, by using a single power amplifier 1020 with a power range from 2 W to 15 W, the electric field within the power transmission range of the antenna 1030 controlled by the single power amplifier 1020 is at or below any level that is regulated by relevant rules or regulations. In some embodiments, the SAR value in a location of the radiation profile of the antenna decreases as the range of the radiation profile increases.

In some embodiments, the radiation profile generated by the antenna controlled by a single power amplifier is defined based on how much usable power is available to a wireless-power receiver when it receives electromagnetic energy from the radiation profile (e.g., rectifies and converts the electromagnetic energy into a usable DC current), and the amount of usable power available to such a wireless-power receiver can be referred to as the effective transmitted power of an electromagnetic signal. In some embodiments, the effective transmitted power of the electromagnetic signal in a predefined radiation profile is at least 0.5 W. In some embodiments, the effective transmitted power of the signal in a predefined radiation profile is greater than 1 W. In some embodiments, the effective transmitted power of the signal in a predefined radiation profile is greater than 2 W. In some embodiments, the effective transmitted power of the signal in a predefined radiation profile is greater than 5 W. In some embodiments, the effective transmitted power of the signal in a predefined radiation profile is less than or equal to 4 W. In some embodiments, there are a range of values that fall within the effective transmitted power (e.g., 2-4 W).

In some embodiments, the transmitting device 1000 is coupled to or integrated with an electronic device, such as a pen, a marker, a phone, a tablet, a laptop, a hearing aid, smart glasses, headphones, computer accessories (e.g., mouse, keyboard, remote speakers), and/or other electrical devices. In some embodiments, the wireless-power transmitter 1000 is coupled to or integrated with a small consumer device, such as a fitness band, a smart watch, and/or other wearable product. Alternatively, in some embodiments, the wireless-power transmitter 1000 is an electronic device.

FIG. 10B is a block diagram of another wireless-power transmitter 1050 (e.g., an instance of the transmitting device 102) including an RFIC 1060, one or more sensors 1065, one or more antennas 1030, and/or a power amplifier 1020 in accordance with some embodiments. For ease of discussion and illustration, the wireless-power transmitter 1050 can be an instance of the wireless-power transmitter devices described above in reference to FIGS. 1-9, and includes one or more additional and/or distinct components, or omits one or more components. In some embodiments, the RFIC 1060 includes a CPU subsystem 1070, an external device control interface, a subsection for DC to power conversion, and analog and digital control interfaces interconnected via an interconnection component, such as a bus or interconnection fabric block 1071. In some embodiments, the CPU subsystem 1070 includes a microprocessor unit (CPU) 1073 with related read-only memory (ROM) 1072 for device program booting via a digital control interface, e.g., an I2C port, to an external flash containing the CPU executable code to be loaded into the CPU subsystem random-access memory (RAM) 1074 or executed directly from flash. In some embodiments, the CPU subsystem 1070 also includes an encryption module or block 1076 to authenticate and secure communication exchanges with external devices, such as wireless-power receivers that attempt to receive wirelessly delivered power from the Wireless-power transmitters. In some embodiments, the wireless-power transmitters may also include a temperature monitoring circuit (not shown) that is in communication with the CPU subsystem 1070 to ensure that the wireless-power transmitters remains within an acceptable temperature range. For example, if a determination is made that the wireless-power transmitters has reached a threshold temperature, then operation of the wireless-power transmitters may be temporarily suspended until the wireless-power transmitters falls below the threshold temperature.

In some embodiments, the RFIC 1060 also includes (or is in communication with) a PAIC 1061A that is responsible for controlling and managing operations of a power amplifier, including, but not limited to, reading measurements of impedance at various measurement points within the power amplifier, instructing the power amplifier to amplify the electromagnetic signal, synchronizing the turn on and/or shutdown of the power amplifier, optimizing performance of the power amplifier, protecting the power amplifier, and other functions discussed herein. In some embodiments, the impedance measurement are used to allow the wireless-power transmitters (via the RFIC 1060 and/or PAIC 1061A) to detect of one or more foreign objects, optimize operation of the one or more power amplifiers, assess one or more safety thresholds, detect changes in the impedance at the one or more power amplifiers, detect movement of the receiver within the wireless transmission field, protect the power amplifier from damage (e.g., by shutting down the power amplifier, changing a selected power level of the power amplifier, and/or changing other configurations of the wireless-power transmitters), classify a receiver (e.g., authorized receivers, unauthorized receivers, and/or receiver with an object), compensate for the power amplifier (e.g., by making hardware, software, and/or firmware adjustments), tune the wireless-power transmitters, and/or other functions.

In some embodiments, the PAIC 1061A may be on the same integrated circuit as the RFIC 1060. Alternatively, in some embodiments, the PAIC 1061A may be on its own integrated circuit that is separate from (but still in communication with) the RFIC 1060. In some embodiments, the PAIC 1061A is on the same chip with one or more of the power amplifiers 1020. In some other embodiments, the PAIC 1061A is on its own chip that is a separate chip from the power amplifiers 1020. In some embodiments, the PAIC 1061A may be on its own integrated circuit that is separate from (but still in communication with) the RFIC 1060 enables older systems to be retrofitted. In some embodiments, the PAIC 1061A as a standalone chip communicatively coupled to the RFIC 1060 can reduce the processing load and potential damage from over-heating. Alternatively or additionally, in some embodiments, it is more efficient to design and use two different ICs (e.g., the RFIC 1060 and the PAIC 1061A).

In some embodiments, executable instructions running on the CPU are used to manage operation of the wireless-power transmitters and to control external devices through a control interface, e.g., SPI control interface 1075, and the other analog and digital interfaces included in the RFIC 1060. In some embodiments, the CPU subsystem 1070 also manages operation of the subsection of the RFIC 1060, which includes a local oscillator (LO) 1077 and a transmitter (TX) 1078. In some embodiments, the LO 1077 is adjusted based on instructions from the CPU subsystem 1070 and is thereby set to different desired frequencies of operation, while the TX converts, amplifies, modulates the output as desired to generate a viable power level.

In some embodiments, the RFIC 1060 and/or PAIC 1061A provide the viable power level (e.g., via the TX 1078) directly to the one or more power amplifiers 1020 and does not use any beam-forming capabilities (e.g., bypasses/disables a beam-forming IC and/or any associated algorithms if phase-shifting is not required, such as when only a single antenna 1030 is used to transmit power transmission signals to a wireless-power receiver). In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase. In some embodiments, the RFIC 1060 and/or PAIC 1061A regulate the functionality of the power amplifiers 1020 including adjusting the viable power level to the power amplifiers 1020, enabling the power amplifiers 1020, disabling the power amplifiers 1020, and/or other functions.

Various arrangements and couplings of power amplifiers 1020 to antenna coverage areas 1090 (which can be instance of the plurality of power-transfer points of a transmitter antenna element) allow the wireless-power receiver to sequentially or selectively activate different antenna coverage areas 1090 (e.g., power transfer points) in order to determine the most efficient and safest (if any) antenna coverage area 1090 to use for transmitting wireless-power to a wireless-power receiver.

In some embodiments, the one or more power amplifiers 1020 are also controlled by the CPU subsystem 1070 to allow the CPU 1073 to measure output power provided by the power amplifiers 1020 to the antenna coverage areas (e.g., plurality of power-transfer points) of the wireless-power transmitter. In some embodiments, the one or more power amplifiers 1020 are controlled by the CPU subsystem 1070 via the PAIC 1061A. In some embodiments, the power amplifiers 1020 may include various measurement points that allow for at least measuring impedance values that are used to enable the foreign object detection techniques, receiver and/or foreign object movement detection techniques, power amplifier optimization techniques, power amplifier protection techniques, receiver classification techniques, power amplifier impedance detection techniques, and/or other safety techniques described in commonly-owned U.S. Pat. No. 10,985,617.

In some embodiments, the near-field power transmitters disclosed herein may use adaptive loading techniques to optimize power transfer. Such techniques are described in detail in commonly-owned PCT Application No. PCT/US2017/065886 (Published PCT Application WO 2018/111921) and, in particular, in reference to FIGS. 5-8 and 12-15 of PCT Application No. PCT/US2017/065886.

Figure 11:
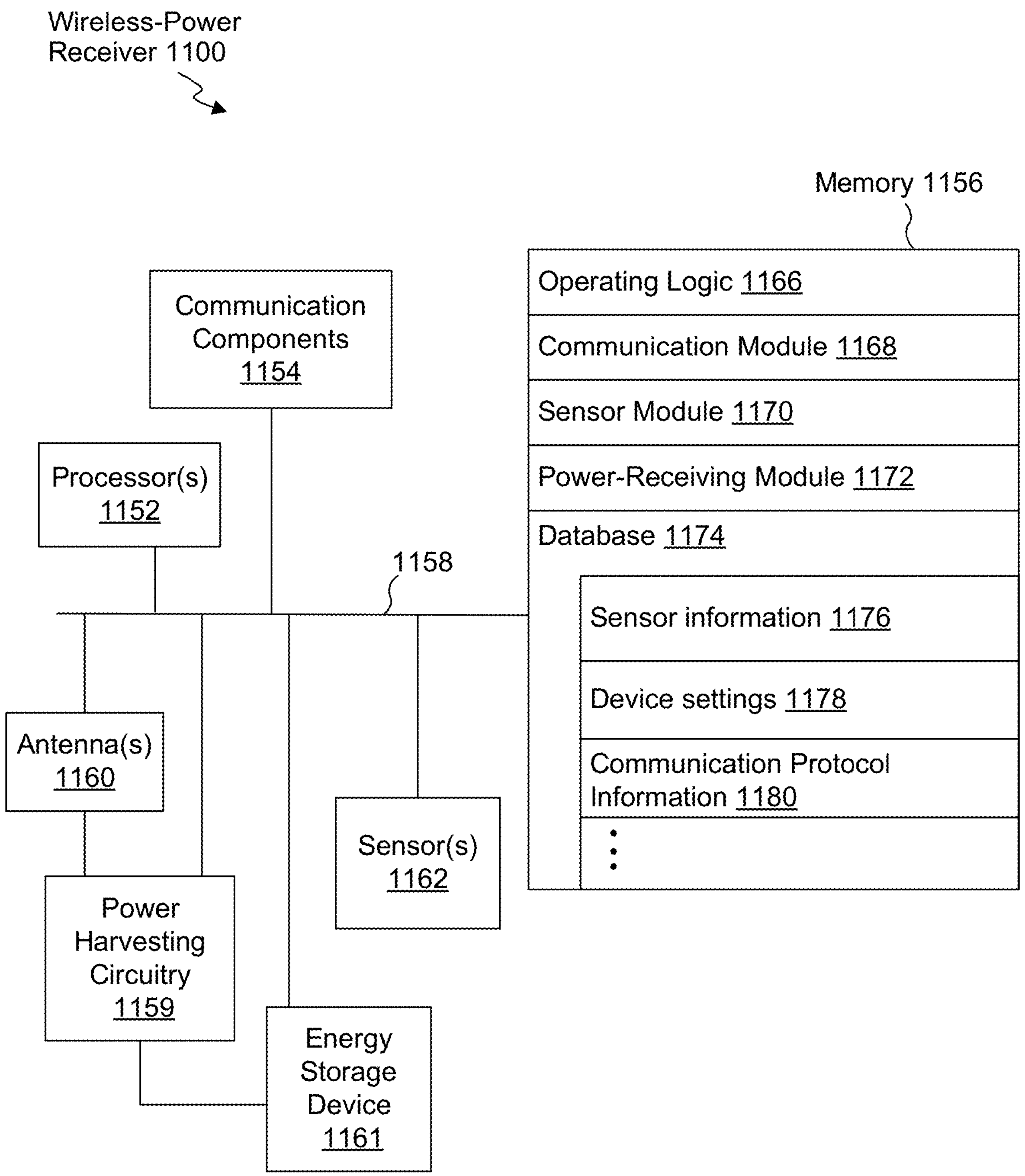
FIG. 11 is a block diagram illustrating a wireless power receiver in accordance with some embodiments.

FIG. 11 is a block diagram illustrating a representative wireless-power receiver 1100 (also sometimes interchangeably referred to herein as a receiver, or power receiver), in accordance with some embodiments. In various embodiments, the receivers described previously with respect to FIGS. 1-10 are instances of the wireless-power receiver 1100. In some embodiments, the wireless-power receiver 1100 includes one or more processing units (e.g., CPUs, ASICs, FPGAs, microprocessors, and the like) 1152, one or more communication components 1154, memory 1156, antenna(s) 1160 (which can be instances receiver antenna elements), power harvesting circuitry 1159 (e.g., power conversion circuitry), and one or more communication buses 1158 for interconnecting these components (sometimes called a chipset). In some embodiments, the wireless-power receiver 1100 includes one or more optional sensors 1162, similar to the one or sensors. In some embodiments, the wireless-power receiver 1100 includes an energy storage device 1161 for storing energy harvested via the power harvesting circuitry 1159. In various embodiments, the energy storage device 1161 includes one or more batteries, one or more capacitors, one or more inductors, and the like.

As described herein, power harvesting circuitry captures and converts ambient energy from the environment, such as light, heat, vibration, or radio waves, into electrical energy that can be used to power electronic devices. In some embodiments, the power harvesting circuitry 1159 includes one or more rectifying circuits and/or one or more power converters. In some embodiments, the power harvesting circuitry 1159 includes one or more components (e.g., a power converter) configured to convert energy from power waves and/or concentrated areas of RF energy to electrical energy (e.g., electricity). In some embodiments, the power harvesting circuitry 1159 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the antenna(s) 1160 include one or more helical antennas, such as those described in detail in commonly-owned U.S. Pat. No. 10,734,717 (e.g., with particular reference to FIGS. 2-4B, and elsewhere).

In some embodiments, the wireless-power receiver 1100 includes one or more output devices such as one or more indicator lights, a sound card, a speaker, a small display for displaying textual information and error codes, etc. In some embodiments, the wireless-power receiver 1100 includes a location detection device, such as a GPS or other geo-location receiver, for determining the location of the wireless-power receiver 1100.

In various embodiments, the one or more sensors 1162 include one or more thermal radiation sensors, ambient temperature sensors, humidity sensors, IR sensors, occupancy sensors (e.g., RFID sensors), ambient light sensors, motion detectors, accelerometers, and/or gyroscopes. It is noted that the foreign object detection techniques can operate without relying on the one or more sensor(s) 1162.

The communication component(s) 1154 enable communication between the wireless-power receiver 1100 and one or more communication networks. In some embodiments, the communication component(s) 1154 are capable of data communications using any of a variety of custom or standard wireless protocols (e.g., IEEE 802.15.4, Wi-Fi, Zigbee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. It is noted that the foreign object detection techniques can operate without relying on the communication component(s) 1154.

The communication component(s) 1154 include, for example, hardware capable of data communications using any of a variety of custom or standard wireless protocols (e.g., IEEE 802.15.4, Wi-Fi, Zigbee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 1156 includes high-speed random-access memory, such as DRAM, SRAM, DDR SRAM, or other random-access solid-state memory devices; and, optionally, includes non-volatile memory, such as one or more magnetic disk storage devices, one or more optical disk storage devices, one or more flash memory devices, or one or more other non-volatile solid state storage devices. The memory 1156, or alternatively the non-volatile memory within memory 1156, includes a non-transitory computer-readable storage medium. In some embodiments, the memory 1156, or the non-transitory computer-readable storage medium of the memory 1156, stores the following programs, modules, and data structures, or a subset or superset thereof:

- Operating logic 1166 including procedures for handling various basic system services and for performing hardware dependent tasks;
- Communication module 1168 for coupling to and/or communicating with remote devices (e.g., remote sensors, transmitters, receivers, servers, mapping memories) in conjunction with communication component(s) 1154;
- Optional sensor module 1170 for obtaining and processing sensor data (e.g., in conjunction with sensor(s) 1162) to, for example, determine the presence, velocity, and/or positioning of the wireless-power receiver 1100, a transmitting device 102, or an object in the vicinity of the transmitting device 102;
- Wireless power-receiving module 1172 for receiving (e.g., in conjunction with antenna(s) 1160 and/or power harvesting circuitry 1159) energy from capacitively-conveyed electrical signals, power waves, and/or energy pockets; optionally converting (e.g., in conjunction with power harvesting circuitry 1159) the energy (e.g., to direct current); transferring the energy to a coupled electronic device; and optionally storing the energy (e.g., in conjunction with energy storage device 1161); and
- Database 1174, including but not limited to:
  - Sensor information 1176 for storing and managing data received, detected, and/or transmitted by one or more sensors (e.g., sensors 1162 and/or one or more remote sensors);
  - Device settings 1178 for storing operational settings for the wireless-power receiver 1100, a coupled electronic device, and/or one or more remote devices; and
  - Communication protocol information 1180 for storing and managing protocol information for one or more protocols (e.g., custom or standard wireless protocols, such as Zigbee, Z-Wave, and/or custom or standard wired protocols, such as Ethernet);

Each of the above-identified elements (e.g., modules stored in memory 1156 of the wireless-power receiver 1100) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 1156 optionally, stores a subset of the modules and data structures identified above. Furthermore, the memory 1156 optionally, stores additional modules and data structures not described above, such as an identifying module for identifying a device type of a connected device (e.g., a device type for an electronic device that is coupled with the wireless-power receiver 1100). In some embodiments, the memory 1156 stores a secure element module for providing identification information to the wireless-power transmitter (e.g., the wireless-power transmitter uses the identification information to determine if the wireless-power receiver 1100 is authorized to receive wirelessly delivered power). In some embodiments, the memory 1156 stores a signature-signal generating module used to control various components to cause impedance changes at the antenna(s) 1160 and/or power harvesting circuitry 1159 to then cause changes in reflected power as received by a signature-signal receiving circuit.

Figure 12:
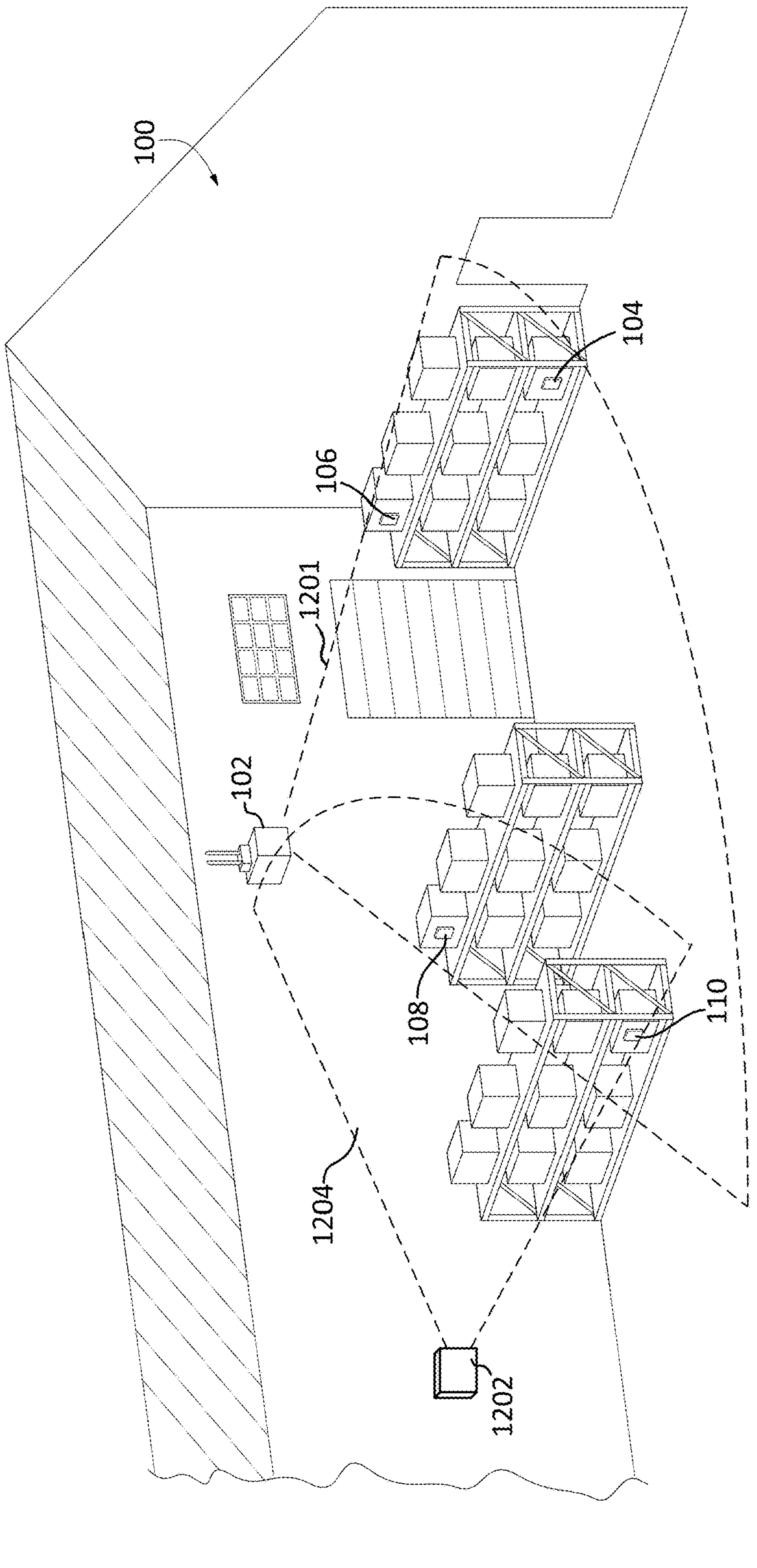
FIG. 12 illustrates example operation of a wireless repeater in accordance with some embodiments.

FIG. 12 illustrates an example operation of a wireless repeater in accordance with some embodiments. The transmitting device 102 in FIG. 12 is generating an energizing pattern 1201 that covers the receivers 104, 106, 108, and 110. FIG. 12 also shows an RF device 1202 (e.g., an RFID reader device) with a communication range of 1204 that covers the receivers 108 and 110. In some embodiments, the transmitting device 102 receives a signal (e.g., an RFID signal) from the RF device 1202 and repeats the signal to the receivers in the energizing pattern 1201, including the receivers 104 and 106. In some embodiments, the transmitting device 102 receives a response to the signal from the receivers 104 and 106 and relays the response to the RF device 1202. In this way, the transmitting device 102 extends the effective range of the RF device 1202.

Figure 13A:
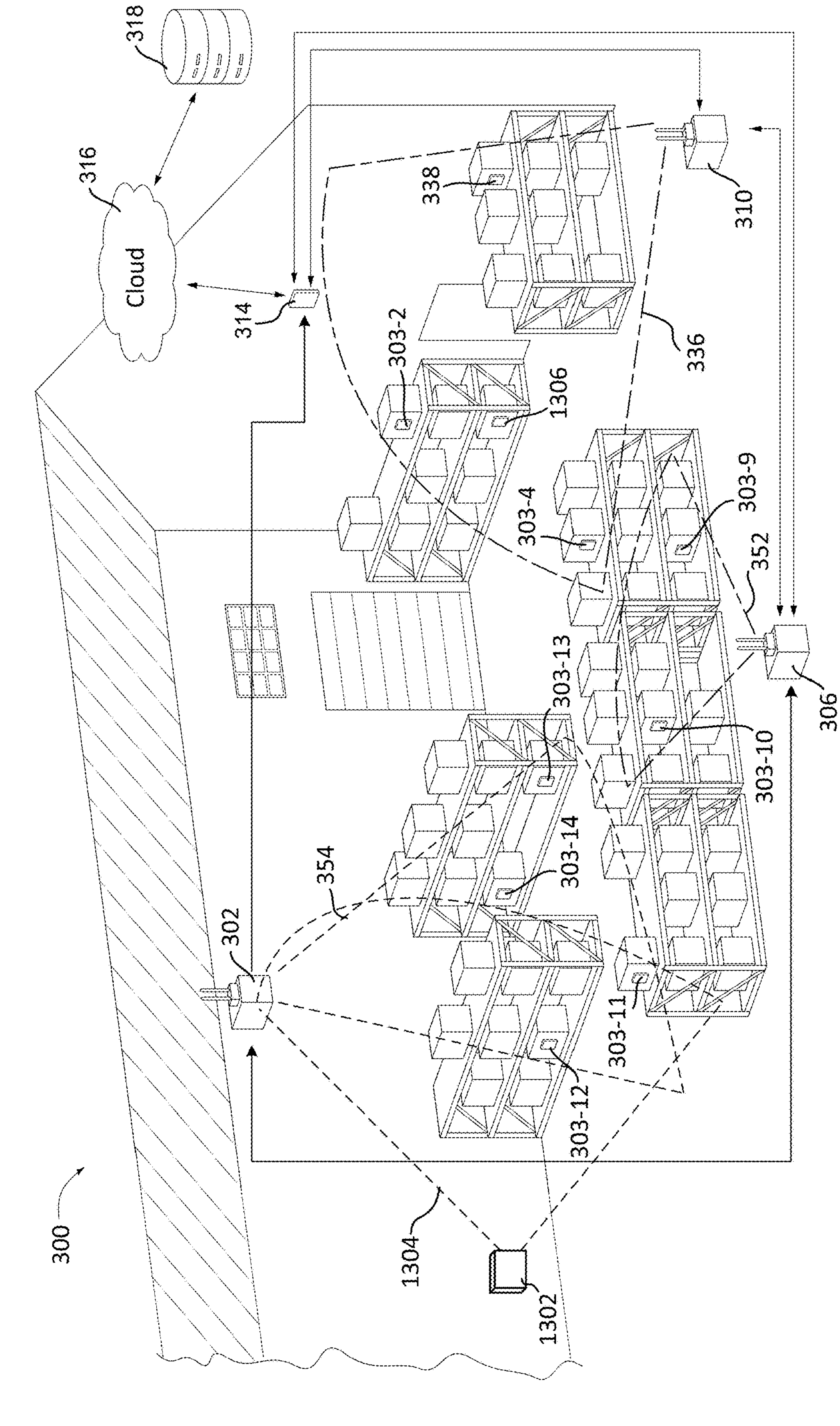
FIGS. 13A-13B illustrate example operation of a wireless-power network in accordance with some embodiments.
Figure 13B:
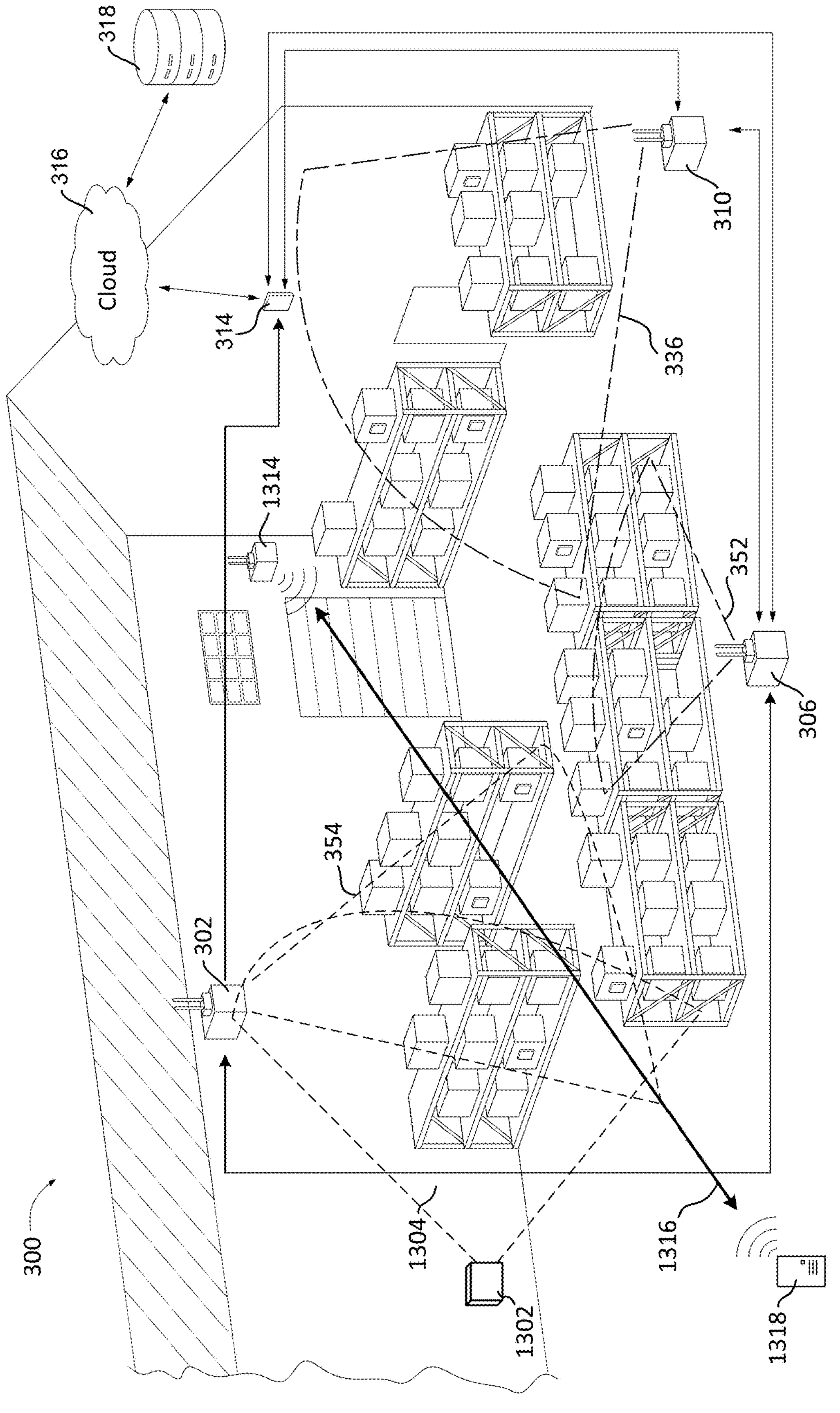

FIGS. 13A-13B illustrate example operation of a wireless-power network in accordance with some embodiments. FIG. 13A shows the wireless-power network 300 from FIGS. 3A-3C with the addition of an RF device 1302 (e.g., an RFID reader device). The RF device 1302 in FIG. 13A has a communication range 1304 that covers the receivers 303-11 and 303-12. In some embodiments, the transmitting device 302 receives a signal (e.g., an RFID signal) from the RF device 1302 and repeats the signal to the receivers in the energizing pattern 354, including the receiver 303-13. In some embodiments, the transmitting device 302 receives a response to the signal from the receivers 303-13 and relays the response to the RF device 1302. In some embodiments, the transmitting device 302 relays the signal to the transmitting devices 306 and 310 and relays responses corresponding to the receivers 303-2, 338, 1306, 303-9, and 303-10 to the RF device 1302. In this way, the wireless-power network 300 extends the effective range of the RF device 1302.

In some situations, a WPT TX may operate in an area with multiple networks in the same frequency band. In some cases, the WPT TX may interfere with other networks. In those cases, it is desirable to detect and classify signals in the area and configure the WPT TX into an appropriate non-interfering state.

FIG. 13B shows the wireless-power network 300, the RF device 1302, and wireless communication devices 1314 and 1318. In some embodiments, the wireless communication devices 1314 and 1318 utilize the same frequency bands as the wireless-power network 300. In some embodiments, the transmitting devices 302, 306, and 310 are configured to detect communications between the devices 1314 and 1318 and adjust the transmission of wireless power to reduce/minimize interference with the communications. For example, the transmitters scan and identify communication network(s) that are in-band and likely to be harmed by the WPT. In this example, the transmitters are set to a non-interfering configuration in response to a determination that the communication network(s) are likely to be harmed.

In some situations, wireless power networks are deployed in areas with legacy tracking and communications systems.

For example, an ultra high frequency (UHF) RFID read zone may overlap with a wireless power network (WPN) zone. In some situations, a WPN may interfere with RFID reading (e.g., tags located in a WPN cell could be jammed). In some embodiments, a WPN TX is used to augment a forward link-limited RFID system by repeating the reader-to-tag signal and optionally the tag-to-reader phase. For example, tags located in the wireless power zone 354 may have higher response rates and higher probability of successful reading. In addition, tags located in the wireless power zones 352 and 336 are visible to the RF device 1302.

Figure 14:
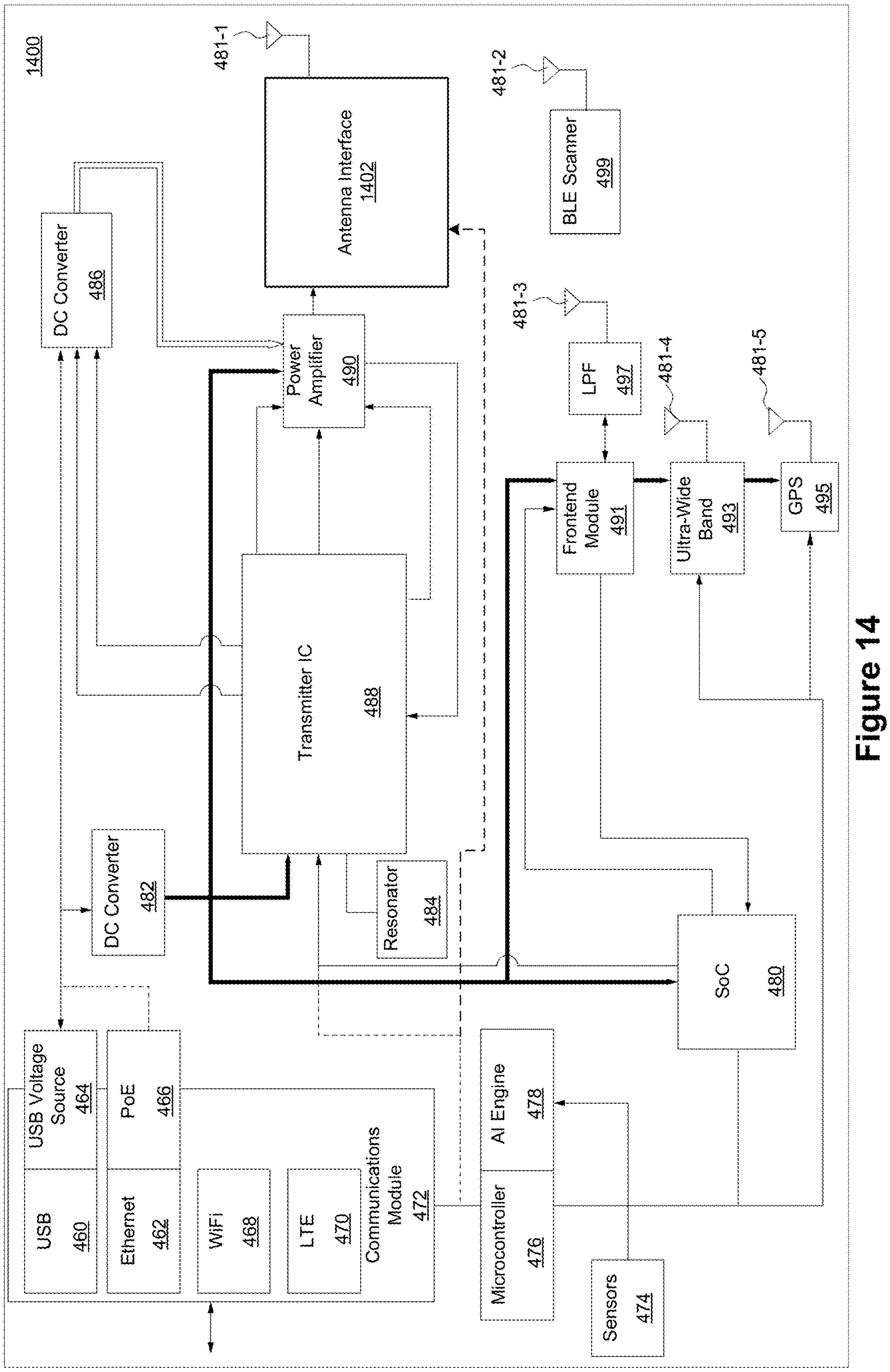
FIG. 14 illustrates an example circuit for wireless-power transmission in accordance with some embodiments.

FIG. 14 illustrates an integrated transmitter platform 1400 for wireless-power transmission in accordance with some embodiments. The integrated transmitter platform 1400 is similar to the integrated transmitter platform 458 illustrated in FIG. 4B, except the frontend module 494 and various radio components are replaced with an antenna interface 1402. In some embodiments, the antenna interface 1402 includes one or more antenna modules and one or more receiver modules, including one or more of: an RFID module, an RFID tag receiver, a software-defined receiver, a protocol-specific receiver, a WiFi module, and a WPT module. In some embodiments, the integrated transmitter platform 1400 includes separate antennas for WPT and RFID/WiFi communications.

An integrated transmitter platform with synchronization capability may operate in several different modes defined by hardware capability and/or software programmability. The modes may include an RFID reader mode, an RFID repeater mode, a WPT mode, a listen-before-talk mode, and a data classification and aggregation mode. In some embodiments, in the RFID reader mode, the transmitter includes an RFID reader unit. In some embodiments, in the RFID repeater mode the transmitter is nominally off until an RFID signal is detected, an RFID reader envelope is followed by the repeater, and functionality may be enabled or disabled via firmware. In some embodiments, in an RFID repeater and WPT mode, the transmitter is nominally running WPT functionality and, if an RFID reader pattern is received, the transmitter automatically transitions into RFID repeating mode. In some embodiments, the RFID repeating mode continues until no RFID read pattern is detected for some amount of time (e.g., a programmable timeout). In some embodiments, the RFID frequency is programmable. For example, an existing WPT frequency plan may be followed in some cases, and in other cases (e.g., using a software-defined radio (SDR) receiver), the RFID frequency may be detected and the repeater frequency plan adjusted for best performance. In some embodiments, in an RFID repeater, WPT, and listen-before-talk mode, the repeater works as above with WPT in RFID-compatible always-on mode (non-reader). If an in-band signal is detected above a programmable detection threshold, WPT is temporarily disabled (e.g., using programmable thresholds). In some embodiments, in an RFID repeater, WPT, listen-before-talk (LBT), and data classification/aggregation mode, the repeater works as above with WPT in RFID-compatible always-on mode (non-reader). If an in-band signal is detected above a programmable detection threshold, a radio communication receiver samples and classifies the signal (e.g., as RFID read, backscatter, LoRA, or 802.11h). The signal may constitute a packet or frame of data. If the WPN TX is also a gateway, the data packet/frame may be forwarded to the cloud based on some criteria. In some embodiments, the functionality described above is implemented in hardware. In some embodiments, the functionality described above is software programmable.

Figure 15A:
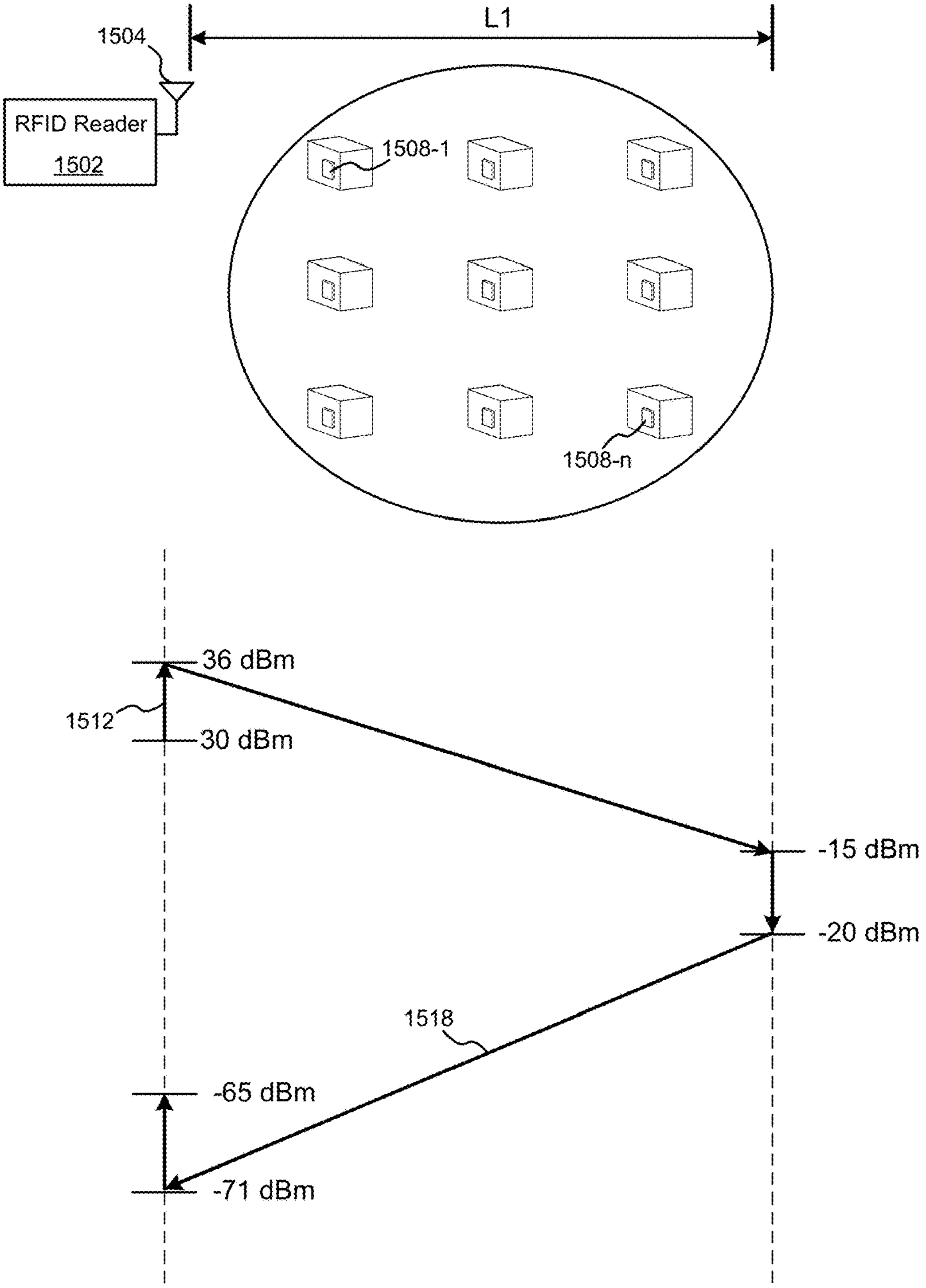
FIGS. 15A-15F illustrate example operation of wireless repeaters in accordance with some embodiments.

FIGS. 15A-15F illustrate an example operation of wireless repeaters in accordance with some embodiments. FIG. 15A shows an RFID reader device 1502 with an antenna 1504 and an associated range of L1 (e.g., 9 meters). FIG. 15A further shows multiple RF devices 1508 (e.g., 1508-1 through **1508-*n*) within the range L1 (e.g., a link budget) of the RFID reader device 1502. In some embodiments, the RF devices 1508 include one or more RFID tags. FIG. 15A also shows example transmission strengths for the RFID reader 1502. For example, the RFID reader 1502 transmits a signal 1512 with a transmit power of 30 dBm. In accordance with some embodiments, the antenna 1504** has a gain of 6 dBm resulting in an effective isotropic radiated power (EIRP) of 36 dBm. The signal strength decreases across the range L1 to a value of −15 dBm (e.g., has a path loss of 51 dB). In accordance with some embodiments, an RF device antenna has a gain of 0 db and a conversion efficiency of −5 dB, resulting in a signal of −20 dBm.

The return signal 1518 also decreases across the range L1 to a value of −71 dBm. The received signal is boosted at the antenna 1504 to a value of −65 dBm. In some embodiments, the receive signal is boosted at the antenna 1504 to a value of between −100 to −40 dBm. In the example of FIG. 15A the RF devices 1508 have a sensitivity of −20 dBm. In some embodiments, the RF devices have a sensitivity of between −10 dBm and −100 dBm. Table 1 below shows example power for the system shown in FIG. 15A.

| UHF RFID reader to tag | | | |
|---|---|---|---|
| Reader | Reader TXP | 30 | dBm |
| | Antenna Gain | 6 | dBi |
| | EIRP | 36 | dBm |
| | Freq | 0.915 | GHz |
| Path Loss | Distance | 9 | m |
| | PathLoss | 50.76 | dB |
| Tag | Coupling Efficiency | −5 | dB |
| | RXNet | −19.76 | dBm |
| | Tag IC sensitivity | −20 | dBm |
| | Net Margin | 0.24 | dB |
| UHF RFID tag to reader | | | |
| Tag | Reflected Power | −19.76 | dBm |
| | Gain | 0 | dBi |
| | EIRP | −19.755 | dBm |
| | Freq | 0.915 | GHz |
| Path Loss | Distance | 9 | m |
| | PathLoss | 50.76 | dB |
| Reader | Reader Sensitivity 1 | −64.5 | dBm |
| | Reader Sensitivity 2 | −75 | dB |
| | Net Margin | 10.49 | dB |

Figure 15B:
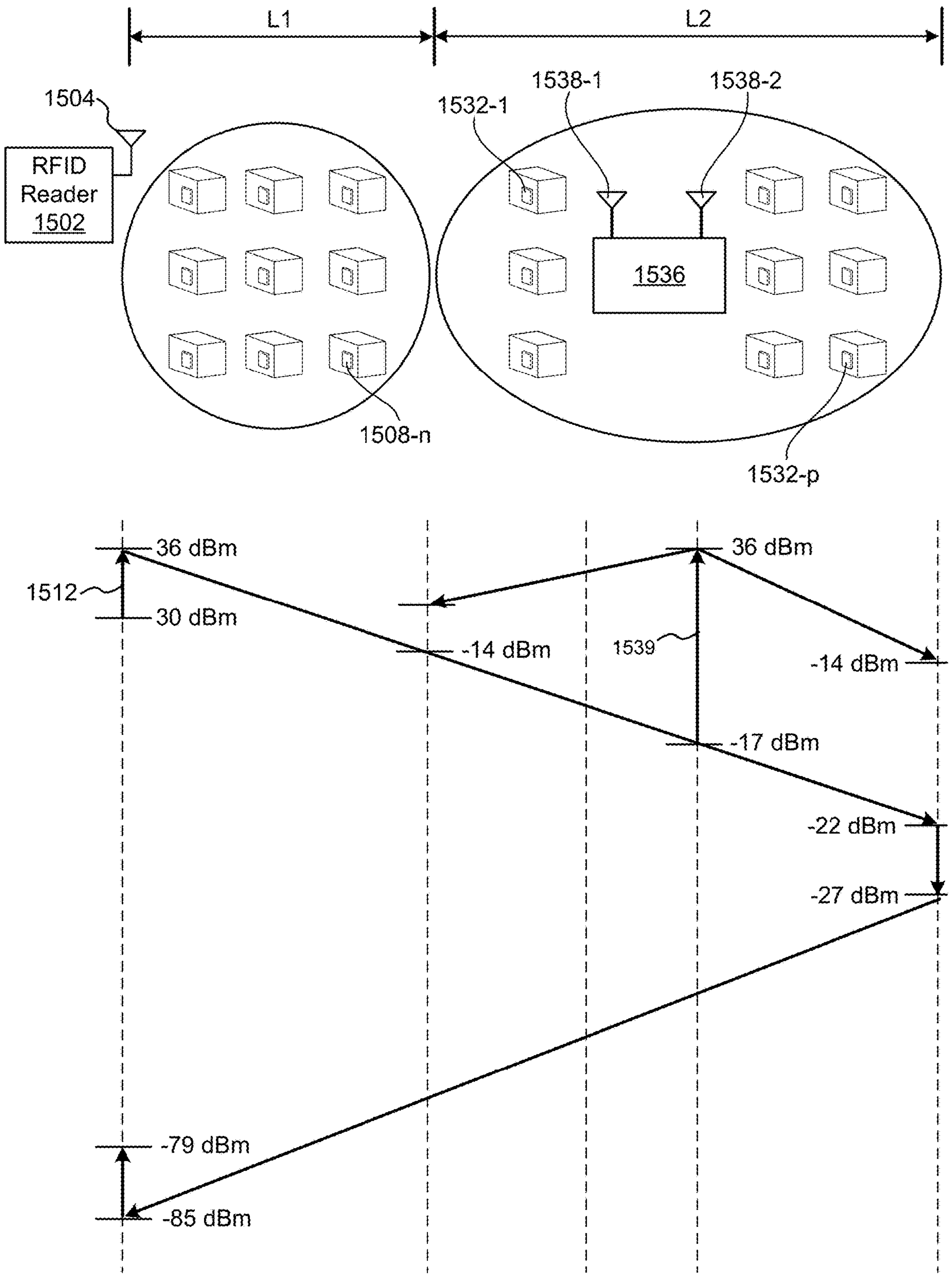

FIG. 15B shows the RFID reader device 1502 and an RF repeater device 1536 (e.g., working together to boost the RFID reading range). The RF repeater device 1536 includes a receive antenna 1538-1 and a transmit antenna 1538-2. In some embodiments, the RF repeater device 1536 includes a single antenna for receive and transmit. The RF repeater device 1536 has an associated range of L2 (e.g., 12 meters, 20 meters, 50 meters). FIG. 15B further shows the RF devices 1508 with the range L1 and RF devices 1532 within the range L2. As shown in FIG. 15B, the signal 1512 from the RFID reader 1502 has a strength of −79 dBm if it travels the range of L1 and L2 without any assistance from the RF repeater device 1536. However, the RF repeater device 1536 repeats the signal 1512 with a signal 1539 that has an EIRP of 36 dBm (e.g., −17 dBm plus an amplifier gain, a receive antenna gain, and a transmit antenna gain). As shown in FIG. 15B, the RF repeater device 1536 extends the range of the RFID reader 1502 by increasing the signal strength from −17 dBm to an EIRP of 36 dBm.

For example, with a WPT repeater, there are at least two factors that affect the system link budget, such as the RFID reader's sensitivity and the RFID tag's sensitivity. In some embodiments, other factors are considered, such as any obstructions between communicating devices. In this configuration, the system coverage is determined by the RFID reader's sensitivity. A carrier cancellation amplifier can be placed in the middle of the tag group to increase the coverage and it has the capability to help the RFID reader to reach the potential coverage. For example, the WPT repeater is installed at a place 12 meters from the RFID reader where it picks up the RFID reader's signal and amplifies it and broadcast at an EIRP of 36 dBm. In this example, the WPT repeater powers up all the tags around it in an 8-meter radius.

Figure 15C:
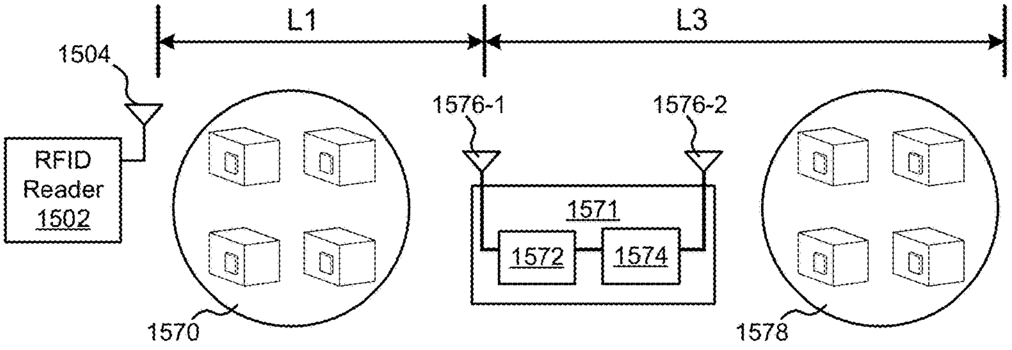

FIG. 15C illustrates the RFID reader device 1502 and a repeater device 1571. The repeater device 1571 includes a receive antenna 1576-1 and a transmit antenna 1576-2 and has an associated range L3 that covers a group of RF devices 1578. The repeater device 1571 includes a receiver module 1572 and an amplifier module 1574. In the example of FIG. 15C the operation of the repeater device 1571 increases the effective range of the RFID reader device 1502 by the amount of L3 (e.g., 8 meters, 10 meters, or 12 meters).

Figure 15D:
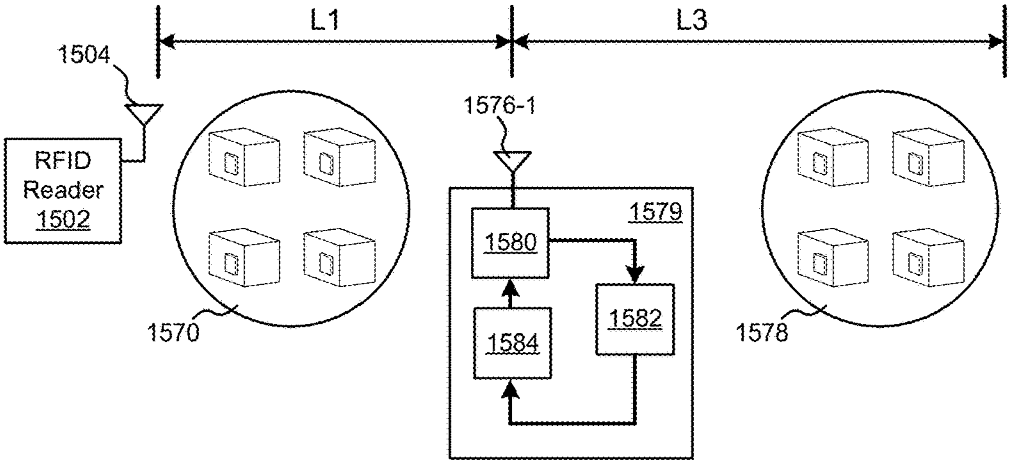
Figure 15E:
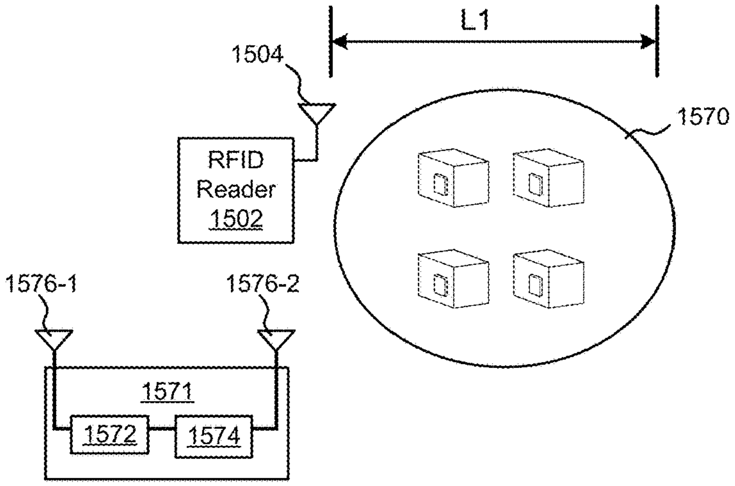

FIG. 15D illustrates the RFID reader device 1502 and a repeater device 1579. The repeater device 1579 includes the antenna 1576-1 (e.g., a shared antenna for receiving and transmitting signals). The repeater device 1579 also includes a circulator 1580, a receiver module 1582, and an amplifier module 1584. The repeater device 1579 in FIG. 15D has the associated range L3 that covers the RF devices 1578. FIG. 15E illustrates the RFID reader device 1502 with the RF repeater device 1571 arranged to boost performance (e.g., receiving and repeating the signal with amplification) within the associated range L1 (rather than extend the range). In some embodiments, the repeater devices 1536, 1571, and 1579 are WPT devices configured to repeat RFID signals. For example, the WPT device listens for RFID reader transmissions and modulates its transmissions to follow the reader amplitude shift keying (ASK)/OOK envelope to repeat the reader signal. In this way, passive tags can be visible (e.g., detectable) closer to the reader sensitivity distance. In some embodiments, the repeater devices 1536, 1571, and 1579 are configured to boost read range of the RFID reader device 1502 and/or increase read performance within the RFID reader device range (e.g., range L1).

In some embodiments, the repeater device is configured to operate in a RFID-only mode and/or a hybrid RFID and WPT mode. For example, the WPT device can be disabled completely when RFID is detected. In an example, the location of the reader, un-boosted area, and boosted area are known, and separate antennas can be used to receive the RFID and transmit the repeated signal. The repeater device can be implemented with a shared antenna for TX and receiver (RX), e.g., for lower cost and/or better control of isolation.

Figure 15F:
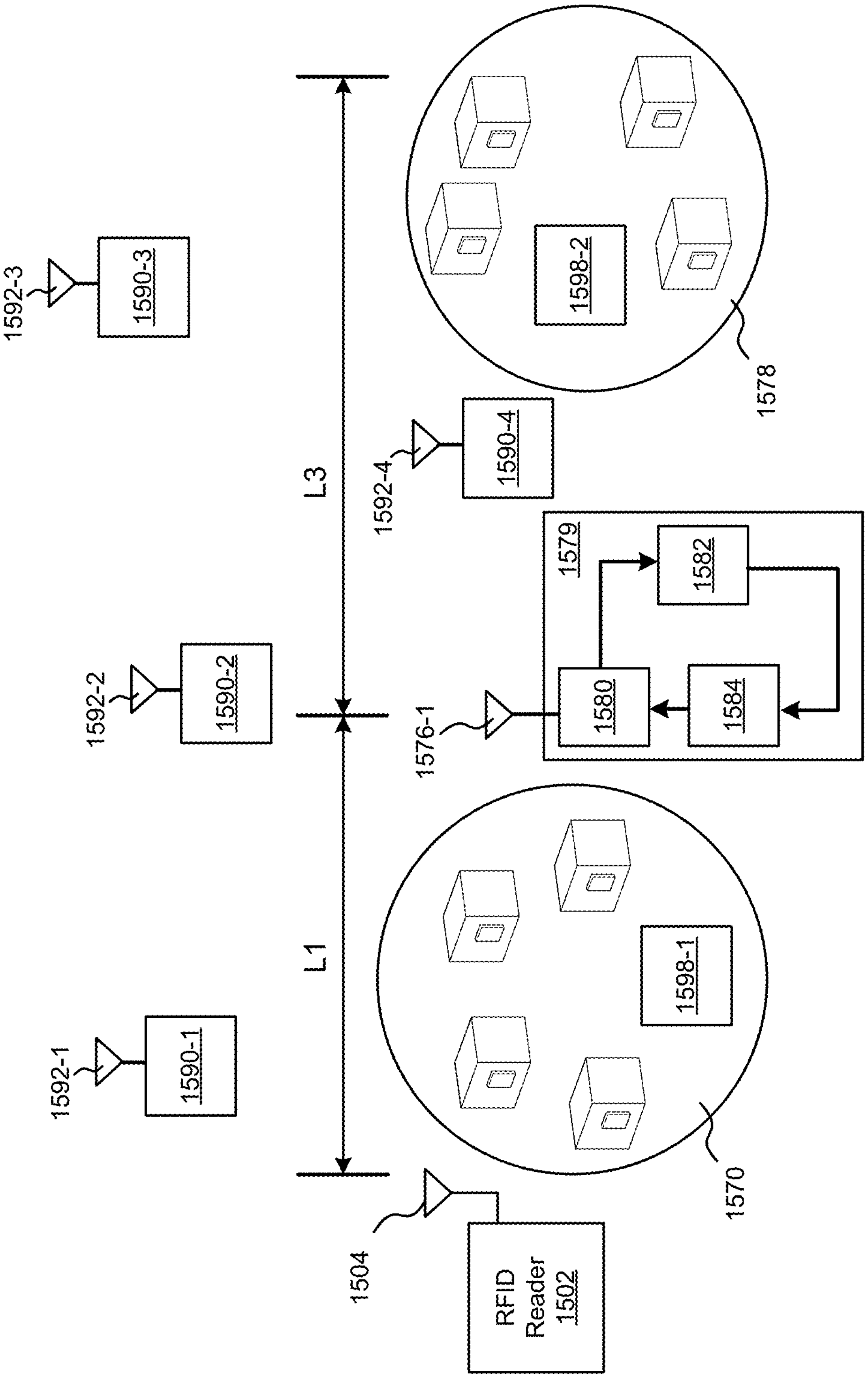

FIG. 15F illustrates the RFID reader device 1502 and the repeater device 1579 arranged in a similar manner as in FIG. 15D. In the example of FIG. 15F, devices 1598 (e.g., Bluetooth communication devices) and devices 1590 (e.g., WiFi communication devices) are positioned in the ranges L1 and L3. In some embodiments, the repeater device 1579 is configured to detect transmissions between the devices 1598 and/or the devices 1590 and modulates its transmissions (e.g., WPT transmissions) to reduce/minimize interference with the transmissions between the devices 1598 and/or the devices 1590.

In some embodiments, the WPT device listens for other transmissions and modulates its TX. In some embodiments, the RFID receiver identifies the RFID signals so the TX can follow the reader envelope. In some embodiments, a programmable SDR receiver examines data properties and determines what action to take, via parametric analysis and preamble/data demodulation. In some embodiments, the WPT device is used to energize BLE tags and sensors in the presence of RFID, and is collocated with LoRa, 802.11 ah, and/or other networks. In some embodiments, there is a protocol-specific and/or software-programmable receiver in the WPT device, such that the receiver can be programmed to detect and classify nearby signals as likely to be impacted or not. For example, the WPT transmitter can use an RFID hybrid mode or other coexistence mode depending on the signals present in the area. In some embodiments, a SDR solution is used with a hardware receiver and modulator to minimize repeater latency.

Figure 16A:
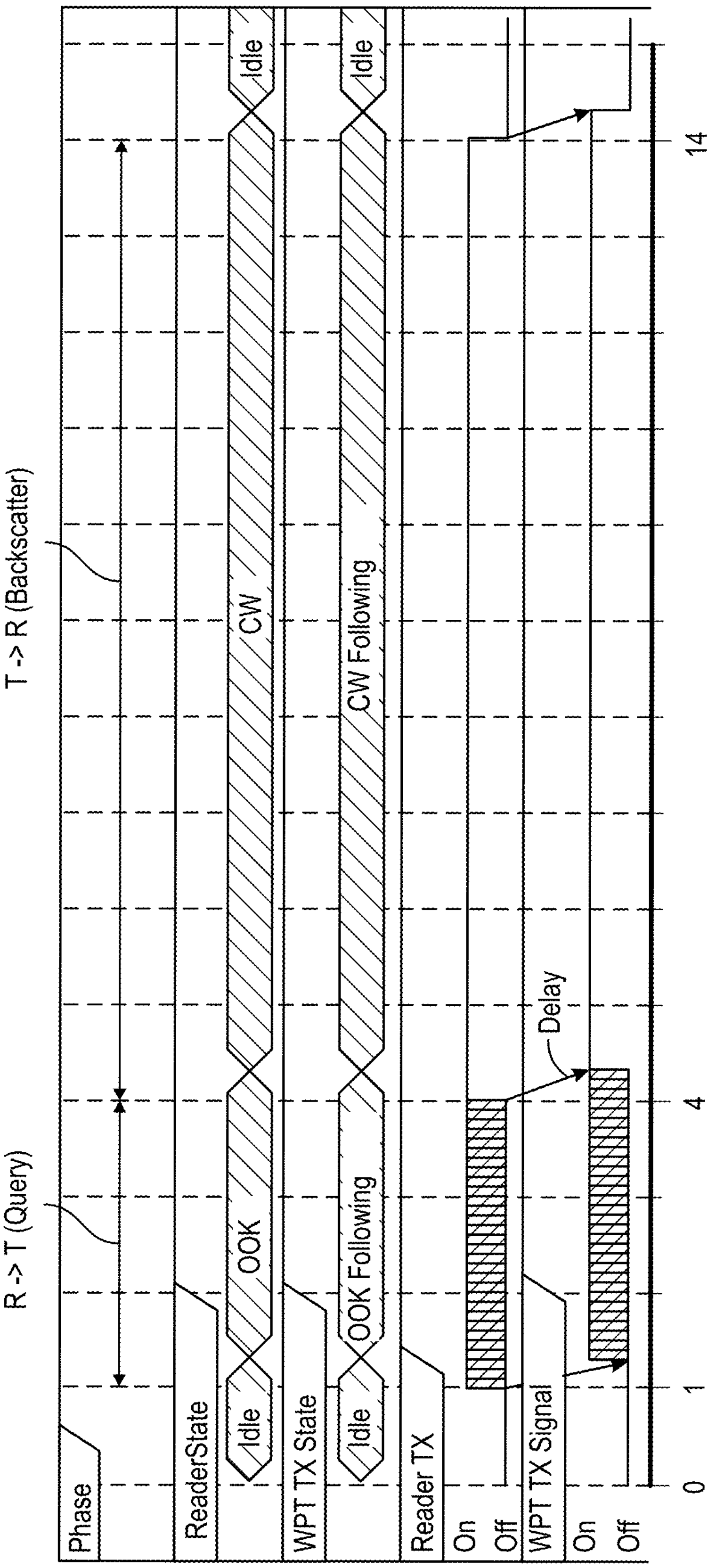
FIGS. 16A-16E illustrate example timing waveforms for a wireless-power transmission system in accordance with some embodiments.

FIGS. 16A-16E illustrate example timing waveforms for a wireless-power transmission system in accordance with some embodiments. FIG. 16A shows a timing diagram for RFID repeating functions. In the example of FIG. 16A, the WPT TX signal is used to repeat the reader TX signal. For example, when the reader TX signal is detected at the WPT TX, the WPT TX is enabled to follow the envelope of the received signal. The WPT TX responds (with minimum delay) and returns to idle state when RFID reader cycle is complete. In some embodiments, the receiver is a physical layer solution only, e.g., an envelope follower.

Figure 16B:
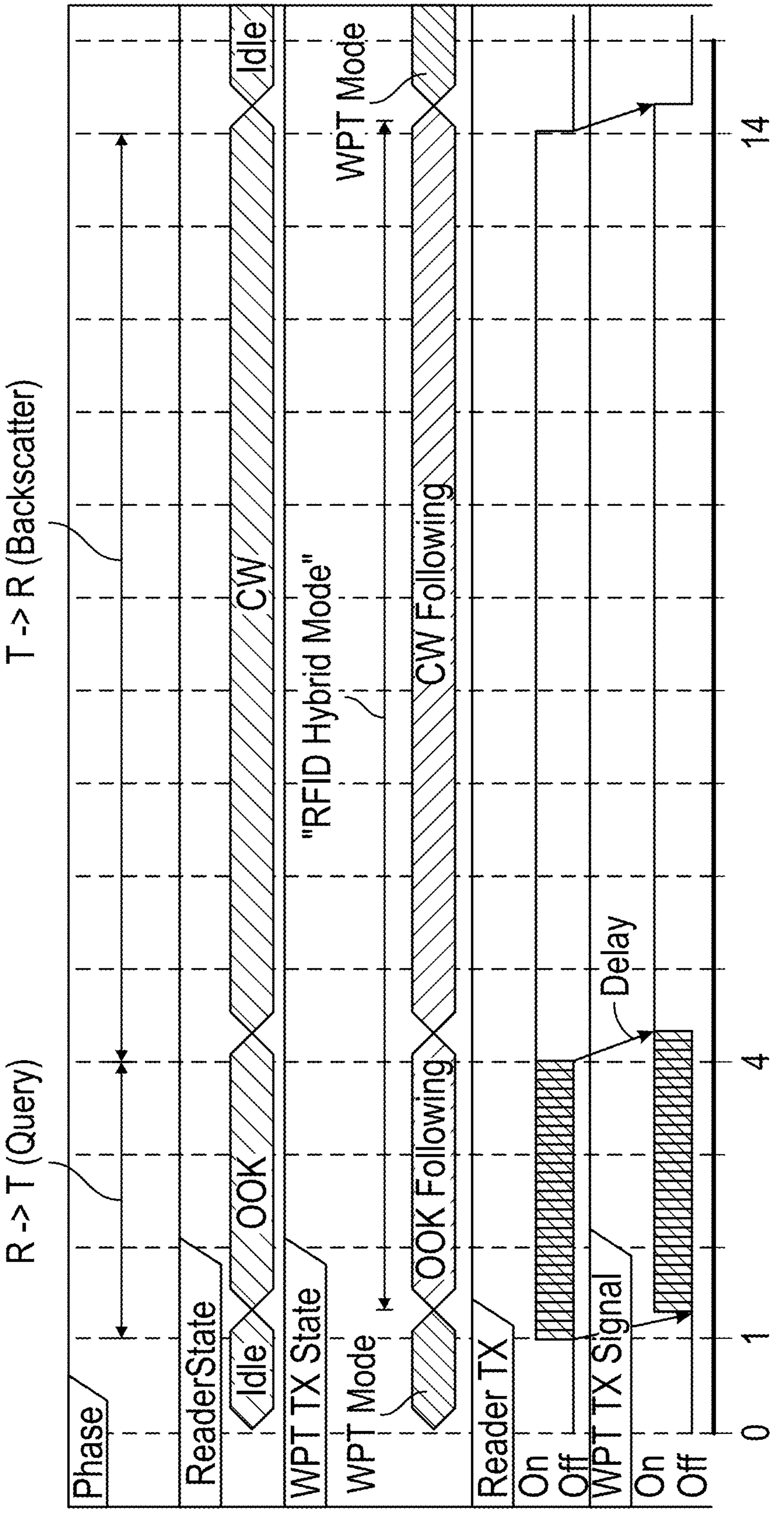

FIG. 16B shows a timing diagram for WPT and RFID repeat functions. In the example of FIG. 16B, the WPT repeater state switches between a WPT mode and an RFID mode in accordance with detecting a reader TX signal. For example, when the reader TX signal is detected at the WPT repeater, the WPT repeater changes into an RFID hybrid mode, and follows the envelope of the received signal while RFID reader is active. In this example, the WPT repeater responds and then returns to previous WPT mode when the RFID reader becomes inactive. In some embodiments, the receiver is a physical layer solution only, e.g., an envelope follower. In some embodiments, switching between the hybrid mode and the WPT mode is achieved in hardware or hardware and software. In some embodiments, this mode switching is used to implement an LBT functionality, where WPT turns off when a signal is detected and/or the WPT goes to a pre-programmed transmit (e.g., power/frequency) setting when a signal is detected.

Figure 16C:
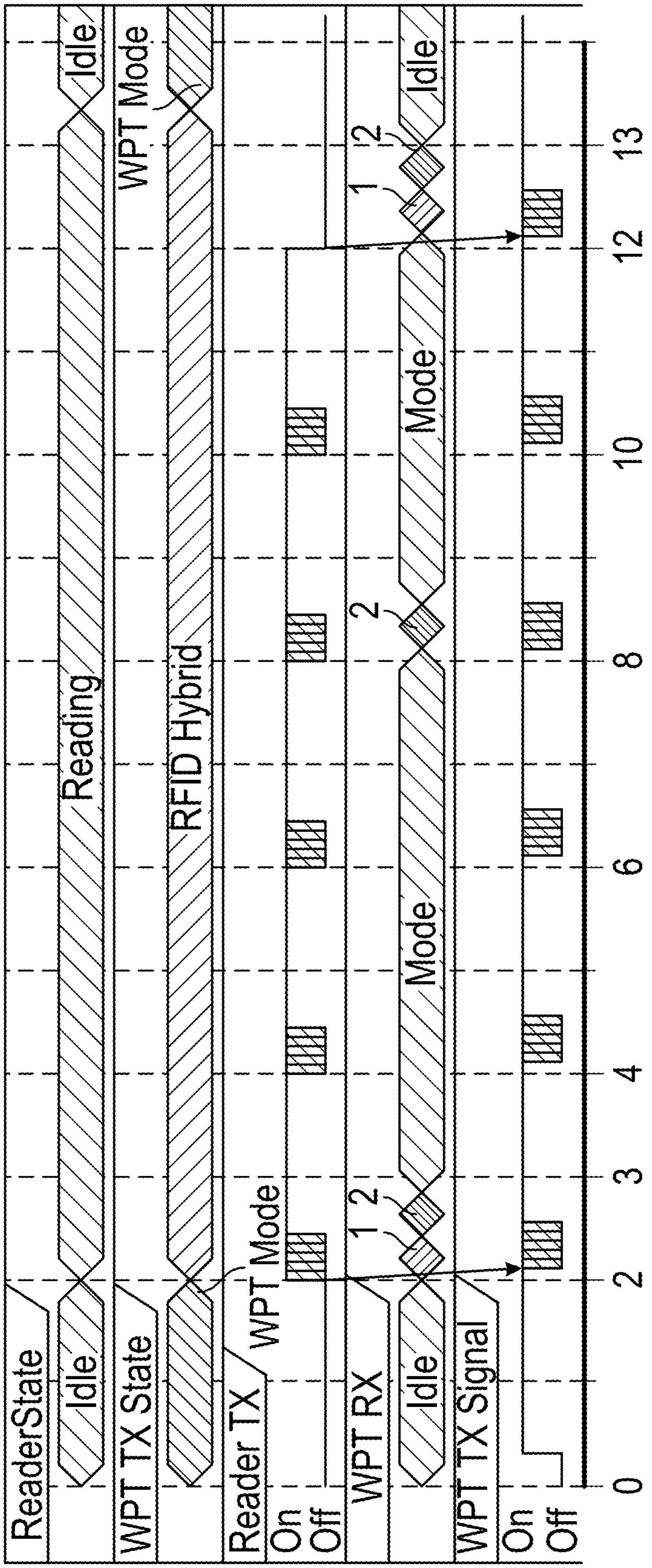

FIG. 16C shows another timing diagram for WP and RFID repeat functions. In the example of FIG. 16C, the WPT repeater state switches between the WPT mode and the RFID mode. For example, when the Reader TX signal is detected at the WPT repeater, the WPT repeater changes into RFID hybrid mode, and follows the envelope of the received signal while RFID reader is active. In this example, the WPT repeater responds and the returns to previous WPT mode when the RFID reader becomes inactive. At (1) the device is in an energy/power detection phase (e.g., envelope detection is occurring). At (2) the device is in an RFID classification phase. For example, the WPT RX demodulates/decodes the RFID reader signal, software reads the data, and classifies the data as RFID or not RFID. The classification may be periodic, and/or there may be a time limit or other programmable limit for a coexistence mode. In various embodiments, the detection and classification are performed at a single chip, multiple chips, or logical blocks. In some embodiments, in accordance with a determination that the signal is RFID, the software configures the hardware into a RFID hybrid mode until one or more conditions are met to go back to normal WPT mode (e.g., based on timeout, number of reads, and/or other parameter received from the network). In some embodiments, in accordance with a determination that the signal is not RFID, the software maintains the system in normal WPT mode.

Figure 16D:
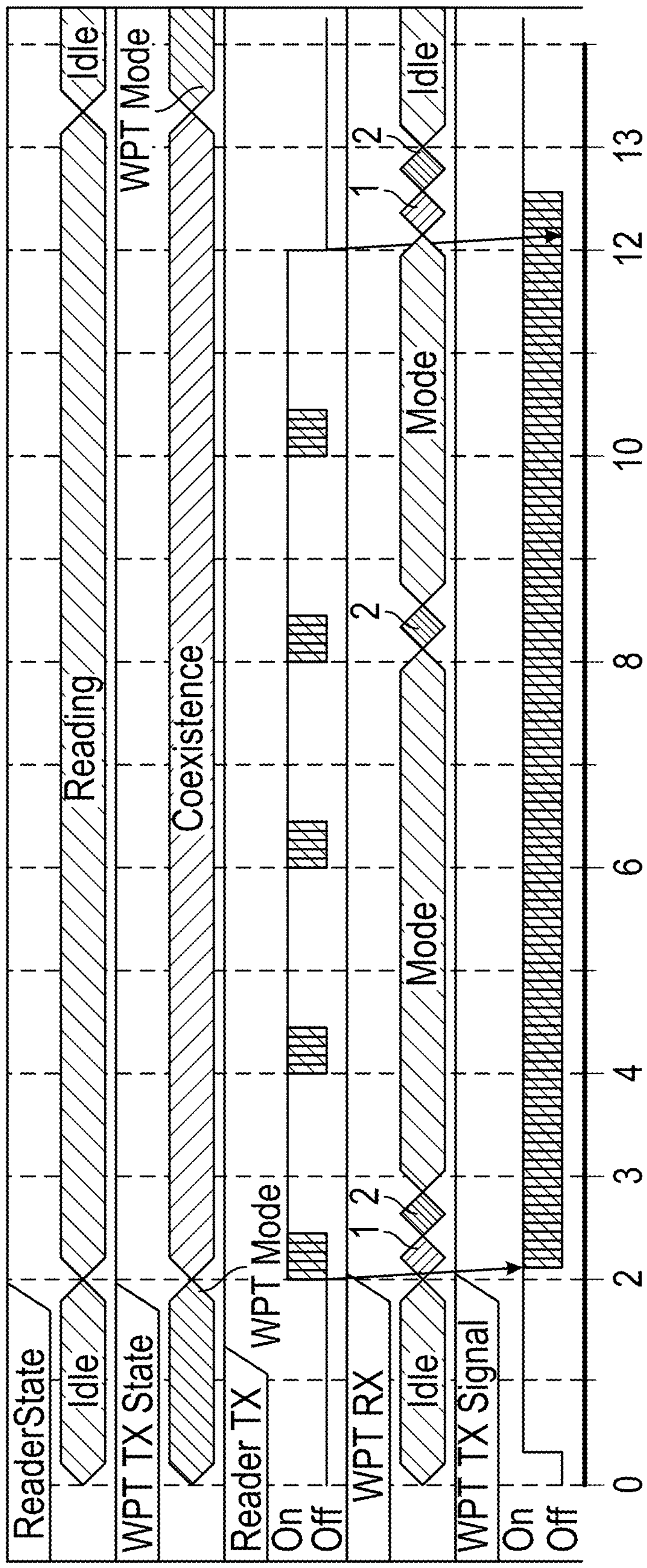

FIG. 16D shows another timing diagram for WP and coexistence functions. In the example of FIG. 16D, the WPT repeater state switches between the WPT mode and a coexistence mode. At (1) the device is in a signal detection phase (e.g., a trigger starts an RX classification process and/or energy detection). At (2) the device is in a coexistence RX classification phase. For example, at (2) the WPT RX demodulates and/or decodes the signal or part of it, such as the preamble, software reads the data, and classifies the data as a known or unknown radio standard. In various embodiments, the classification is periodic, and/or based on a time-limit or some other programmable limit for the coexistence mode. For example, if a detected signal is RFID, the device switches into RFID hybrid mode. In this example, if the detected signal is not RFID, the device checks for other in-band signals. In some embodiments, the classification is based on frequency, spectrum, bandwidth, shape, and/or packet power profile. In this example, depending on the power level and classification of the signal the software configures the TX appropriately. For example, if the signal is WiFi or WiFi-like the device takes action A, if the signal is LoRa or LoRa-like the devices takes action B, and if the signal is GSM or GSM-like the device takes action C. In some embodiments, the data is classified locally or offloaded to a local ML system or to the cloud (e.g., via backhaul radios). In some embodiments, the devices described with reference to FIGS. 16C and 16D implement an LBT feature.

Figure 16E:
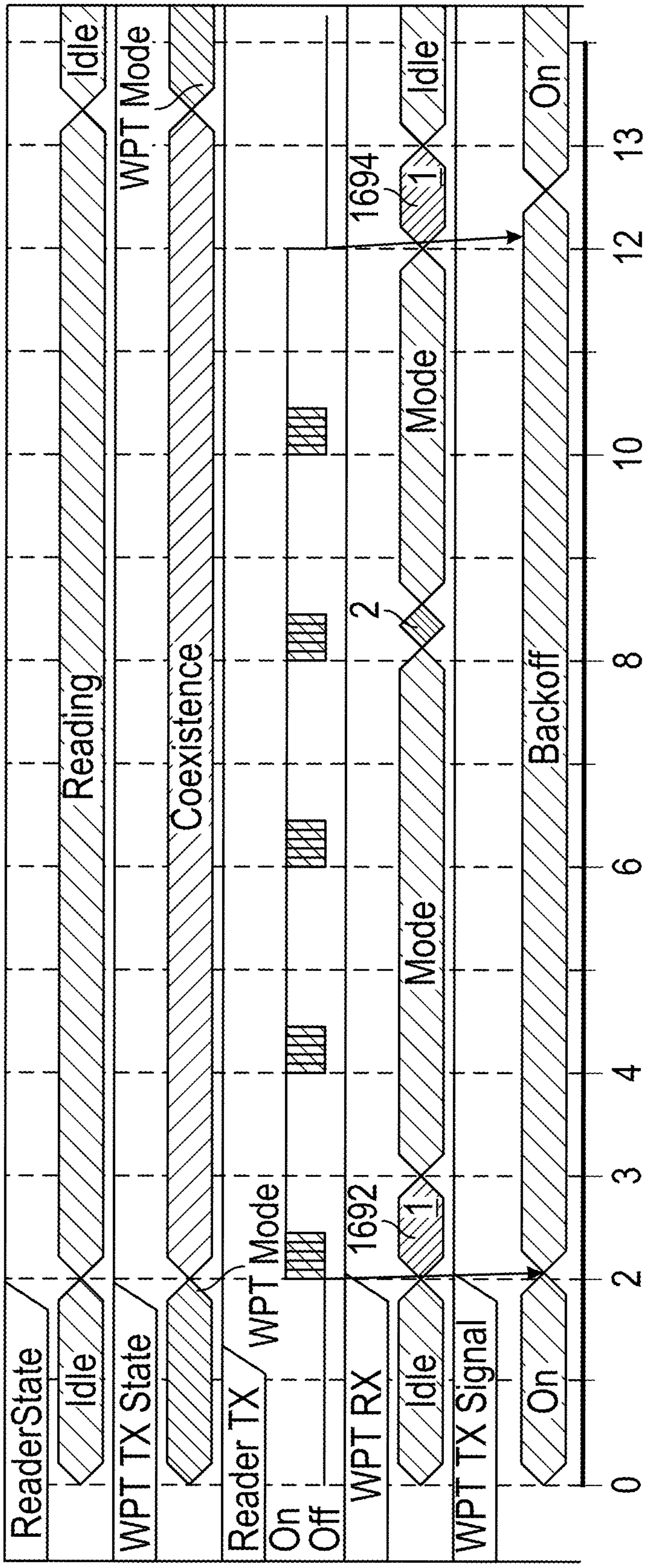

FIG. 16E shows another timing diagram for wireless power and coexistence functions. In the example of FIG. 16E, the reader state switches between idle and reading, and the WPT transmit state switches between the WPT mode and a coexistence mode accordingly. The reader transmitter switches between off (in the idle reader state) to on (in the reading state). During the on state, the reader transmitter may transmit or repeat an incoming RF signal (e.g., operate as an RFID repeater). In some cases, RFID performance is enhanced by adding an uncorrelated in-band signal (e.g., WPT) in a certain amplitude window. In some cases, the uncorrelated signal may be 6-20 dB below the reader signal. In some embodiments, the WPT TX is programmed to operate in a non-envelope-following mode, e.g., that can enhance the performance of certain tags. For example, the non-envelope-following mode is lower power at a high duty cycle and/or a non-correlated PWM signal. In some embodiments, the envelope detection and signal classification are combined into a single function, e.g., with a single indication of (RFID) activity presented to the local processor. At (1) in FIG. 16E, signal detection and/or classification is performed, and RFID is determined to be present at 1692 and not present at 1694. At (2) in FIG. 16E, periodic monitoring of the detection signal is performed. In some embodiments, the detection signal is continuously monitored. In some embodiments, a period of the periodic monitoring is based on one or more properties of the detected signal and/or one or more properties of the WPT transmitter. In accordance with some embodiments, the WPT TX is switched into RFID hybrid mode in response to the RFID being present (e.g., as described previously with respect to FIGS. 16C-16D). In the example of FIG. 16E, the hybrid mode is (i) static or dynamic CW power, or (ii) a PWM at one or several frequencies in sequence. The backoff mode in FIG. 16E indicates a programmable backoff power level. In some embodiments, the system detects an RF signal (e.g., an RFID signal) and then moves to a static CW or hopping (non-envelope-following) transmission pattern. In some embodiments, the static CW or hopping (non-envelope-following) transmission pattern is transmitted at a lower power as compared to when the RF signal is not detected.

Figure 17:
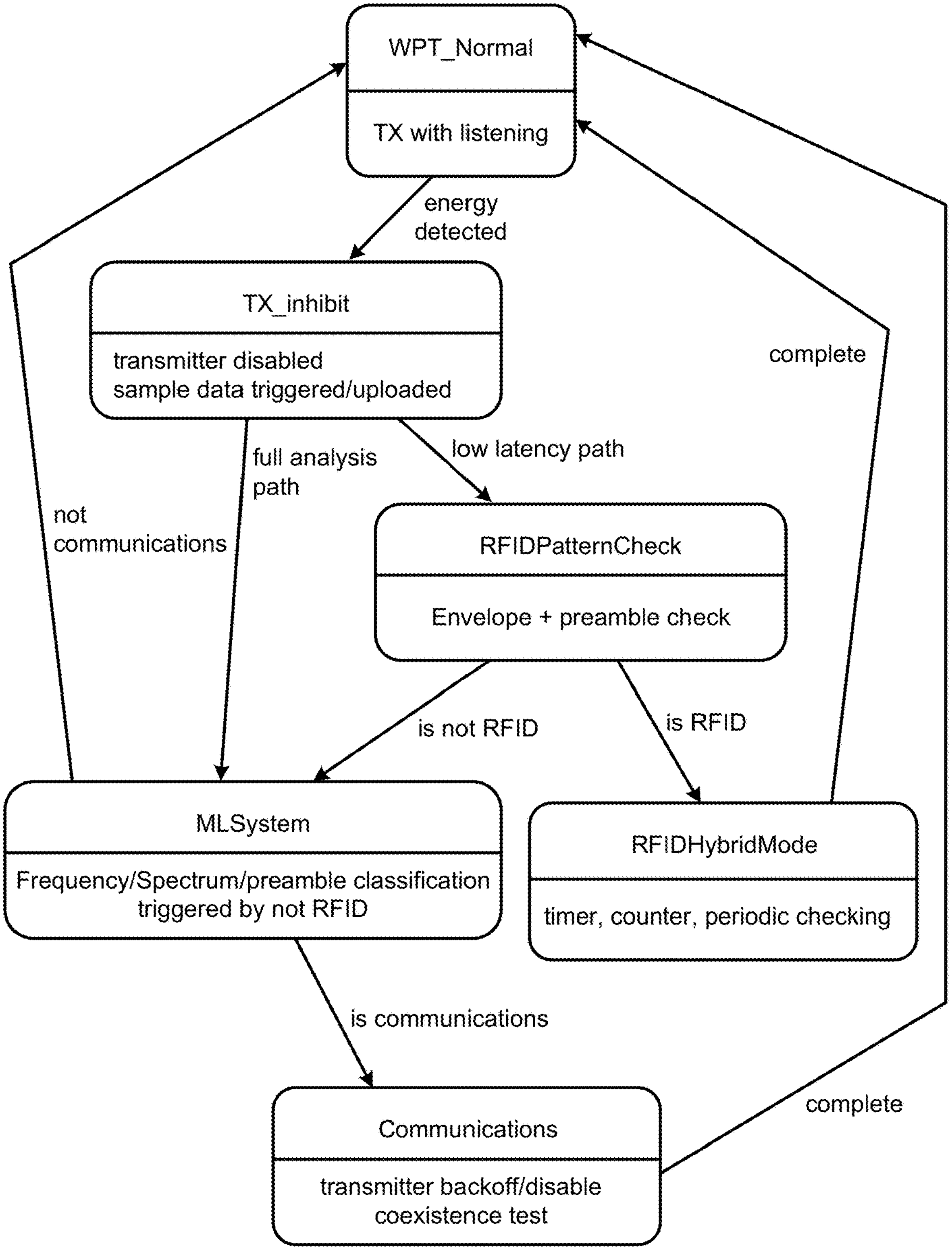
FIG. 17 is a state diagram for wireless-power transmission in accordance with some embodiments.

FIG. 17 is a state diagram for wireless-power transmission in accordance with some embodiments. In FIG. 17, the device is initially in a WPT_normal state that includes transmitting with listening. In response to detecting energy meeting one or more criteria, the device transitions to a TX_inhibit state where the transmitter is disabled (e.g., transmission ceases) and detected energy is sampled and/or uploaded for analysis. In this way, when energy is detected at the receiver, the transmitter is temporarily backed off or disabled to begin classification. In a low-latency path, the device transitions to an RFIDPatternCheck state and an envelope and/or preamble for the sample data is checked. In some embodiments, sample data is read from the receiver. If the sampled data is RFID, the device transitions to an RFIDHybridMode that includes a timer, counter, and/or periodic checking. If the sample data is not RFID (or the device uses a full analysis path), the device transitions to an MLSystem state. For example, if an RFID pattern checker determines the signal is not RFID, the ML system is triggered to start additional classification. In the MLSystem state, the frequency, spectrum, and/or preamble of the sample data is analyzed to classify the sample data. If the sample data is determined to be a wireless communication, the device transitions to a Communications state that includes backing off and/or disabling the transmitter and/or performing a coexistence test. In accordance with a determination that the communication is complete, the device transitions back to the WPT_normal state. In this way, if the classification system determines that radio communications are present, the transmitter will stay in backoff/disable mode or go into coexistence mode until radio communications are not present.

In some embodiments, the state diagram includes only a subset of the states shown in FIG. 17. For example, in some embodiments, the MLSystem state and/or Communications state are not included. In some embodiments, the state diagram for WPT TX includes RFID detection and a programmable algorithm for RFID coexistence and/or enhancement. In some embodiments, the WPT is in a normal WPT mode, e.g., while listening for signals. In some cases, the envelope detection and signal classification may be combined into a single function, e.g., with a single indication to the local processor. In some embodiments, when RFID is triggered, a hybrid mode algorithm starts. In some embodiments, the algorithm analyzes the signal amplitude and, optionally, the frequency or other properties of the nearby reader. In some embodiments, the algorithm adjusts the WPT output to a RFID-enhancing state. In some embodiments, the RFID-enhancing state includes an envelope follower mode (e.g., as described previously). In some embodiments, the RFID-enhancing state includes static or varying power level (e.g., set for edge tag enhancement). In some embodiments, a power-setting algorithm is a fixed value from memory and/or a lookup table (LUT). In some embodiments, while RFID is present, the transmitter stays in the programmed RFID hybrid/enhancement mode. In some embodiments, the RFIDHybridMode includes fixed or programmable backoff (e.g., with lower power and/or adjusted duty cycle).

Figure 18A:
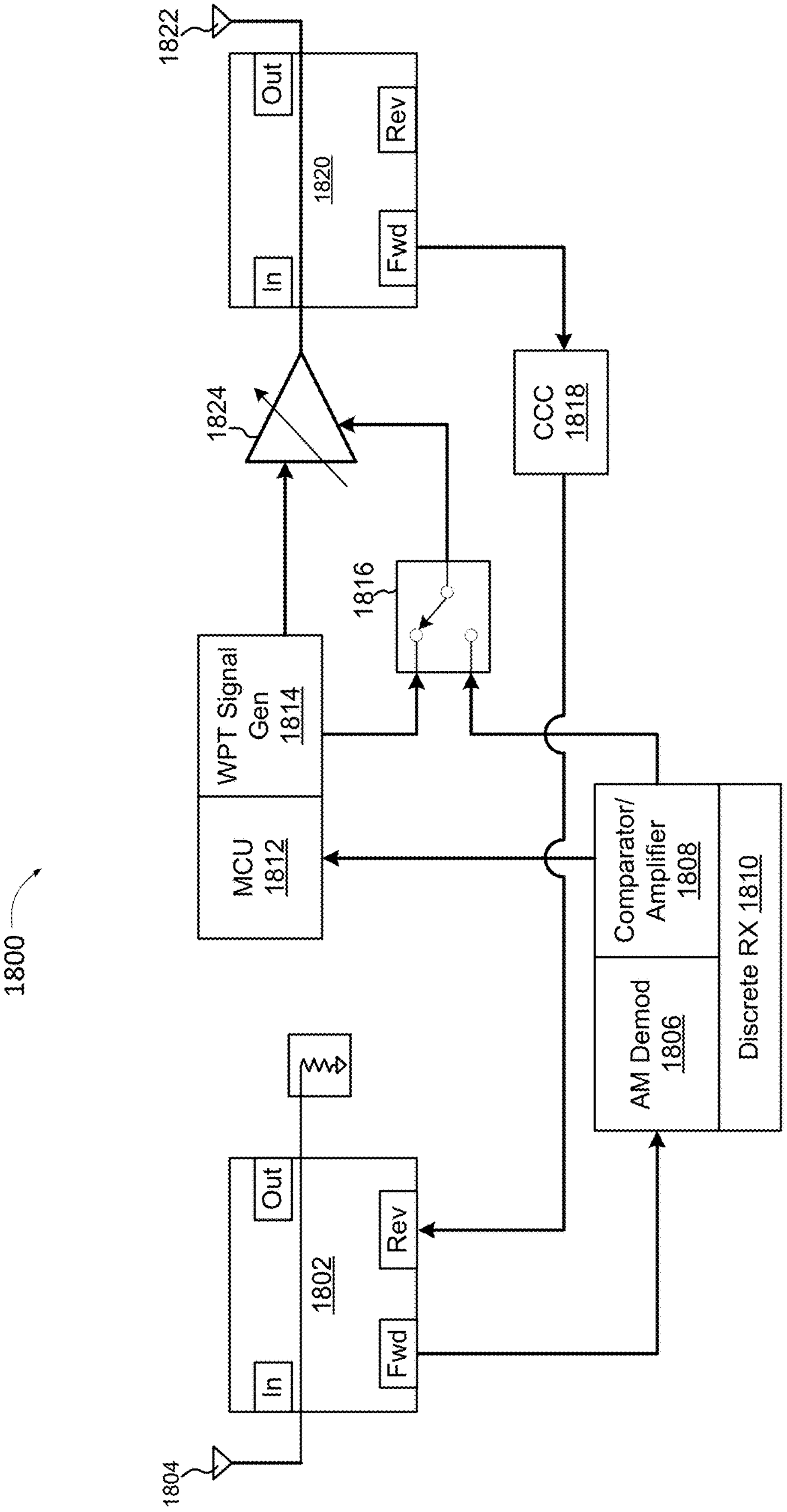
FIGS. 18A-18F illustrate example circuits for wireless-power transmission in accordance with some embodiments.

FIGS. 18A-18F illustrate example circuits for wireless-power transmission in accordance with some embodiments. FIG. 18A shows a circuit 1800 for a repeater device that includes a receiver antenna 1804 and receiver coupler 1802. The repeater device in FIG. 18A also includes a transmit antenna 1822 and a transmit coupler 1820. The receiver coupler 1802 is coupled to a discrete RX module 1810 that includes an AM demodulator 1806 and a comparator and/or amplifier 1808. The discrete RX module 1810 is coupled to a microcontroller (MCU) 1812 (e.g., sends a trigger to the MCU). The MCU 1812 is coupled to, or includes, a WPT signal generator 1814 that is coupled to an amplifier component 1824 (e.g., sends an RF out signal to the amplifier component) and a switching component 1816 (e.g., controlling amplification of the amplifier component 1824). The MCU 1812 and the transmit coupler 1820 are coupled to a carrier cancellation circuit (CCC) 1818. In some embodiments, the AM demodulator 1806 and the amplifier component 1824 are configured to detect an incoming power envelope and modulate the TX signal to follow. In some embodiments, the TX envelope is generated by the MCU 1812 based on the received signal from the receiver. In some embodiments, device is configured to provide the TX envelope directly from the receiver output.

Figure 18B:
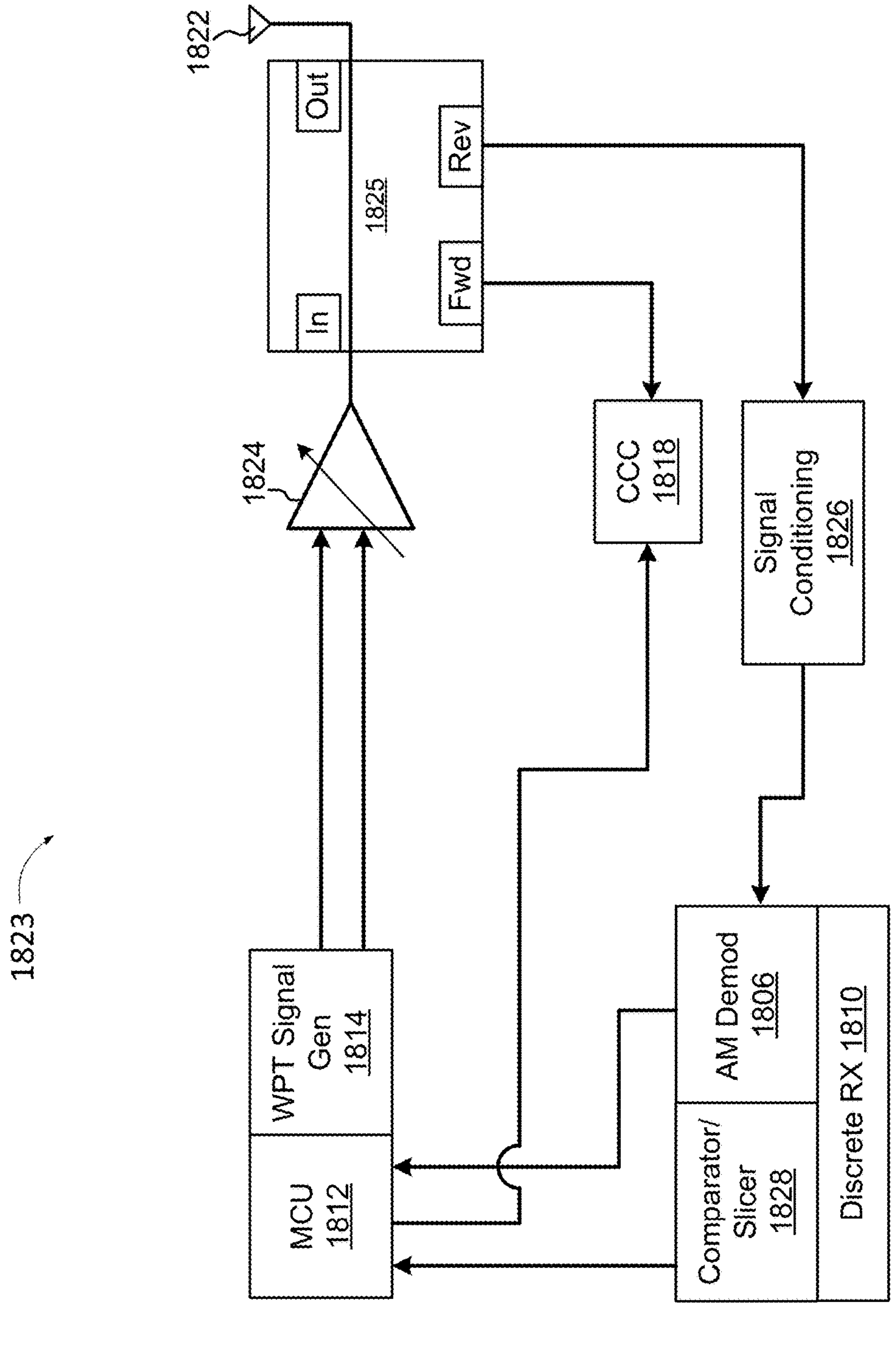

FIG. 18B illustrates a circuit 1823 that is similar to the circuit 1800, except that a signal antenna 1822 is used as both a transmitter and receiver. In the example of FIG. 18B, the discrete RX module 1810 includes the AM demodulator 1806 and a comparator and/or slicer module 1828. The AM demodulator 1806 in FIG. 18B is coupled to a transceiver coupler 1825 for the antenna 1822 via a signal conditioning component 1826. In some embodiments, the circuits 1800 and 1823 include one or more isolation components (e.g., the CCC 1818) configured to isolate the received and transmitted signals from one another (e.g., isolate the receiver from the transmitter).

Figure 18C:
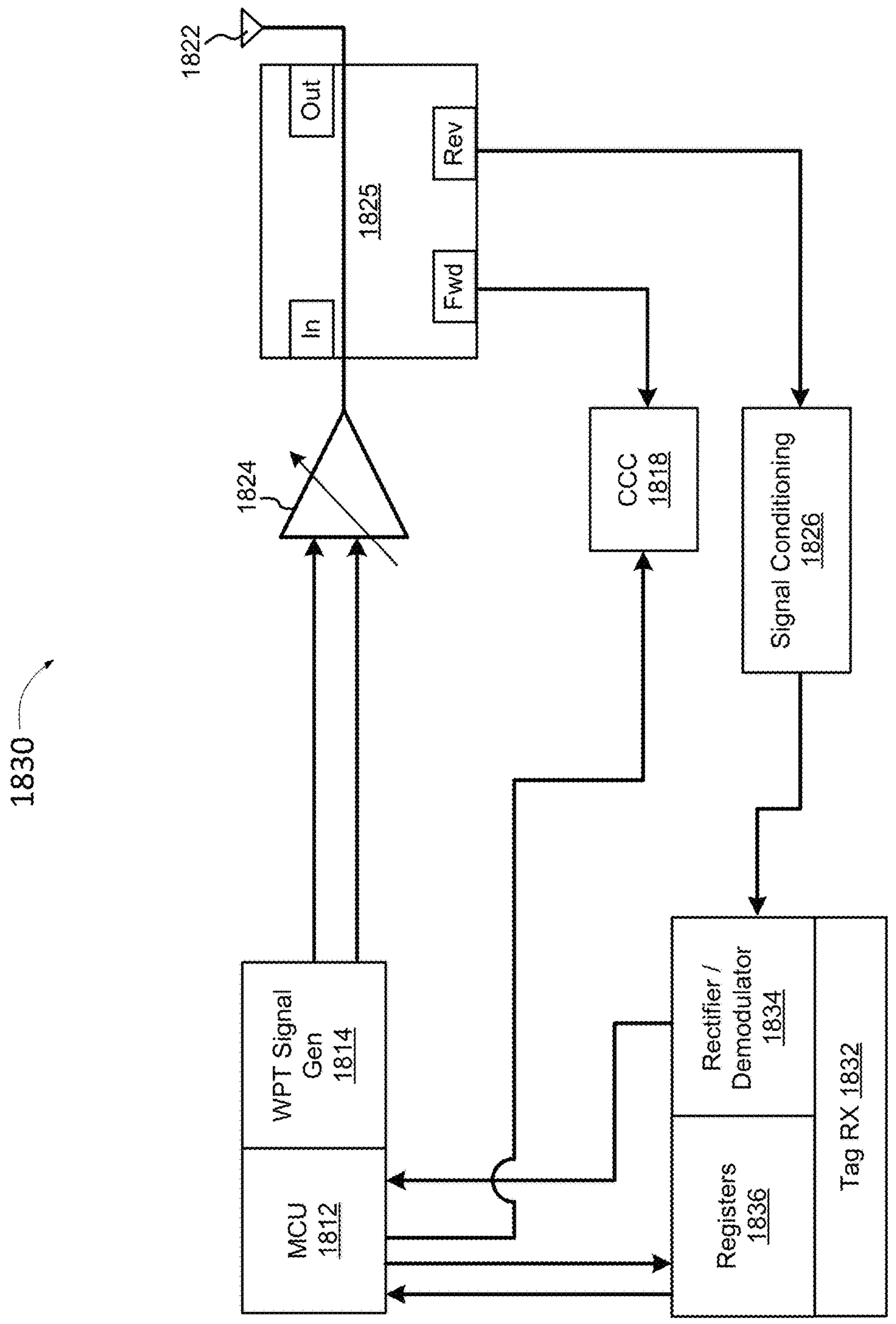

FIG. 18C illustrates a circuit 1830 that is similar to the circuit 1823, except that the discrete RX module 1810 is replaced with a tag RX module 1832. The tag RX module 1832 includes a rectifier and/or demodulator 1834 and registers 1836. In some embodiments, the tag RX module 1832 is a RFID tag integrated circuit (IC) used as the receiver, which contains power rectification, envelope detection, and/or RFID signal decoding/demodulation. For example, the decoded data can be used by the transmitter system to monitor RFID status before switching into RFID hybrid mode. As an example, the TX envelope in RFID hybrid mode is provided by the tag IC envelope after confirmation by the MCU that the signal is actually RFID. To maximize performance and reduce self-jamming, the carrier cancellation circuit may be adaptive, using feedback from the receive coupler port via the tag IC. In some embodiments, calibration of the carrier-cancellation circuit improves/optimizes system performance. As a manufacturing calibration example: the device may disable TX and apply test signal to the antenna port at minimum level to verify trigger condition sensitivity, enable TX at max power, and if trigger condition is affected, sweep the CCC filter and attenuation settings until trigger condition is visible. In some embodiments, the calibration is triggerable at runtime for fine-tuning due to temperature/component drift or other detected change in conditions (e.g., antenna load change or obstruction, other sensor inputs).

Figure 18D:
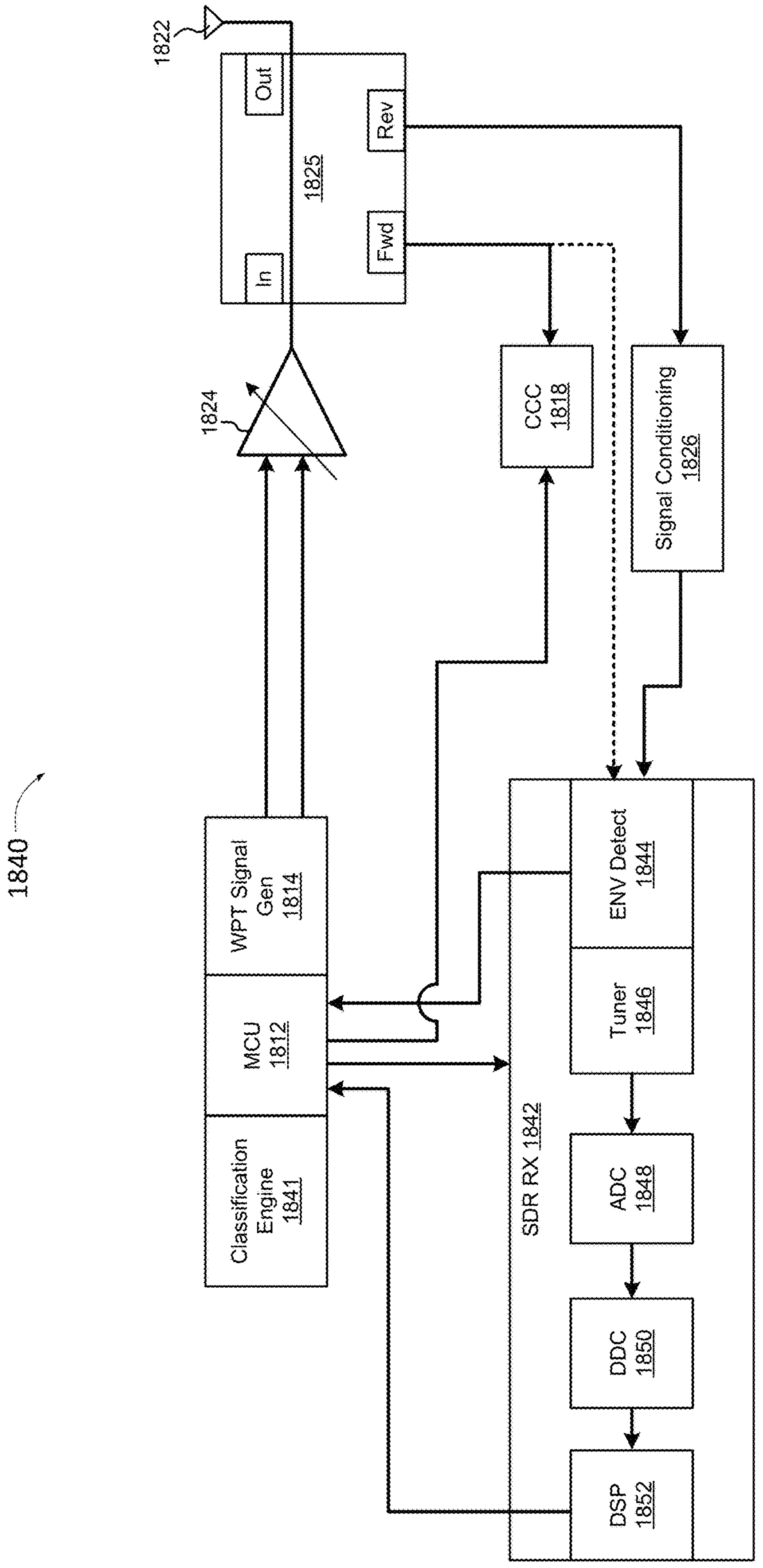

FIG. 18D illustrates a circuit 1840 that is similar to the circuit 1823, except that the discrete RX module 1810 is replaced with a software-defined radio (SDR) RX module 1842. In addition, the MCU module 1812 includes, or is coupled to, a classification engine 1841 in FIG. 18D. The SDR RX module 1842 includes an environmental detection module 1844, a tuner 1846, an analog-to-digital converter (ADC) 1848, a digital down converter (DDC) 1850, and a digital signal processor (DSP) 1852. In an example the received signal is sampled via a directional coupler. Signal conditioning (e.g., gain, attenuation, and/or filtering) is used to optimize the received signal for the receiver. In this example, the carrier-cancellation circuit 1818 is controlled by the MCU 1812. The MCU 1812 improves/optimizes the filter setting to reduce/minimize the carrier signal present in the received signal. The carrier cancellation function may be implemented in the DSP or may be implemented in hardware. The tuner 1846 may be configured to convert the incoming signal to an intermediate frequency (IF). The ADC 1848, DDC 1850, and/or DSP 1852 may represent a decoder that decodes the data. For example, the decoder allows the transmitter system to monitor the received signal and switch into a preset or adaptive hybrid mode. In some embodiments, additional specialized hardware and/or software in the system is included to aid in classification with preprogrammed or learned pattern detection for different communication standards. In some embodiments, there are one or more low-latency envelope detectors configured to trigger the classification and TX mode control state machine. The circuit 1840 may be configured to include different programmable behaviors if RFID is detected versus WiFi, GSM, or Lora. For example, depending on input power received, the transmitter may back off power, or completely turn off until the channel is clear.

Figure 18E:
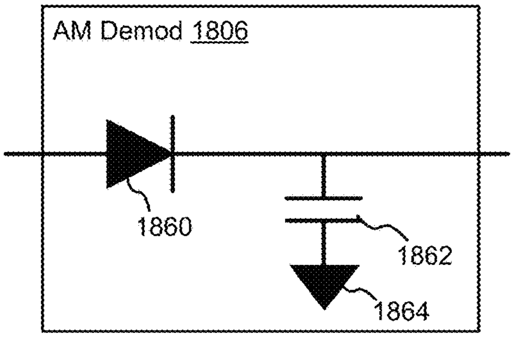
Figure 18F:
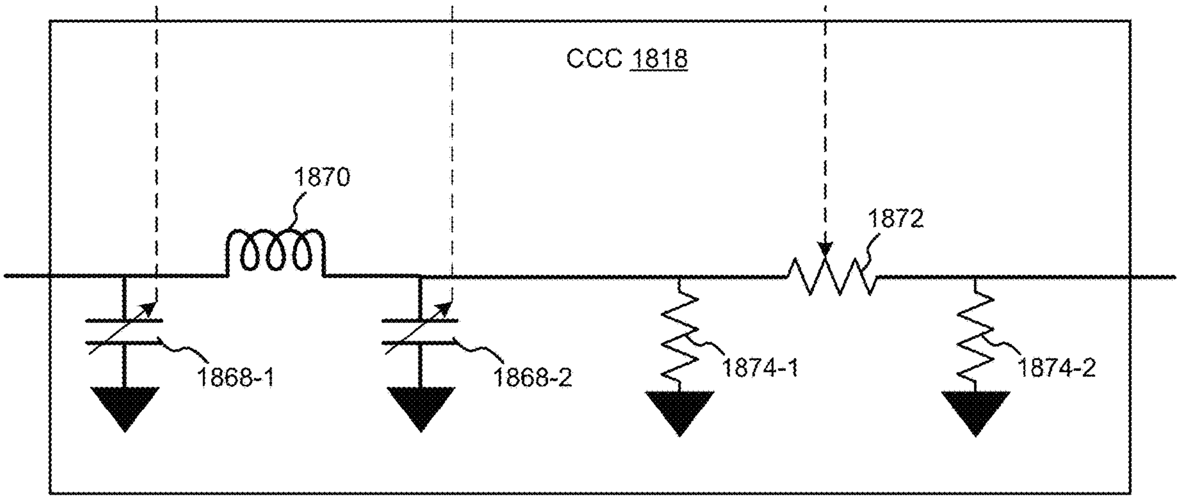

FIG. 18E shows example components of the AM demodulator 1806 in accordance with some embodiments. The AM demodulator 1806 includes a diode 1860 coupled with an electrical ground 1864 via a capacitor 1862. FIG. 18F shows example components of the CCC 1818 in accordance with some embodiments. The CCC 1818 includes a phase tuner portion that includes variable capacitors 1868-1 and 1868-2 and an inductor 1870. The CCC 1818 includes an amplifier tuner portion that includes resistors 1874-1 and 1874-2 and a variable resistor 1872 (e.g., a potentiometer). In some embodiments, the CCC 1818 operates in series between the TX and RX path couplers, or as shunt in the case of a shared antenna. In some embodiments, the CCC 1818 includes a variable phase shifter and an attenuator.

Table 2 below shows example power for a UHF RFID system without a repeater/boost.

| | Reader to Tag (5 m) | Reader to Tag (10 m) | |
|---|---|---|---|
| TX Power | 30 | 30 | dBm |
| Antenna Gain | 6 | 6 | dBi |
| EIRP | 36 | 36 | dBm |
| Frequency | 0.918 | 0.918 | GHz |
| Distance | 5 | 10 | m |
| PathLoss | 45.68 | 51.70 | dB |
| Pin from Reader | −9.678 | −15.698 | dBm |
| RX Gain | 1 | 1 | dBi |
| RX Net Input | −8.678 | −14.698 | dBm |
| RX Efficiency | 30% | 30% | |
| RX Net of Efficiency | 0.041 | 0.01 | mW |
| RX Sensitivity | −20 | −20 | dBm |
| RX Overhead | 0.01 | 0.01 | mW |
| RX Surplus | 0.031 | 0.000 | mW |
| dB Margin | 6.09 | 0.07 | dB |

Table 3 below shows example power for a UHF RFID system with a repeater/boost.

| Reader to Tag (with Booster) | | |
|---|---|---|
| Reader TXP | 30 | dBm |
| Antenna Gain | 6 | dBi |
| EIRP | 36 | dBm |
| Frequency | 0.918 | GHz |
| Distance | 10 | m |
| PathLoss | 51.70 | dB |
| Pin from Reader | −15.698 | dBm |
| RX Gain | 1 | dBi |
| RX Net Input from Reader | −14.698 | dBm |
| WPT TXP | 30 | dBm |
| Antenna Gain | 6 | dBi |
| EIRP | 36 | dBm |
| Frequency | 0.918 | GHz |
| Distance | 5 | m |
| PathLoss | 45.68 | dB |
| Pin from Reader | −9.678 | dBm |
| RX Gain | 1 | dBi |
| RX Net Input from Reader | −8.678 | dBm |
| Total from Reader + WPT | −7.709 | dBm |
| RX Efficiency | 30% | |
| RX Net of Efficiency | 0.051 | mW |
| RX Sensitivity | −20 | dBm |
| RX Overhead | 0.01 | mW |
| RX Surplus | 0.041 | mW |
| dB Margin | 7.06 | dB |

Table 4 below shows example power for a reader to a WPT transmit with antenna isolation.

| Reader to WPT RX with antenna isolation | | |
|---|---|---|
| TX Power | 30 | dBm |
| Antenna Gain | 6 | dBi |
| EIRP | 36 | dBm |
| Frequency | 0.918 | GHz |
| Distance | 5 | m |
| PathLoss | 45.68 | dB |
| Pin from Reader | −9.678 | dBm |
| WPT TX | 30 | dBm |
| Antenna Gain | 6 | dBm |
| EIRP | 36 | dBm |
| Coupler Directivity | 1 | dB |
| Coupling Factor | 10 | dB |
| TX at RX path | 29 | dBm |
| WPT RX Antenna Gain | 6 | dBi |
| Reader at RX | −3.678 | dB |
| Antenna Isolation | 60 | dB |
| TX at RX | −18 | dBm |

Table 5 below shows example power for a reader to a WPT transmit with carrier cancellation.

| Reader to WPT RX with carrier cancellation | | |
|---|---|---|
| TX Power | 30 | dBm |
| Antenna Gain | 6 | dBi |
| EIRP | 36 | dBm |
| Frequency | 0.918 | GHz |
| Distance | 5 | m |
| PathLoss | 45.68 | dB |
| Pin from Reader | −9.678 | dBm |
| WPT TX | 30 | dBm |
| Antenna Gain | 6 | dBm |
| EIRP | 36 | dBm |
| Coupler Directivity | 1 | dB |
| Coupling Factor | 10 | dB |
| TX at RX path | 29 | dBm |
| Carrier Cancellation | 60 | dB |
| TX at RX Net | −41 | dBm |
| Reader at RX Net | −13.678 | dBm |

Figure 19A:
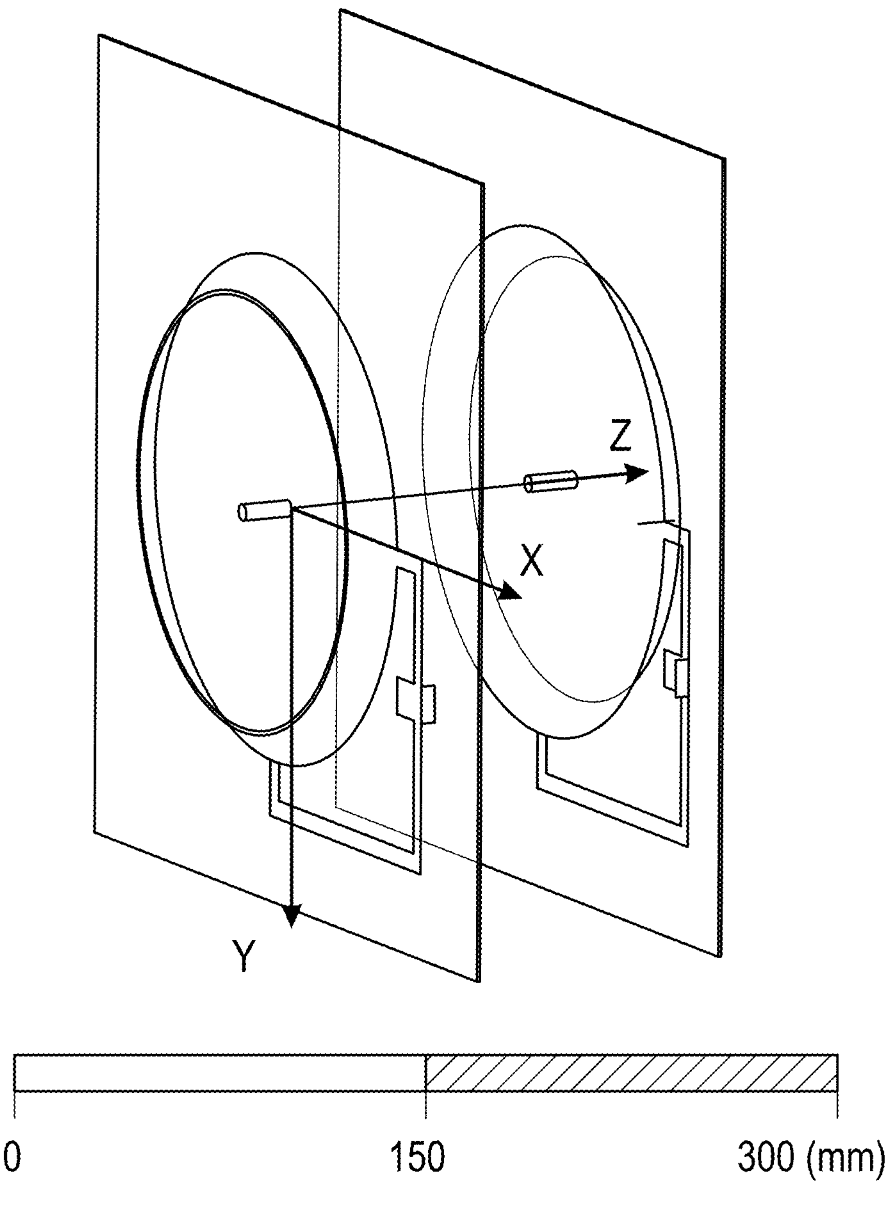
FIGS. 19A-19B illustrate an example antenna diversity solution in accordance with some embodiments.
Figure 19B:
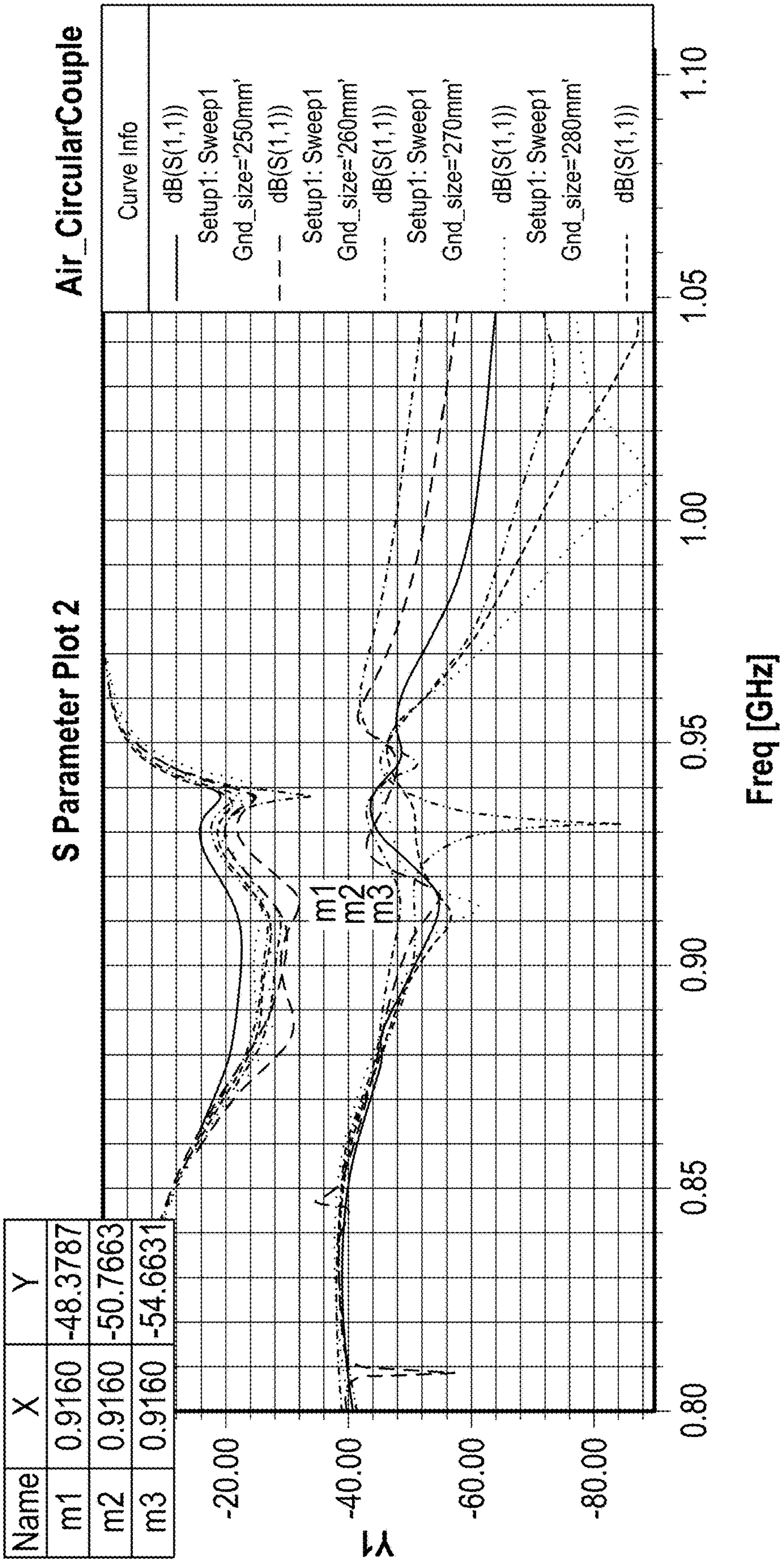

FIGS. 19A-19B illustrate an example antenna diversity solution in accordance with some embodiments. FIG. 19A shows an example with two patch antennas placed back-to-back with one another. For example, the two patch antennas are left-hand and right-hand circularly polarized and placed back-to-back with 100 mm separation. The antennas represent an electromagnetic solution that allows for simultaneous monitoring for RFID read signals while transmitting in WPT or RFID hybrid mode. FIG. 19B shows example simulation results for the antenna arrangement shown in FIG. 19A. For example, the simulated coupling is from −48 dB to −55 dB depending on the size of the antenna back plane.

Figure 20A:
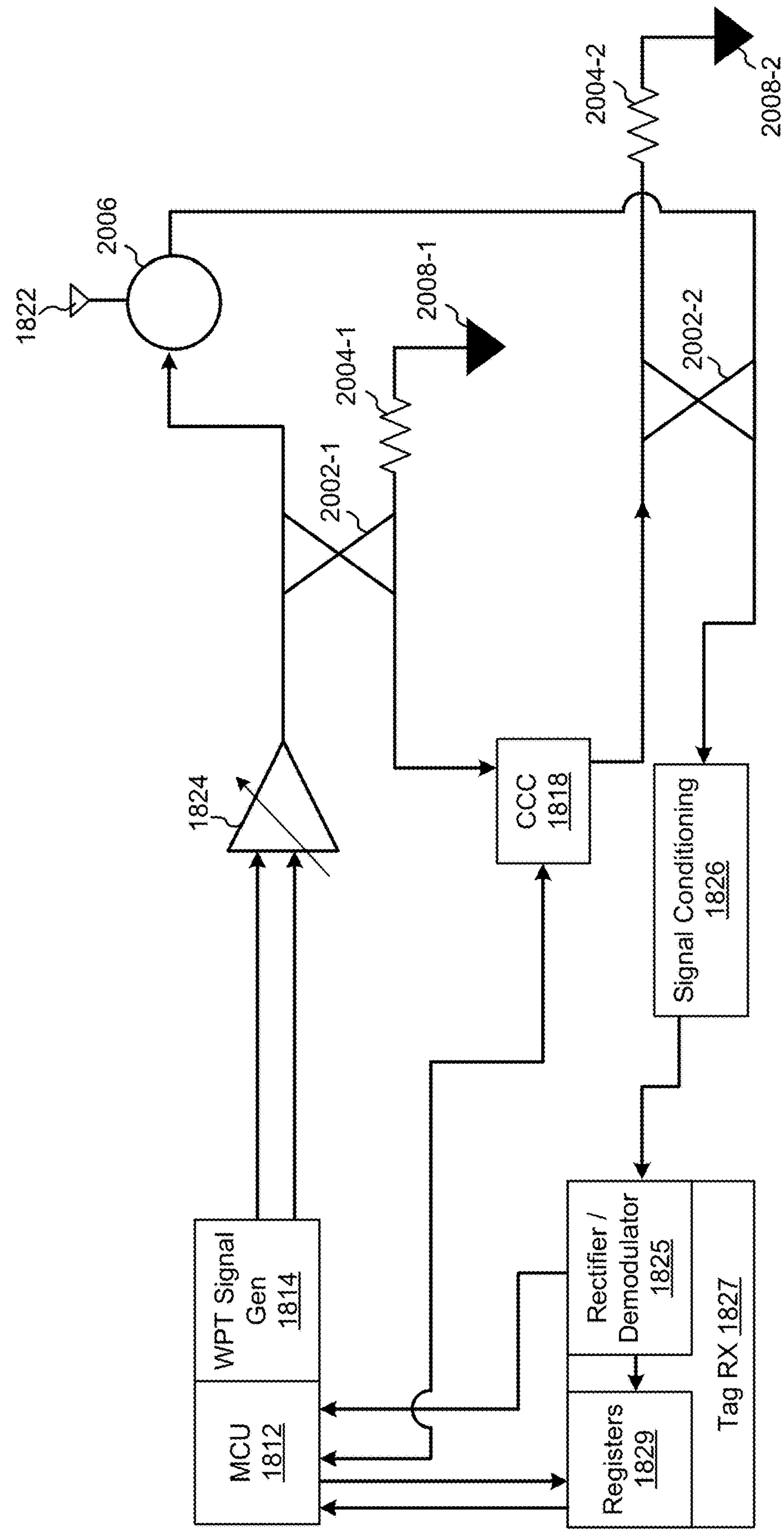
FIGS. 20A-20D illustrate example circuits for wireless-power transmission in accordance with some embodiments.
Figure 20B:
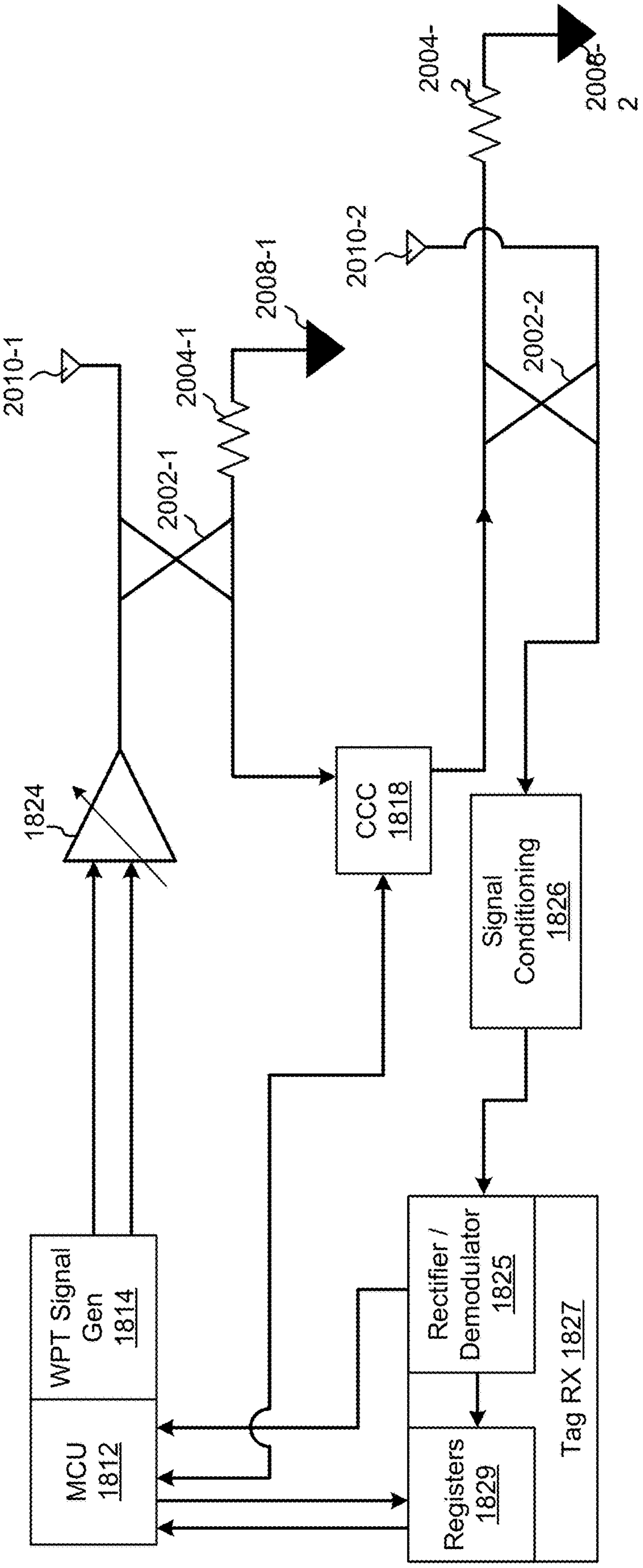
Figure 20C:
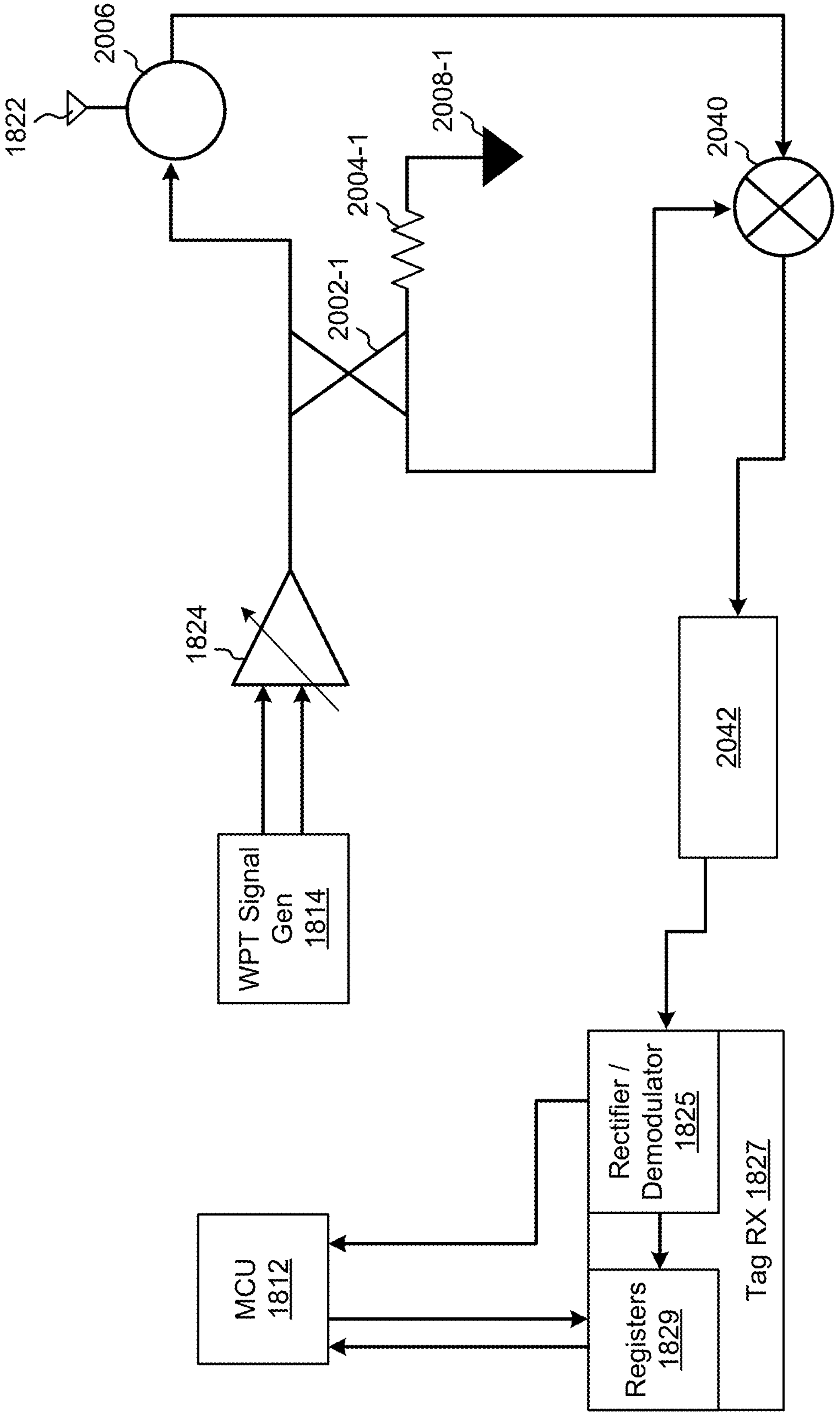
Figure 20D:
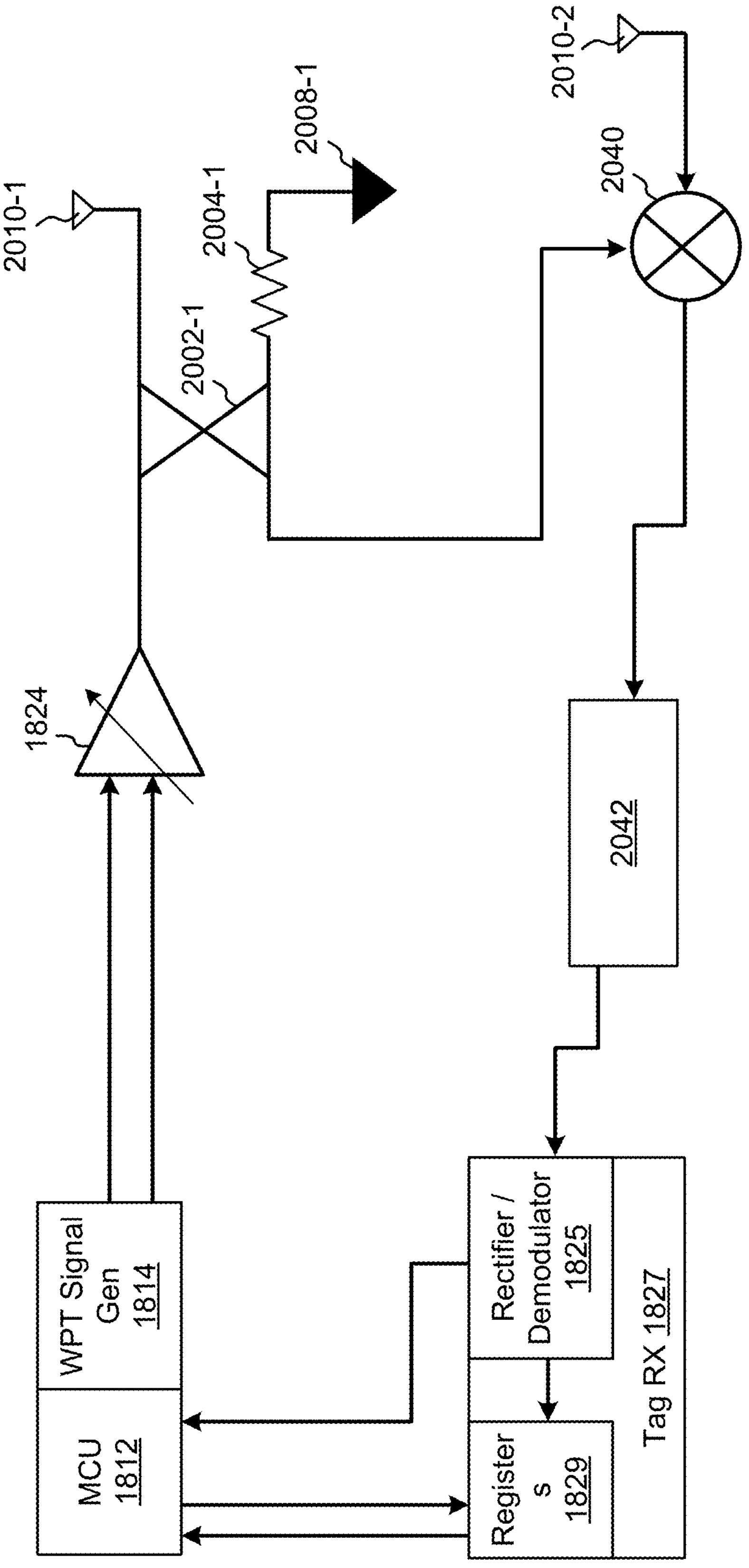

FIGS. 20A-20D illustrate example circuits for wireless-power transmission in accordance with some embodiments. FIG. 20A shows an example circuit for a repeater with an antenna 1822, a circulator 2006, and directional couplers 2002-1 and 2002-2. FIG. 20B shows an example circuit for a repeater with antennas 2010-1 and 2010-2 (e.g., the antenna 2010-2 for receiving and the antenna 2010-1 for transmitting). For example, with the circulator 2006 the loss is minimized to the insertion loss of the circulator only. In this way, a circulator improves the RX sensitivity. FIGS. 20A and 20B show RX circuits with carrier cancellation achieved by two directional couplers. FIG. 20C shows an example circuit for a repeater with the antenna 1822, the circulator 2006, the directional coupler 2002-1, a directional coupler 2040, and conditioning component 2042 (e.g., a low pass filter). In some embodiments, the low pass filter is configured to pass signals in the range of 0-30 MHz. FIG. 20D shows an example circuit for a repeater with the antennas 2010-1 and 2010-2, the directional coupler 2040, and the conditioning component 2042. For example, when the WPT transmitting RF frequency is different from the RFID reader frequency, the WPT signal received on the RX path can be cancelled effectively by mixing with the carrier frequency.

Table 6 below shows example power for a reader to a WPT transmit with carrier cancellation via isolator.

| Reader to WPT RX with carrier cancellation via isolator | | |
|---|---|---|
| TX Power | 30 | dBm |
| Antenna Gain | 6 | dBi |
| EIRP | 36 | dBm |
| Frequency | 0.918 | GHz |
| Distance | 5 | m |
| PathLoss | 45.68 | dB |
| Pin from Reader | −9.678 | dBm |
| WPT TX | 30 | dBm |
| Antenna Gain | 6 | dBm |
| EIRP | 36 | dBm |
| Coupler Directivity | 1 | dB |
| Coupling Factor | 10 | dB |
| Isolation | 15 | dB |
| Isolator Loss | 1 | dB |
| TX at RX (conducted power at repeater) | 13 | dBm |
| Carrier Cancellation | 40 | dB |
| TX at RX (carrier after the carrier cancellation) | −37 | dBm |
| Reader at RX Net | −3.678 | dBm |

Figure 21A:
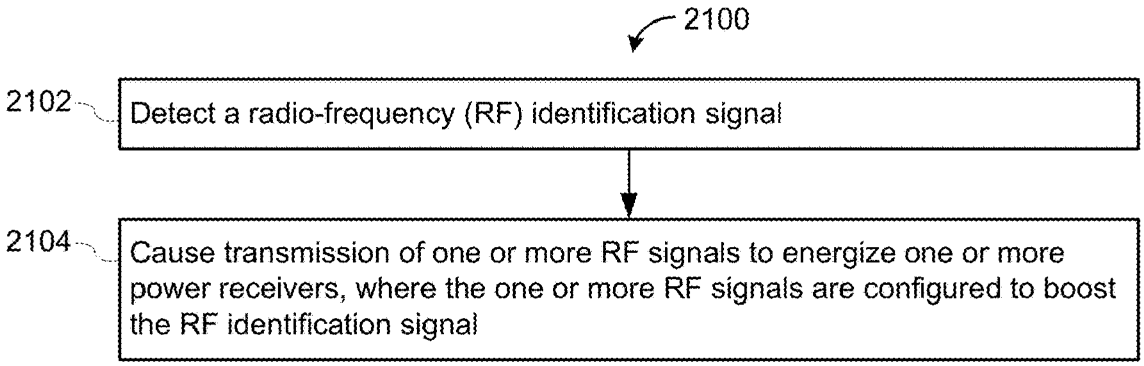
FIGS. 21A-21B are flow diagrams showing example methods of wireless-power transmission in accordance with some embodiments.
Figure 21B:
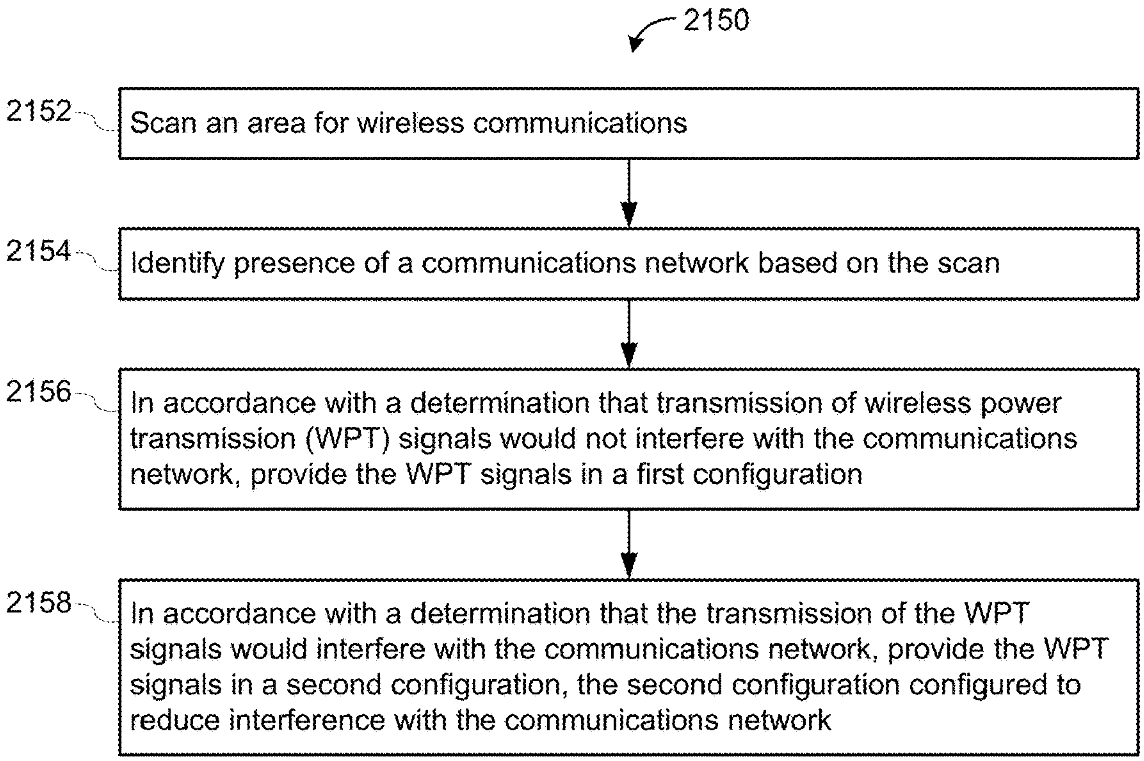

FIGS. 21A-21B are flow diagrams showing example methods of wireless-power transmission in accordance with some embodiments. FIG. 21A is a flow diagram showing a method 2100 of providing wireless power and wireless synchronization (e.g., as illustrated in FIGS. 15A-15F) in accordance with some embodiments. The method 2100 may be performed by a transmitting device 102 or 302, or one or more integrated circuits of a transmitting device such as the integrated transmitter platform 1400 (FIG. 14), the RFIC 1060 (FIG. 10A), and/or the PAIC 1061A (FIG. 10B). At least some of the operations shown in FIG. 21A correspond to instructions stored in a computer memory or a computer-readable storage medium (e.g., memory 1072 and 1074 of the wireless-power transmitter 1050, FIG. 10B). For simplicity and clarity, the operations below are described as being performed by a transmitting device.

The transmitting device detects (2102) an RFID signal. In some embodiments, the RFID signal comprises an RFID interrogation signal. In some embodiments, the RFID signal comprises an RFID transmission signal. In some embodiments, the RFID signal is detected using a signal-detecting receiver.

The transmitting device causes (2104) transmission of one or more RF signals to energize one or more power receivers, where the one or more RF signals are configured to boost the RFID signal. In some embodiments, the one or more RF signals are synchronized with the RFID signal. In some embodiments, configuring the one or more RF signals to boost the RFID signal includes increasing a range and/or performance of the RFID signal. In some embodiments, the transmitting device determines timing information of the RFID signal; and configures the transmission of the one or more RF signals. In some embodiments, the timing information comprises a time period and/or frequency of the RFID signal. In some embodiments, the transmitting device determines an envelope of the RFID signal; and configures the one or more RF signals to conform to the envelope of the RFID signal. In some embodiments, the one or more RF signals are transmitted concurrently with detecting the RFID signal. In some embodiments, the RFID signal has a first frequency, and the one or more RF signals are configured to have the first frequency. In some embodiments, the RFID signal is detected using a first antenna and the one or more RF signals are transmitted using a second antenna.

In some embodiments, the transmitting device, prior to detecting the RFID signal, causes transmission of the one or more RF signals; and, in response to detecting the RFID signal, the transmitting device ceases to cause transmission of the one or more RF signals; and configures the one or more RF signals to boost the RFID signal, where the one or more RF signals are caused to be transmitted after the configuring.

FIG. 21B is a flow diagram showing a method 2150 of operating a transmitter device in accordance with some embodiments. The method 2150 may be performed by a transmitting device 102 or 302, or one or more integrated circuits of a transmitting device such as the integrated transmitter platform 1400 (FIG. 14), the RFIC 1060 (FIG. 10A), and/or the PAIC 1061A (FIG. 10B). At least some of the operations shown in FIG. 21B correspond to instructions stored in a computer memory or a computer-readable storage medium (e.g., memory 1072 and 1074 of the wireless-power transmitter 1050, FIG. 10B). For simplicity and clarity, the operations below are described as being performed by a transmitting device.

The transmitting device scans (2152) an area for wireless communications. For example, the transmitting device detects energy as described previously with respect to FIG. 17.

The transmitting device identifies (2154) the presence of a communications network based on the scan. For example, the transmitting device performs an RFID pattern check and/or analyzes properties of the detected signal/energy to identify the presence of the communications network, as described previously with respect to FIG. 17.

In accordance with a determination that transmission of WPT signals would not interfere with the communications network, the transmitting device provides (2156) the WPT signals in a first configuration. In some embodiments, the scanning and the determining are performed at a same chip (e.g., a single integrated circuit). In some embodiments, determining whether the transmission of the WPT signals would interfere with the communications network includes determining that the WPT signals share at least a portion of a frequency band with the communications network. In some embodiments, determining whether the transmission of the WPT signals would interfere with the communications network includes classifying a protocol type of the communications network.

In accordance with a determination that the transmission of the WPT signals would interfere with the communications network, the transmitting device provides (2158) the WPT signals in a second configuration, the second configuration configured to reduce interference with the communications network. In some embodiments, the transmitting device determines whether the transmission of the WPT signals would interfere with the communications network. In some embodiments, the transmitting device transitions from the second configuration to the first configuration in accordance with one or more predefined criteria. In some embodiments, the transmitting device receives a packet from the communications network; and transmits the packet to a remote device.

Figure 22A:
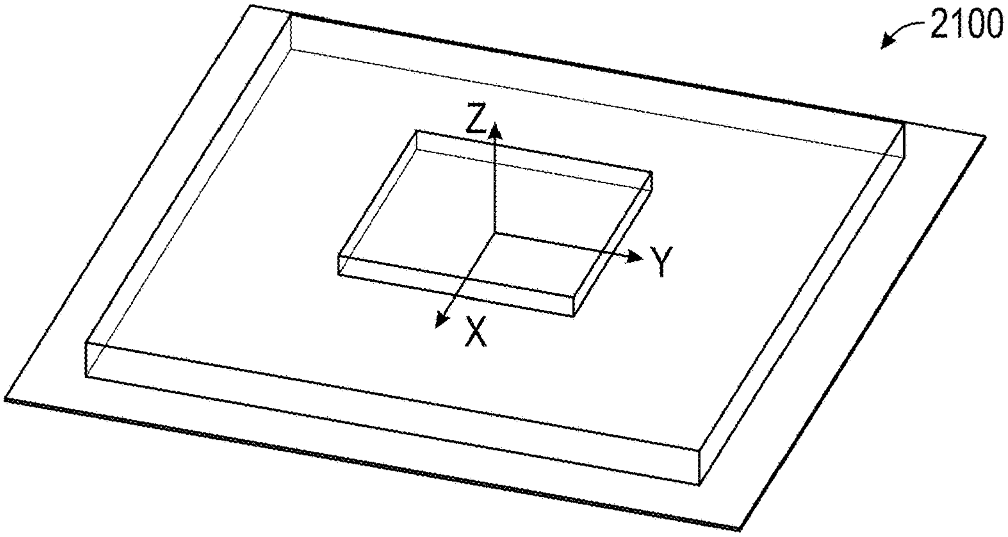
FIGS. 22A-22F illustrate an example antenna with example outputs in accordance with some embodiments.
Figure 22B:
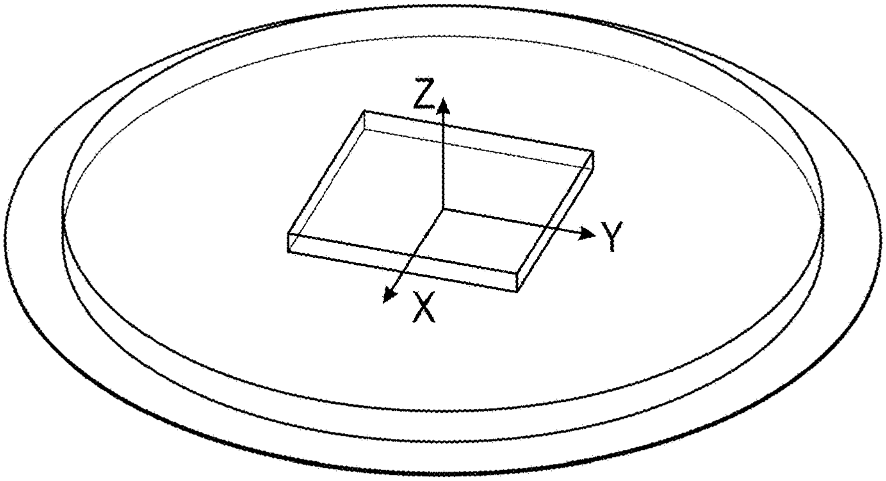
Figure 22C:
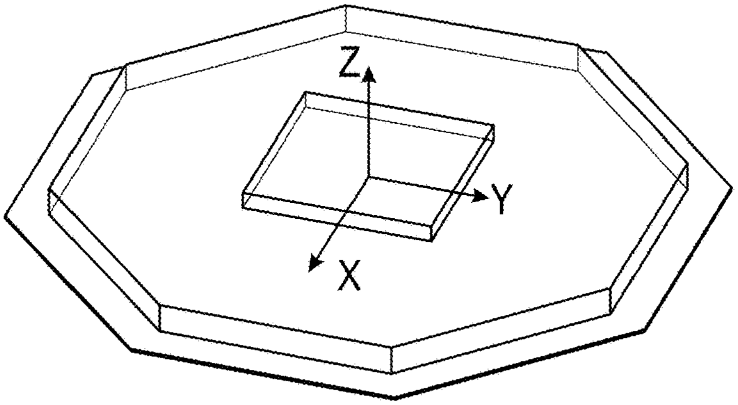

FIGS. 22A-22F illustrate example antennas with example outputs in accordance with some embodiments. FIG. 22A shows an antenna 2100. In some embodiments, the antenna 2100 is a stacked patch antenna for 918 MHz WPT and 2.4 GHz frequency band. In some embodiments, the antenna includes three layers of metal. For example, the bottom layer is the antenna ground, the second layer is the patch antenna for 918 MHz WPT band, and the top layer is the patch antenna for 2.4 GHz. In some embodiments, a dielectric is positioned between the ground and the second layer. For example, the dielectric between ground and the 918 Mhz patch may be a ¼-inch-thick dielectric material (such as HDPE or any other low-loss dielectric materials, including air). In some embodiments, a dielectric is positioned between the second layer and the top layer. For example, the dielectric material between 918 MHz WPT and the 2.4 GHz patch is ⅛-inch-thick dielectric material. In some embodiments, the size of the antenna is about 120 mm×120 mm. In some embodiments, the antenna 2100 has a non-rectangular shape. For example, FIG. 22B shows an oval-shaped antenna and FIG. 22C shows a hexagonal-shaped antenna. In some situations, the stacked patch antenna arrangement improves gain and/or efficiency of the WPT and 2.4 GHz (e.g., Bluetooth) transmissions. In some embodiments, the WPT band is an 865 MHz ISM band. In some embodiments, there are two feedings for WPT antenna and two feedings for 2.4 GHz. In some embodiments, the two feedings for each frequency band excite two orthogonal polarization modes.

Figure 22D:
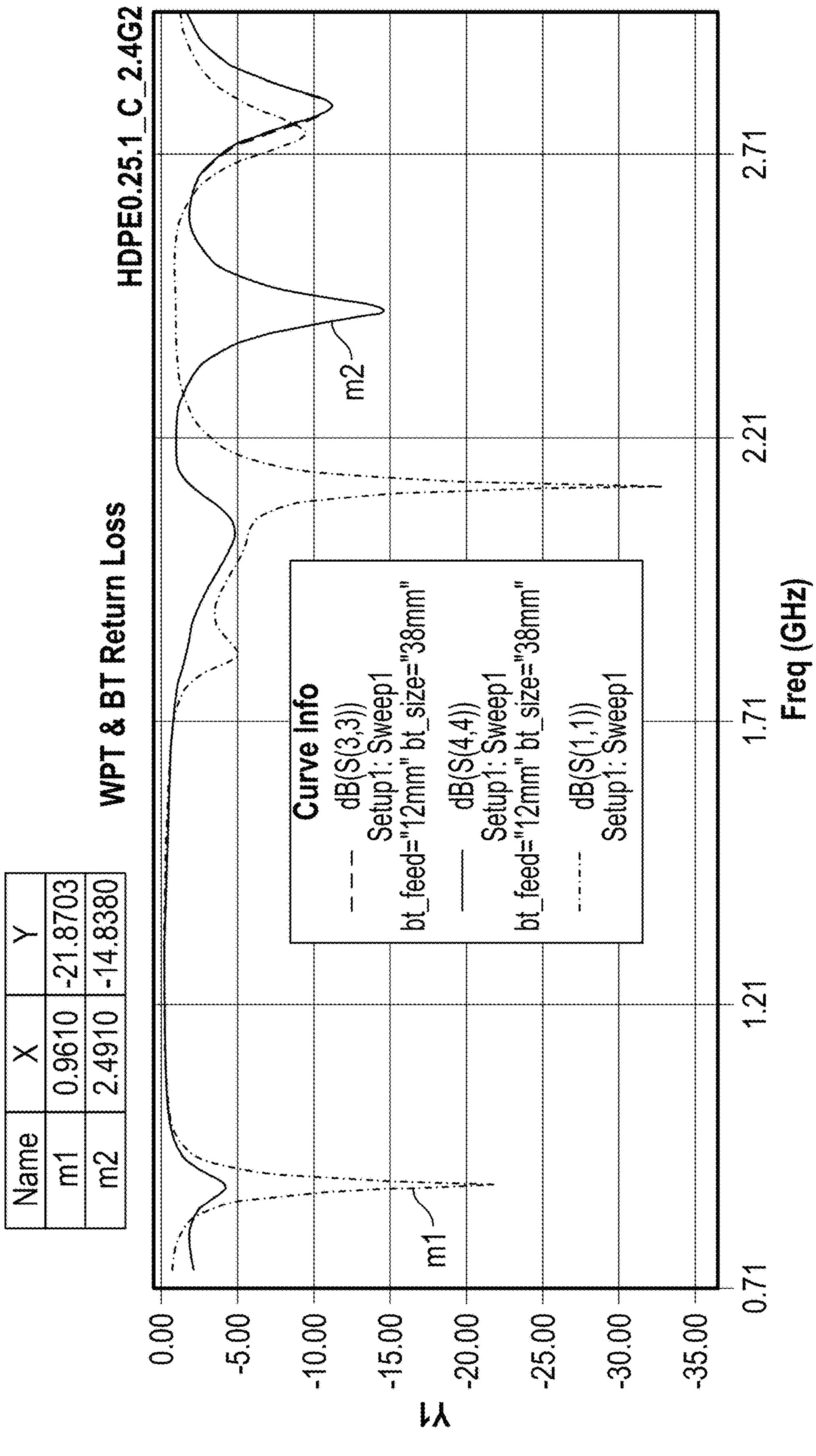
Figure 22E:
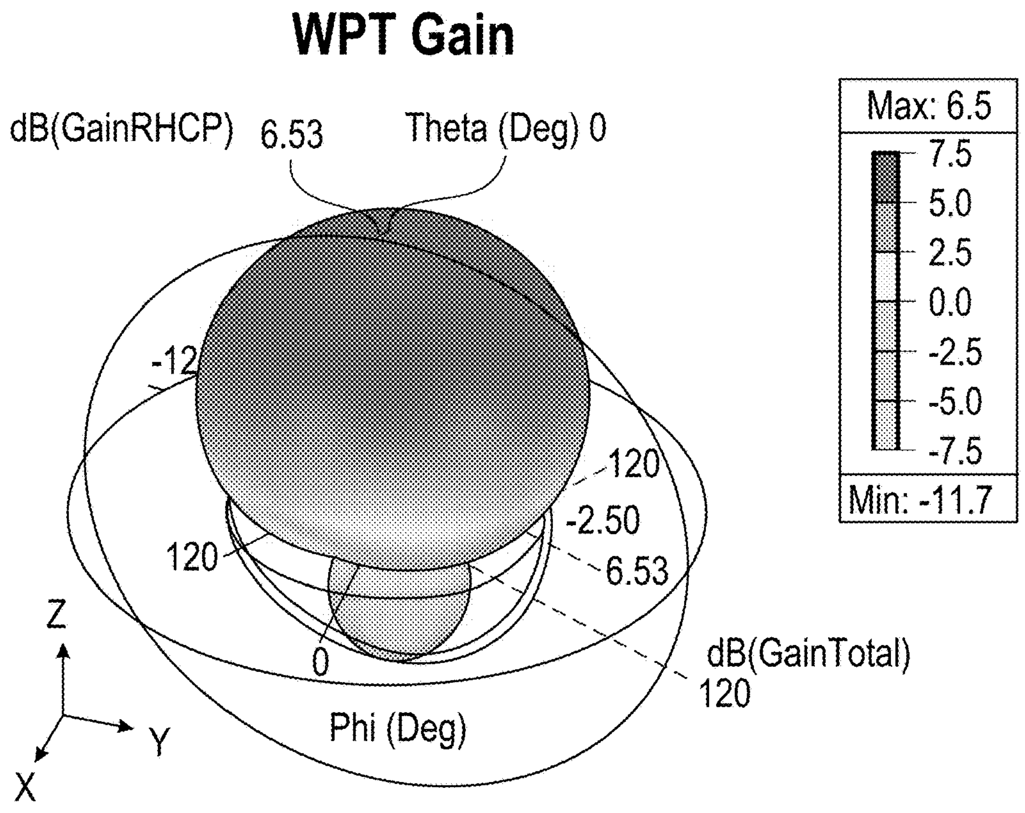
Figure 22F:
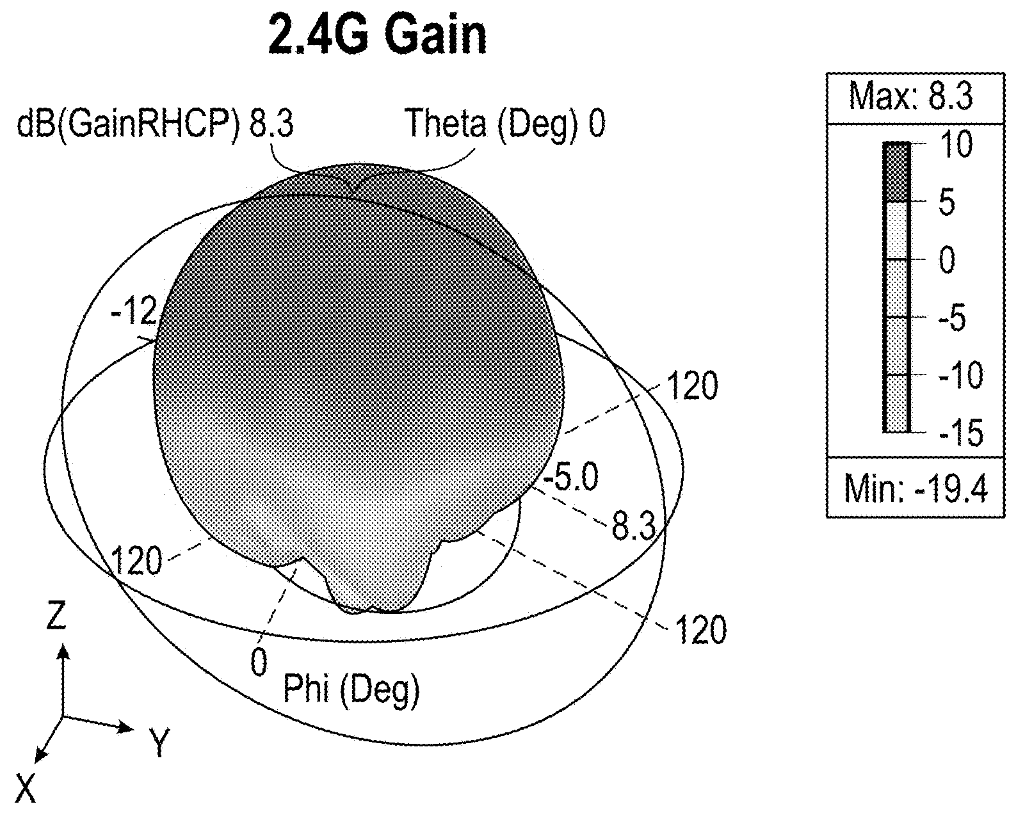

FIG. 22D shows a plot of the return loss for the WPT mode and the 2.4 GHz mode. In some embodiments, the antenna gain for the WPT is between 6-9 dB depending on the ground size. In some circumstances, the larger ground plate yields a higher WPT antenna gain. In some embodiments, the 2.4 GHz antenna gain is about 8 dB (e.g., regardless of the ground size). FIGS. 22E and 22F show gain plots for the WPT band and 2.4 GHz band transmissions.

Figure 23A:
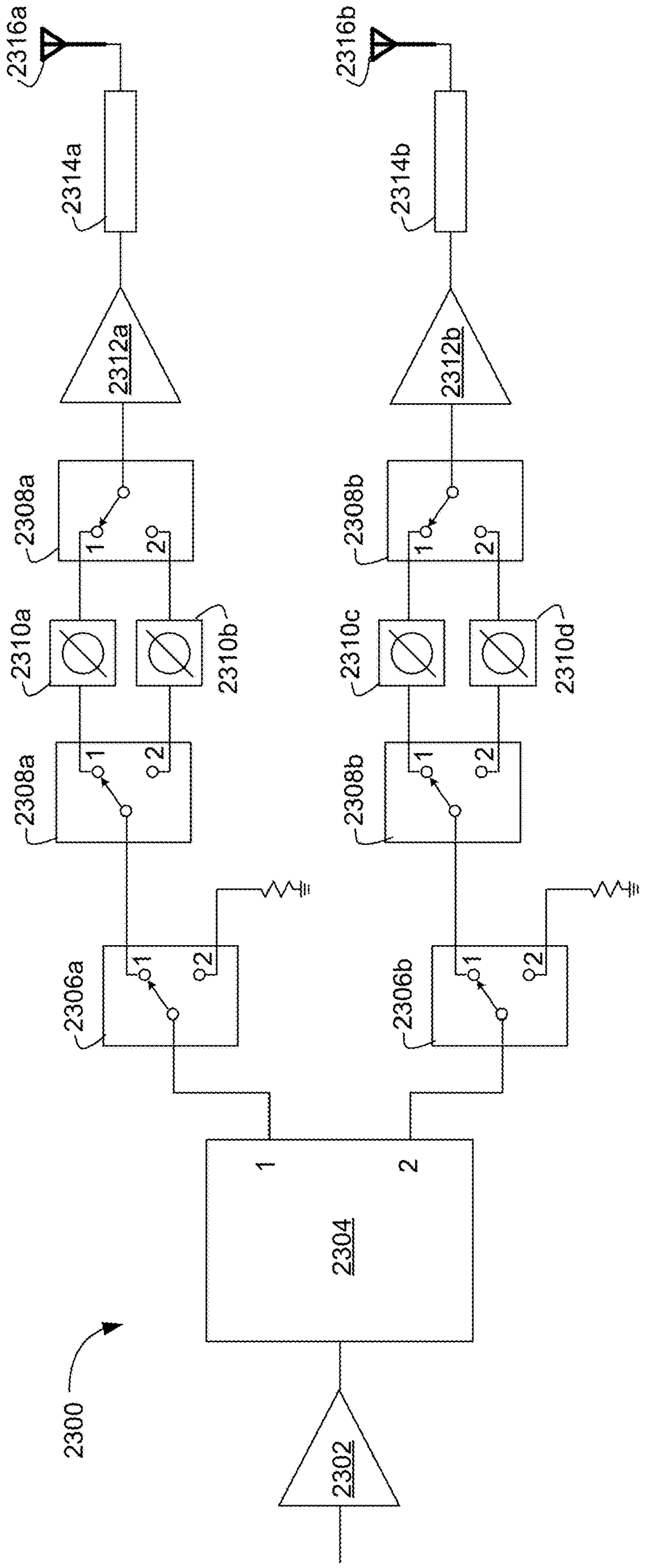
FIGS. 23A-23D illustrate example circuits for wireless-power transmission in accordance with some embodiments.

FIG. 23A-23D illustrate example circuits for wireless-power transmission in accordance with some embodiments. In some embodiments, the circuits in described FIGS. 23A-23D are components of the various transmitting devices described previously. FIG. 23A illustrates an antenna tuning circuit 2300 that has dynamically switchable polarization between linear (e.g., vertical and/or horizontal) and circular (e.g., RHCP and/or LHCP) polarizations. The tuning circuit 2300 includes a preamplifier 2302 (e.g., a variable gain amplifier), a splitter 2304 (e.g., a programmable splitter), two disconnect switches 2306*a* and 2306*b* (e.g., signal termination switches), two pairs of phase-select switches 2308*a* and 2308*b*, at least two phase shifters 2310*a*-2310*d* (e.g., four phase shifters as illustrated in FIG. 23A) (e.g., a 90-degree phase shifter, a 180-degree phase shifter, and the like), two amplifiers 2312*a* and 2312*b* (e.g., variable gain amplifiers in the range of 5 dBm-100 dBm), two load balancing components 2314*a* and 2314*b* (e.g., impedance matching components configured to match an impedance of an input signal to an impedance of a respective antenna), and two antennas 2316*a* and 2316*b*. In some embodiments, the splitter 2304 is programmable between a splitter-only mode for linear polarization and a splitter and 90-degree phase shift mode for circular polarization. In some embodiments, a pair of phase-select switches 2308*a* and a pair of phase switches 2308*b* are configured to switch polarization for the antennas 2316*a*-2316*b*, respectively. In some embodiments, a phase shifter 2310*a* is a 180-degree phase shifter, the phase shifter 2310*b* is a 0-degree phase shifter (e.g., a bypass of the phase shifter 2310*a*), the third phase shifter 2310*c* is a 90-degree phase shifter, and the fourth phase shifter 2310*d* is a 0-degree phase shifter (e.g., a bypass of the third phase shifter 2310*c*). The configurability of the antenna tuning circuit 2300 allows for the circuit to be adapted to different antenna coverage requirements and have a higher EIRP as compared to conventional, non-configurable WPT devices. In some embodiments, the antenna tuning circuit 2300 further includes a fine tuning component configured to achieve the phase operations described herein.

For example, while the two disconnect switches 2306*a*-2306*b* are both in their respective position 1, the phase-select switch 2308*a* being at position 1 and the phase-select switch 2308*b* being at position 1 corresponds to a LHCP setting, the phase-select switches 2308*a* being at position 2 and the phase-select switches 2308*b* being at position 1 corresponds to a RHCP setting, the phase-select switches 2308*a* being at position 1 and the phase-select switches 2308*b* being at position 2 corresponds to a linear out-of-phase setting, and the phase-select switches 2308*a* being at position 2 and the phase-select switches 2308*b* being at position 2 corresponds to a linear in-phase setting. Additionally, switching the pair of phase-select switches 2308*a* in its position 2 and switching the disconnect switch 2306*b* in its position 2 corresponds to a horizontal linear polarization setting, and switching the pair of phase-select switches 2308*b* in its position 2 and switching the disconnect switch 2306*a* in its position 2 corresponds to a vertical linear polarization setting.

Figure 23B:
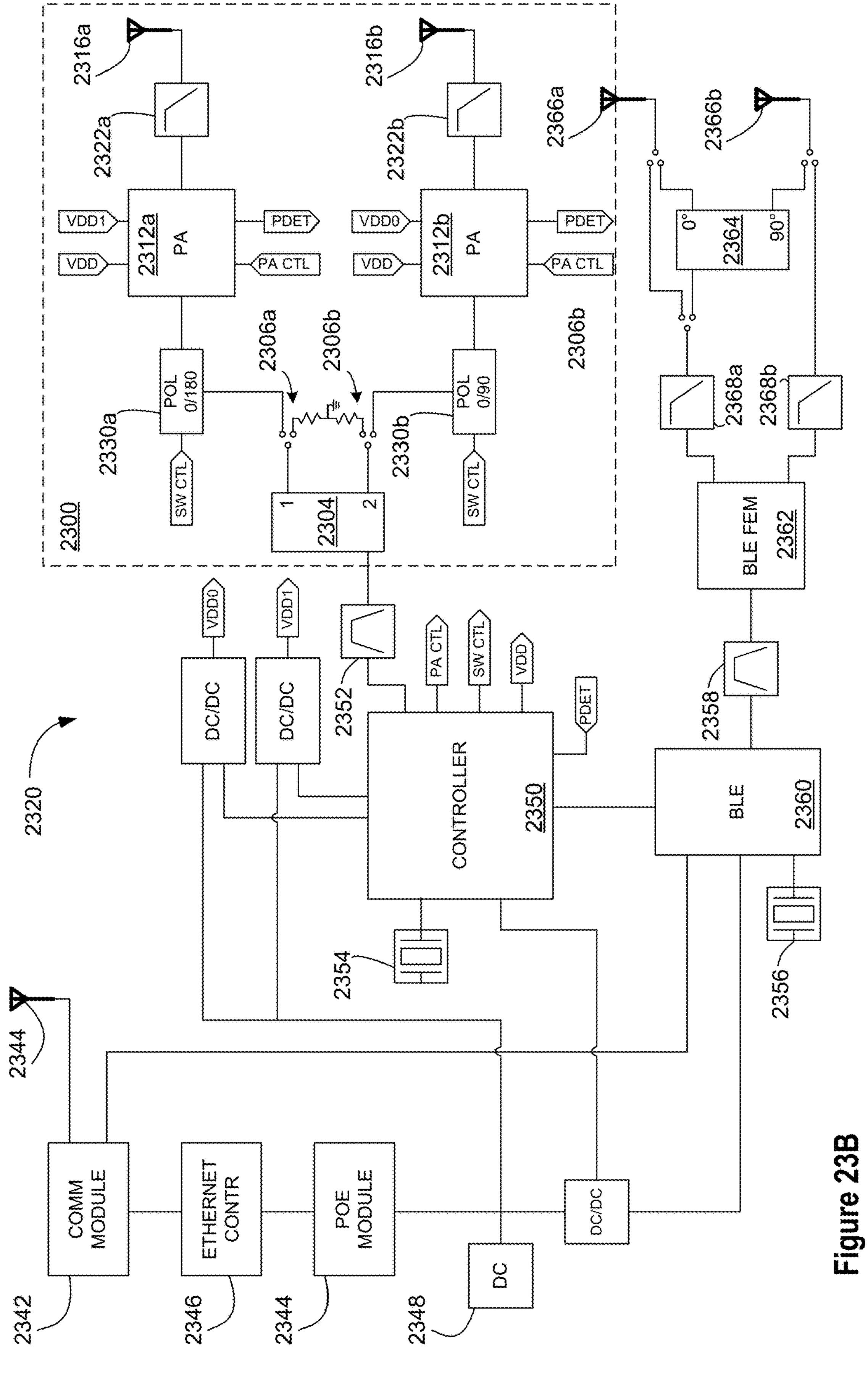

FIG. 23B illustrates an integrated transmitter platform 2320 for wireless power transmission in accordance with some embodiments. The integrated transmitter platform 2320 includes the antenna tuning circuit 2300. As illustrated in FIG. 23A, the antenna tuning circuit 2300 includes the splitter 2304, the two disconnect switches 2306*a*-2306*b*, two phase switching modules 2330*a*-2330*b* (each phase switching module includes a respective pair of phase-select switches (e.g., the phase-select switches 2308*a*-2308*b*) and at least one phase shifter (e.g., the at least two phase shifters 2310*a*-2310*d*)), the two amplifiers 2312*a*-2312*b* (e.g., variable gain amplifiers), and the two antennas 2316*a*-2316*b*. In some embodiments, the tuning circuit 2300 further includes at least one variable-gain amplifier coupled to respective inputs of the two phase switching modules 2330*a*-2330*b* to vary a voltage of an output signal supplied to the plurality of polarization-switching components. In some embodiments, the antenna tuning circuit 2300 further includes two low-pass filters 2322*a*-2322*b* (or another type of filter, e.g., band-pass filters) coupled between respective outputs of the two amplifiers 2312*a*-2312*b* and respective inputs of the two antennas 2316*a*-2316*b*.

The integrated transmitter platform 2320 further includes a communications module 2342 communicatively coupled to at least one communication antenna 2344 similar to the communications module 472 described in reference to FIGS. 4B and 14. In some embodiments, the communications module 2342 includes at least a USB module, a WiFi module, an LTE module, and/or an Ethernet module. In some embodiments, the integrated transmitter platform 2320 further includes at least one power supply option including power-over-ethernet (PoE) connection 2344 (coupled to the Ethernet module via an ethernet controller 2346), a USB voltage source 2348, and/or another DC voltage source.

The integrated transmitter platform 2320 further includes a controller integrated circuit (IC) 2350, in accordance with some embodiments. The controller IC 2350 is configured to produce a WPT pattern by individually controlling the two antennas 2316*a*-2316*b*, the two phase switching modules 2330*a*-2330*b*, and the two amplifiers 2312*a*-2312*b*. In some embodiments, the controller IC 2350 is a WPT controller with programmable frequencies 864-867 MHz and 902-928 MHz. In some embodiments, the programmable frequencies are in a range between 860-960 MHz, which can be consistent with local regulations in certain jurisdictions. The controller IC 2350 is connected to the splitter 2304 to transmit WPT signals to the antenna tuning circuit 2300. In some embodiments, the controller IC 2350 is connected to the splitter 2304 via a band-pass filter 2352. The controller IC 2350 is further connected to the two disconnect switches 2306*a*-2306*b* and the two phase switching modules 2330*a*-2330*b* to switch the antenna tuning circuit between the different settings. The controller IC 2350 is further connected to the two amplifiers 2312*a*-2312*b* to control respective gains of the two amplifiers 2312*a*-2312*b* and, in some embodiments, to receive data from the two amplifiers 2312*a*-2312*b*. The controller IC 2350 is further connected to a resonator 2354 (e.g., a 16M resonator, a 26M resonator, a 50M resonator, etc.). The controller IC 2350 is configured to produce the LHCP setting, the RHCP setting, the linear out-of-phase setting, the linear in-phase setting, the horizontal linear polarization setting, and the vertical linear polarization setting at the two antennas 2316*a*-2316*b*, in accordance with some embodiments.

In some embodiments, the integrated transmitter platform 2320 further includes a Bluetooth module 2360 connected to a Bluetooth front-end module 2362. In some embodiments, the Bluetooth module 2360 is connected to the Bluetooth front-end module 2362 via a band-pass filter 2358. The Bluetooth front-end module 2362 is connected to a phase-switching module comprising a splitter 2364 and a series of phase-selection switches. The phase-switching module is connected to at least one antenna 2366*a*-2366*b*. In some embodiments, the phase-switching module allows the integrated transmitter platform to be programmed to a horizontal linear polarization setting, a vertical linear polarization setting, and/or an RHCP setting. In some embodiments, the Bluetooth front-end module 2362 is connected to the phase-switching module via at least one low-pass filter 2368. In some embodiments, the Bluetooth module 2360 is further connected to a resonator 2356 (e.g., a 16M resonator, a 26M resonator, a 50M resonator, etc.). In some embodiments, the controller IC 2350, the Bluetooth module 2360, and the Bluetooth front-end module 2362 are configured to produce WPT patterns at the at least one antenna 2366*a*-2366*b*. In some embodiments, the WPT patterns at the at least one antenna 2366*a*-2366*b* are programmable with frequencies in a range of 100 MHz to 10 GHz (e.g., 2.4 GHz). In some embodiments, the controller IC 2350 is configured for TDM between the Bluetooth and WPT functionalities. In this way, the integrated transmitter platform 2320 is configured to have integrated zone discrimination, integrated networking (e.g., IP networking), and integrated POE and DC power with automatic switching. In accordance with some embodiments, the integrated transmitter platform 2320 includes multiple power amplifiers and antenna elements configurable for individual and/or group operation with dynamic antenna pattern switching (e.g., using low cost switches), optional integrated matching, and optional dynamic tuning.

Figure 23C:
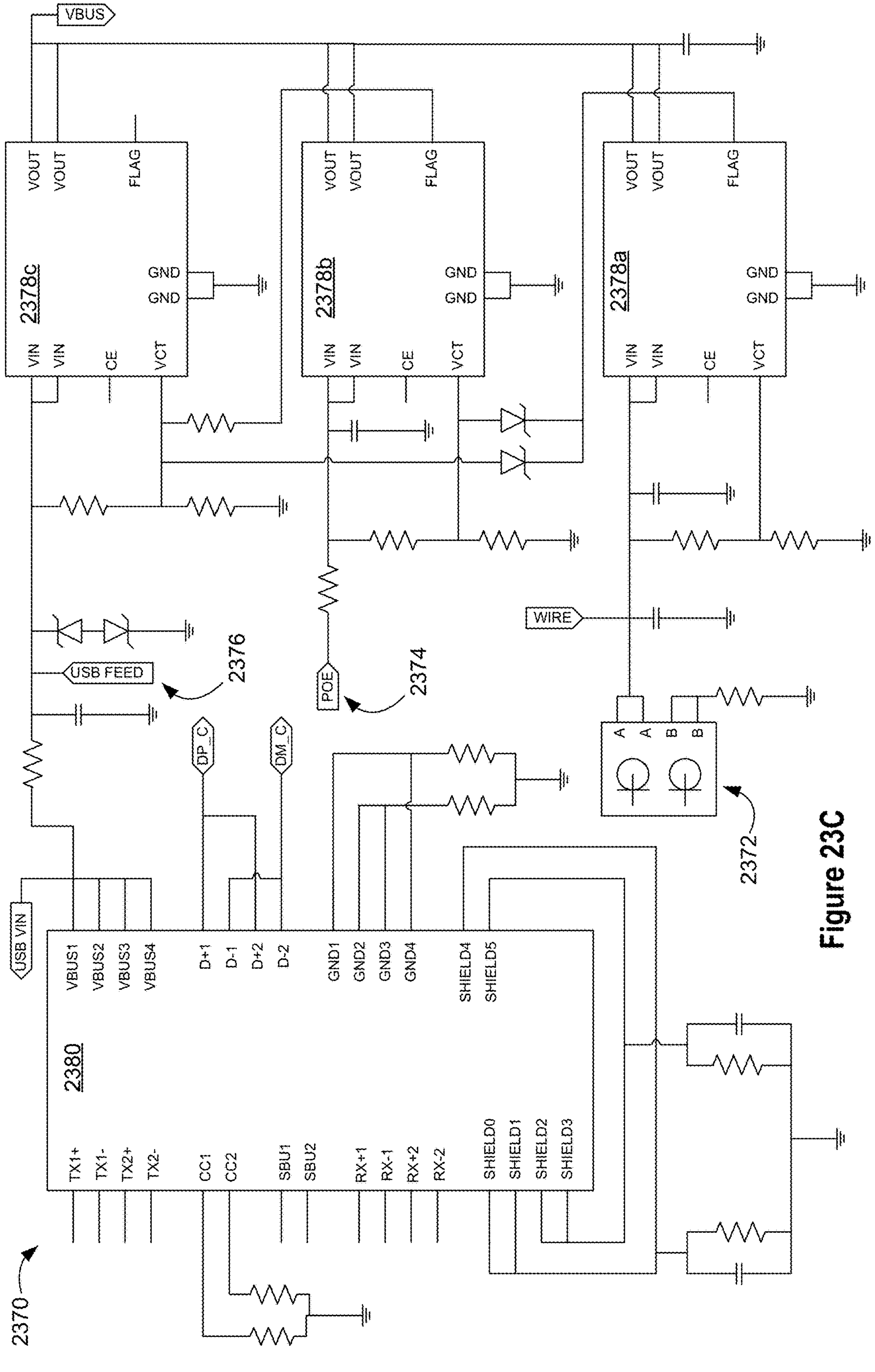

FIG. 23C illustrates a dynamic power supply 2370, in accordance with some embodiments. The dynamic power supply 2370 is configured to supply power to the integrated transmitter platform 2320. The dynamic power supply 2370 includes a terminal block power input 2372, a power-over-ethernet input power 2374 (e.g., the power-over-ethernet 2344 described in reference to Figure B), and a USB-C power input 2376. The dynamic power supply 2370 further includes three power distribution switches 2378*a*-2378*c* configured to dynamically switch between the terminal block power input 2372, the power-over-ethernet input power 2374, and the USB-C power input 2376 (each of the three power distribution switches 2378*a*-2378*c* associated with each of the input power sources). The dynamic power supply 2370 further includes a power supply IC 2380 for controlling each of the three power distribution switches 2378*a*-2378*c* and dynamically switching between each of the three input power sources. In some embodiments, the power supply IC 2380 is configured to prioritize the terminal block power input 2372 over the power-over-ethernet input power 2374 and prioritize the power-over-ethernet input power 2374 over the USB-C power input 2376. In some embodiments, the USB-C power input 2376 can be used to debug the dynamic power supply 2370 without drawing power while either the terminal block power input 2372 and/or the power-over-ethernet input power 2374 is being used to supply power. In some embodiments, the power supply IC is a component of controller IC 2350.

Figure 23D:
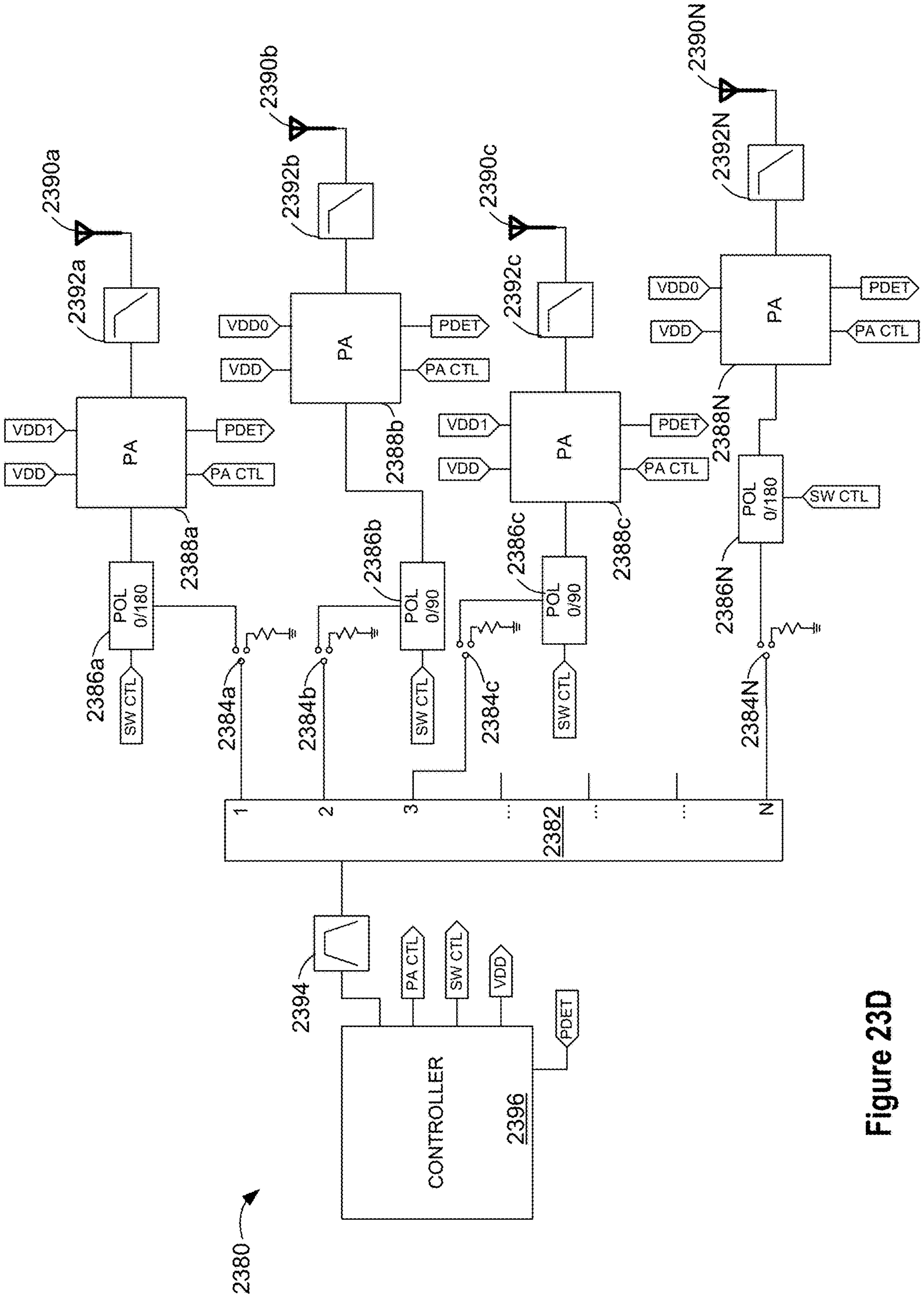

FIG. 23D illustrates an alternate integrated transmitter platform 2380 for wireless power transmission, in accordance with some embodiments. The alternate integrated transmitter platform 2380 includes a splitter 2382, a plurality of disconnect switches 2384*a*-2384N, a plurality of phase switching modules 2386*a*-2386N (each phase switching module includes a respective pair of phase-select switches (e.g., the phase-select switches 2308*a*-2308*b*) and at least one phase shifter (e.g., the at least two phase shifters 2310*a*-2310*d*)), a plurality of amplifiers 2388*a*-2388N (e.g., variable gain amplifiers), and a plurality of antennas 2390*a*-2390N. In some embodiments, the alternate integrated transmitter platform 2380 includes a plurality of low-pass filters 2392*a*-2392N (or another type of filter, e.g., band-pass filters) coupled between respective outputs of the plurality amplifiers 2388*a*-2388N and respective inputs of the plurality of antennas 2390*a*-2390N. The alternate integrated transmitter platform 2380 may include as many disconnect switches, switching modules, amplifiers, and antennas as required to create a desired WPT pattern. The alternate integrated transmitter platform 2380 further includes a controller IC 2396, in accordance with some embodiments. The controller IC 2396 is configured to individually program an WPT pattern produced by each of the plurality of antennas 2390*a*-2390N by controlling the plurality of phase switching modules 2386*a*-2386N and the plurality of amplifiers 2388*a*-2388N. In some embodiments, the controller IC 2396 is connected to the splitter 2382 via a band-pass filter 2394. The controller IC 2396 is further connected to the plurality of disconnect switches 2384*a*-2384N and the plurality of phase switching modules 2386*a*-2386N to switch the antenna tuning circuit between the different settings. The controller IC 2396 is further connected to the plurality of amplifiers 2388*a*-2388N to control respective gains of the plurality of amplifiers 2388*a*-2388N and, in some embodiments, to receive data from the plurality of amplifiers 2388*a*-2388N. In some embodiments, the controller IC 2396 is configured to operate the integrated transmitter platform 2380 for, at least one of: continuous wave programmable frequency-hopping spread spectrum (FHSS), pulse-width modulation (PWM), amplitude modification (AM), and on-off keying (OOK). In some embodiments, the integrated transmitter platform 2380 includes configurable antenna polarization and patterns via fixed phase and/or amplitude combinations.

Figure 24A:
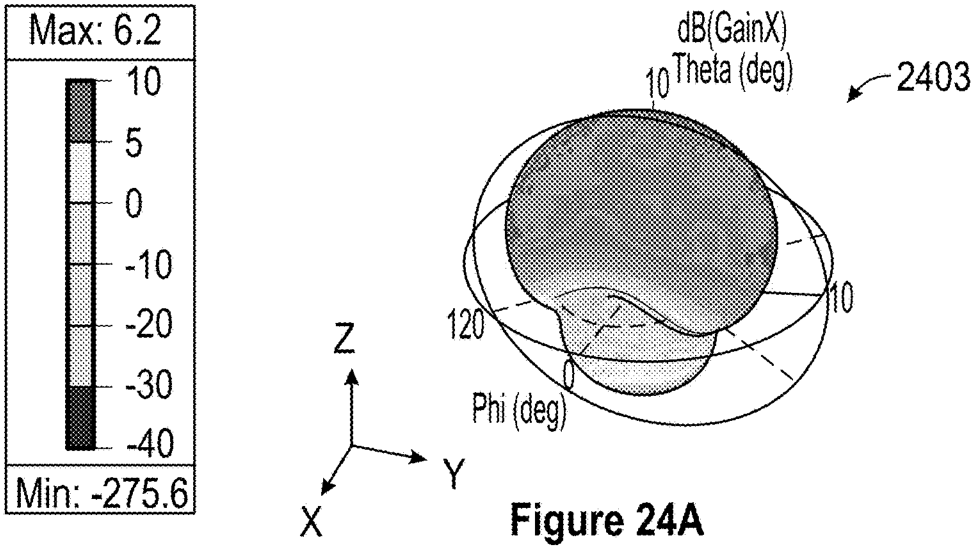
FIGS. 24A-24R illustrate gain plot diagrams of operating states for wireless-power transmission devices in accordance with some embodiments.
Figure 24B:
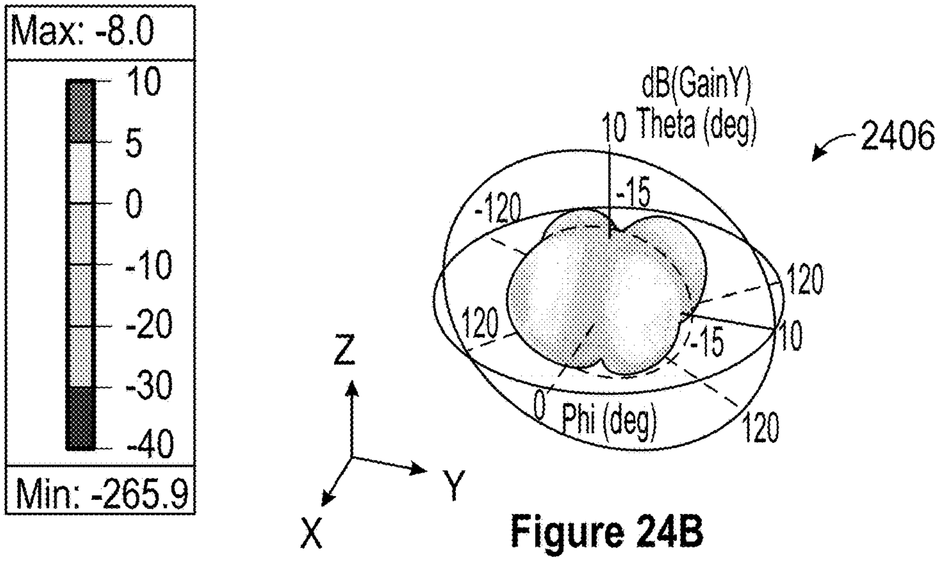
Figure 24C:
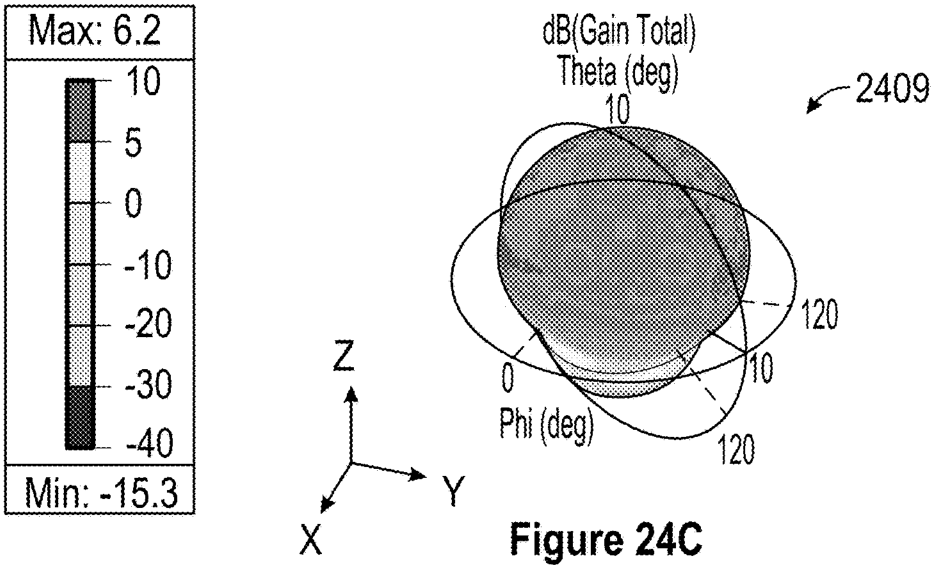
Figure 24D:
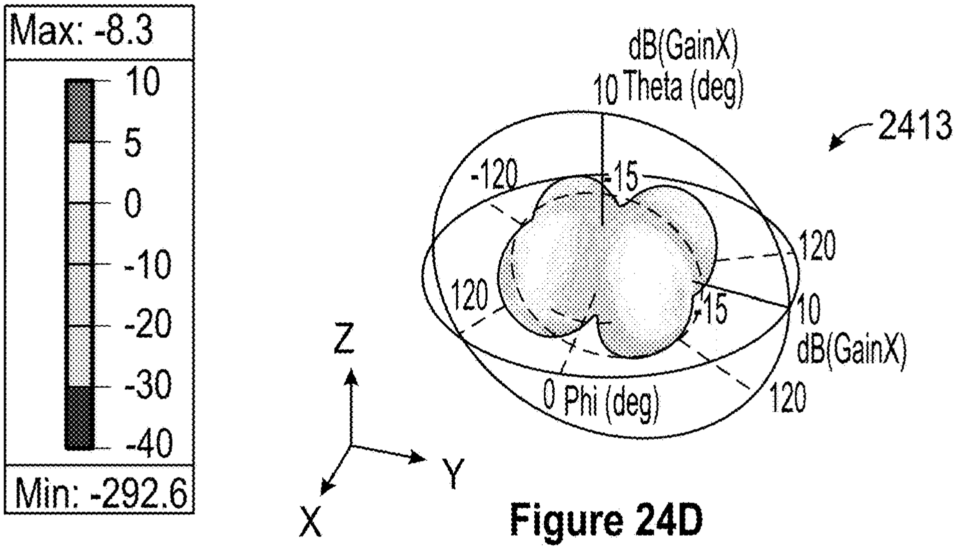
Figure 24E:
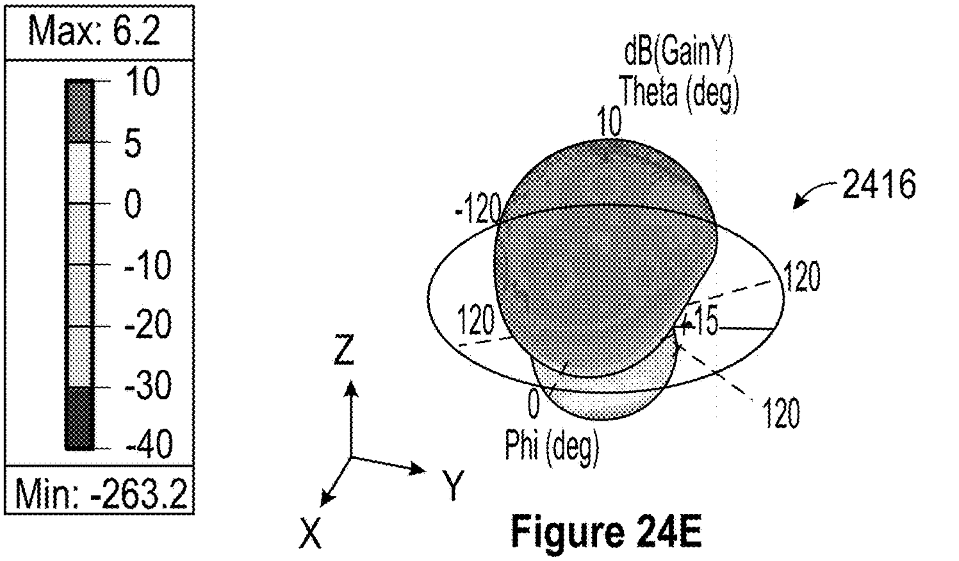
Figure 24F:
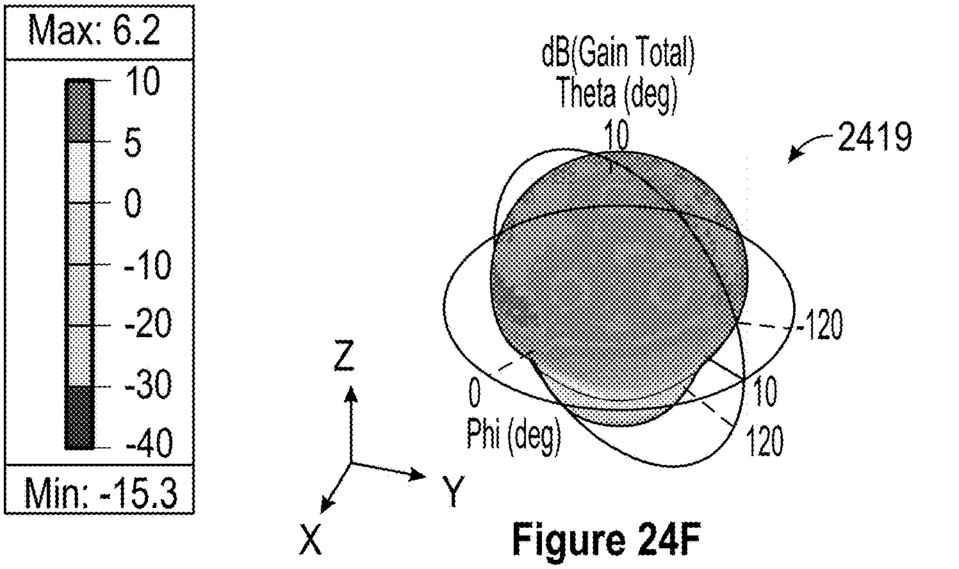
Figure 24G:
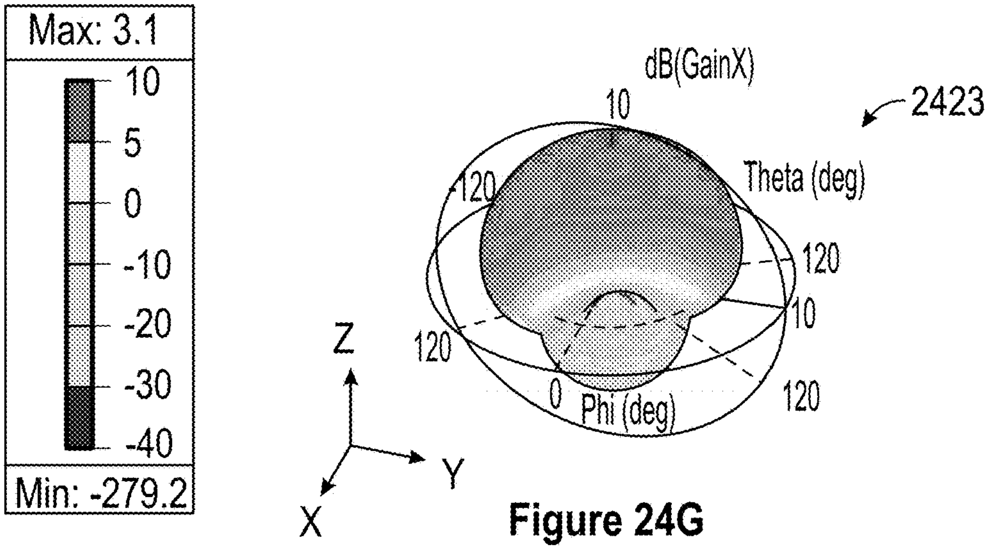
Figure 24H:
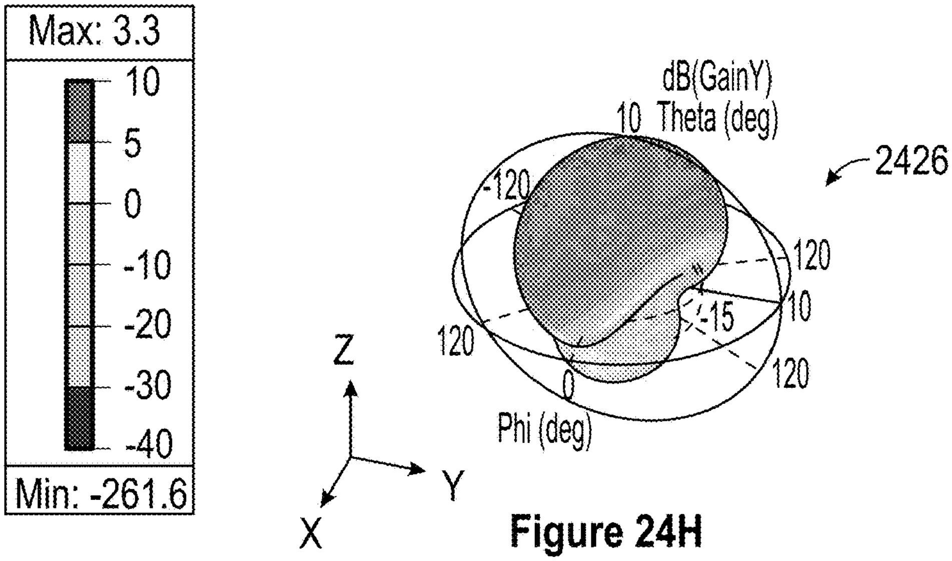
Figure 24I:
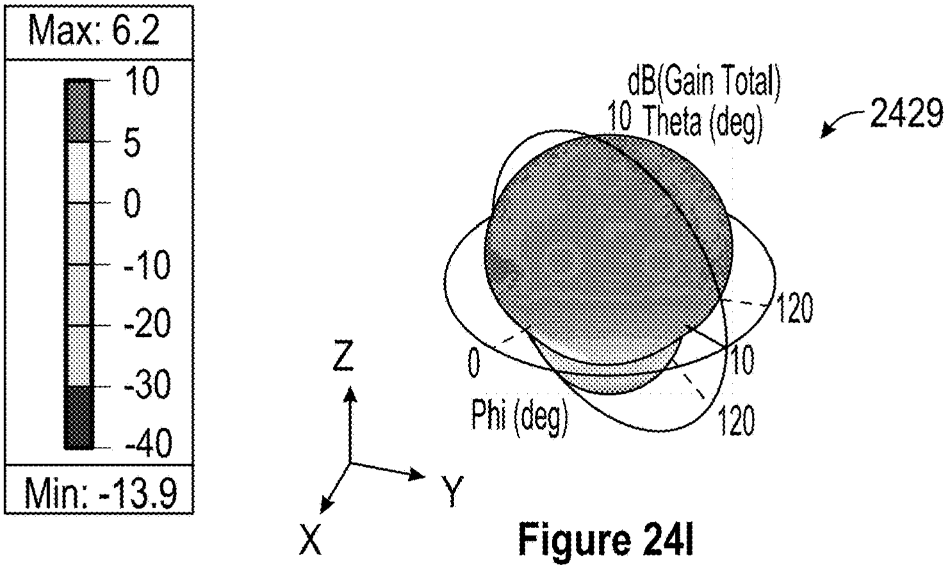
Figure 24J:
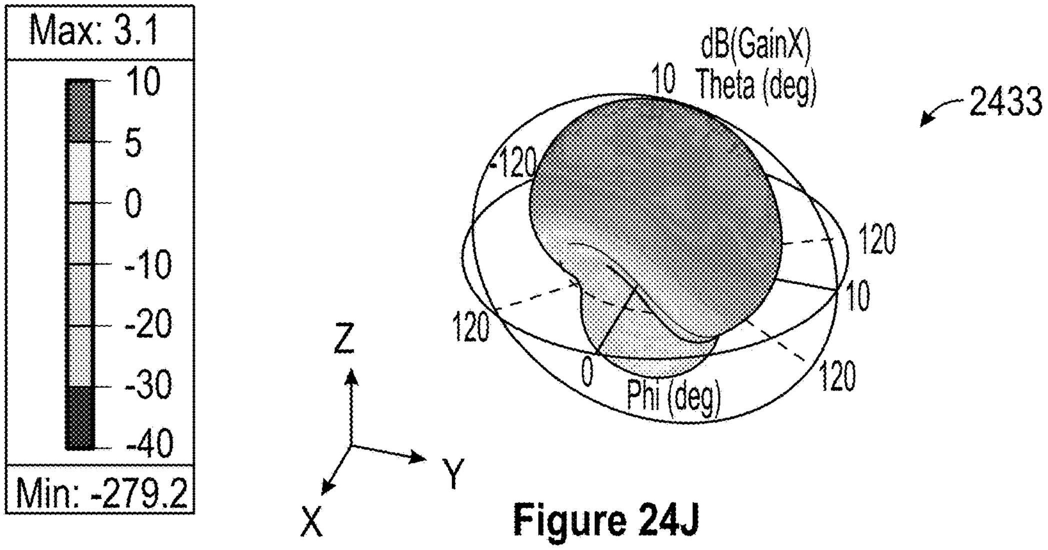
Figure 24K:
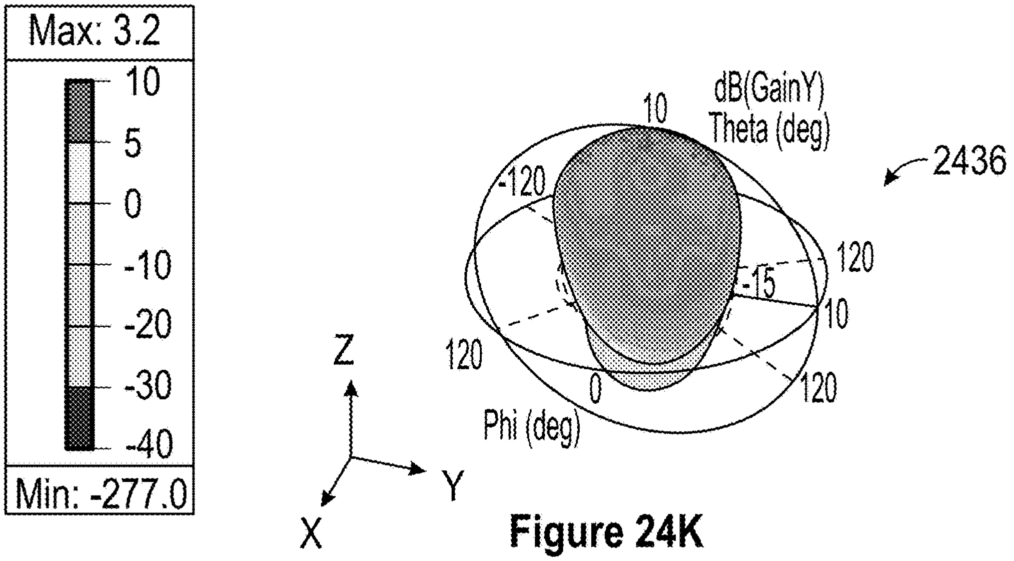
Figure 24L:
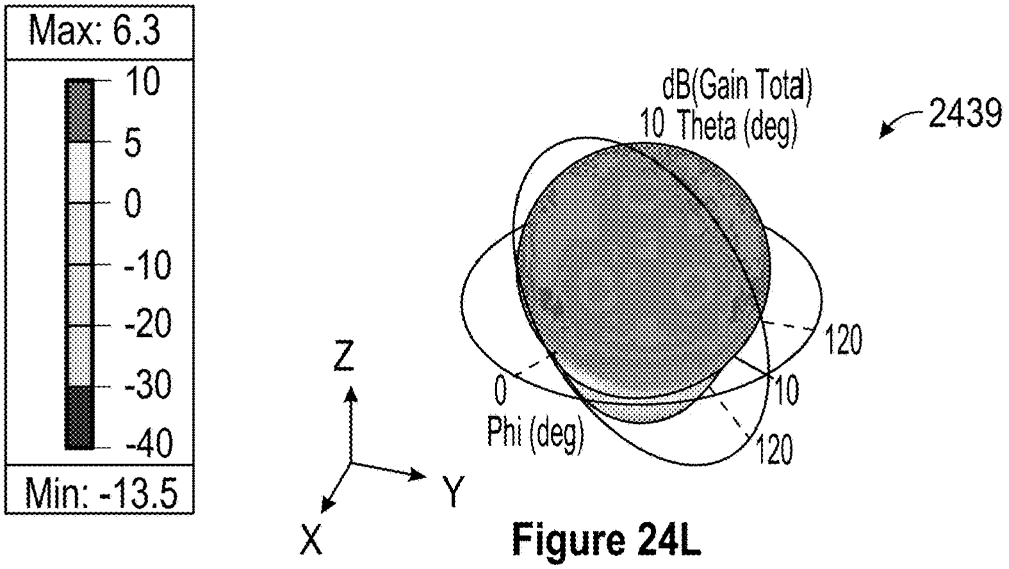
Figure 24M:
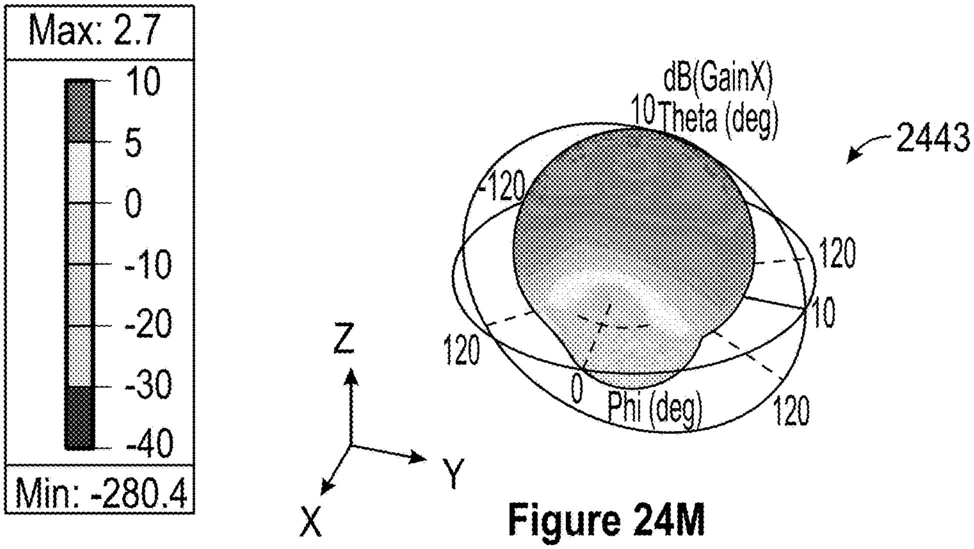
Figure 24N:
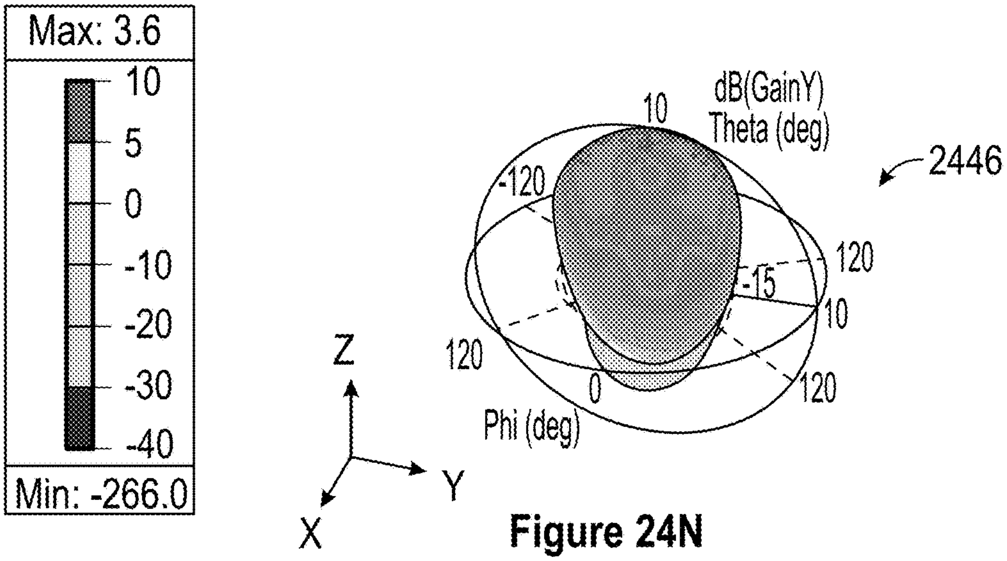
Figure 24O:
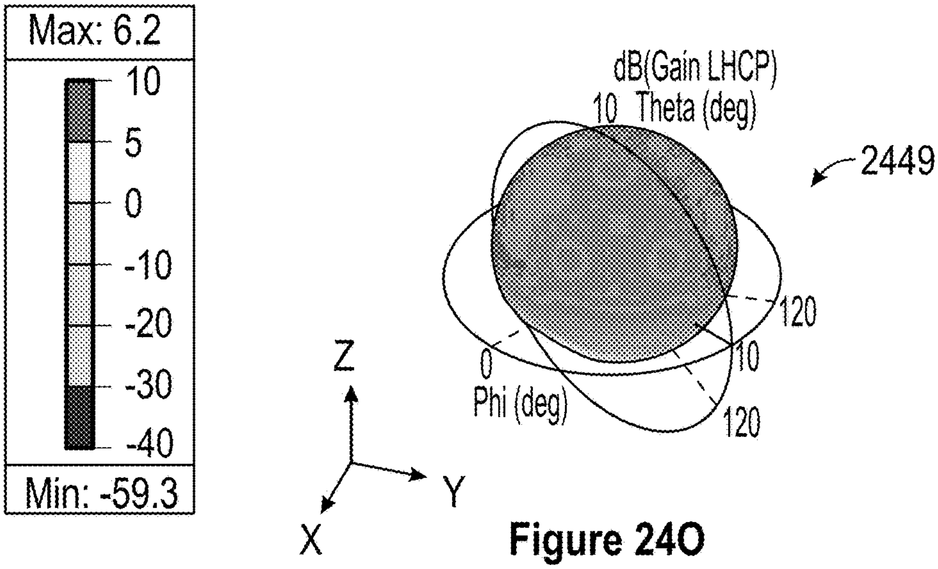
Figure 24P:
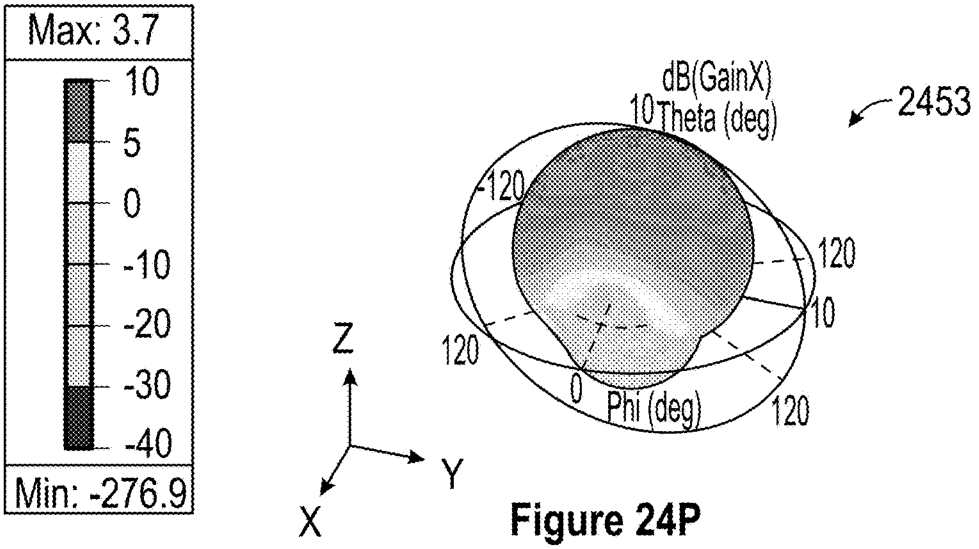
Figure 24Q:
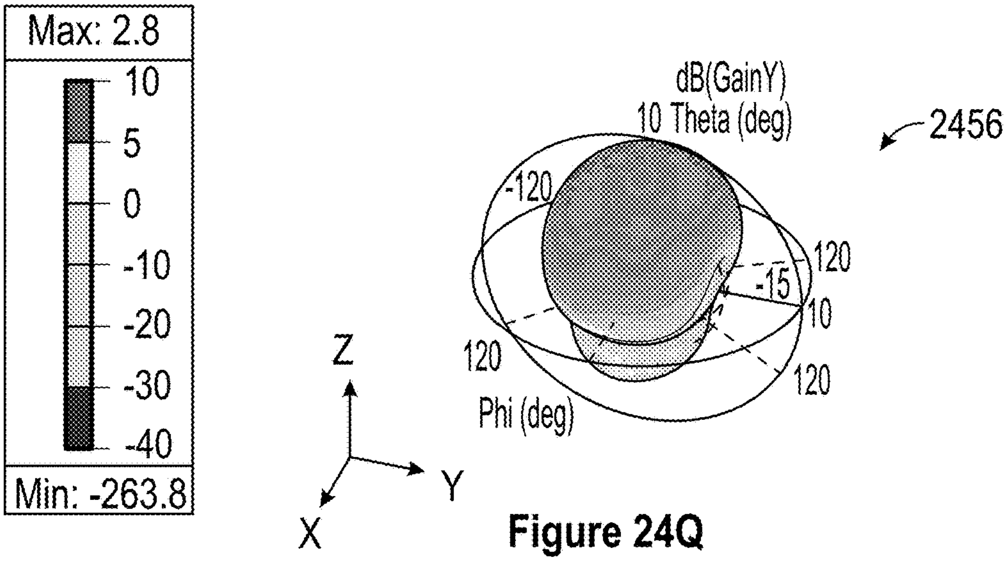
Figure 24R:
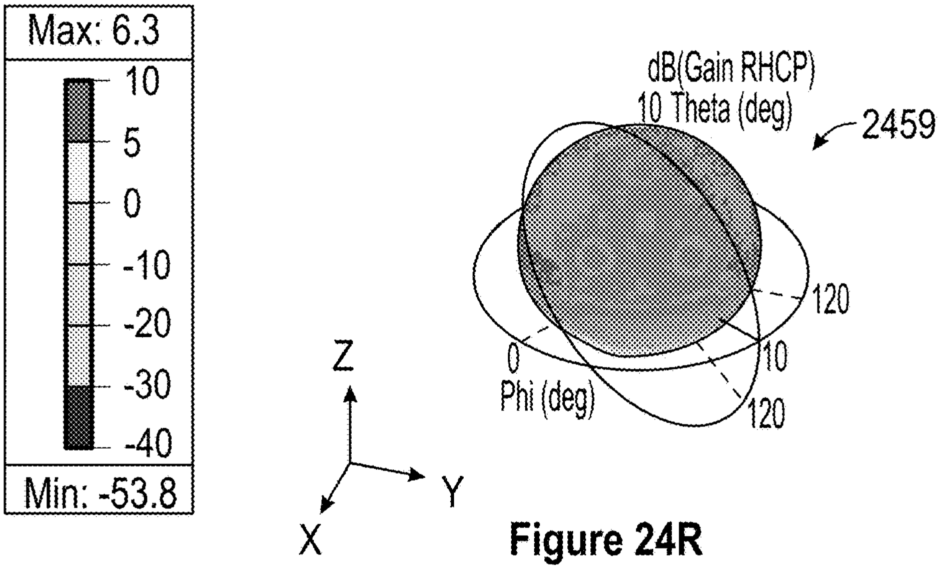

FIGS. 24A-24R illustrate gain plots of the operating states of the antenna tuning circuit 2300, in accordance with some embodiments. FIGS. 24A-24C illustrate the horizontal linear polarization setting and radiation field pattern (e.g., gain plot) in accordance with some embodiments. In the example of FIGS. 24A-24C, example radiation field patterns are shown corresponding to the antennas 2316*a*-2316*b*. FIG. 24A illustrates a radiation field pattern 2403 produced by the antenna 2316*a*, FIG. 24B illustrates a radiation field pattern 2406 produced by the antenna 2316*b*, and FIG. 24C illustrates a third radiation field pattern 2409 produced by both the antenna 2316*a* and the antenna 2316*b*. The example radiation field patterns correspond with the antenna 2316*a* having a 0-degree phase shift and the antenna 2316*b* being disconnected via the disconnect switch 2306*b*.

FIGS. 24D-24F illustrate the vertical linear polarization setting and radiation field pattern (e.g., gain plot) in accordance with some embodiments. In the example of FIGS. 24D-24F, example radiation field patterns are shown corresponding to the antennas 2316*a*-2316*b*. FIG. 24D illustrates a radiation field pattern 2413 produced by the antenna 2316*a*, FIG. 24E illustrates a radiation field pattern 2416 produced by the antenna 2316*b*, and FIG. 24F illustrates a third radiation field pattern 2419 produced by both the antenna 2316*a* and the antenna 2316*b*. The example radiation field patterns correspond with the antenna 2316*a* being disconnected via the disconnect switch 2306*a* and the antenna 2316*b* having a 0-degree phase shift.

FIGS. 24G-24I illustrate the linear in-phase polarization setting and radiation field pattern (e.g., gain plot) in accordance with some embodiments. In the example of FIGS. 24G-24I, example radiation field patterns are shown corresponding to the antennas 2316*a*-2316*b*. FIG. 24G illustrates a radiation field pattern 2423 produced by the antenna 2316*a*, FIG. 24H illustrates a radiation field pattern 2426 produced by the antenna 2316*b*, and FIG. 24I illustrates a third radiation field pattern 2429 produced by both the antenna 2316*a* and the antenna 2316*b*. The example radiation field patterns correspond with the antenna 2316*a* having a 0-degree phase shift and the antenna 2316*b* having a 0-degree phase shift.

FIGS. 24J-24L illustrate the linear out-of-phase polarization setting and radiation field pattern (e.g., gain plot) in accordance with some embodiments. In the example of FIGS. 24J-24L, example radiation field patterns are shown corresponding to the antennas 2316*a*-2316*b*. FIG. 24J illustrates a radiation field pattern 2433 produced by the antenna 2316*a*, FIG. 24K illustrates a radiation field pattern 2436 produced by the antenna 2316*b*, and FIG. 24L illustrates a third radiation field pattern 2439 produced by both the antenna 2316*a* and the antenna 2316*b*. The example radiation field patterns correspond with the antenna 2316*a* having a 0-degree phase shift and the antenna 2316*b* having a 180-degree phase shift.

FIGS. 24M-24O illustrate the LHCP setting and radiation field pattern (e.g., gain plot) in accordance with some embodiments. In the example of FIGS. 24M-24O, example radiation field patterns are shown corresponding to the antennas 2316*a*-2316*b*. FIG. 24M illustrates a radiation field pattern 2443 produced by the antenna 2316*a*, FIG. 24N illustrates a radiation field pattern 2446 produced by the antenna 2316*b*, and FIG. 24O illustrates a third radiation field pattern 2449 produced by both the antenna 2316*a* and the antenna 2316*b*. The example radiation field patterns correspond with the antenna 2316*a* having a 90-degree phase shift and the antenna 2316*b* having a 180-degree phase shift.

FIGS. 24P-24R illustrate the RHCP setting and radiation field pattern (e.g., gain plot) in accordance with some embodiments. In the example of FIGS. 24P-24R, example radiation field patterns are shown corresponding to the antennas 2316*a*-2316*b*. FIG. 24P illustrates a radiation field pattern 2453 produced by the antenna 2316*a*, FIG. 24Q illustrates a radiation field pattern 2456 produced by the antenna 2316*b*, and FIG. 24R illustrates a third radiation field pattern 2459 produced by both the antenna 2316*a* and the antenna 2316*b*. The example radiation field patterns correspond with the antenna 2316*a* having a 90-degree phase shift and the antenna 2316*b* having a 0-degree phase shift.

Figure 25A:
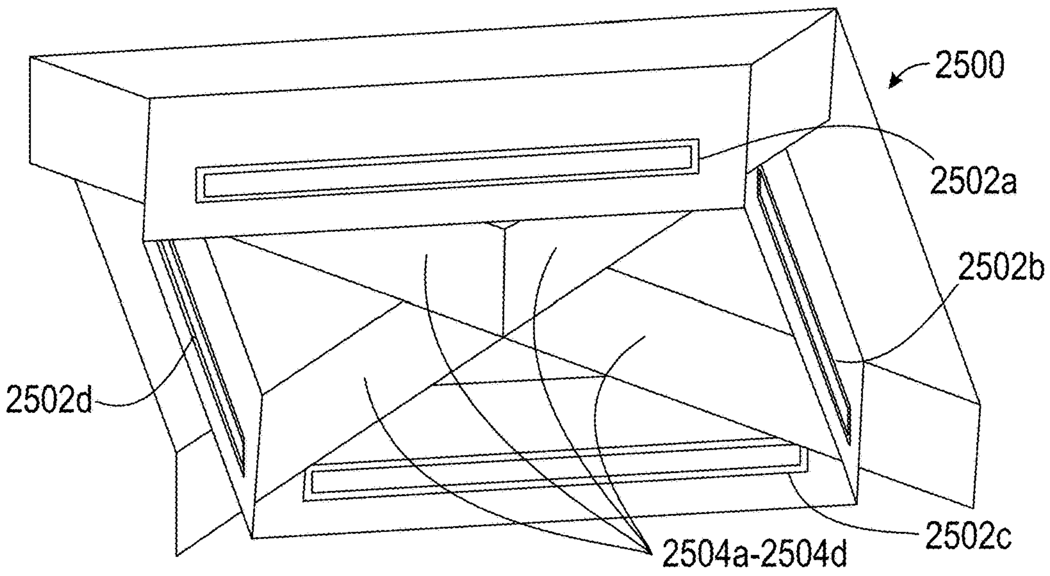
FIGS. 25A-25G illustrate example wireless-power transmission devices in accordance with some embodiments.
Figure 25B:
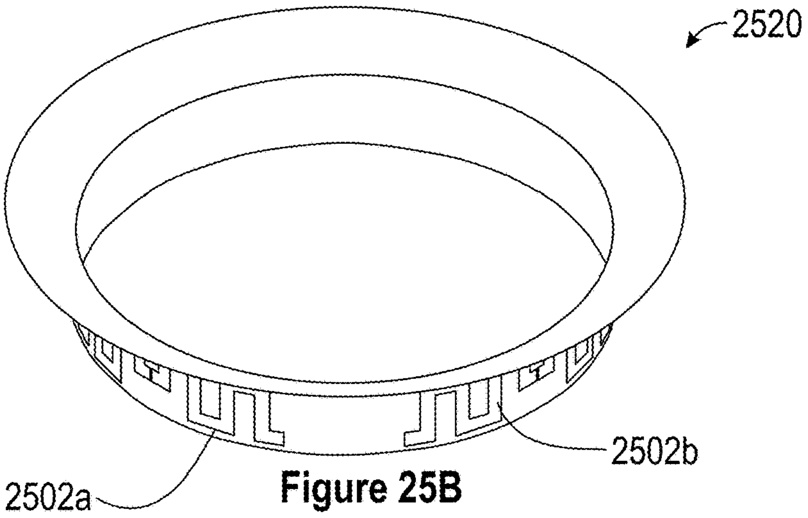
Figure 25C:
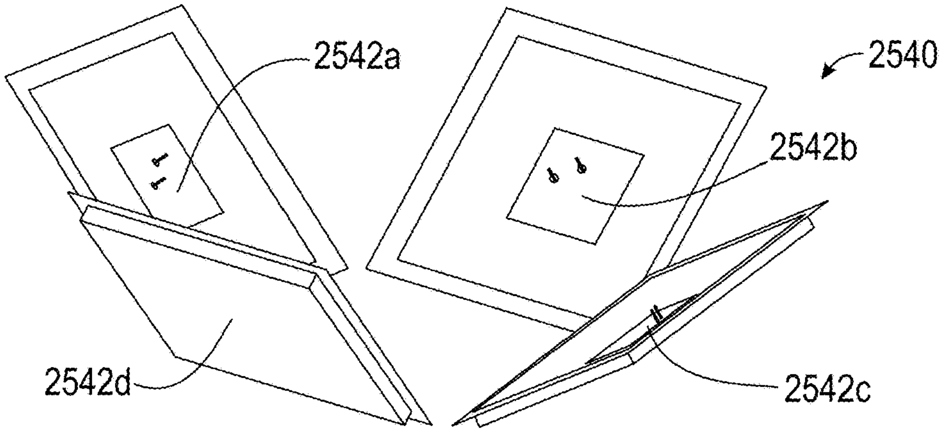

FIGS. 25A-25C illustrate example antenna arrays, in accordance with some embodiments. FIG. 25A illustrates an antenna array 2500 including four antennas 2502*a*-2502*d*. In some embodiments, the four antennas 2502*a*-2502*d* are sectorized folded dipole antennas. Each of the four antennas 2502*a*-2502*d* is a directional antenna and is linearly polarized. The antenna array 2500 further includes reflectors 2504*a*-2504*d*. The reflectors 2504*a*-2504*d* are configured to reflect WPT patterns produced by each of the four antennas 2502*a*-2502*d* such that a rear lobe of a radiation pattern of each of the four antennas 2502*a*-2502*d* is reflected in a direction of the main lobe (e.g., away from the antenna array 2500). In some embodiments, the reflectors 2504*a*-2504*b* reduce interference between each of the WPT patterns produced by each of the four antennas 2502*a*-2502*d*. The four antennas 2502*a*-2502*d* and the reflectors 2504*a*-2504*d* are configured to produce four directional WPT patterns to four distinct power zones. For example, the four directional WPT pattern each have a 90-degree bandwidth. In some embodiments, each of the four antennas 2502*a*-2502*b* operate independently to provide a distinct WPT pattern to each of the four power zones. For example, an antenna 2502*a* continuously provides a first WPT pattern (with a first gain and a first polarization) to a first power zone, a antenna 2502*b* dynamically provides a second WPT pattern (with a second gain and a second polarization) to a second power zone (e.g., the antenna 2502*b* emits the second WPT pattern when certain criterion are met and provides no WPT when the certain criterion are not met), and/or a third antenna 2502*c* provides no WPT pattern to a third power zone. In some embodiments, at least two of the four antennas 2502*a*-2502*d* operate in a group and/or groups to provide an identical WPT pattern to at least two of the four power zones. In some embodiments, the four antennas 2502*a*-2502*d* are arranged on the antenna array 2500 in a rectangular shape (e.g., a square shape), as illustrated in FIG. 25A. In some embodiments, the four antennas 2502*a*-2502*d* are arranged on a antenna array 2520 in a circular shape as illustrated in FIG. 25B. In some embodiments, the antenna array 2520 has a diameter in the range of 100 mm to 500 mm (e.g., 200 mm) and a height in the range of 10 mm to 200 mm (e.g., 50 mm).

FIG. 25C illustrates a third antenna array 2540 including four antennas 2542*a*-2542*d*. In some embodiments, the four antennas 2542*a*-2542*d* are stacked dual-patch antennas (e.g., the stacked patch antennas described in reference to FIGS. 22A-22C). In some embodiments, each of the four antennas 2542*a*-2542*d* produce four directional WPT patterns to each of the four power zones. In some embodiments, each of the antennas 2542*a*-2542*d* has dimensions in the range of 1 mm to 200 mm. For example, each antenna has a size of 120 mm by 120 mm by 9 mm.

Figure 25D:
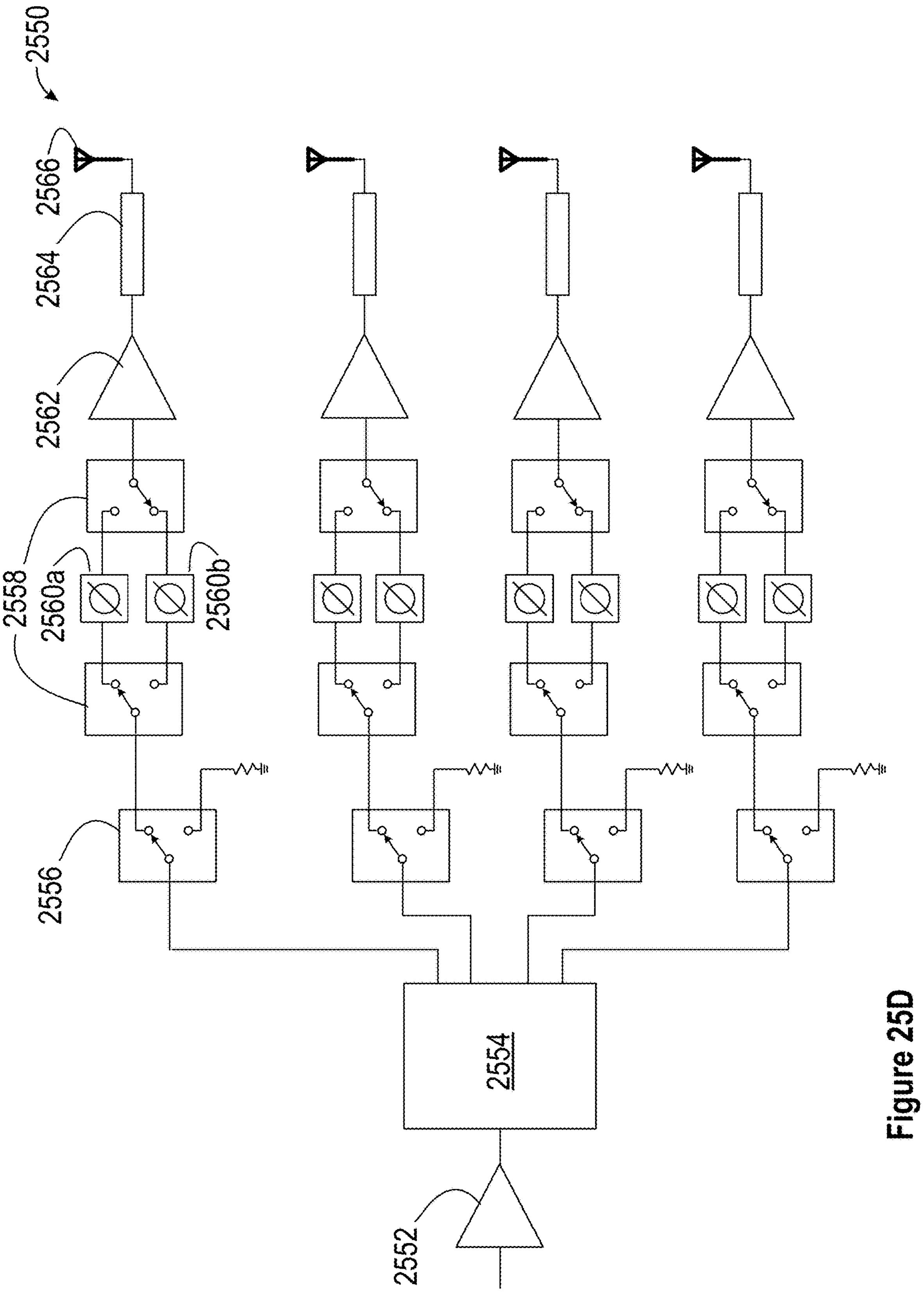

FIG. 25D illustrates an antenna tuning circuit 2550 for providing WPT signals to the antenna arrays described in reference to FIGS. 25A-25C, in accordance with some embodiments. In some embodiments, the antenna tuning circuit 2550 includes a preamplifier 2552, a splitter 2554 (e.g., a programmable splitter), and four antenna control circuits. Each of the four antenna control circuits includes a disconnect switch 2556 (e.g., a signal termination switch), a pair of phase-select switches 2558, at least two phase shifters 2560*a*-2560*b* (e.g., two phase shifters as illustrated in FIG. 25D) (e.g., a 90-degree phase shifter, a 180-degree phase shifter, etc.), an amplifier 2562 (e.g., a variable gain amplifier in the range of 5 dBm-100 dBm), a load balancing component 2564 (e.g., an impedance matching component configured to match an impedance of an input signal to an impedance of a respective antenna), and an antenna 2566 (e.g., one of the four antennas 2502*a*-2502*d* and/or one of the four antennas 2542*a*-2542*d*). In some embodiments, the preamplifier 2552, the splitter 2554, each of the four disconnect switches, each of the four pairs of phase-select switches, and each of the four amplifiers are separately configurable by a controller IC to provide the four directional WPT patterns to each of the four power zones, described in reference to FIGS. 25A-25C.

Figure 25E:
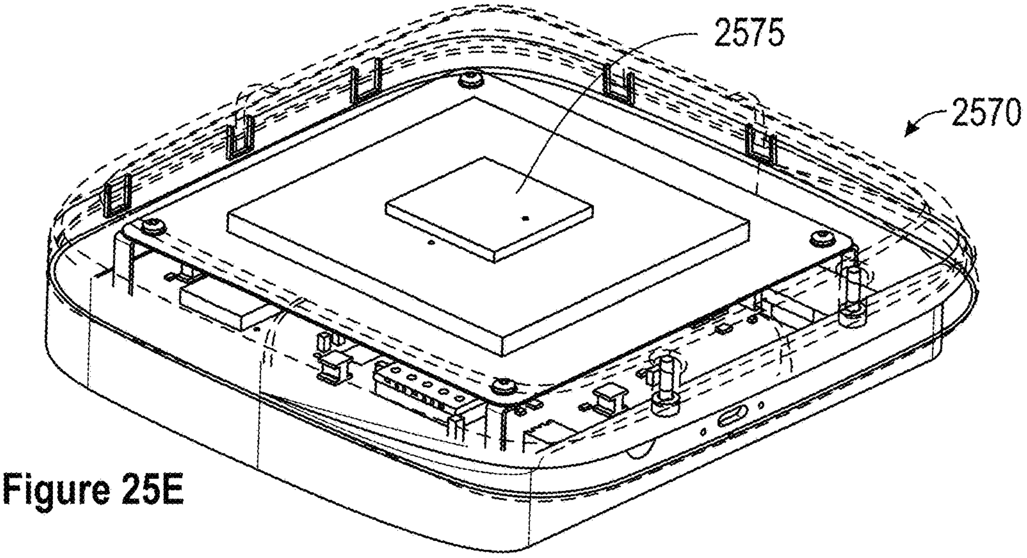
Figure 25F:
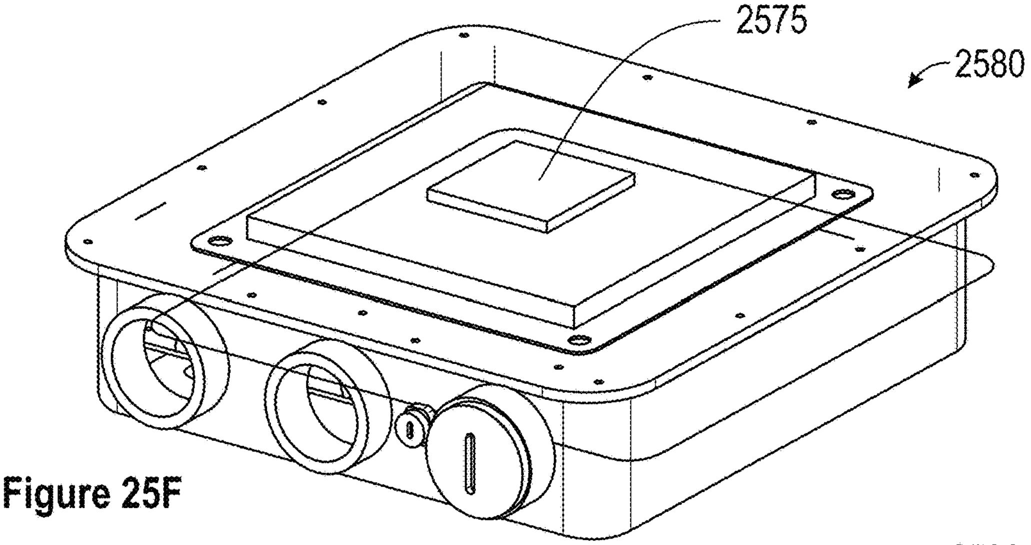
Figure 25G:
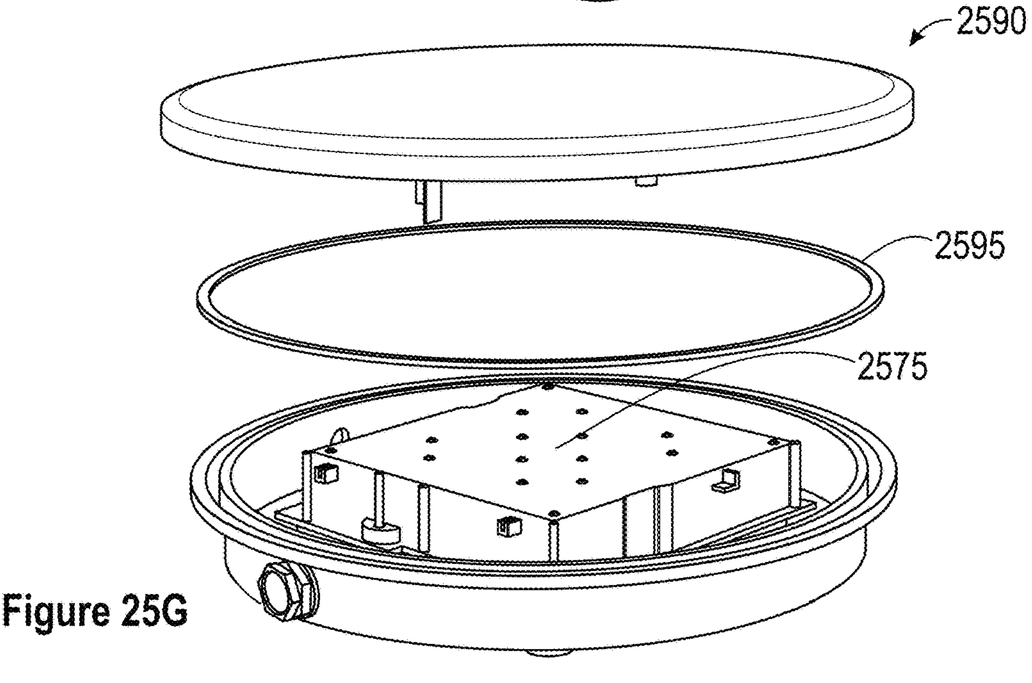

FIG. 25E-25G illustrate example housings for a multi-patch antenna array 2575 (e.g., the stacked patch antennas described in reference to FIGS. 22A-22C and/or multi patch antennas described in reference to FIG. 26A), in accordance with some embodiments. FIG. 25E illustrates an indoor housing 2570 for the multi-patch antenna array 2575. FIG.

25E illustrates a outdoor housing 2580 for the multi-patch antenna array 2575. FIG. 25F illustrates a outdoor 2590 housing for the multi-patch antenna array 2575. In some embodiments, the outdoor housing 2580 and the outdoor housing 2590 are waterproof (e.g., pieces of the outdoor housing 2580 and the outdoor housing 2590 are coupled with an O-ring gasket 2595 as illustrated in FIG. 25G). In some embodiments, the indoor housing 2570, the outdoor housing 2580, and the outdoor housing 2590 include at least one mounting mechanism for mounting the housing to a surface (e.g., a wall, a ceiling, etc.).

Figure 26A:
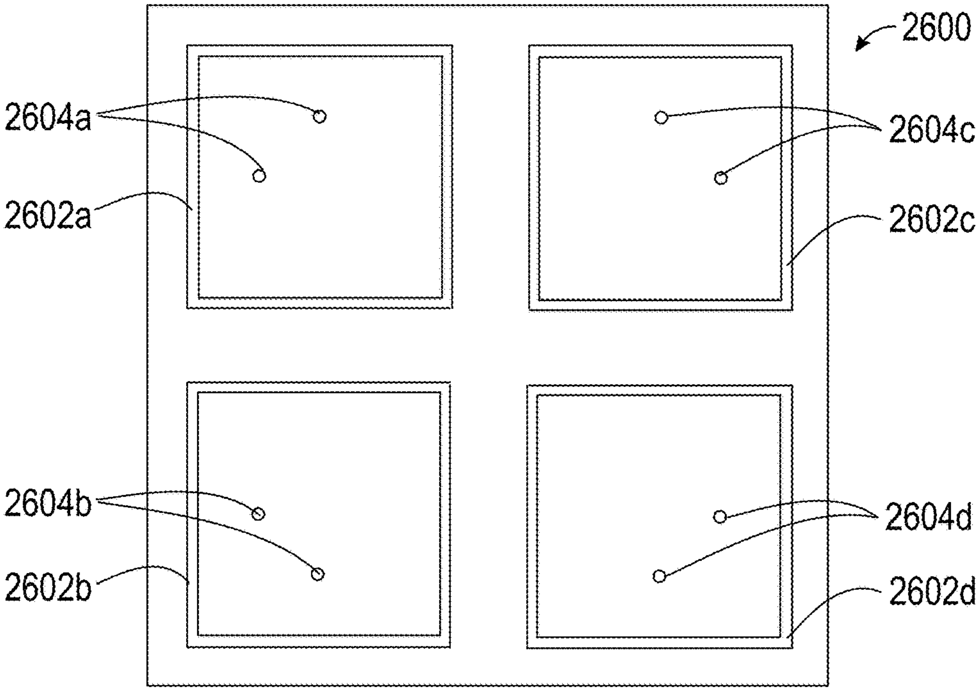
FIGS. 26A-26I illustrate example circuits for wireless-power transmission in accordance with some embodiments.

FIG. 26A illustrates a multi-patch antenna array 2600, in accordance with some embodiments. The multi-patch antenna array 2600 includes a plurality of patch antennas 2602*a*-2602*d* (e.g., four patch antennas, as illustrated in FIG. 26A). In some embodiments, each of the plurality of antennas 2602*a*-2602*d* is a stacked patch antenna (e.g., the stacked patch antennas described in reference to FIGS. 22A-22C). Each of the plurality patch antennas 2602*a*-2602*d* includes a respective pair of feed ports 2604*a*-2604*d* for providing WPT signals to the plurality of patch antennas 2602*a*-2602*d*. In some embodiments, the plurality of patch antennas 2602*a*-2602*d* and the respective pairs of feed ports 2604*a*-2604*d* are arranged such that the respective pairs of feed ports 2604*a*-2604*d* have a circular arrangement (e.g., as illustrated in FIG. 26A). The circular arrangement allows for improved isolation between the respective pairs of feed ports 2604*a*-2604*d*. In some embodiments, each of the respective pairs of feed ports 2604*a*-2604*d* are separately configurable. The multi-patch antenna array 2600 is reconfigurable to produce a plurality of WPT patterns including: a horizontal linear polarized directive WPT pattern, a vertical linear polarized directive WPT pattern, an LHCP directive WPT pattern, an RHCP directive WPT pattern, and/or at least one non-directive WPT pattern (e.g., as shown in Table 7 and in FIGS. 26D-26I). In some embodiments, the multi-patch antenna array 2600 is rectangular-shaped and has dimensions between 6 in. by 6 in. and 24 in. by 24 in. (e.g., 12 in. by 12 in.). In some embodiments, the multi-patch antenna array 2600 includes a plurality of spacers, each of the plurality of spacers separating a respective patch antenna are spaced from a back layer (e.g., a separation of 11 mm). In some embodiments, the multi-patch antenna array 2600 is configured to operate in a range of 10 MHz to 10 GHz (e.g., 900 MHz). In some embodiments, a WPT transmitter includes a coplanar multiband dual linear-polarized structure with dynamic polarization/pattern switching and integrated matching.

In some embodiments, the multi-patch antenna array 2600 includes a circular feeding arrangement (e.g., illustrated by the feed ports 2604*a*-2604*d*), which allows miniaturization of the antenna array dimensions. In some embodiments, the multi-patch antenna array 2600 is configured for reconfigurable directive patterns that include linear-polar (x-pol) (e.g., with peak gain of 11.6 dBi), linear-polar (y-pol) (e.g., with peak gain of 11.6 dBi), circular-polar (left-hand) (e.g., with peak gain of 11.6 dBi), and circular-polar (right-hand) (e.g., with peak gain of 11.6 dBi). In some embodiments, the multi-patch antenna array 2600 is reconfigurable for non-directive patterns (e.g., aiming for side coverage).

Figure 26B:
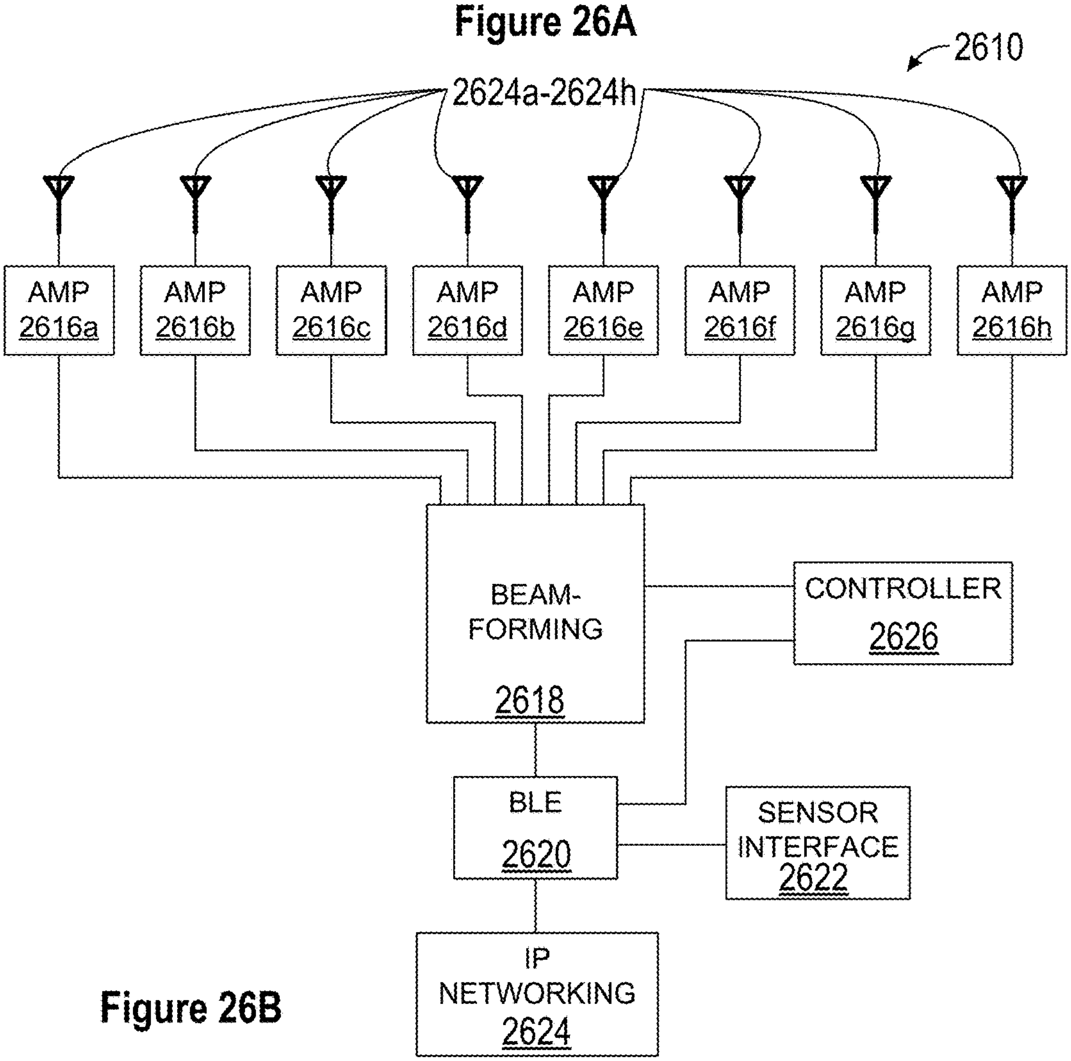

FIG. 26B illustrates an integrated transmitter platform 2610 for providing WPT signals to the multi-patch antenna array 2600, in accordance with some embodiments. The integrated transmitter platform 2610 includes eight antennas 2614*a*-2614*h* (e.g., corresponding to the respective pairs of feed ports 2604*a*-2604*d*, as illustrated in FIG. 26A), eight amplifiers 2616*a*-2616*h* (e.g., variable gain amplifiers), a beam-forming module 2618 (e.g., an antenna tuning circuit 2630 described in reference to FIG. 26C), a Bluetooth module 2620, a sensor interface 2622, an Internet protocol (IP) networking interface 2624, and a controller IC 2626. The controller IC 2626 is configured to control the beam-forming module 2618 and the eight amplifiers 2616*a*-2616*h* to produce the plurality of WPT patterns (e.g., the WPT patterns discussed in reference to FIG. 26A) at the eight feed ports 2614*a*-2614*h*. In some embodiments, the integrated transmitter platform 2610 includes additional features described in reference to the integrated transmitter platform 2320 and the alternate integrated transmitter platform 2380. In some embodiments, the integrated transmitter platform 2610 is configurable to have selectable fixed phase and on/off patterns (e.g., including side-coverage patterns).

Table 7 shows how each of the eight feed ports 2614*a*-2614*h* is configured to produce the horizontal linear polarized directive WPT pattern, the vertical linear polarized directive WPT pattern, the LHCP directive WPT pattern, the RHCP directive WPT pattern, and a non-directive WPT pattern. In some embodiments, each of the eight feed ports 2614*a*-2614*h* is configured to have a same magnitude (unless a respective antenna is configured to be off). Table 1 shows the phase shift at each of the eight feed ports 2614*a*-2614*h* to achieve a desired WPT pattern.

TABLE 7

Example Antenna Configurations

| Antenna | Horizontal | Vertical | LHCP | RHCP | Non-Directive |
|---|---|---|---|---|---|
| 2614a | 0 Degrees | Off | 0 Degrees | 0 Degrees | 0 Degrees |
| 2614b | Off | 0 Degrees | 90 Degrees | 90 Degrees | 90 Degrees |
| 2614c | 180 Degrees | Off | 180 Degrees | 180 Degrees | −90 Degrees |
| 2614d | Off | 0 Degrees | 90 Degrees | 90 Degrees | 180 Degrees |
| 2614e | 180 Degrees | Off | 180 Degrees | 180 Degrees | 0 Degrees |
| 2614f | Off | 180 Degrees | −90 Degrees | −90 Degrees | 90 Degrees |
| 2614g | 0 Degrees | Off | 0 Degrees | 0 Degrees | − 90 Degrees |
| 2614h | Off | 180 Degrees | −90 Degrees | −90 Degrees | 180 Degrees |

Figure 26C:
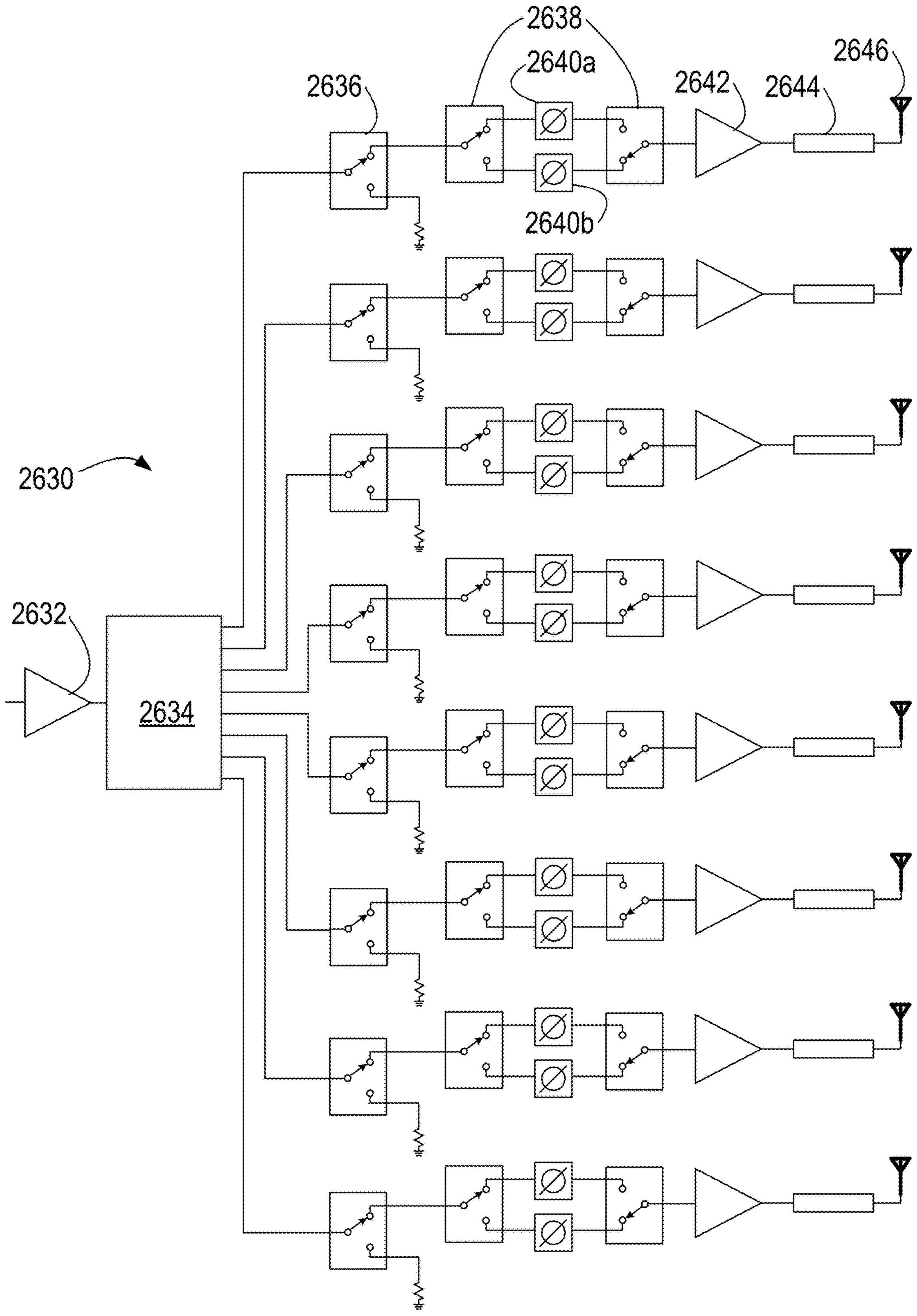

FIG. 26C illustrates an antenna tuning circuit 2630 for producing the plurality of WPT patterns, in accordance with some embodiments. In some embodiments, the antenna tuning circuit 2630 comprises the eight feed ports 2614*a*-2614*h*, the eight amplifiers 2616*a*-2617*h*, and the beam-forming module 2618, described in reference to FIG. 26B. In some embodiments, the antenna tuning circuit 2630 includes a preamplifier 2632, a splitter 2634, and eight antenna control circuits (e.g., similar to the antenna control circuits described in reference to FIG. 25D). Each of the eight antenna control circuits includes a disconnect switch 2636, a pair of phase-select switches 2638, at least two phase shifters 2640*a*-2640*b* (e.g., a 90-degree phase shifter, a 180-degree phase shifter, a −90-degree phase shifter etc.), an amplifier 2642, and a feed port 2646 (e.g., one of the respective pairs of feed ports 2602*a*-2602*d* described in reference to FIG. 26A and/or one of the eight feed ports 2612*a*-2612*h* described in reference to FIG. 26B). In some embodiments, the preamplifier 2632, the splitter 2634, each of the eight disconnect switches, each of the eight pairs of phase-select switches, and each of the eight amplifiers are separately configurable by the controller IC 2626. In some embodiments, the antenna tuning circuit 2630 is configured to produce the plurality of WPT patterns (e.g., the WPT patterns discussed in reference to FIG. 26A and Table 7). In some embodiments, a portion of the eight control circuits do not include the pair of phase-select switches 2638 and the at least two phase shifters (e.g., as shown in Table 7, antenna 2614*a* does not need the pair of phase-select switches 2638 and the at least two phase shifters since it only needs to be configured to have a fixed 0-degree phase shift or be off). In some embodiments, a portion of the eight control circuits include more than two phase-select switches 2638 and the more than two phase shifters (e.g., as shown in Table 7, antenna 2614*f* has three phase-select switches and three phase shifters to switch between a 180-degree phase shift, a −90-degree phase shift and a 90-degree phase shift). In some embodiments, the antenna tuning circuit 2630 is configured to have all amplitudes matched.

Figure 26D:
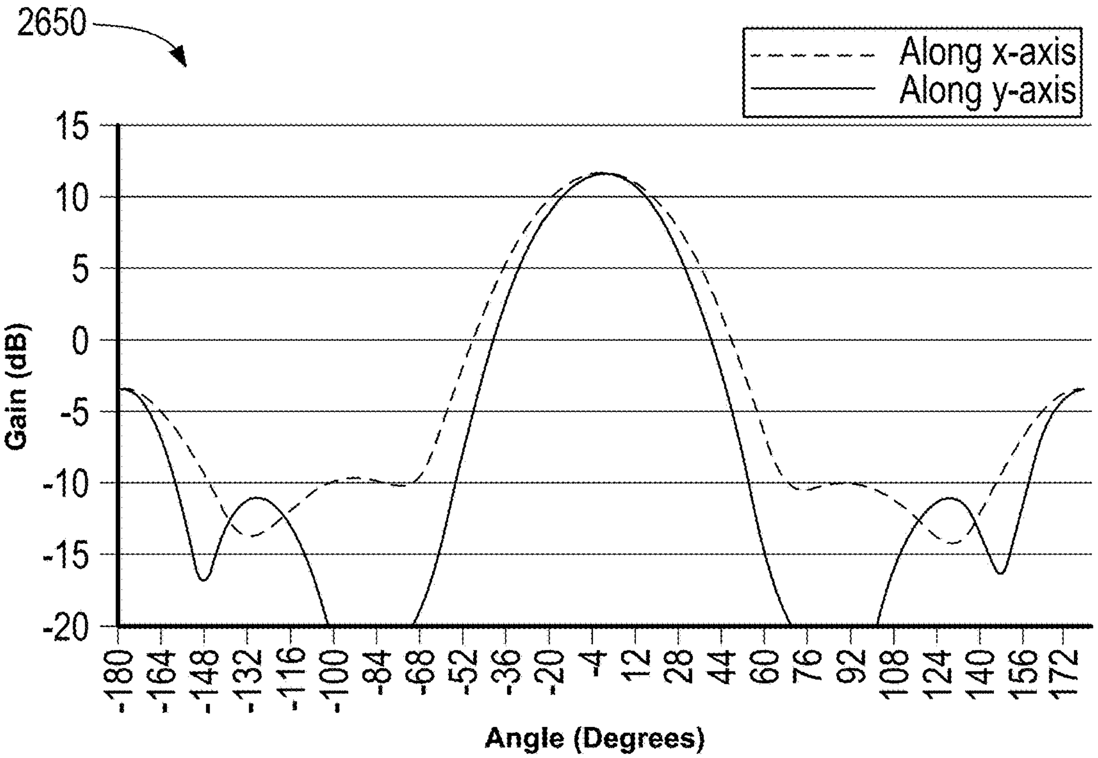

FIG. 26D illustrates a gain plot 2650 of the horizontal linear polarized directed WPT pattern produced by the antenna tuning circuit 2630 at the multi-patch antenna array 2600, in accordance with some embodiments. The gain plot 2650 shows a gain of the horizontal linear polarized directed WPT pattern based on an angle relative to a face of the multi-patch antenna array 2600. As illustrated in FIG. 26D, the horizontal linear polarized directed WPT pattern has a peak gain at a 0-degree angle from the face of the multi-patch antenna array 2600 along both an x-axis and a y-axis as it a directional WPT pattern.

Figure 26E:
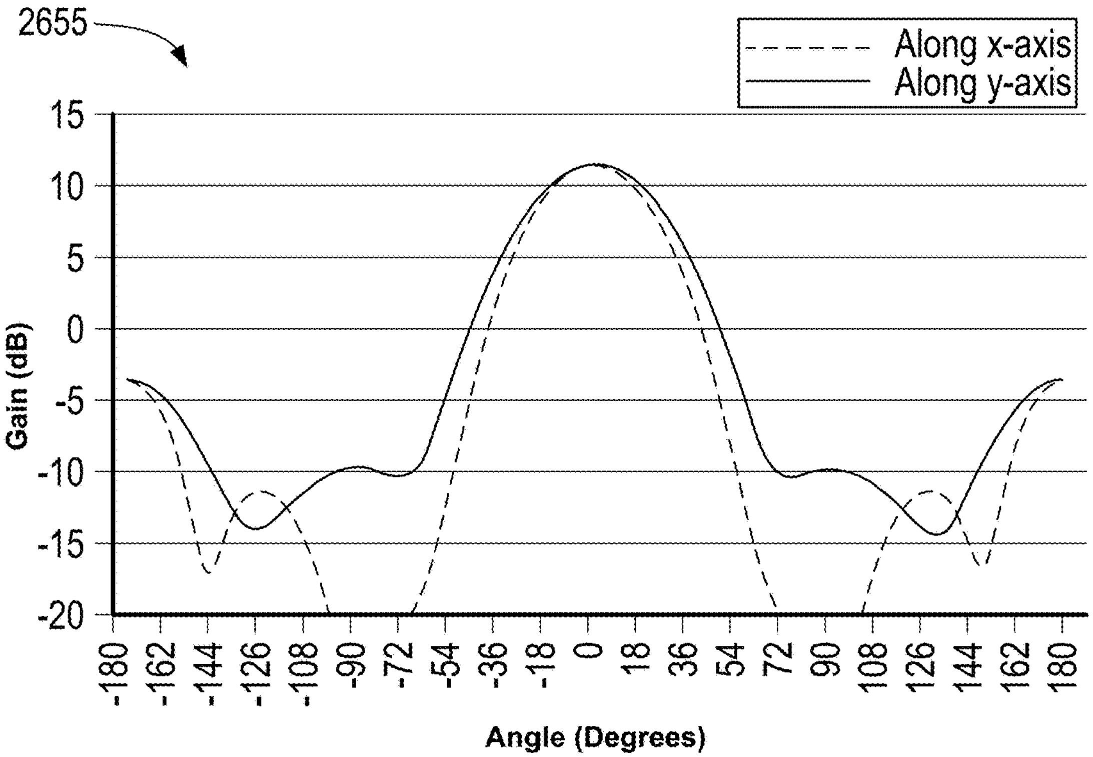

FIG. 26E illustrates a gain plot 2655 of the vertical linear polarized directed WPT pattern produced by the antenna tuning circuit 2630 at the multi-patch antenna array 2600, in accordance with some embodiments. The gain plot 2655 shows a gain of the vertical linear polarized directed WPT pattern based on the angle relative to the face of the multi-patch antenna array 2600. As illustrated in FIG. 26E, the vertical linear polarized directed WPT pattern has a peak gain at a 0-degree angle from the face of the multi-patch antenna array 2600 along both an x-axis and a y-axis as it a directional WPT pattern.

Figure 26F:
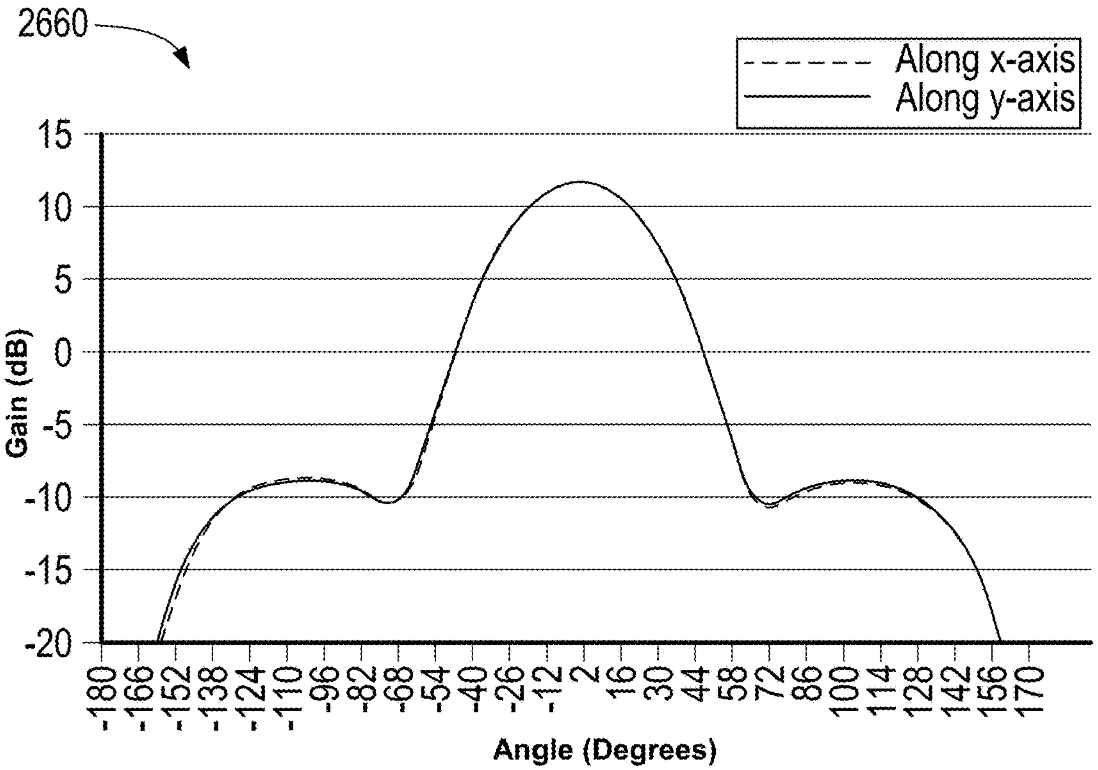

FIG. 26F illustrates a third gain plot 2660 of the LHCP directed WPT pattern produced by the antenna tuning circuit 2630 at the multi-patch antenna array 2600, in accordance with some embodiments. The third gain plot 2660 shows a gain of the LHCP directed WPT pattern based on the angle relative to the face of the multi-patch antenna array 2600. As illustrated in FIG. 26F, the LHCP directed WPT pattern has a peak gain at a 0-degree angle from the face of the multi-patch antenna array 2600 along both an x-axis and a y-axis as it a directional WPT pattern.

Figure 26G:
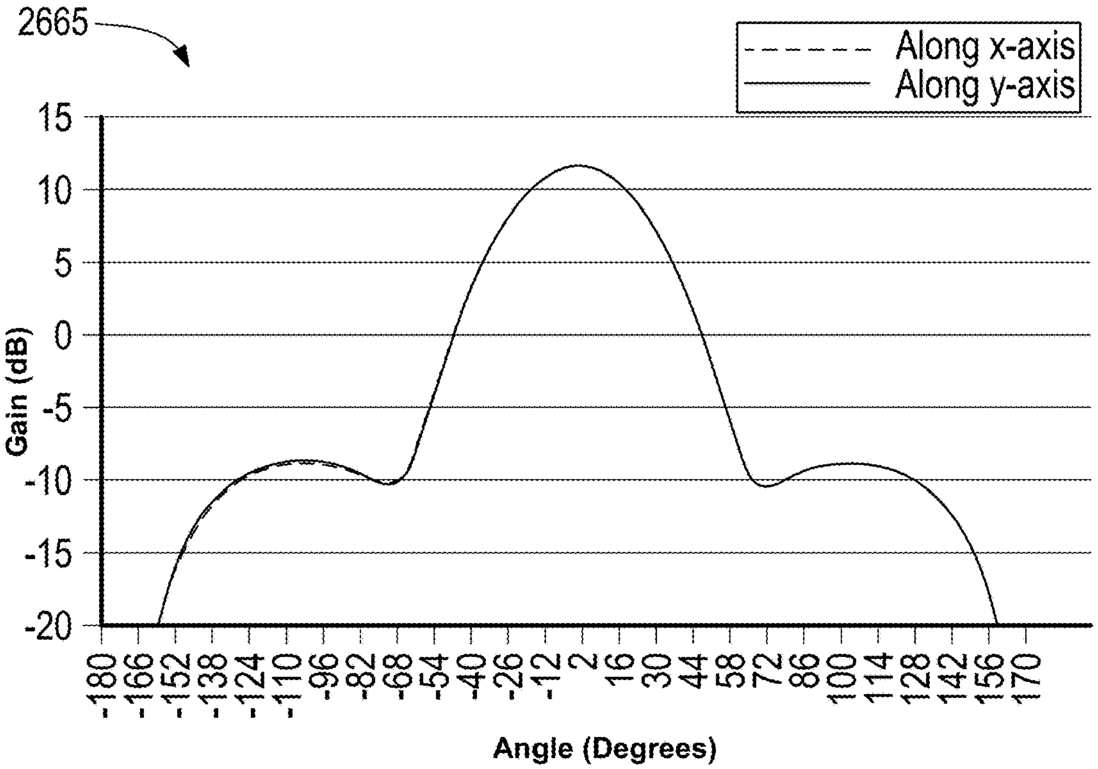

FIG. 26G illustrates a fourth gain plot 2665 of the RHCP directed WPT pattern produced by the antenna tuning circuit 2630 at the multi-patch antenna array 2600, in accordance with some embodiments. The fourth gain plot 2665 shows a gain of the RHCP directed WPT pattern based on the angle relative to the face of the multi-patch antenna array 2600. As illustrated in FIG. 26G, the RHCP directed WPT pattern has a peak gain at a 0-degree angle from the face of the multi-patch antenna array 2600 along both an x-axis and a y-axis as it a directional WPT pattern.

Figure 26H:
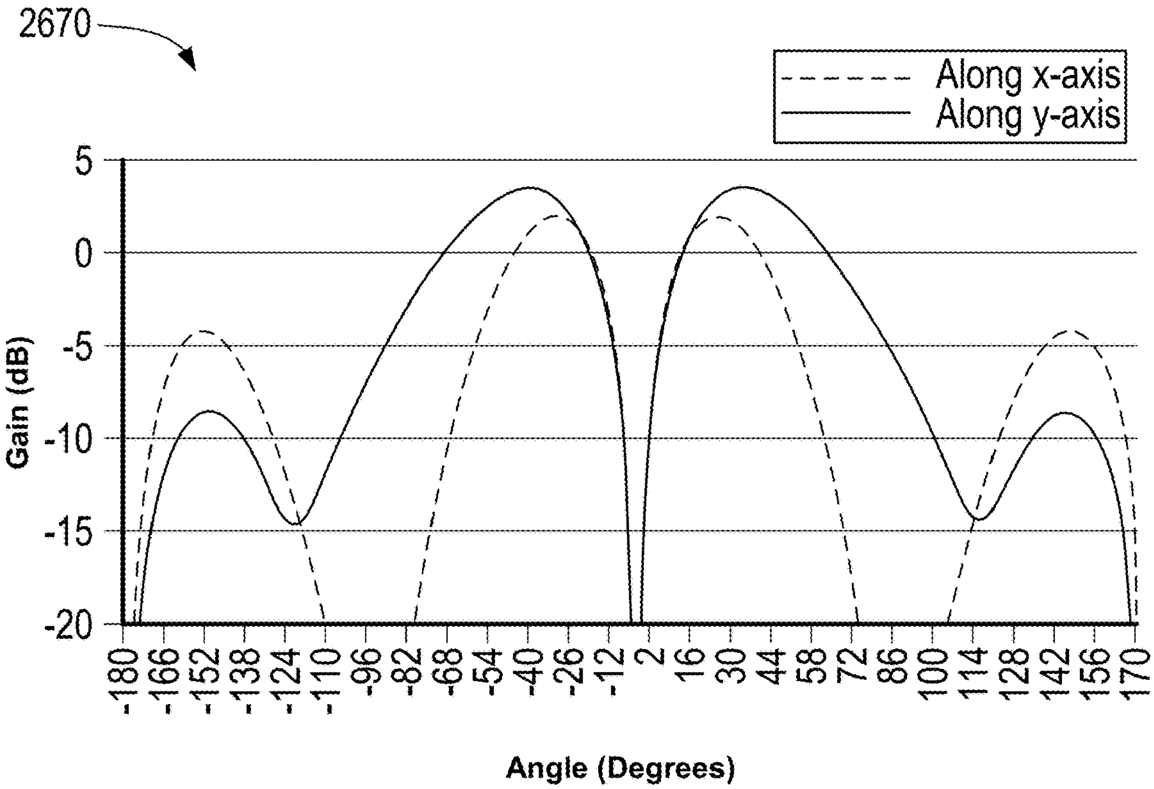

FIG. 26H illustrates a fifth gain plot 2670 of a vertical linear polarized non-directive WPT pattern produced by the antenna tuning circuit 2630 at the multi-patch antenna array 2600, in accordance with some embodiments. The fifth gain plot 2670 shows a gain of the vertical linear polarized non-directive WPT pattern based on the angle relative to the face of the multi-patch antenna array 2600. As illustrated in FIG. 26H, the vertical linear polarized non-directive WPT pattern has a peak gain at a 23-degree angle from the face of the multi-patch antenna array 2600 along an x-axis and a 33-degree angle from the face of the multi-patch antenna array 2600 along a y-axis as it a non-directional WPT pattern.

Figure 26I:
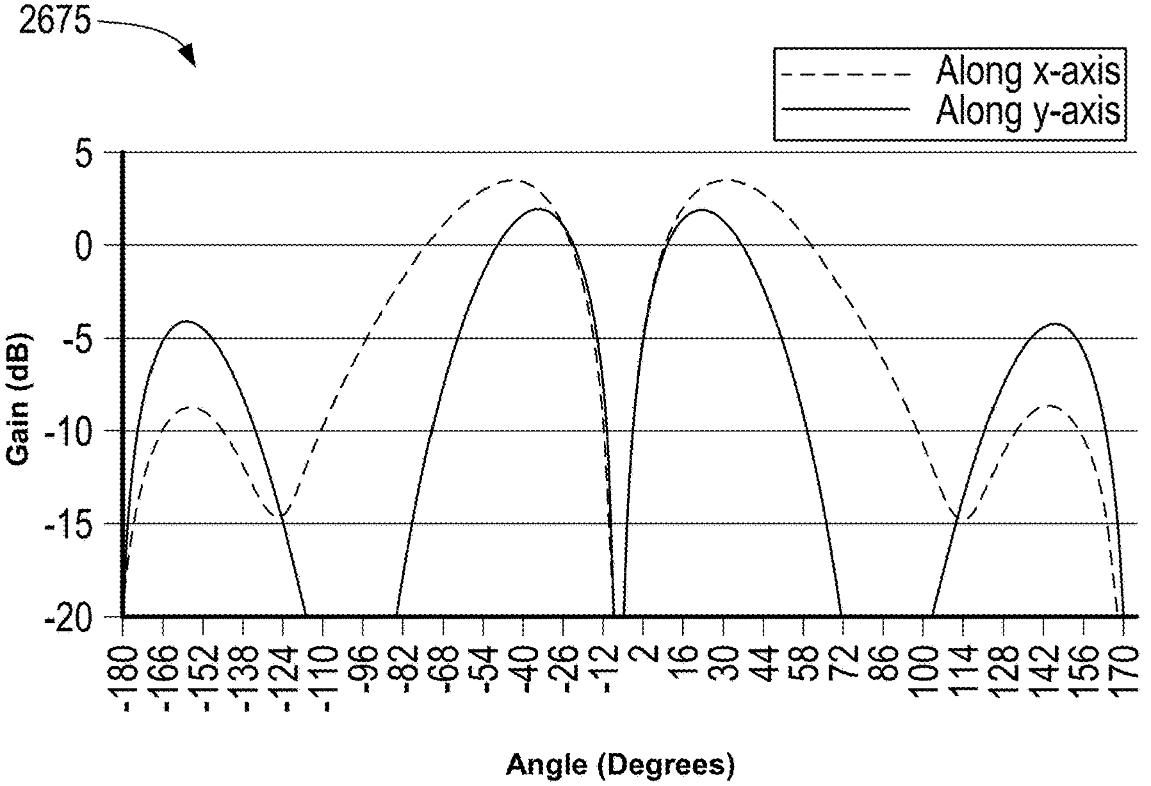

FIG. 26I illustrates a sixth gain plot 2675 of a horizontal linear polarized non-directive WPT pattern produced by the antenna tuning circuit 2630 at the multi-patch antenna array 2600, in accordance with some embodiments. The fifth gain plot 2675 shows a gain of the horizontal linear polarized non-directive WPT pattern based on the angle relative to the face of the multi-patch antenna array 2600. As illustrated in FIG. 26I, the horizontal linear polarized non-directive WPT pattern has a peak gain at a 33-degree angle from the face of the multi-patch antenna array 2600 along an x-axis and a 33-degree angle from the face of the multi-patch antenna array 2600 along a y-axis as it a non-directional WPT pattern.

Turning now to some example embodiments of the methods, devices, systems, and computer-readable storage media described earlier. In short, the descriptions below proceed by first discussing the paragraphs beginning with an A symbol, which relate to surveying for active and inactive receivers; following that is a discussion of paragraphs beginning with a B symbol, which relate to a wireless-power transmitting device; following that is a discussion of paragraphs beginning with a C symbol, which relate to wireless power and wireless synchronization; following that is a discussion of paragraphs beginning with a D symbol, which relate to operating a transmitter device; following that is a discussion of paragraphs beginning with a E symbol, which relate to wireless power coexistence; and following that is a discussion of paragraphs beginning with a F symbol, which relate to a repeater device.

(A1) In accordance with some embodiments, a method of surveying for active and inactive power receivers within a wireless-power coverage area is performed (e.g., the method 900). The method includes: (i) causing performance of a survey looking for active power receivers of a plurality of power receivers within a wireless-power coverage area using one or more communication radios (e.g., the frontend module 442 and coupled antennas 450 and 452 in FIG. 4A); (ii) receiving information from an active power receiver of the plurality of power receivers (e.g., the response from the receiver 104 in FIG. 1A); (iii) causing transmission of radio-frequency (RF) signals to energize inactive power receivers of the plurality of power receivers using a power-transmission antenna (e.g., the controller IC 408 and coupled antennas 424 and 426 in FIG. 4A), where: (a) a first RF signal of the RF signals is transmitted using a first value for a transmission characteristic (e.g., 918 MHz), and (b) a second RF signal of the RF signals is transmitted using a second value for the transmission characteristic (e.g., 2.4 GHz), the first and second values being distinct; (iv) receiving additional information from a first energized power receiver (e.g., the receiver 106 in FIG. 1C) and further information from a second energized power receiver (e.g., the receiver 208 in FIG. 2C), where: (a) the first energized power receiver was one of the inactive power receivers until it received energy from the first RF signal, and (b) the second energized power receiver was one of the inactive power receivers until it received energy from the second RF signal; and (v) identifying two or more frequency bands (e.g., 918 MHz and 2.4 GHz) for radio-frequency wireless-power transmissions by a wireless-power transmitting device within the wireless-power coverage area based on the information, the additional information, and the further information. In some embodiments, the signals further include mmW bands. In some situations, a goal is to wake as many of the inactive devices as possible so various different RF signals are sent out with different values for different transmission characteristics to achieve this goal.

(A2) In some embodiments of A1, the information from the active power receiver includes an indication of harvesting capability for the active power receiver (e.g., whether the active power receiver is configured for 918 MHz or 865 MHz WPT).

(A3) In some embodiments of A2, the two or more frequency bands for radio-frequency wireless-power transmissions are identified based on the harvesting capability for the active power receiver (e.g., the active power receiver is configured for 865 MHz WPT and one of the identified bands is 865 MHz).

(A4) In some embodiments of any of A1-A3: (i) the information from the active power receiver includes an indication of a receiver type (e.g., a device identifier or a device type identifier) for the active power receiver; and (ii) the method further includes identifying a harvesting capability for the active power receiver based on the receiver type. In some embodiments, identifying the harvesting capability for the active power receiver comprises using an LUT stored in the memory of the wireless-power transmitting device. In some embodiments, identifying the harvesting capability for the active power receiver comprises sending the indication of the receiver type to a remote system (e.g., a server system in the cloud 316, as shown in FIG. 3A) and receiving a response from the remote system that indicates the harvesting capability.

(A5) In some embodiments of any of A1-A4, causing transmission of RF signals to energize the inactive power receivers comprises causing transmission of the first RF signal and the second RF signal in sequence. In some embodiments, the first RF signal and the second RF signal are transmitted concurrently or simultaneously (e.g., as illustrated in FIGS. 8A-8B).

(A6) In some embodiments of any of A1-A5, causing transmission of RF signals to energize the inactive power receivers comprises modulating the RF signals in accordance with one or more wake-up patterns. In some embodiments, the wake-up patterns include clock calibrations and OOK patterns.

(A7) In some embodiments of any of A1-A6, the inactive power receivers of the plurality of power receivers include a batteryless device. In some embodiments, the plurality of power receivers are located within a warehouse environment and there can be numerous (e.g., hundreds or thousands) of such power receivers in the warehouse environment, each of which is used to help track inventory. Other examples include grocery store pricing tags that can be power receivers. These examples are non-limiting and non-commercial applications are also contemplated, including ones in which internet of things devices within residential homes are the power receivers.

(A8) In some embodiments of any of A1-A7, the method further includes generating an energizing pattern (e.g., the energizing pattern 112 in FIG. 1D) for RF wireless-power transmissions based on the identified two or more frequency bands. For example, an energizing pattern defines how a respective wireless-power transmitting device is to transmit RF signals into a wireless-power coverage area, which can include information concerning frequency bands, power levels, polarization, duty cycle, and the like. In some embodiments, the energizing pattern also is based on which receivers have been assigned to the transmitting device and that the energizing patterns change as the assigned receivers change.

(A9) In some embodiments of A8, generating the energizing pattern includes setting a power level for the power-transmission antenna. In some embodiments, generating the energizing pattern includes setting a respective power level for each of the one or more communication radios (e.g., a power level at which to amplify a power transmission signal using a power amplifier).

(A10) In some embodiments of A8 or A9, generating the energizing pattern includes setting a duty cycle for each frequency band of the two or more frequency bands.

(A11) In some embodiments of any of A8-A10, generating the energizing pattern includes selecting a polarization setting and a phase setting. (e.g., linear polarization and/or circular polarization feeding schemes). In some embodiments, generating the energizing pattern further includes selecting a frequency-hopping setting (e.g., via a programmable splitter component).

(A12) In some embodiments of any of A8-A11, the energizing pattern is further based on a site map of the wireless-power coverage area. In some embodiments, the site map includes relative locations of walls and impediments to wireless-power transmission. In some embodiments, the site map includes relative locations of other transmitters in the coverage area.

(A13) In some embodiments of any of A8-A12, generating the energizing pattern includes scheduling energizing time periods and device scanning time periods (e.g., BLE advertisement and scanning).

(A14) In some embodiments of any of A8-A13, the method further includes, prior to generating the energizing pattern, determining that the energizing pattern complies with one or more regulatory standards (e.g., based on duty cycle, intensity, and modulation scheme).

(A15) In some embodiments of any of A8-A14, the method further includes, after generating an energizing pattern, (i) determining that at least one of the active power receiver, the first energized power receiver, and the second energized power receiver is no longer within the wireless-power coverage area; and (ii) in accordance with the determination, modifying the energizing pattern based on remaining receivers in the wireless-power coverage area (e.g., as illustrated in FIG. 2B). In some embodiments, modifying the energizing pattern comprises identifying a frequency band of the two or more frequency bands and excluding the frequency band from the modified energizing pattern.

(A16) In some embodiments of any of A8-A15, the method further includes, after generating an energizing pattern, (i) determining that at least one additional power receiver is within the wireless-power coverage area; and (ii) in accordance with the determination, modifying the energizing pattern based on the at least one additional power receiver (e.g., as illustrated in FIG. 2C). In some embodiments, modifying the energizing pattern comprises identifying an additional frequency band and modifying the energizing pattern to include the additional frequency band.

(A17) In some embodiments of any of A8-A16, the method further includes registering the energizing pattern with a server system (e.g., the gateway device 314 or a device in the cloud 316 in FIG. 3A). In some embodiments, the wireless-power transmitting device further registers the power receiver information with the server system.

(A18) In some embodiments of A17, the server system is configured to assist with generating respective energizing patterns for each of multiple wireless-power transmitting devices, including the wireless-power transmitting device, that are within the wireless-power coverage area. In some embodiments, the server system provides an optimized energizing pattern to the wireless-power transmitting device (or information for optimizing the energizing pattern at the wireless-power transmitting device) so as to minimize overlap of power transfer between the multiple wireless-power transmitting devices. In some embodiments, the information from the active and energized receivers is used to identify a frequency band for another wireless-power transmitting device. For example, multiple power bridges (transmitter devices) may be configured with frequency and coverage area settings (e.g., concurrently). For example, server determines which receivers are going to be powered by which wireless-power transmitting devices, so the coverage areas for each of the transmitting devices can be configured dynamically and be something that is server-defined and then pushed down to the transmitting devices (or the transmitting devices can coordinate among one another to refine and/or do some of the coverage designations/modifications locally). In some embodiments, the different wireless-power transmitting devices receive the information from different power-receivers and all of the various received information is used in the aggregate to generate the energizing patterns for the various wireless-power transmitting devices (e.g., the wireless-power transmitting device does not need to receive the information from the power receivers, it can be another transmitting device, or a collection of transmitting devices, that receives that information that is then used to generate an energizing pattern for the wireless-power transmitting device).

(A19) In some embodiments of any of A1-A18, the one or more communication radios are configured for system calibration transmissions, energizing transmissions, and communications transmissions.

(A20) In some embodiments of any of A1-A19, the power-transmission antenna is distinct from the one or more communication radios. In some embodiments, the one or more communication radios include one or more antennas that are distinct from the power-transmission antenna.

(A21) In some embodiments of A20, the transmission of the RF signals is caused using a plurality of power-transmission antennas, including the power-transmission antenna (e.g., the antennas shown in FIG. 6A).

(A22) In some embodiments of A21, the plurality of power-transmission antennas are coplanar to one another and collocated within a same housing (e.g., have the same phase center and are integrated with feeding structure on main PCB).

(A23) In some embodiments of A22, the plurality of power-transmission antennas have a multiband dual linear-polarized or circular-polarized structure (e.g., can be operated as circular-polarized or cross-polarized).

(A24) In some embodiments of A22 or A23, the plurality of power-transmission antennas are configured for dynamic polarization-switching (e.g., have BOM-programmable or dynamic switched frequency tuning).

In accordance with some embodiments, a computing system includes one or more processors; memory; and one or more programs stored in the memory and configured for execution by the one or more processors, the one or more programs comprising instructions for performing any of the methods of A1-A24. In some embodiments, the computing system is a server system. In some embodiments, the computing system is the wireless-power transmitting device.

In accordance with some embodiments, a non-transitory computer-readable storage medium storing one or more programs configured for execution by a computing system having one or more processors and memory, the one or more programs comprising instructions for performing any of the methods of A1-A24. In some embodiments, the computing system is a server system (e.g., A17-A18). In some embodiments, the computing system is the wireless-power transmitting device (e.g., A1).

(B1) In accordance with some embodiments, a wireless-power transmitting device (e.g., the transmitting device 102) includes (i) a polarization-switching component configured to switch between a left-hand circular polarization setting, a right-hand circular polarization setting, a horizontal polarization setting, and a vertical polarization setting; (ii) a plurality of antennas coupled to a plurality of outputs of the polarization-switching component; and (iii) a programmable-splitter component coupled to the polarization-switching component and configured to be switchable between a linear polarization setting and a circular polarization setting (e.g., as illustrated in FIGS. 5A-5C).

(B2) In some embodiments of B1, the device further includes one or more balancing units (e.g., the balancing units 420, 422, 446, and 448 in FIG. 4A) coupled to one or more inputs of the switching component, the one or more balancing units configured to interface unbalanced input lines with balanced output lines for the polarization-switching component. In some embodiments, the balancing units include isolation transformers.

(B3) In some embodiments of B1 or B2, the programmable-splitter component includes a 90-degree phase shift element (e.g., the phase shifter 508) coupled with a switching element (e.g., the switch matrix 506). in some embodiments, the programmable-splitter component includes a phase shift element in the range of 0 degrees to 180 degrees.

(B4) In some embodiments of any of B1-B3, the device further includes a variable-gain component (e.g., the amplifier 502) coupled to an input of at least one of the polarization-switching components (e.g., the switch matrix 506) and the programmable-splitter component (e.g., the splitter 504), the variable-gain component configured to vary a voltage of an output signal supplied to the at least one of the polarization-switching component and the programmable-splitter component (e.g., based on a control voltage supplied to the variable gain component).

(B5) In some embodiments of any of B1-B4, the plurality of antennas are adapted to transmit at a sub-1 gigahertz frequency (e.g., 918 MHz) and a 2.4 gigahertz frequency (e.g., same phase center for both bands).

(B6) In some embodiments of any of B1-B5, the plurality of power-transmission antennas are coplanar to one another and collocated within the same housing (e.g., as illustrated in FIG. 6C).

(B7) In some embodiments of any of B1-B6, the plurality of antennas have a multiband dual linear-polarized or circular-polarized structure (e.g., as illustrated in FIG. 6A).

(B8) In some embodiments of any of B1-B7, switching between the left-hand circular polarization setting, the right-hand circular polarization setting, the horizontal polarization setting, and the vertical polarization setting comprising adjusting respective phases for the plurality of antennas (e.g., as illustrated in FIGS. 7A-7D).

(B9) In some embodiments of any of B1-B8, the plurality of antennas comprise a first subset of antennas (e.g., the antennas 604) adapted for a first frequency band and a second subset of antennas (e.g., the antennas 606) adapted for a second frequency band.

(B10) In some embodiments of B9, the first and second subsets of antennas are positioned in a coplanar, alternating arrangement (e.g., two groups of four symmetrically shaped antennas).

(B11) In some embodiments of B10, the first and second subsets of antennas are arranged to maintain high isolation between antenna ports (e.g., at least 15 dB).

(B12) In some embodiments of any of B1-B11, the plurality of antennas are mounted to an antenna board, and the wireless-power transmitting device further includes a reflective housing (e.g., the housing 654) enclosing at least a portion of the antenna board.

(B13) In some embodiments of any of B1-B12, the polarization-switching component is configured to select one of the left-hand circular polarization setting, the right-hand circular polarization setting, the horizontal polarization setting, and the vertical polarization setting in accordance with an energizing pattern selected for the wireless-power transmitting device.

(B14) In some embodiments of B13, the programmable-splitter component is configured to select one of the linear polarization setting and the circular polarization setting in accordance with the energizing pattern selected for the wireless-power transmitting device.

(B15) In some embodiments of B14, the energizing pattern is selected based on a plurality of power receivers identified within a wireless-power coverage area of the wireless-power transmitting device (e.g., as illustrated in FIGS. 1-3).

In accordance with some embodiments, a method of forming the wireless-power transmitting device of any of A1-A24 comprises providing and coupling each of the components of the wireless-power transmitting device recited in any of B1-B15.

In accordance with some embodiments, a method of using the wireless-power transmitting device of any of B1-B15 comprises transmitting RF signals to a power receiver to wirelessly deliver power to the power receiver.

In accordance with some embodiments, the wireless-power transmitting device of any of B1-B15 is used as a component of the wireless-power transmitting device of any of A1-A24.

(C1) In accordance with some embodiments, a method of providing wireless power and wireless synchronization (e.g., the method 2100) includes (i) detecting an RF identification signal; and (ii) causing transmission of one or more RF signals to energize one or more power receivers, wherein the one or more RF signals are configured to boost the RFID signal. In some embodiments, the method is performed at any one of the transmitting devices described herein. In some embodiments, the method is performed at a wireless power bridge. In some embodiments, the wireless power bridge is configured to operate as an RF repeater (e.g., for RFID signals).

(C2) In some embodiments of C1, the one or more RF signals are synchronized with the RFID signal.

(C3) In some embodiments of C1 or C2, configuring the one or more RF signals to boost the RFID signal includes increasing a range and/or performance of the RFID signal. In some embodiments, configuring the RF signals to boost the RFID signal includes adjusting one or more frequencies of the RF signals based on a frequency of the RFID signal.

(C4) In some embodiments of any of C1-C3, the method further includes determining timing information of the RFID signal; and configuring the transmission of the one or more RF signals.

(C5) In some embodiments of C4, the timing information comprises a time period and/or frequency of the RFID signal.

(C6) In some embodiments of any of C1-C5, the RFID signal comprises an RFID interrogation signal (e.g., from an RFID reader).

(C7) In some embodiments of any of C1-C6, the RFID signal comprises an RFID transmission signal (e.g., from an RFID tag).

(C8) In some embodiments of any of C1-C7, the RFID signal is detected using a signal-detecting receiver (e.g., an RFID receiver with read interrupt signaling and data demodulation). In some embodiments, the receiver is a data communication receiver. In some embodiments, the receiver is a sampling receiver with detection and demodulation hardware (e.g., for LoRa, WiFi, and/or RFID). In some embodiments, the receiver is a sampling receiver with software-defined demodulation for various types of networks (e.g., power, preamble, and classification).

(C9) In some embodiments of any of C1-C8, the method further includes determining an envelope of the RFID signal; and configuring the one or more RF signals to conform to the envelope of the RFID signal. For example, the one or more RF signals are modulated to follow the reader ASK/OOK envelope to repeat the reader signal.

(C10) In some embodiments of any of C1-C9, the one or more RF signals are transmitted concurrently with detecting the RFID signal. For example, using antenna spatial multiplexing, non-reciprocity, and/or carrier cancellation.

(C11) In some embodiments of any of C1-C10, the RFID signal has a first frequency, and the one or more RF signals are configured to have the first frequency. For example, the RFID frequency is detected, and the repeater frequency plan is adjusted for best performance.

(C12) In some embodiments of any of C1-C11, the RFID signal is detected using a first antenna and the one or more RF signals are transmitted using a second antenna.

(C13) In some embodiments of any of C1-C12, the method further including, prior to detecting the RFID signal, causing transmission of the one or more RF signals; and, in response to detecting the RFID signal (a) ceasing to cause transmission of the one or more RF signals; and (b) configuring the one or more RF signals to boost the RFID signal, where the one or more RF signals are caused to be transmitted after the configuring.

(D1) In accordance with some embodiments, a method of operating a transmitter device includes (i) operating the transmitter device in a first mode, including: (a) detecting an RF identification signal; and (b) augmenting the RFID signal using a transmitter of the transmitter device (e.g., repeating the RFID signal); and (ii) operating the transmitter device in a second mode, including (a) detecting one or more power receivers; and (b) causing transmission of one or more RF signals, via the transmitter, to energize the one or more power receivers. In some embodiments, while in the first mode, the transmitter is off (powered-down) until an RFID signal is received. In some embodiments, the second mode is disabled in response to detecting the RFID signal (e.g., to avoid interference). In some embodiments, the method is performed at any one of the transmitting devices described herein. In some embodiments, the method is performed at a wireless power bridge. In some embodiments, the wireless power bridge is configured to operate as an RF repeater (e.g., for RFID signals).

(D2) In some embodiments of D1, operating the transmitter device in the second mode further includes detecting the RFID signal and configuring the one or more RF signals to augment the RFID signal.

(D3) In some embodiments of D1 or D2, the RFID signal is detected using a first antenna and the RFID signal is augmented using a second antenna.

(D4) In some embodiments of D1 or D2, the RFID signal is detected and augmented using a same antenna.

(D5) In some embodiments of D4, the one or more RF signals are transmitted using the same antenna.

(D6) In some embodiments of any of D1-D5, the transmitter device is configured to operate in the second mode in accordance with a determination that at least one power receiver is detected; and the transmitter device is configured to operate in the first mode in accordance with a determination that the at least one power receiver is not detected.

(D7) In some embodiments of any of D1-D6, the transmitter device is configured to transition from the first mode to the second mode in accordance with detection of at least one power receiver.

(D8) In some embodiments of any of D1-D7, the transmitter device is further configured to operate in a third mode, including (i) detecting the one or more power receivers; and (ii) causing transmission of one or more second RF signals, via the transmitter, to energize the one or more power receivers, the one or more second RF signals configured to reduce interference with a communication signal.

(D9) In some embodiments of D8, the transmitter device is configured to operate in the second mode in accordance with a determination that no communication signal is detected; and the transmitter device is configured to operate in the third mode in accordance with a determination that at least one communication signal is detected. In some embodiments, while operating in the third mode, the transmitter device is configured to transition to the second mode in accordance with the communication signal no longer being detected (e.g., a preset time out).

(D10) In some embodiments of D8 or D9, operating in the third mode further includes (i) determining whether transmission of the one or more RF signals would interfere with the communication signal; (ii) in accordance with a determination that the transmission of the one or more RF signals would not interfere with the communication signal, causing transmission of the one or more RF signals; and (iii) in accordance with a determination that the transmission of the one or more RF signals would interfere with the communication signal, causing transmission of the one or more second RF signals.

(D11) In some embodiments of any of D1-D10, available modes of the transmitter device are enabled or disabled in firmware, the available modes including the first mode and the second mode.

(E1) In accordance with some embodiments, a method of providing wireless power and wireless synchronization (e.g., the method 2150) includes, at a device configured to provide wireless power transmission (WPT) signals: (i) scanning an area for wireless communications; (ii) identifying the presence of a communications network based on the scan; (iii) in accordance with a determination that transmission of the WPT signals would not interfere with the communications network, providing the WPT signals in a first configuration; and (iv) in accordance with a determination that the transmission of the WPT signals would interfere with the communications network, providing the WPT signals in a second configuration, the second configuration configured to reduce interference with the communications network. In some embodiments, the method is performed at a network device (e.g., a bridge or gateway device). In some embodiments, the method is performed at any one of the transmitting devices described herein. In some embodiments, a software-defined radio (SDR) is used to determine/set the configurations based on properties of detected communication signals. In some embodiments, the configuration selection is based on a power level and/or classification of the communications network. For example, a first configuration is used for the presence of WiFi, a second configuration is used for the presence of LoRa, and a third configuration is used for the presence of GSM.

In some embodiments, the communications network is an RFID, WiFi, LoRa, or GSM network. In some embodiments, the second configuration includes transmission of WPT signals in an envelope-follower mode. In some embodiments, the second configuration includes transmission of WPT signals in a non-envelope-follower mode. In some embodiments, the second configuration includes transmission of WPT signals in a static CW or hopping transmission pattern.

(E2) In some embodiments of E1, the method further includes determining whether the transmission of the WPT signals would interfere with the communications network. In some embodiments, the determination occurs at the device, in some embodiments the determination occurs at a remote system (e.g., presence data is sent to the remote system for analysis and instructions).

(E3) In some embodiments of E2, the scanning and the determining are performed at a same chip. In some embodiments, the scanning and the determining at different chips.

(E4) In some embodiments of E2 or E3, determining whether the transmission of the WPT signals would interfere with the communications network comprises determining that the WPT signals share at least a portion of a frequency band with the communications network.

(E5) In some embodiments of any of E2-E4, determining whether the transmission of the WPT signals would interfere with the communications network comprises classifying a protocol type of the communications network. For example, an RFID protocol, an 802.11 protocol, or a LoRA protocol. For example, the receiver demodulates/decodes the incoming signal (e.g., the preamble), software reads the data, and classifies the incoming signal as RFID or not RFID. In this example, the RFID signals are considered to interfere, and the non-RFID signals are considered not to interfere. The classification can be periodic, and/or there can be a time limit or some other programmable limit for coexistence mode. In some embodiments, the classification is based on a frequency, a spectrum, a bandwidth, a shape, and/or a packet power profile.

(E6) In some embodiments of any of E1-E5, the method further includes transitioning from the second configuration to the first configuration in accordance with one or more predefined criteria. In some embodiments, the one or more predefined criteria include a timeout criterion, a number of reads criterion, and/or other parameters received from the communications network.

(E7) In some embodiments of any of E1-E6, the method further includes receiving a packet from the communications network; and transmitting the packet to a remote device. In some embodiments, communication packets are forwarded to a network (cloud) server.

In accordance with some embodiments, a computing system includes one or more processors, memory, and one or more programs stored in the memory and configured for execution by the one or more processors, the one or more programs comprising instructions for performing any of the methods described herein (e.g., the methods 900, 2100, 2150, A1-A24, C1-13, D1-D11, and E1-E7).

In accordance with some embodiments, a non-transitory computer-readable storage medium stores one or more programs configured for execution by a computing system having one or more processors and memory, the one or more programs comprising instructions for performing any of the methods described herein (e.g., the methods 900, 2100, 2150, A1-A24, C1-13, D1-D11, and E1-E7).

(F1) In accordance with some embodiments, a repeater device includes: (i) a receiver configured to detect an incoming radio-frequency (RF) identification signal; (ii) circuitry coupled to the receiver and a transmitter, the circuitry configured to: (a) detect a power envelope of the incoming RFID signal; and (b) modulate an output signal in accordance with the power envelope to generate a modulated output signal; and (iii) the transmitter configured to transmit the modulated output signal. In some embodiments, the receiver comprises an RFID tag IC. In some embodiments, the receiver comprises a power rectifier component, an envelope detection component, and an RFID signal decoder component. In some embodiments, the repeater device is configured to monitor decoded data and switch to a hybrid operation mode in accordance with the decoded data meeting one or more criteria (e.g., as described previously with respect to FIG. 17).

(F2) In some embodiments of F1, the repeater device further includes control circuitry configured to generate a power envelope for the output signal based on the power envelope of the incoming RFID signal. For example, the control circuitry may be a controller or microcontroller.

(F3) In some embodiments of F1 or F2, the circuitry comprises an amplitude demodulator for detecting the power envelope, and an amplitude modulator for modulating the output signal. In some embodiments, the circuitry includes a coupling component configured to provide the power envelope to the amplitude modulator. In some embodiments, the circuitry includes a classification component configured to detect patterns corresponding to different communication standards.

(F4) In some embodiments of any of F1-F3, the receiver and the transmitter are components of a same antenna. In some embodiments, the circuitry comprises a directional coupler configured to sample the incoming RFID signal. In some embodiments, the circuitry comprises a signal conditioning component configured to apply a gain, attenuation, and/or filer to the RFID signal.

(F5) In some embodiments of any of F1-F4, the receiver and the transmitter are components of a different antennas.

(F6) In some embodiments of any of F1-F5, the receiver comprises one or more of: a tuner configured to convert the incoming RFID signal to an intermediate frequency; an analog-to-digital converter; a digital downconverter; and a digital signal processor (DSP). In some embodiments, the DSP is programmable. In some embodiments, the DSP is configured to decode the data.

(F7) In some embodiments of any of F1-F5, the repeater device further includes a cancellation circuit configured to isolate the receiver from the transmitter. For example, the cancellation circuit is arranged in series between the receiver and the transmitter. In some embodiments, the cancellation circuit comprises a variable phase shifter and/or an attenuator. In some embodiments, the cancellation circuit is adaptive (e.g., uses feedback from the receiver to adjust one or more outputs). In some embodiments, a carrier cancellation function is implemented in a processor (e.g., a DSP). In some embodiments, the cancellation circuit comprises a circulator.

(F8) In some embodiments of any of F1-F7, the repeater device is configured to perform any of the methods of C1-13, D1-D11, and E1-E7. In some embodiments, the repeater device includes one or more components from any of the transmitting devices described herein (e.g., the repeater device is an instance of one of the transmitting devices described herein).

In some embodiments, the repeater device is configured for RFID detection and enhancement. As an example, the repeater device detects an RFID interrogation over-the-air, and synchronizes a WPT transmission to interrogators in time and/or frequency. In some embodiments, the transmitting device is configured to boost range of an RFID response signal, e.g., amplify the backscatter signal by applying power during the tag to reader phase of RFID. In some embodiments, the transmitting device is configured to detect, synchronize, and boost the reader signal to improve the range of an existing RFID reader. In some embodiments, the transmitting device includes an algorithm to switch between a pure WPT mode and an RFID hybrid mode (e.g., as described previously with respect to FIG. 17).

In some embodiments, the repeater device is configured for programmable listen-before-talk and classification. For example, the repeater device scans and identifies communication networks in-band and classifies the networks as likely or unlikely victims based on a combination of factors. In this example, the repeater device sets the transmitter to a non-interfering configuration if needed.

In some embodiments, the repeater device is a wireless power bridge. In some embodiments, the repeater device includes dedicated WPT band(s) with programmable PHY optimized for wireless power transmission, e.g., with or without data communication in the WPT band(s). In some embodiments, the wireless power bridge operates in one of several modes which may have different hardware configurations and/or may be software-programmable. For example, the modes may include RFID repeater only; RFID repeater and WPT; RFID repeater, WPT, and listen-before-talk; or RFID repeater, WPT, and LBT with data classification.

In some embodiments, the repeater device includes a signal-detecting receiver inside a WPN transmitter. In some embodiments, the repeater device includes a power and/or envelope detector to enable TX to match RFID activity. In some embodiments, the repeater device includes a RFID receiver with read interrupt signaling and data demodulation. In some embodiments, the repeater device includes a data communication receiver inside a WPN transmitter. In some embodiments, the repeater device includes a sampling receiver with LoRa, WiFi, and RFID detection/demodulation in hardware. In some embodiments, the repeater device includes a sampling receiver with software-defined demodulation for various victim networks (e.g., power, preamble, and/or classification).

In some embodiments, the repeater device includes an electromagnetic and/or electronic solution to enable simultaneous receive and transmit for RFID boosting, including one or more of: antenna spatial multiplexing (diversity), electromagnetic or electronic non-reciprocity, and fixed and/or adaptive carrier cancellation.

(G1) In accordance with some embodiments, a wireless-power transmitting (WPT) device (e.g., the antenna tuning circuit 2300, the antenna tuning circuit 2550, the antenna tuning circuit 2630, etc.) includes a programmable splitter component (e.g., the splitter 2304), a plurality of polarization switching components (e.g., the two phase-shifting modules 2330*a*-2330*b*), a plurality of amplifiers (e.g., the two amplifiers 2312*a*-2312*b*), and a plurality of antennas (e.g., the two antennas 2316*a*-2316*b*). The programmable splitter component is configured to be switchable between a linear polarization setting (e.g., a horizontal linear polarization setting, a vertical linear polarization setting, a linear out-of-phase setting, and/or a linear in-phase setting) and a circular polarization setting (e.g., an LHCP setting and/or an RHCP setting). The plurality of polarization switching components are coupled to a plurality of outputs of the programmable splitter component (e.g., as illustrated in FIGS. 23A, 26D, and 26C). The plurality of amplifiers are coupled to respective outputs of the plurality of polarization-switching components (e.g., as illustrated in FIGS. 23A, 26D, and 26C). The plurality of antennas are coupled to respective outputs of the plurality of amplifiers (e.g., as illustrated in FIGS. 23A, 26D, and 26C).

(G2) In some embodiments of G1, the WPT device further includes another amplifier (e.g., the preamplifier 2302), and the programmable splitter component is coupled to an output of the other amplifier (e.g., as illustrated in FIGS. 23A, 26D, and 26C). In some embodiments, the other amplifier is a variable-gain amplifier.

(G3) In some embodiments of G1-G2, the WPT device further includes a plurality of filters (e.g., the two low-pass filters 2322*a*-2322*b*), and the plurality of filters are coupled to the respective inputs of the plurality of antennas (e.g., as illustrated in FIG. 23B). In some embodiments, the plurality of filters includes at least one of a low-pass filter, a high-pass filter, and a band-pass filter.

(G4) In some embodiments of G1-G3, each of the plurality of polarization-switching components switch between a left-hand circular polarization (LHCP) setting, a right-hand circular polarization (RHCP) setting, a horizontal polarization setting, and a vertical polarization setting. In some embodiments, the each of the plurality of polarization-switching components further switch between an in-phase linear polarization setting, an out-of-phase linear polarization setting, a horizontal non-directive setting, and a vertical non-directive setting.

(G5) In some embodiments of G1-G4, the switching between the left-hand circular polarization setting, the right-hand circular polarization setting, and the horizontal polarization setting, and the vertical polarization setting includes adjusting respective phases for the plurality of antennas.

(G6) In some embodiments of G1-G5, each of the plurality of amplifiers is configured to vary a voltage of an output signal supplied to the plurality of antennas (e.g., each of the plurality of amplifiers is a variable-gain amplifier).

(G7) In some embodiments of G1-G6, the WPT device further includes a controller coupled to the programmable splitter, each of the plurality of polarization-switching components, and each of the plurality of amplifiers (e.g., as illustrated in FIGS. 23B and 26B). In some embodiments, the controller controls the programmable splitter, each of the plurality of polarization-switching components, and each of the plurality of amplifiers to switch between the left-hand circular polarization setting, the right-hand circular polarization setting, and the horizontal polarization setting, and the vertical polarization setting.

(G8) In some embodiments of G1-G7, the WPT device further includes a communication device (e.g., a WiFi device, a Bluetooth device, an LTE device, and/or an Ethernet device) coupled to the controller (e.g., as illustrated in FIG. 23B).

(G9) In some embodiments of G1-G8, the WPT device further includes a plurality of matching components (e.g., the two load-balancing components 2314*a*-2314*b*). The plurality of matching components are coupled to the respective outputs of the plurality of amplifiers (e.g., as illustrated in FIGS. 23A, 25D, and 26C). Each matching component of the plurality of matching components are configured to interface unbalanced input lines with balanced output lines for the plurality of polarization-switching components.

(G10) In some embodiments of G1-G9, the WPT device further includes a multi-band wireless-power transmission source (e.g., included in the IC controller 2350). The programmable-splitter component is coupled to an output of the multi-band wireless-power transmission source (e.g., as illustrated in FIG. 23B).

(G11) In some embodiments of G1-G10, the WPT device further includes a dynamic power supply (e.g., the dynamic power supply 2370). The dynamic power supply is coupled to the plurality of amplifiers.

(G12) In some embodiments of G1-G11, the plurality of antennas includes at least one stacked patch antenna (e.g., the stacked patch antennas described in reference to FIGS. 22A-22C).

(G13) In some embodiments of G1-G12, the WPT device receives power via an Ethernet connection (e.g., the power-over-ethernet connection 2344).

(G14) In some embodiments of G1-G13, the plurality of antennas are arranged within a housing (e.g., the indoor housing 2570, the first outdoor housing 2580, and the second outdoor housing 2590). The housing comprises two pieces coupled with an O-ring (e.g., the O-ring gasket 2595).

(G15) In some embodiments of G1-G14, the programmable splitter component includes a 90-degree (or 180-degree) phase shift element (e.g., the at least two phase shifters 2310*a*-2310*d*) coupled with a switching element (e.g., the two pairs of phase-select switches 2308*a*-2308*b*) (e.g., as illustrated in FIGS. 23A, 25D, and 26C).

(G16) In some embodiments of G1-G15, the WPT device further includes at least one variable-gain component coupled to respective inputs of the plurality of polarization-switching components. The at least one variable-gain component is configured to vary a voltage of an output signal supplied to the plurality of polarization-switching components.

(G17) In some embodiments of G1-G16, the plurality of antennas are adapted to transmit at a sub-1 gigahertz frequency and a 2.4 gigahertz frequency.

(G18) In some embodiments of G1-G17, the plurality of antennas include a least one of a dual-patch antenna (e.g., the dual-patch antenna described in reference to FIGS. 22A-22C), a multi-patch antenna (e.g., the multi-patch antenna array 2600), and a multi-zone antenna (e.g., the first antenna array 2500, the second antenna array 2520, and/or the third antenna array 2540) and are collocated within a housing (e.g., as illustrated in FIGS. 25A-25B and 25E-25G).

(G19) In some embodiments of G1-G18, the plurality of antennas have a multi-band dual linear polarized and/or circular-polarized structure.

(G20) In some embodiments of G1-G19, the plurality of antennas include a first subset of antennas adapted for a first frequency band and a second subset of antennas adapted for a second frequency band.

(G21) In some embodiments of G1-G20, the first and second subsets of antennas are positioned in a coplanar, alternating arrangement (e.g., as illustrated in FIG. 6A).

(G22) In some embodiments of G1-G21, the first and second subsets of antennas are arranged to maintain high isolation between antenna ports (e.g., as illustrated in FIGS. 25A-25C and 26A).

(G23) In some embodiments of G1-G22, the plurality of antennas are mounted to an antenna board, and the wireless-power transmitting device further comprises a reflective housing enclosing at least a portion of the antenna board (e.g., as illustrated in FIGS. 25A-25B).

(G24) In some embodiments of G1-G23, the programmable-splitter component is configured to select one of a linear polarization setting (e.g., a horizontal linear polarization setting, a vertical linear polarization setting, a linear out-of-phase setting, and/or a linear in-phase setting) and a circular polarization setting (e.g., an LHCP setting and/or an RHCP setting) in accordance with an energizing pattern selected for the WPT device.

(G25) In some embodiments of G1-G24, the energizing pattern is selected based on a plurality of power receivers identified within a wireless-power coverage area of the wireless-power transmitting device.

(H1) In accordance with some embodiments, a wireless power transmitting (WPT) device includes a housing (e.g., the housing illustrated in reference to FIGS. 25A-25B), a plurality of antenna elements (e.g., the four antennas 2502*a*-2502*d*), a transmitter (e.g., the antenna tuning circuit 2550), and a plurality of radiofrequency (RF) wave reflectors (e.g., the reflectors 2504*a*-2504*d*). The plurality of antenna elements are arranged within the housing and each antenna element of the plurality of antenna elements have a different coverage zone of a plurality of coverage zones. The plurality of coverage zones are configured to reduce overlap. The transmitter is coupled to the plurality of antenna elements (e.g., as illustrated in FIG. 25D) and is configured to govern operation of the plurality of antenna elements. The plurality of RF wave reflectors are arranged on the housing. The plurality of RF wave reflectors and the plurality of antenna elements are arranged such that each antenna element of the plurality of antenna elements produces a respective wireless-power radiation field pattern into a respective coverage zone of the plurality of coverage zones.

(H2) In some embodiments of H1, the transmitter includes a programmable splitter component (e.g., the splitter 2554), a plurality of polarization switching components, and a plurality of amplifiers (e.g., the amplifier 2562). The programmable splitter component is configured to be switchable between a linear polarization setting (e.g., a horizontal linear polarization setting, a vertical linear polarization setting, a linear out-of-phase setting, and/or a linear in-phase setting) and a circular polarization setting (e.g., an LHCP setting and/or an RHCP setting). The plurality of polarization switching components are coupled to a plurality of outputs of the programmable splitter component (e.g., as illustrated in FIG. 25D). The plurality of amplifiers are coupled to respective outputs of the plurality of polarization-switching components (e.g., as illustrated in FIG. 25D). The plurality of antenna elements are coupled to respective outputs of the plurality of amplifiers (e.g., as illustrated in FIG. 25D).

(H3) In some embodiments of H1-H2, the transmitter is configured to select one of a linear polarization setting (e.g., a horizontal linear polarization setting, a vertical linear polarization setting, a linear out-of-phase setting, and/or a linear in-phase setting) and a circular polarization setting (e.g., an LHCP setting and/or an RHCP setting) in accordance with an energizing pattern selected for the WPT device.

(H4) In some embodiments of H1-H3, the energizing pattern is selected based on a plurality of power receivers identified within the respective coverage zone of the plurality of coverage zones area of the WPT device.

(H5) In some embodiments of H1-H4, the transmitter is configured to govern operation of the plurality of antenna elements such that (i) a first antenna element of the plurality of antenna elements produces a first wireless-power radiation field pattern into a first coverage zone of the plurality of coverage zones, and (ii) a second antenna element of the plurality of antenna elements produces a second wireless-power radiation field pattern, distinct from the first wireless power radiation field pattern, into a second coverage zone of the plurality of coverage zones.

(H6) In some embodiments of H1-H5, the transmitter is configured to govern operation of the plurality of antenna elements such that a portion of the plurality of antenna elements produces a group wireless-power radiation field pattern into a portion of the plurality of coverage zones.

(H7) In some embodiments of H1-H6, the transmitter is configured to identify a receiver based on a receiver's location in the plurality of coverage zones.

(H8) In some embodiments of H1-H7, the plurality of antenna elements include at least one of a folded dipole antenna (e.g., as illustrated in FIGS. 25A-25B) and a stacked patch antenna (e.g., as illustrated in FIG. 25C).

(H9) In some embodiments of H1-H8, the plurality of RF wave reflectors are arranged to reduce interference between a plurality of wireless-power radiation field patterns produced by the plurality of antenna elements.

(H10) In some embodiments of H1-H9, the plurality of antenna elements are arranged in one of a circular shape (e.g., as illustrated in FIG. 25B) and a rectangular shape (e.g., a square shape, as illustrated in FIG. 25A).

(H11) In some embodiments of H1-H10, the wherein the housing includes two pieces coupled with an O-ring (e.g., the O-ring gasket 2595) (e.g., as illustrated in FIG. 25G).

(I1) In accordance with some embodiments, a wireless-power transmitting (WPT) device includes a substrate (e.g., as illustrated in FIG. 26A), a transmitter (e.g., the antenna tuning circuit 2630), and a plurality of patch antennas (e.g., the plurality of antennas 2602*a*-2602*d*). The transmitter is coupled to the plurality of patch antennas. Each patch antenna of the plurality of patch antennas includes at least one feed port (e.g., the respective pairs of feed ports 2604*a*-2604*d*). The transmitter is configured to govern operation of each feed port of the at least one feed port of each patch antenna. The transmitter is configured to selectively produce a plurality of directive wireless-power radiation field patterns by adjusting feed port (e.g., as shown by Table 7 and illustrated in FIGS. 26D-26G).

(I2) In some embodiments of I1, the transmitter is further configured to selectively produce a plurality of non-directive wireless-power radiation field patterns by adjusting the feed port configurations (e.g., as shown by Table 7 and illustrated in FIGS. 26H-26I).

(I3) In some embodiments of I1-I2, the plurality of non-directive wireless-power radiation field patterns includes at least one side wireless-power radiation field pattern (e.g., as illustrated in FIGS. 26H-26I).

(I4) In some embodiments of I1-I3, each of the at least one feed port of each patch antenna of the plurality of patch antennas is configured to reduce interference between each of the at least one feed port of each patch antenna of the plurality of patch antennas.

(I5) In some embodiments of I1-I4, the at least one feed port of each patch antenna of the plurality of patch antennas are arranged in a circular arrangement (e.g., as illustrated in FIG. 26A).

(I6) In some embodiments of I1-I5, the transmitter includes a programmable-splitter component (e.g., the splitter 2634), a plurality of polarization-switching components, and a plurality of amplifiers (e.g., the amplifier 2642). The programmable splitter component is configured to be switchable between a linear polarization setting (e.g., a horizontal linear polarization setting, a vertical linear polarization setting, a linear out-of-phase setting, and/or a linear in-phase setting) and a circular polarization setting (e.g., an LHCP setting and/or an RHCP setting). The plurality of polarization switching components are coupled to a plurality of outputs of the programmable splitter component (e.g., as illustrated in FIG. 26C). The plurality of amplifiers are coupled to respective outputs of the plurality of polarization-switching components (e.g., as illustrated in FIG. 26C). Each of the at least one feed port of each patch antenna of the plurality of patch antennas are coupled to a respective output of the plurality of amplifiers (e.g., as illustrated in FIG. 26C).

(I7) In some embodiments of I1-I6, the transmitter further includes another amplifier (e.g., the preamplifier 2632). The programmable-splitter component is coupled to an output of the other amplifier (e.g., as illustrated in FIG. 26C).

(I8) In some embodiments of I1-I7, the transmitter further includes a plurality of matching components (e.g., the load balancing component 2644). The plurality of matching components are coupled to the respective outputs of the plurality of amplifiers (e.g, as illustrated in FIG. 26C). Each matching component of the plurality of matching components is configured to interface unbalanced input lines with balanced output lines for the plurality of polarization-switching component.

(I9) In some embodiments of I1-I8, each of the plurality of polarization-switching components switch between a left-hand circular polarization setting, a right-hand circular polarization setting, a horizontal polarization setting, a vertical polarization setting, and at least one non-directive linear polarization setting (e.g., as shown by Table 7).

(I10) In some embodiments of I1-I9, the switching between the left-hand circular polarization setting, the right-hand circular polarization setting, and the horizontal polarization setting, and the vertical polarization setting includes adjusting respective phases for each of the at least one feed port of each patch antenna of the plurality of patch antennas (e.g., as shown by Table 7).

(I11) In some embodiments of I1-I10, at least one of the plurality of polarization-switching components have a fixed phase (e.g., feed port 2614*a*, as shown by Table 7).

(I12) In some embodiments of I1-I11, the plurality of patch antennas comprises four patch antennas (e.g., as illustrated in FIG. 26A). Each of the four patch antennas includes two feed ports (e.g., as illustrated in FIGS. 26A-26C).

In some embodiments, the devices described herein (e.g., a WPT device, WPN transmitter device, and/or other type of device) are implemented in a lighting fixture. In some embodiments, the devices described herein further include lighting components (e.g., light emitting diodes, filaments, and other types of lighting components). In some embodiments, the devices described are configured to couple to (and acquire power from) a light socket, lamp socket, or other type of light fixture mount. In some embodiments, the devices are configured to obtain power via an AC and/or DC lighting power supply. In some embodiments, the devices are configured to obtain power via a power over ethernet (PoE) connection integrated in the light socket or mount (e.g., coupled via PoE 466 and/or USB voltage source 464). In some embodiments, the programmable bridging and/or gateway functionality described herein is incorporated into lighting fixtures and/or lighting controls. In some embodiments, an assigned power zone area (wireless power zone) for a device is based on a light fixture location for the device. In some embodiments, the devices described herein have a form factor corresponding to a light box, pendant light, or table lamp. In some embodiments, an antenna of the device is integrated into a light box reflector. In some embodiments, an antenna of the device is integrated into a pendant light fixture (e.g., hanging from a ceiling). In some embodiments, an antenna of the device is integrated into a task lamp.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 1372, 1374, or 1156) can include, but is not limited to, high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

Stored on any one of the machine-readable medium (media), features of the present invention can be incorporated in software and/or firmware for controlling the hardware of a processing system (such as the components associated with the wireless-power transmitter 1300 and/or wireless-power receivers 1100), and for enabling a processing system to interact with other mechanisms utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A wireless-power-transmitting device, comprising:

a programmable-splitter component configured to be switchable between a linear polarization setting and a circular polarization setting;

a plurality of polarization-switching components coupled to a plurality of outputs of the programmable-splitter component;

a plurality of amplifiers coupled to respective outputs of the plurality of polarization-switching components; and a plurality of antennas coupled to respective outputs of the plurality of amplifiers.

2. The device of claim 1, further comprising:

another amplifier, wherein the programmable-splitter component is coupled to an output of the other amplifier.

3. The device of claim 1, further comprising a plurality of filters coupled to the respective inputs of the plurality of antennas.

4. The device of claim 1, wherein each of the plurality of polarization-switching components switch between a left-hand circular polarization setting, a right-hand circular polarization setting, a horizontal polarization setting, and a vertical polarization setting.

5. The device of claim 4, wherein switching between the left-hand circular polarization setting, the right-hand circular polarization setting, and the horizontal polarization setting, and the vertical polarization setting includes adjusting respective phases for the plurality of antennas.

6. The device of claim 1, wherein each of the plurality of amplifiers is configured to vary a voltage of an output signal supplied to the plurality of antennas.

7. The device of claim 1, further comprising a controller coupled to the programmable splitter, each of the plurality of polarization-switching components, and each of the plurality of amplifiers.

8. The device of claim 7, further comprising a communication device coupled to the controller.

9. The device of claim 1, further comprising a plurality of matching components, coupled to the respective outputs of the plurality of amplifiers, each matching component of the plurality of matching components configured to interface unbalanced input lines with balanced output lines for the plurality of polarization-switching component.

10. The device of claim 1, further comprising a multi-band wireless-power transmission source, wherein the programmable-splitter component is coupled to an output of the multi-band wireless-power transmission source.

11. The device of claim 1, further comprising a dynamic power supply, coupled to the plurality of amplifiers.

12. The device of claim 1, wherein the plurality of antennas includes at least one stacked patch antenna.

13. The device of claim 1, wherein the wireless-power transmitting device receives power via an ethernet connection.

14. The device of claim 1, wherein the plurality of antennas are arranged within a housing and the housing comprises two pieces coupled with an O-ring.

15. A wireless-power-transmitting device, comprising:

a housing;

a plurality of antenna elements arranged within the housing, each antenna element of the plurality of antenna elements having a different coverage zone of a plurality of coverage zones, wherein the plurality of coverage zones are configured to reduce overlap;

a transmitter coupled to the plurality of antenna elements, the transmitter configured to govern operation of the plurality of antenna elements, and wherein the transmitter includes:

a programmable-splitter component configured to be switchable between a linear polarization setting and a circular polarization setting, a plurality of polarization-switching components coupled to a plurality of outputs of the programmable-splitter component, and a plurality of amplifiers coupled to respective outputs of the plurality of polarization-switching components, wherein the plurality of antenna elements are coupled to respective outputs of the plurality of amplifiers; and a plurality of radiofrequency (RF) wave reflectors arranged on the housing, wherein: the plurality of RF wave reflectors and the plurality of antenna elements are arranged such that each antenna element of the plurality of antenna elements produces a respective wireless-power radiation field pattern into a respective coverage zone of the plurality of coverage zones.

16. The device of claim 15, wherein the transmitter is configured to govern operation of the plurality of antenna elements such that:

a first antenna element of the plurality of antenna elements produces a first wireless-power radiation field pattern into a first coverage zone of the plurality of coverage zones; and a second antenna element of the plurality of antenna elements produces a second wireless-power radiation field pattern, distinct from the first wireless power radiation field pattern, into a second coverage zone of the plurality of coverage zones.

17. A wireless-power-transmitting device, comprising:

a substrate;

a plurality of patch antennas arranged on the substrate; and a transmitter coupled to the plurality of patch antennas, wherein:

each patch antenna of the plurality of patch antennas includes at least one feed port;

the transmitter is configured to govern operation of each feed port of the at least one feed port of each patch antenna; and the transmitter is configured to selectively produce a plurality of directive wireless-power radiation field patterns by adjusting feed port configurations.

18. The device of claim 17, wherein the transmitter is further configured to selectively produce a plurality of non-directive wireless-power radiation field patterns by adjusting the feed port configurations.

19. The device of claim 17, wherein the transmitter includes:

a programmable-splitter component configured to be switchable between a linear polarization setting and a circular polarization setting;

a plurality of polarization-switching components coupled to a plurality of outputs of the programmable-splitter component; and a plurality of amplifiers coupled to respective outputs of the plurality of polarization-switching components, wherein each of the at least one feed port of each patch antenna of the plurality of patch antennas are coupled to a respective output of the plurality of amplifiers.

* * * * *